(12) United States Patent
Shirai et al.

(10) Patent No.: US 11,780,519 B2
(45) Date of Patent: Oct. 10, 2023

(54) TELESCOPIC APPARATUS CONTROLLER, TELESCOPIC APPARATUS OPERATING SYSTEM, AND TELESCOPIC APPARATUS

(71) Applicant: SHIMANO INC., Sakai (JP)

(72) Inventors: Toyoto Shirai, Sakai (JP); Yuki Sakagawa, Sakai (JP); Norikazu Taki, Sakai (JP); Akihiro Nozaki, Sakai (JP); Noor Ashyikkin Binti Mohd Noor, Sakai (JP); Kentaro Kosaka, Sakai (JP)

(73) Assignee: SHIMANO INC., Sakai (JP)

( * ) Notice: Subject to any disclaimer, the term of this patent is extended or adjusted under 35 U.S.C. 154(b) by 1193 days.

(21) Appl. No.: 16/365,627

(22) Filed: Mar. 26, 2019

(65) Prior Publication Data
US 2020/0307729 A1    Oct. 1, 2020

(51) Int. Cl.
*B62J 1/08*    (2006.01)
*B62J 1/06*    (2006.01)
*G05B 15/02*    (2006.01)

(52) U.S. Cl.
CPC . *B62J 1/06* (2013.01); *B62J 1/08* (2013.01); *G05B 15/02* (2013.01); *B62J 2001/085* (2013.01)

(58) Field of Classification Search
CPC .................................................. B62J 2001/085
See application file for complete search history.

(56) References Cited

U.S. PATENT DOCUMENTS

| 8,079,772 | B1 * | 12/2011 | Brennan | F16B 7/105 |
|---|---|---|---|---|
| | | | | 403/322.2 |
| 2013/0221713 | A1 | 8/2013 | Pelot et al. | |
| 2017/0096184 | A1 | 4/2017 | Hara et al. | |
| 2017/0096185 | A1 * | 4/2017 | Hara | B62J 1/08 |
| 2018/0037294 | A1 * | 2/2018 | Kurotobi | B62K 25/04 |
| 2018/0186419 | A1 * | 7/2018 | Shipman | B62J 43/23 |
| 2018/0222541 | A1 | 8/2018 | Madau et al. | |
| 2018/0257736 | A1 * | 9/2018 | Komatsu | B62J 45/41 |
| 2020/0148298 | A1 * | 5/2020 | Hara | B62M 25/08 |
| 2020/0377167 | A1 * | 12/2020 | Suzuki | B62M 6/45 |

FOREIGN PATENT DOCUMENTS

| CN | 112606929 A * | 4/2021 | ............... B62J 1/08 |
|---|---|---|---|
| CN | 110077497 B * | 9/2021 | ............... B62J 1/08 |
| DE | 102017213606 A1 * | 2/2018 | ............... B62J 1/08 |
| EP | 3771623 A2 * | 2/2021 | ............... B62J 1/08 |
| EP | 4021029 A1 * | 6/2022 | ............... B62J 1/08 |
| TW | 201713539 | 4/2017 | |

* cited by examiner

*Primary Examiner* — Timothy J Brindley
(74) *Attorney, Agent, or Firm* — MORI & WARD, LLP

(57) ABSTRACT

A telescopic apparatus controller for a human-powered vehicle comprises a controller configured to control a telescopic apparatus in one of a plurality of operating modes. The plurality of operating modes includes a first operating mode in which a reference portion of the telescopic apparatus is selectively arranged to one of a first predetermined position and a second predetermined position, and a second operating mode in which the reference portion of the telescopic apparatus is arbitrarily arranged between a first end position and a second end position.

19 Claims, 88 Drawing Sheets

TELESCOPIC APPARATUS CONTROLLER, TELESCOPIC APPARATUS OPERATING SYSTEM, AND TELESCOPIC APPARATUS

BACKGROUND OF THE INVENTION

Field of the Invention

The present invention relates to a telescopic apparatus controller, a telescopic apparatus operating system, and a telescopic apparatus.

Discussion of the Background

A human-powered vehicle includes a control device configured to control a telescopic device.

SUMMARY OF THE INVENTION

In accordance with a first aspect of the present invention, a telescopic apparatus controller for a human-powered vehicle comprises a controller configured to control a telescopic apparatus in one of a plurality of operating modes. The plurality of operating modes includes a first operating mode in which a reference portion of the telescopic apparatus is selectively arranged to one of a first predetermined position and a second predetermined position, and a second operating mode in which the reference portion of the telescopic apparatus is arbitrarily arranged between a first end position and a second end position.

With the telescopic apparatus controller according to the first aspect, it is possible to improve operability of the telescopic apparatus.

In accordance with a second aspect of the present invention, the telescopic apparatus controller according to the first aspect is configured so that the first predetermined position is the same as the first end position.

With the telescopic apparatus controller according to the second aspect, it is possible to simplify the configurations of the first operating mode and the second operating mode.

In accordance with a third aspect of the present invention, the telescopic apparatus controller according to the first or second aspect is configured so that the second predetermined position is the same as the second end position.

With the telescopic apparatus controller according to the third aspect, it is possible to simplify the configurations of the first operating mode and the second operating mode.

In accordance with a fourth aspect of the present invention, the telescopic apparatus controller according to any one of the first to third aspects is configured so that the controller is configured to selectively arrange the reference portion of the telescopic apparatus to one of the first predetermined position, the second predetermined position, and a third predetermined position in the first operating mode.

With the telescopic apparatus controller according to the fourth aspect, it is possible to effectively improve operability of the telescopic apparatus.

In accordance with a fifth aspect of the present invention, the telescopic apparatus controller according to the fourth aspect is configured so that the third predetermined position is provided between the first predetermined position and the second predetermined position and different from the first predetermined position and the second predetermined position.

With the telescopic apparatus controller according to the fifth aspect, it is possible to reliably improve operability of the telescopic apparatus.

In accordance with a sixth aspect of the present invention, the telescopic apparatus controller according to any one of the first to third aspects is configured so that the controller is configured to selectively arrange the reference portion of the telescopic apparatus to one of the first predetermined position, the second predetermined position, and a plurality of third predetermined positions in the first operating mode.

With the telescopic apparatus controller according to the sixth aspect, it is possible to more reliably improve operability of the telescopic apparatus.

In accordance with a seventh aspect of the present invention, the telescopic apparatus controller according to any one of the first to sixth aspects is configured so that the controller is configured to change an operating mode from one of the first operating mode and the second operating mode to the other of the first operating mode and the second operating mode in response to a mode-change input.

With the telescopic apparatus controller according to the seventh aspect, it is possible to easily change the operating mode of the controller.

In accordance with an eighth aspect of the present invention, the telescopic apparatus controller according to any one of the first to seventh aspects further comprises a memory electrically connected to the controller. The memory is configured to store setting information relating to at least one of an operation of the telescopic apparatus and a movement of the telescopic apparatus.

With the telescopic apparatus controller according to the eighth aspect, it is possible to effectively improve operability of the telescopic apparatus.

In accordance with a ninth aspect of the present invention, the telescopic apparatus controller according to the eighth aspect is configured so that the controller is configured to communicate with an external device. The controller is configured to adjust the setting information in response to an input from the external device.

With the telescopic apparatus controller according to the ninth aspect, it is possible to reliably improve operability of the telescopic apparatus.

In accordance with a tenth aspect of the present invention, the telescopic apparatus controller according to any one of the first to ninth aspects is configured so that the telescopic apparatus comprises a first tube, a second tube configured to be telescopically coupled to the first tube, and an actuator configured to telescopically displace the first tube relative to the second tube. The controller is configured to control the actuator.

With the telescopic apparatus controller according to the tenth aspect, it is possible to effectively improve operability of the telescopic apparatus.

In accordance with an eleventh aspect of the present invention, the telescopic apparatus controller according to the tenth aspect is configured so that the actuator includes at least one of a hydraulic device, a pneumatic device, an electric motor, a solenoid, a shape memory alloy, and a piezoelectric element.

With the telescopic apparatus controller according to the eleventh aspect, it is possible to more effectively improve operability of the telescopic apparatus.

In accordance with a twelfth aspect of the present invention, the telescopic apparatus controller according to any one of the first to eleventh aspects further comprises a position sensor configured to detect a current position of the reference portion of the telescopic apparatus.

With the telescopic apparatus controller according to the twelfth aspect, it is possible to effectively improve operability of the telescopic apparatus.

In accordance with a thirteenth aspect of the present invention, the telescopic apparatus controller according to the twelfth aspect is configured so that the controller is configured to selectively arrange the reference portion of the telescopic apparatus according to comparison between the current position of the reference portion and at least one of the first predetermined position and the second predetermined position in the first operating mode. The controller is configured to selectively arrange the reference portion of the telescopic apparatus according to comparison between the current position of the reference portion and at least one of the first end position and the second end position in the second operating mode.

With the telescopic apparatus controller according to the thirteenth aspect, it is possible to more effectively improve operability of the telescopic apparatus.

In accordance with a fourteenth aspect of the present invention, the telescopic apparatus controller according to any one of the first to thirteenth aspects further comprises a wireless communicator electrically connected to the controller. The wireless communicator is configured to be wirelessly in communication with an external device.

With the telescopic apparatus controller according to the fourteenth aspect, it is possible to omit an electric cable.

In accordance with a fifteenth aspect of the present invention, a telescopic apparatus operating system for a human-powered vehicle comprises the telescopic apparatus controller according to any one of the first to fourteenth aspects and the telescopic apparatus.

With the telescopic apparatus operating system according to the fifteenth aspect, it is possible to improve operability of the telescopic apparatus.

In accordance with a sixteenth aspect of the present invention, the telescopic apparatus operating system according to the fifteenth aspect is configured so that the telescopic apparatus comprises a first tube, a second tube configured to be telescopically coupled to the first tube, and an actuator configured to telescopically displace the first tube relative to the second tube.

With the telescopic apparatus operating system according to the sixteenth aspect, it is possible to effectively improve operability of the telescopic apparatus.

In accordance with a seventeenth aspect of the present invention, the telescopic apparatus operating system according to the sixteenth aspect is configured so that the actuator is provided to at least one of the first tube and the second tube.

With the telescopic apparatus operating system according to the seventeenth aspect, it is possible to reliably improve operability of the telescopic apparatus.

In accordance with an eighteenth aspect of the present invention, the telescopic apparatus operating system according to any one of the fifteenth to seventeenth aspects is configured so that the telescopic apparatus includes a height adjustable seatpost.

With the telescopic apparatus operating system according to the eighteenth aspect, it is possible to reliably improve operability of the telescopic apparatus.

In accordance with a nineteenth aspect of the present invention, a telescopic apparatus comprises a first tube, a second tube configured to be telescopically coupled to the first tube, and an electric cable connector provided to one of the first tube and the second tube. The electric cable connector is configured to be detachably coupled to an electric cable.

With the telescopic apparatus according to the nineteenth aspect, it is possible to improve convenience of the telescopic apparatus.

In accordance with a twentieth aspect of the present invention, the telescopic apparatus according to the nineteenth aspect is configured so that the first tube is configured to be mounted to a vehicle body of the human-powered vehicle. The electric cable connector is provided to the first tube such that the electric cable is routed at least partially within an internal space of the vehicle body of the human-powered vehicle.

With the telescopic apparatus according to the twentieth aspect, it is possible to effectively improve convenience of the telescopic apparatus.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
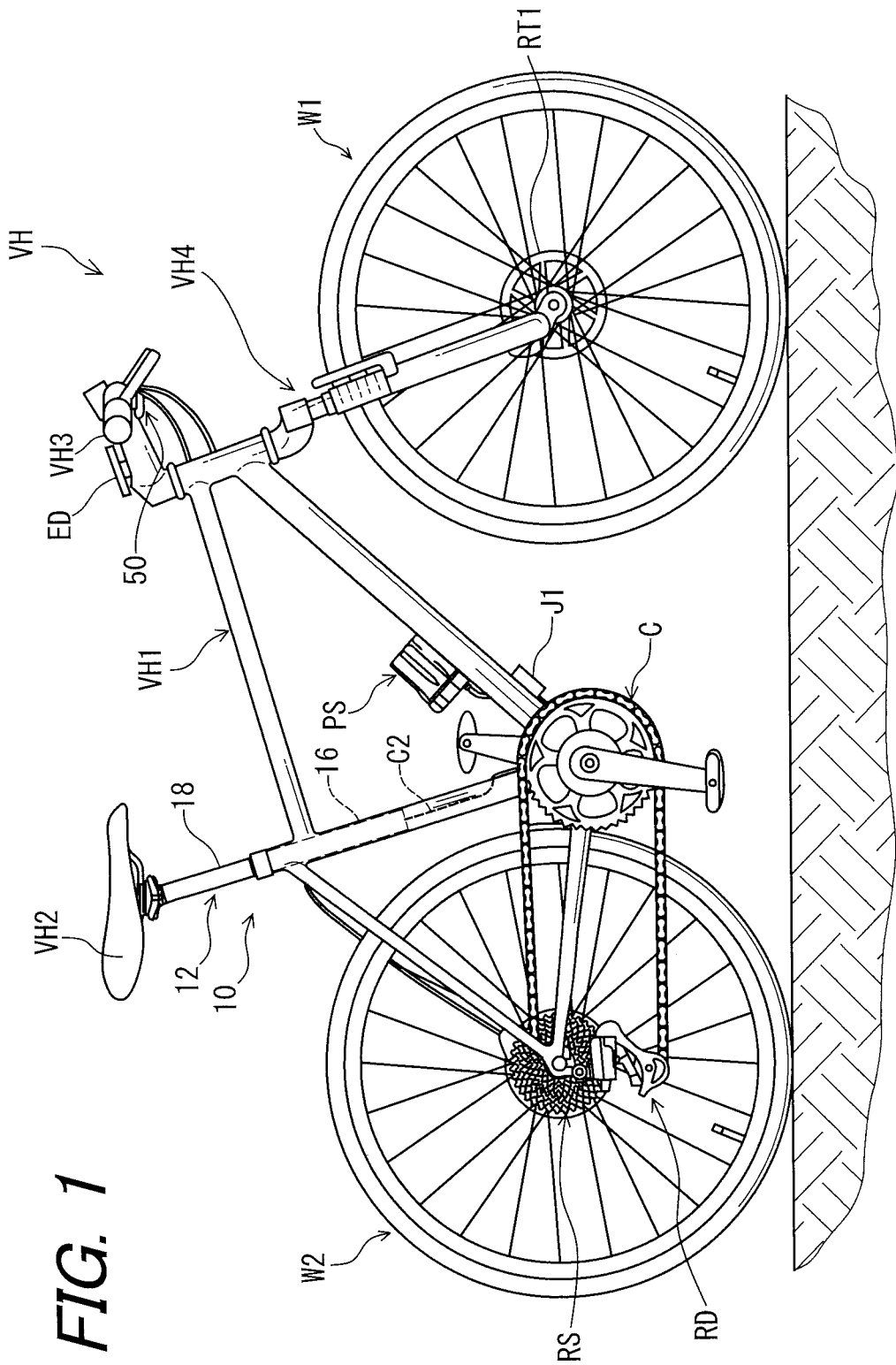
FIG. 1 is a side elevational view of a human-powered vehicle including a telescopic apparatus operating system in accordance with a first embodiment.

The embodiment(s) will now be described with reference to the accompanying drawings, wherein like reference numerals designate corresponding or identical elements throughout the various drawings.

First Embodiment

Referring initially to FIG. 1, a human-powered vehicle VH includes a telescopic apparatus operating system 10 in accordance with a first embodiment. For example, the human-powered vehicle VH is a vehicle to travel with a motive power including at least a human power of a user who rides the human-powered vehicle VH (i.e., rider). The human-powered vehicle VH has an arbitrary number of wheels. For example, the human-powered vehicle VII has at least one wheel. In this embodiment, the human-powered vehicle VH preferably has a smaller size than that of a four-wheeled automobile. However, the human-powered vehicle VH can have an arbitrary size. Examples of the human-powered vehicle VH include a bicycle, a tricycle, and a kick scooter. In this embodiment, the human-powered vehicle VII is a bicycle. An electric assisting system including an electric motor can be applied to the human-powered vehicle VH (e.g., the bicycle) to assist muscular motive power of the user. Namely, the human-powered vehicle VH can be an E-bike. While the human-powered vehicle VII is illustrated as a mountain bike, the telescopic apparatus operating system 10 can be applied to road bikes or any type of human-powered vehicles.

The human-powered vehicle VH further includes a vehicle body VH1, a saddle VH2, a handlebar VH3, a front fork VH4, a front wheel W1, and a rear wheel W2. The telescopic apparatus operating system 10 for the human-powered vehicle VH comprises a telescopic apparatus 12. The telescopic apparatus 12 is mounted to a tubular the vehicle body VH1. The saddle VH2 is attached to the telescopic apparatus 12. The front fork VH4 is rotatably mounted to the vehicle body VH1. The handlebar VH3 is secured to the front fork VH4. The front wheel W1 is rotatably coupled to the front fork VH4. The rear wheel W2 is rotatably coupled to the vehicle body VH1.

In the present application, the following directional terms "front," "rear," "forward," "rearward," "left," "right,"

"transverse," "upward" and "downward" as well as any other similar directional terms refer to those directions which are determined on the basis of a user (e.g., a rider) who sits on the saddle VH2 of the human-powered vehicle VH with facing the handlebar VH3. Accordingly, these terms, as utilized to describe the telescopic apparatus operating system 10 or other components, should be interpreted relative to the human-powered vehicle VH equipped with the telescopic apparatus operating system 10 as used in an upright riding position on a horizontal surface.

The human-powered vehicle VH includes a chain C, a rear derailleur RD, a rear sprocket assembly RS, and a power supply PS. The rear derailleur RD is mounted to the vehicle body VH1 and is configured to shift the chain C relative to the rear sprocket assembly RS to change a gear position. Since the rear derailleur RD includes structures which are known in the vehicle field, they will not be described in detail here for the sake of brevity.

Figure 2:
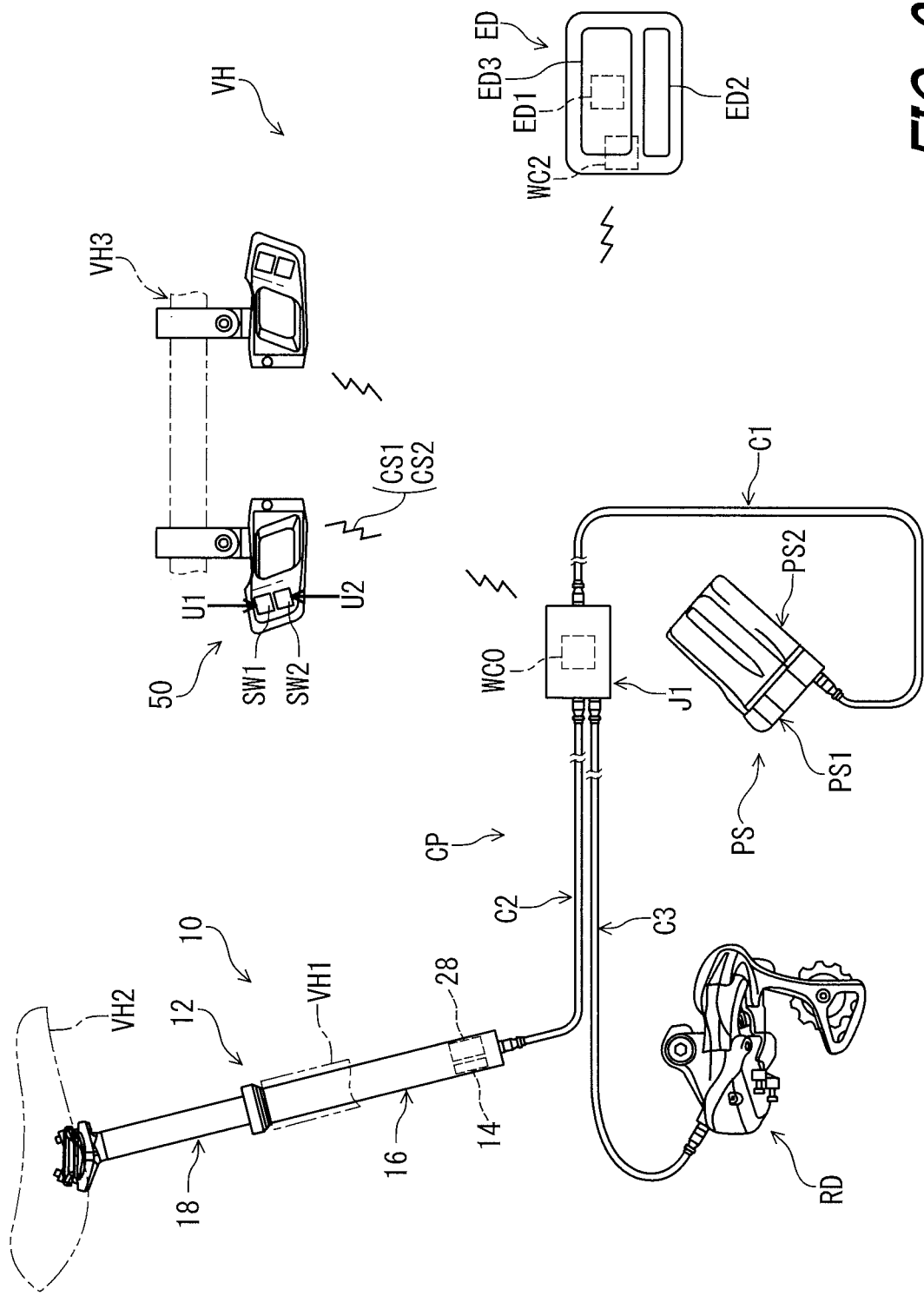
FIG. 2 is a schematic diagram of the telescopic apparatus operating system of the human-powered vehicle illustrated in FIG. 1.

As seen in FIG. 2, the power supply PS includes a battery holder PS1 and a battery PS2. The battery holder PS1 is mounted to the vehicle body VH1 (FIG. 1) and is configured to detachably receive the battery PS2. The battery PS2 is electrically connected to the battery holder PS1 in a state where the battery PS2 is mounted to the battery holder PS1. Examples of the battery PS2 include a primary battery (e.g., a dry-cell battery) and a secondary battery (e.g., a rechargeable battery such as a rechargeable lithium-ion battery).

The telescopic apparatus operating system 10 for the human-powered vehicle VH comprises a telescopic apparatus controller 14. The telescopic apparatus controller 14 is configured to control the telescopic apparatus 12. In this embodiment, the telescopic apparatus 12 includes a height adjustable seatpost. However, the telescopic apparatus 12 can include other apparatuses such as a suspension instead of or in addition to the height adjustable seatpost.

As seen in FIG. 2, the human-powered vehicle VH includes an electric communication path CP. The power supply PS is electrically connected to the rear derailleur RD and the telescopic apparatus operating system 10 with the electric communication path CP to supply electric power to the rear derailleur RD and the telescopic apparatus operating system 10.

The electric communication path CP includes a junction J1, and electric cables C1 to C3. Each of the electric cables C1 to C3 includes electric connectors at both ends thereof. The junction J1 is electrically connected to the battery holder PS1 with the electric cable C1. The junction J1 is electrically connected to the telescopic apparatus operating system 10 with the electric cable C2. The junction J1 is electrically connected to the rear derailleur RD with the electric cable C3.

Figure 3:
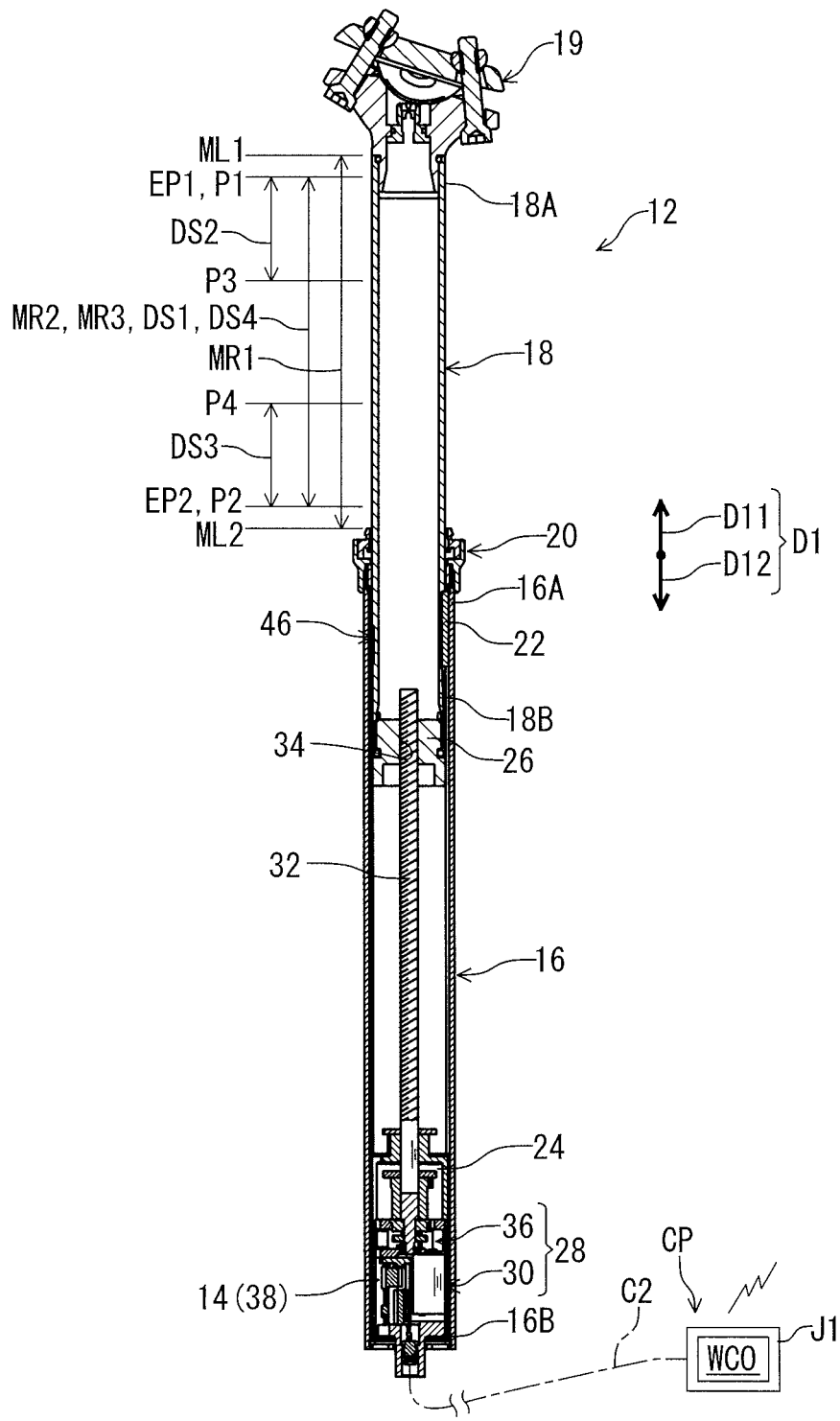
FIG. 3 is a cross-sectional view of a telescopic apparatus of the telescopic apparatus operating system illustrated in FIG. 2.

As seen in FIG. 3, the telescopic apparatus 12 comprises a first tube 16 and a second tube 18. The second tube 18 is configured to be telescopically coupled to the first tube 16. The second tube 18 is movable relative to the first tube 16 in a telescopic direction D1. The first tube 16 and the second tube 18 extend in the telescopic direction D1. The second tube 18 is telescopically received in the first tube 16.

The first tube 16 includes a first end 16A and a first opposite end 16B. The first tube 16 extends between the first end 16A and the first opposite end 16B. The second tube 18 includes a second end 18A and a second opposite end 18B. The second tube 18 extends between the second end 18A and the second opposite end 18B. The actuator 28 is attached to the first opposite end 16B of the first tube 16. A saddle mounting part 19 is attached to the second end 18A of the second tube 18.

The telescopic apparatus 12 has a mechanical movable range MR1. For example, the mechanical movable range MR1 is defined based on the second end 18A of the second tube 18. The mechanical movable range MR1 is a range in which the second tube 18 is mechanically movable relative to the first tube 16 in the telescopic direction D1. The mechanical movable range MR1 includes a first mechanical limit ML1 and a second mechanical limit ML2. The mechanical movable range MR1 is defined between the first mechanical limit ML1 and the second mechanical limit ML2 in the telescopic direction D1.

The telescopic apparatus 12 includes a first stopper 20, a first receiving member 22, a second stopper 24, and a second receiving member 26. The first stopper 20 is secured to the first end 16A of the first tube 16. The first receiving member 22 is attached to the second tube 18. The second stopper 24 is secured to the first opposite end 16B of the first tube 16. The second receiving member 26 is attached to the second opposite end 18B of the second tube 18.

The first stopper 20 is in contact with the first receiving member 22 in a state where the second tube 18 is at the first mechanical limit ML1. The second stopper 24 is in contact with the second receiving member 26 in a state where the second tube 18 is at the second mechanical limit ML2. The first stopper 20 and the first receiving member 22 define the first mechanical limit ML1. The second stopper 24 and the second receiving member 26 define the second mechanical limit ML2.

The telescopic apparatus 12 comprises an actuator 28. The actuator 28 is configured to telescopically displace the first tube 16 relative to the second tube 18. The actuator 28 is provided to at least one of the first tube 16 and the second tube 18. In this embodiment, the actuator 28 is provided to the first tube 16. However, the actuator 28 can be provided to the second tube 18 or both the first tube 16 and the second tube 18. The telescopic apparatus 12 is not limited to the height adjustable seatpost. The telescopic apparatus 12 can include an apparatus such as a suspension.

The actuator 28 includes at least one of a hydraulic device, a pneumatic device, an electric motor, a solenoid, a shape memory alloy, and a piezoelectric element. In this embodiment, the actuator 28 includes an electric motor 30 configured to displace the second tube 18 relative to the first tube 16. However, the actuator 28 can include at least one of the hydraulic device, the pneumatic device, the solenoid, the shape memory alloy, and the piezoelectric element instead of or in addition to the electric motor 30.

The telescopic apparatus 12 includes a screw rod 32 having an external thread. The second receiving member 26 includes a threaded hole 34. The screw rod 32 is operatively coupled to the actuator 28.

Figure 4:
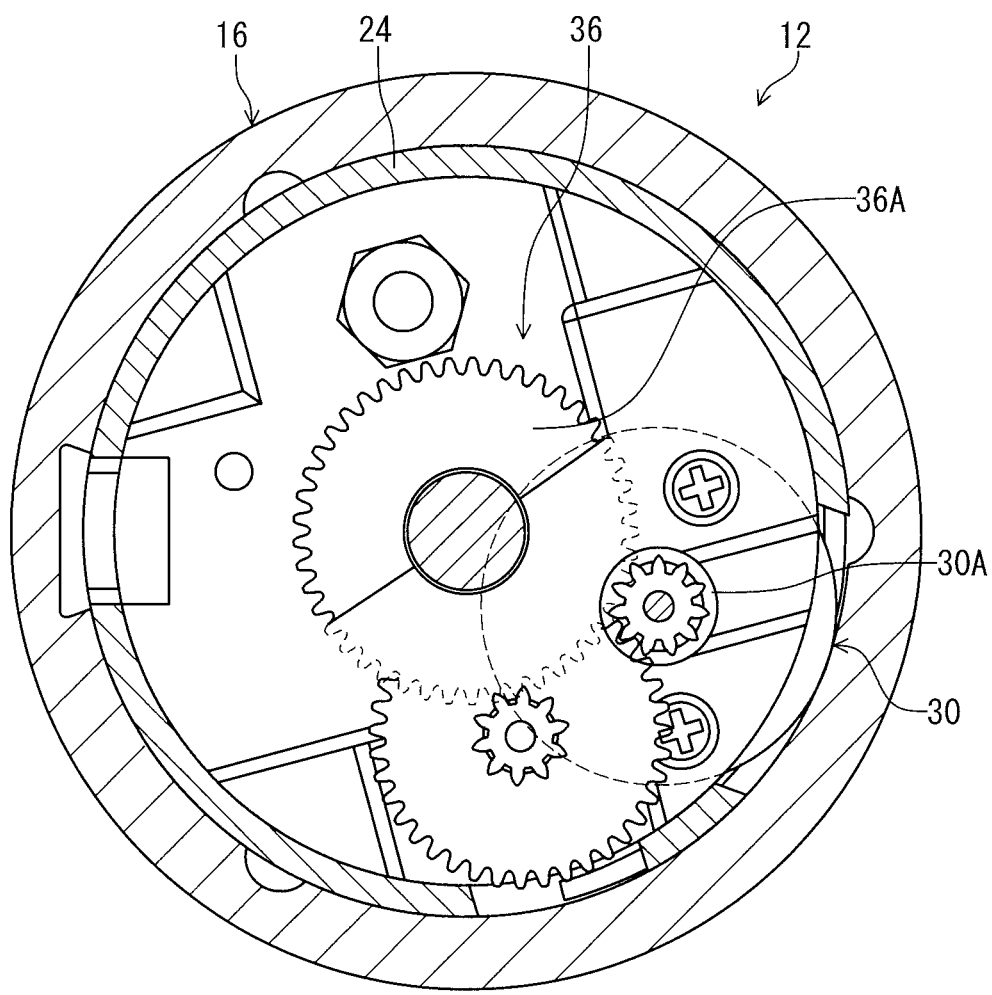
FIG. 4 is a cross-sectional view of the telescopic apparatus of the telescopic apparatus operating system illustrated in FIG. 2.
Figure 5:
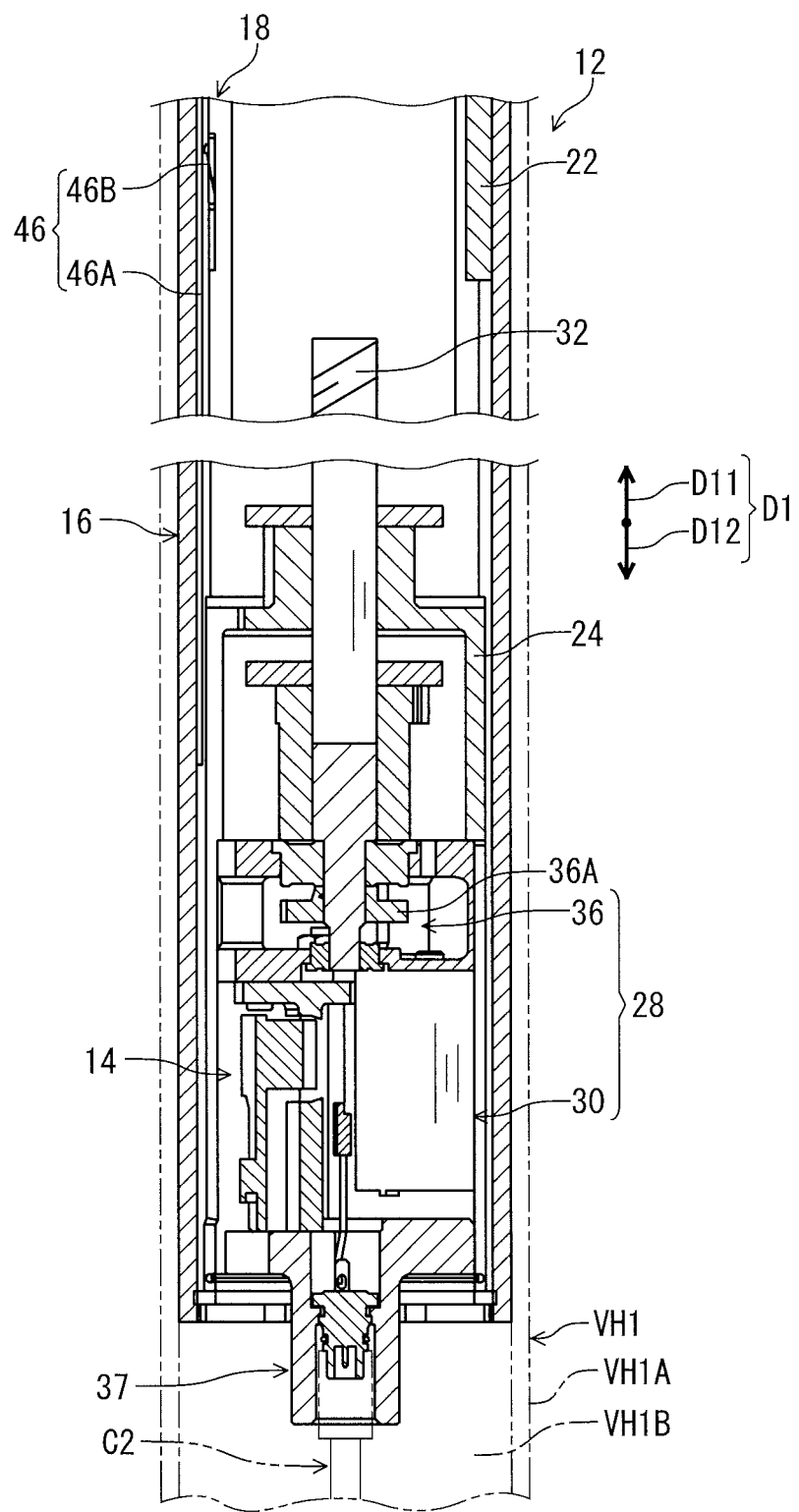
FIG. 5 is a partial enlarged cross-sectional view of the telescopic apparatus of the telescopic apparatus operating system illustrated in FIG. 2.

As seen in FIG. 4, in this embodiment, the actuator 28 includes a gear reducer 36 coupled to a driving shaft 30A of the electric motor 30 to reduce a rotation of the driving shaft 30A. As seen in FIG. 5, the screw rod 32 is coupled to an output gear 36A of the gear reducer 36. The screw rod 32 is threadedly engaged in the threaded hole 34 of the second receiving member 26. The actuator 28 is configured to rotate the screw rod 32 to move the second tube 18 relative to the first tube 16 in the telescopic direction D1.

As seen in FIG. 3, the actuator 28 is configured to rotate the screw rod 32 in a first rotational direction to move the second tube 18 relative to the first tube 16 in a first telescopic direction D11 defined along the telescopic direction D1. The actuator 28 is configured to rotate the screw rod 32 in a second rotational direction to move the second tube 18 relative to the first tube 16 in a second telescopic direction D12 defined along the telescopic direction D1. The second telescopic direction D12 is an opposite direction of the first telescopic direction D11.

As seen in FIG. 5, the telescopic apparatus 12 comprises an electric cable connector 37. The electric cable connector 37 is provided to one of the first tube 16 and the second tube 18. In this embodiment, the electric cable connector 37 is provided to the first tube 16. However, the electric cable connector 37 can be provided to the second tube 18. The electric cable connector 37 is configured to be detachably coupled to the electric cable C2.

The first tube 16 is configured to be mounted to the vehicle body VH1 of the human-powered vehicle VH. The electric cable connector 37 is provided to the first tube 16 such that the electric cable C2 is routed at least partially within an internal space of the vehicle body VH1 of the human-powered vehicle VH. The vehicle body VH1 includes a seat tube VH1A having an internal space VH1B. The first tube 16 is provided in the internal space VH1B of the seat tube VH1A in a state where the telescopic apparatus 12 is mounted to the vehicle body VH1. The electric cable C2 is routed at least partially within the internal space VH1B of the seat tube VH1A.

Figure 6:
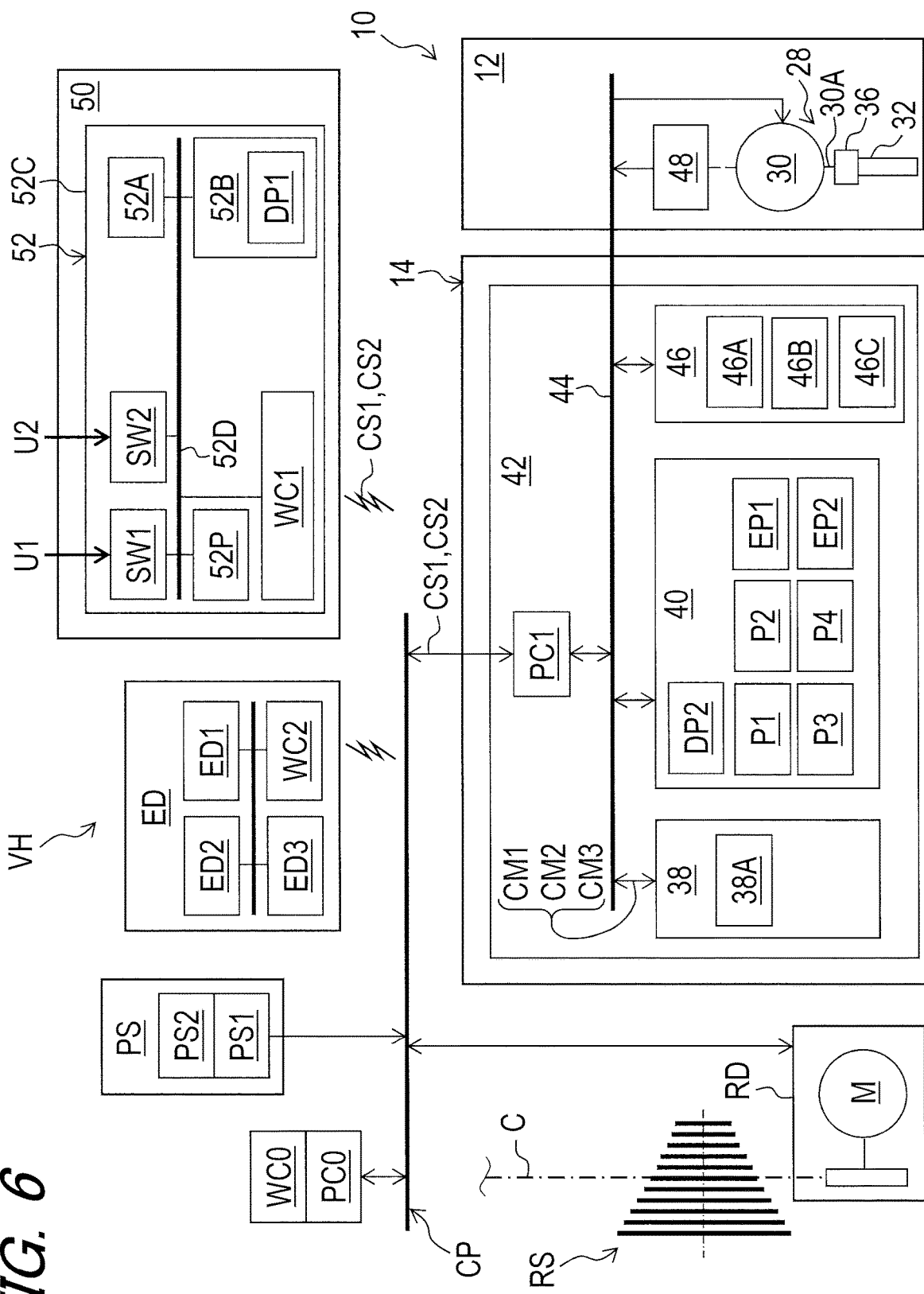
FIG. 6 is a block diagram of the telescopic apparatus operating system illustrated in FIG. 2.

As seen in FIG. 6, the telescopic apparatus controller 14 for the human-powered vehicle VH comprises a controller 38. The controller 38 is configured to control the actuator 28. The telescopic apparatus controller 14 further comprises a memory 40 electrically connected to the controller 38. In this embodiment, the controller 38 includes a processor 38A. The memory 40 includes a read only memory (ROM) and a random-access memory (RAM). The ROM includes a non-transitory computer-readable storage medium. The RAM includes a transitory computer-readable storage medium. The memory 40 includes storage areas each having an address in the ROM and the RAM. The controller 38 controls the memory 40 to store data in the storage areas of the memory 40 and reads data from the storage areas of the memory 40. The processor 38A includes a central processing unit (CPU) and a memory controller. The memory 40 is electrically connected to the controller 38. The telescopic apparatus controller 14 includes a circuit board 42. The controller 38 and the memory 40 are electrically mounted on the circuit board 42. The controller 38 is electrically connected to the memory 40 through the circuit board 42.

The circuit board 42 and the actuator 28 are electrically connected to a bus 44. The actuator 28 is electrically connected to the controller 38 and the memory 40 with the bus 44 and the circuit board 40. The memory 40 (e.g., the ROM) stores a program. The program is read into the controller 38, and thereby the configuration and/or algorithm of the telescopic apparatus controller 14 is performed.

The telescopic apparatus controller 14 further comprises a position sensor 46 configured to detect a current position of a reference portion of the telescopic apparatus 12. The position sensor 46 is electrically connected to the controller 38 and the memory 40 through the circuit board 42. In this embodiment, the reference portion of the telescopic apparatus 12 is defined as the second end 18A of the second tube 18. The second end 18A can also be referred to as the reference portion 18A. However, the reference portion can be defined as other portions of the telescopic apparatus 12.

As seen in FIG. 3, the position sensor 46 is configured to sense a current position of the second end 18A of the second tube 18 relative to the first tube 16. The position sensor 46 is configured to periodically sense a current position of the second end 18A of the second tube 18 relative to the first tube 16. Examples of the position sensor 46 include a contact position sensor and a non-contact position sensor. Examples of the contact position sensor include a resistance position sensor and an encoder. Examples of the non-contact position sensor include a magnetic position sensor, a laser sensor, an ultrasonic wave sensor, and an optical sensor. In this embodiment, the position sensor includes a resistance position sensor. However, the position sensor 46 is not limited to this embodiment.

As seen in FIG. 5, the position sensor 46 includes a resistivity substrate 46A and a brush 46B. The resistivity substrate 46A is attached to an inner peripheral surface 16C of the first tube 16 and extends along the first tube 16 in the telescopic direction D1. The brush 46B is attached to an outer peripheral surface 18C of the second tube 18 to be in contact with the resistivity substrate 46A. The brush 46B is in slidable contact with the resistivity substrate 46A.

As seen in FIG. 6, the position sensor 46 includes a resistance sensor 46C. The resistance sensor 46C is electrically connected to the resistivity substrate 46A. The resistance sensor 46C is electrically mounted on the circuit board 42. The resistance sensor 46C is electrically connected to the controller 38 and the memory 40 through the circuit board 42. The resistance sensor 46C is configured to sense a resistance value of the resistivity substrate 46A. The resistance value sensed by the resistance sensor 46C indicates a position of the second tube 18 relative to the first tube 16. Thus, the position sensor 46 is configured to sense a current position of the reference portion 18A relative to the first tube 16. The controller 38 is configured to store the position sensed by the position sensor 46 in the memory 40. The controller 38 is configured to update the position stored in the memory 40 with the latest position sensed by the position sensor 46.

The telescopic apparatus controller 14 includes an actuator driver 48. The actuator driver 48 is electrically connected to the controller 38 and the memory 40. The actuator driver 48 is configured to control the actuator 28 (e.g., the electric motor 30) to rotate the screw rod 32 based on a control command generated by the controller 38. The control command includes a start of rotation of the driving shaft 30A, a rotational direction of the driving shaft 30A of the electric motor 30, and a stop of rotation of the driving shaft 30A.

As seen in FIG. 2, the telescopic apparatus operating system 10 comprises an operating device 50. The telescopic apparatus controller 14 is configured to control the telescopic apparatus 12 in response to control signals transmitted from the operating device 50. In this embodiment, the operating device 50 includes a first electrical switch SW1 and a second electrical switch SW2.

The first electrical switch SW1 is configured to be activated in response to a first user input U1. For example, the first electrical switch SW1 includes a push-button switch. The first user input U1 includes a normal press of the first electrical switch SW1 and a long press of the first electrical switch SW1. The operating device 50 is configured to determine the first operation period of the first electrical switch SW1. Specifically, the operating device 50 is configured to determine whether the first electrical switch SW1 receives the normal press or the long press as the first user input U1.

The second electrical switch SW2 is configured to be activated in response to a second user input U2. For example, the second electrical switch SW2 includes a push-button switch. The second user input U2 includes a normal press of the second electrical switch SW2 and a long press of the second electrical switch SW2. The operating device 50 is configured to determine the second operation period of the second electrical switch SW2. Specifically, the operating device 50 is configured to determine whether the second electrical switch SW2 receives the normal press or the long press as the second user input U2.

As seen in FIG. 6, the operating device 50 includes a signal controller 52. The signal controller 52 is configured to generate a first control signal CS1 in response to the first user input U1. The signal controller 52 is configured to generate a second control signal CS2 in response to the second user input U2. The signal controller 52 includes a processor 52A, a memory 52B, and a circuit board 52C. The processor 52A and the memory 52B are electrically mounted on the circuit board 52C. The processor 52A includes a central processing unit (CPU) and a memory controller. The memory 52B is electrically connected to the processor 52A. The memory 52B includes a ROM and a RAM. The memory 52B includes storage areas each having an address in the ROM and the RAM. The processor 52A controls the memory 52B to store data in the storage areas of the memory 52B and reads data from the storage areas of the memory 52B. The circuit board 52C and the first electrical switch SW1 are electrically connected to a bus 52D. The first electrical switch SW1 is electrically connected to the CPU 13A and the memory controller 13B with the bus 13E and the circuit board 42. The memory 52B (e.g., the ROM) stores a program. The program is read into the processor 52A, and thereby the configuration and/or algorithm of the signal controller 52 is performed.

The human-powered vehicle VH includes an external device ED. The controller 38 is configured to communicate with the operating device 50. The controller 38 is configured to communicate with the external device ED. In this embodiment, the telescopic apparatus controller 14 further comprises a wireless communicator WC0 electrically connected to the controller 38. The wireless communicator WC0 is configured to be wirelessly in communication with the external device ED. The controller 38 is electrically connected to the wireless communicator WC0 to receive, through the wireless communicator, control signals wirelessly transmitted from the wireless communicator of the operating device 50.

The operating device 50 includes a wireless communicator WC1 and a power source 52P. The wireless communicator WC1 is configured to be wirelessly in communication with the wireless communicator WC0 of the telescopic apparatus controller 14. The power source 52P is connected to the signal controller 52 and the wireless communicator WC1 to supply electric power to the signal controller 52 and the wireless communicator WC1.

The wireless communicator WC1 is connected to the signal controller 52 to wirelessly transmit each of the first control signal CS1 and the second control signal CS2 to the telescopic apparatus controller 14 through the wireless communicator WC0. The wireless communicator WC1 includes a signal transmitting circuit, a signal receiving circuit, and an antenna. Thus, the wireless communicator WC1 can also be referred to as a wireless communication circuit WC1. The wireless communicator WC1 is configured to superimpose digital signals such as the first control signal CS1 and the second control signal CS2 on carrier wave using a predetermined wireless communication protocol to wirelessly transmit the first control signal CS1 and the second control signal CS2.

The wireless communicator WC0 is configured to wirelessly receive each of the first control signal CS1 and the second control signal CS2 to the telescopic apparatus controller 14 through the wireless communicator WC0. The wireless communicator WC0 includes a signal transmitting circuit, a signal receiving circuit, and an antenna. Thus, the wireless communicator WC0 can also be referred to as a wireless communication circuit WC0. The wireless communicator WC0 is configured to superimpose digital signals such as the first control signal CS1 and the second control signal CS2 on carrier wave using a predetermined wireless communication protocol to wirelessly transmit the first control signal CS1 and the second control signal CS2.

As seen in FIG. 2, in this embodiment, the wireless communicator WC0 is provided in the junction J1 and is connected to the telescopic apparatus 12 and the rear derailleur RD with the electric communication path CP. The wireless communicator WC0 can be provided at other locations such as the telescopic apparatus 12, the rear derailleur RD, and the battery holder PS1.

The controller 38 is configured to communicate with the wireless communicator WC0 using power line communication technology. Each of the first to third cables C1 to C3 includes a ground line and a voltage line that are detachably connected to a serial bus that is formed by communication interfaces and the junction 31. Electricity is supplied from the battery PS2 to the telescopic apparatus operating system 10 and the rear derailleur RD via the voltage line. In this embodiment, the controller 38, the wireless communicator WC0, and the rear derailleur RD can all communicate with each other through the voltage line using the power line communication technology.

Power line communication (PLC) carries data on a conductor that is also used simultaneously for electric power transmission or electric power distribution to electric components. In this embodiment, the electric power is supplied from the battery PS2 to the controller 38, the wireless communicator WC0, and the rear derailleur RD via the battery holder PS1 and the electric communication path CP. Furthermore, the controller 38, the wireless communicator WC0, and the rear derailleur RD send and receive control signals via the electric communication path CP using the PLC.

The PLC uses unique identifying information such as a unique identifier that is assigned to each of the controller 38, the wireless communicator WC0, and the rear derailleur RD. Each of the controller 38, the wireless communicator WC0, and the rear derailleur RD includes a PLC controller in which the unique identifying information is stored. Based on the unique identifying information, each of the controller 38, the wireless communicator WC0, and the rear derailleur RD can recognize control signals which are necessary for itself among control signals transmitted via the electric communication path CP.

The controller 38 of the telescopic apparatus controller 14 is configured to communicate with the operating device 50 using the wireless communication and the PLC. However, the controller 38 of the telescopic apparatus controller 14 can be configured to communicate with the operating device 50 using one of the wireless communication and the PLC or other communication technology.

The telescopic apparatus operating system 10 includes a PLC controller PC0 connected to the wireless communicator WC0. The PLC controller PC0 is connected to the electric communication path CP. The PLC controller PC is configured to separate input signals to a power source voltage and control signals. The PLC controller PC is configured to regulate the power source voltage to a level at which the wireless communicator WC0 can properly operate. The PLC controller PC is further configured to superimpose output signals such as the first control signal CS1 and the second control signal VS2 on the power source voltage applied to the electric communication path CP from the power source PS.

The telescopic apparatus controller 14 includes a PLC controller PC1. The PLC controller PC1 is connected to the wireless communicator WC1 with the electric communication path CP and the PLC controller PC0. The first PLC controller PC1 is connected to the controller 38 and the memory 40 with the bus 44.

As seen in FIGS. 7, 8, 11, and 12, the signal controller 52 is configured to generate the first control signal CS1 in response to the activation of the first electrical switch SW1 (i.e., in response to the first user input U1). The signal controller 52 is configured to measure a length of a first operation period OP1 of the first user input U1. The signal controller 52 is configured to compare the first operation period OP1 with a determination period DP1 stored in the memory 40 (FIG. 6).

Figure 7:
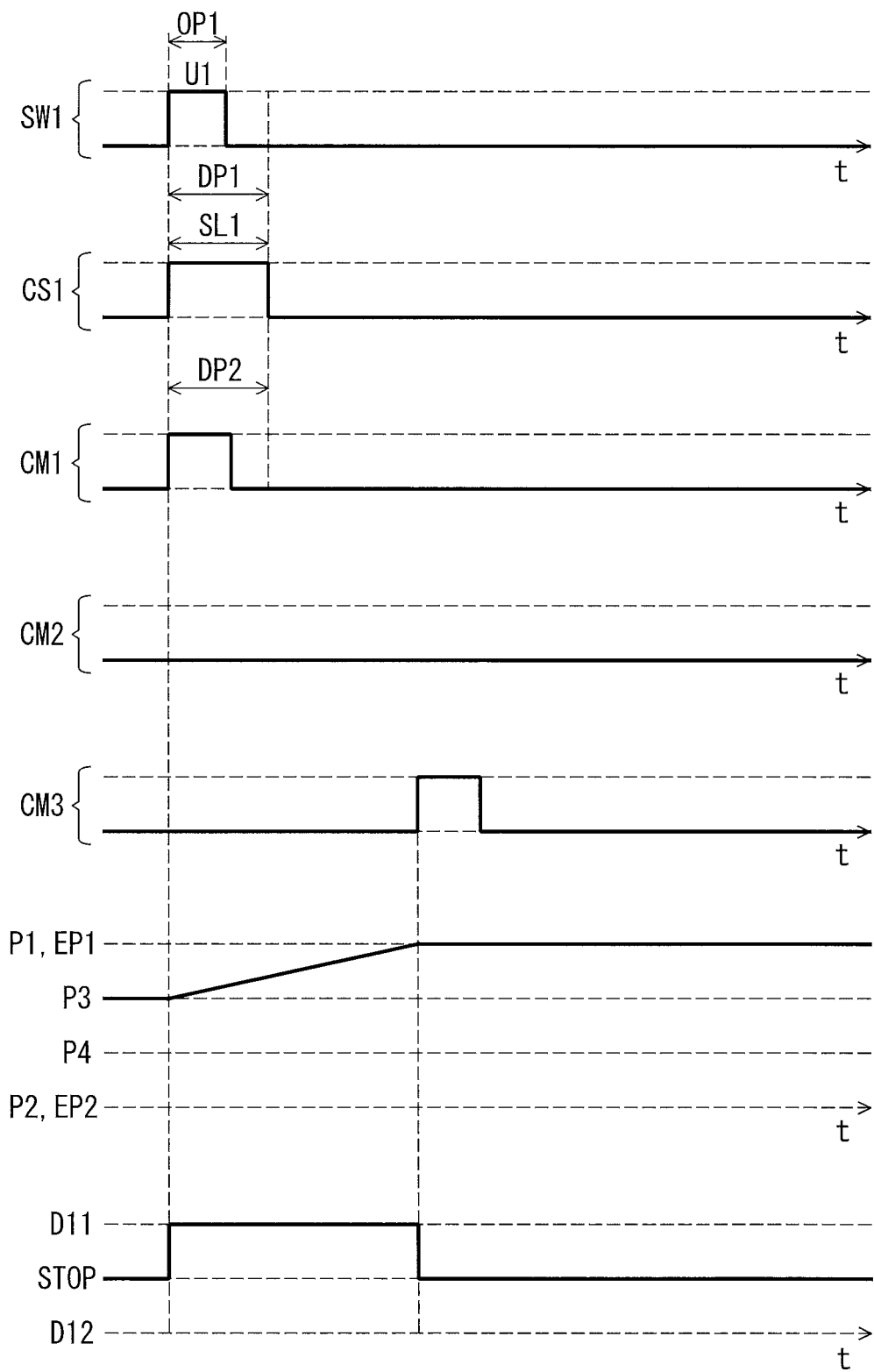
FIGS. 7 to 10 are timing charts of the telescopic apparatus operating system illustrated in FIG. 2 (first operating mode).
Figure 8:
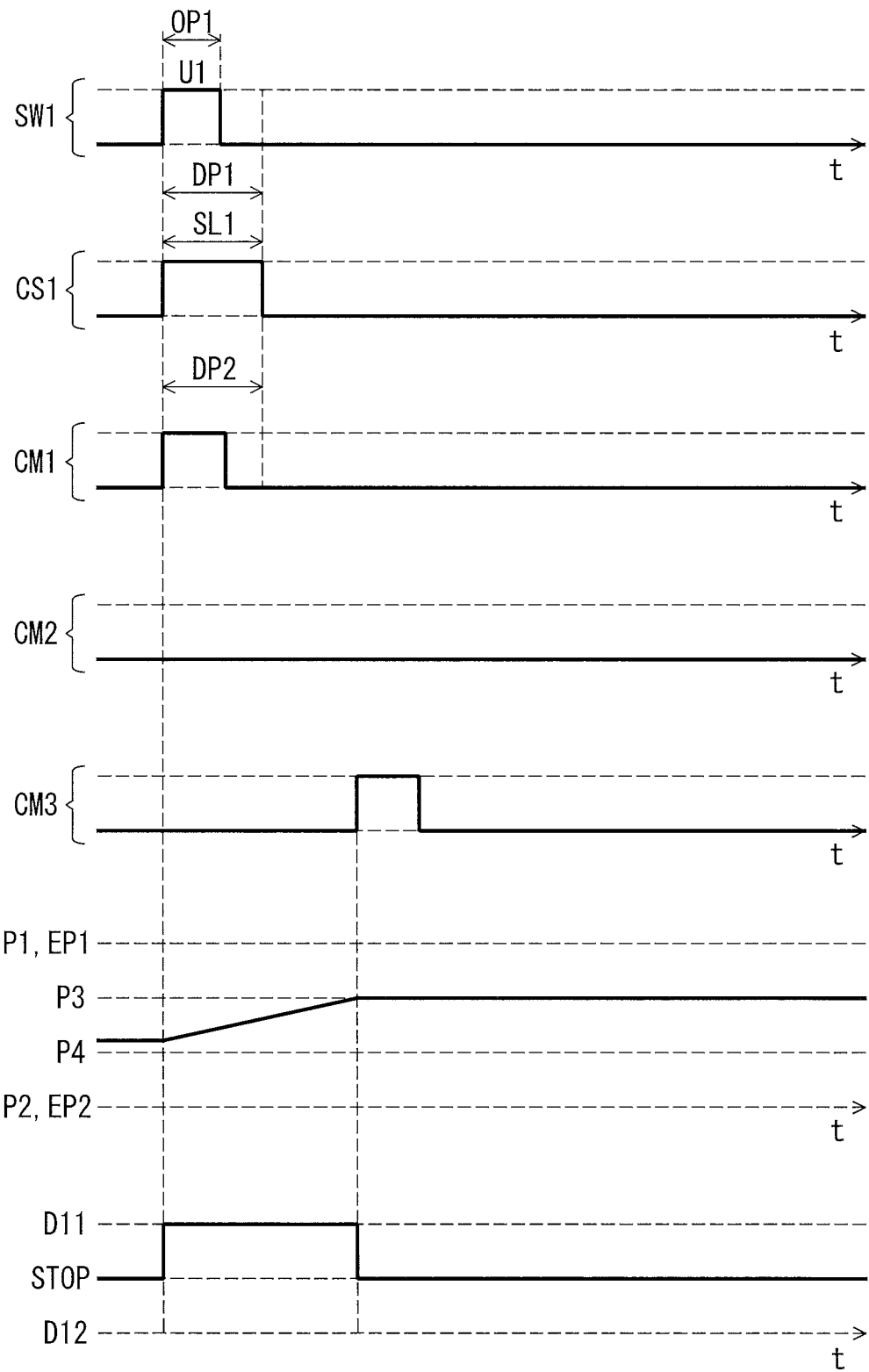

As seen in FIGS. 7 and 8, the signal controller 52 is configured to generate the first control signal CS1 having a signal length SL1 which is constant regardless of a length of a first operation period OP1 of the first user input U1 in a case where the first operation period OP1 of the first user input U1 is shorter than the determination period DP1.

Figure 11:
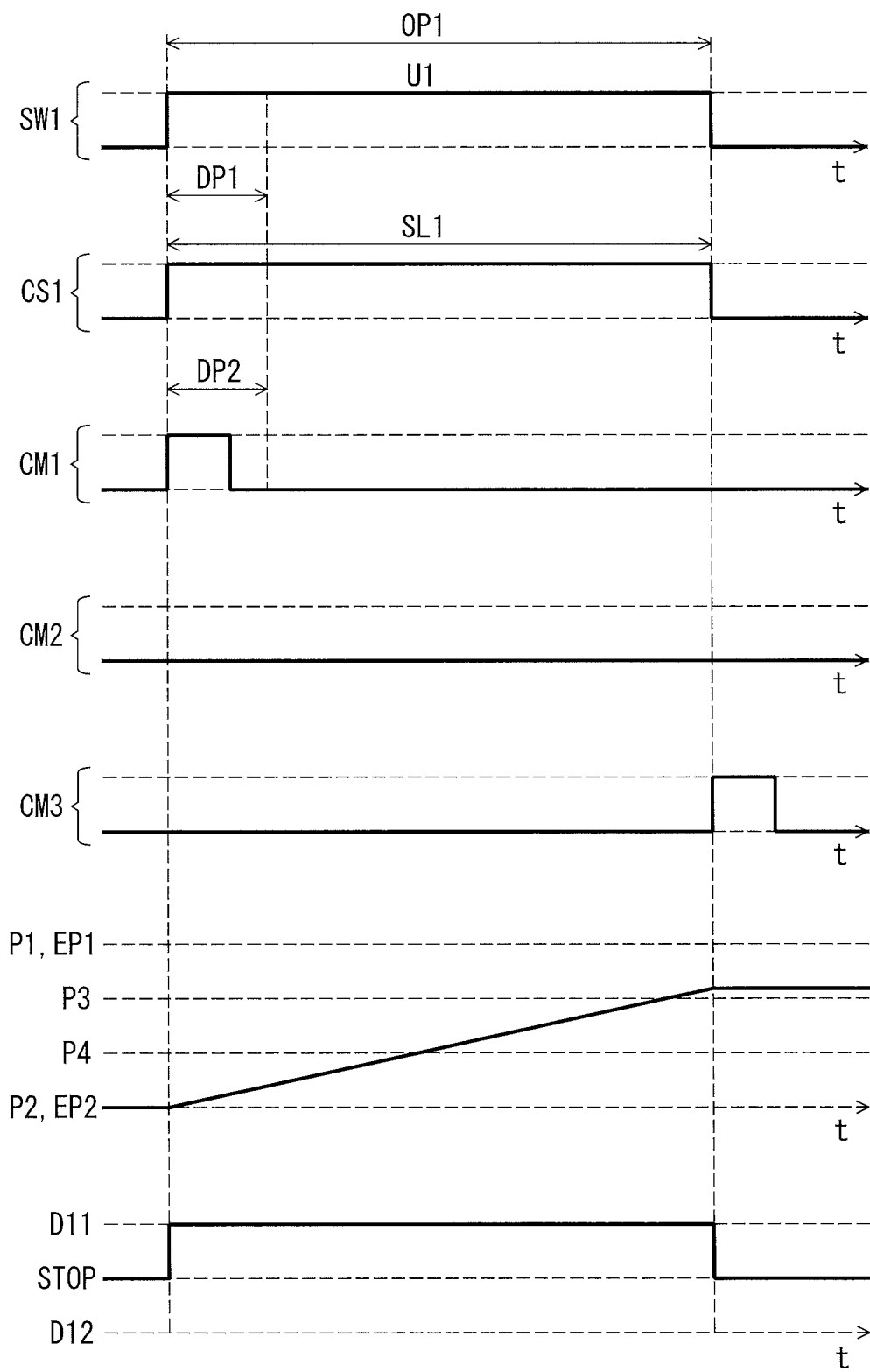
FIGS. 11 to 14 are timing charts of the telescopic apparatus operating system illustrated in FIG. 2 (second operating mode).
Figure 12:
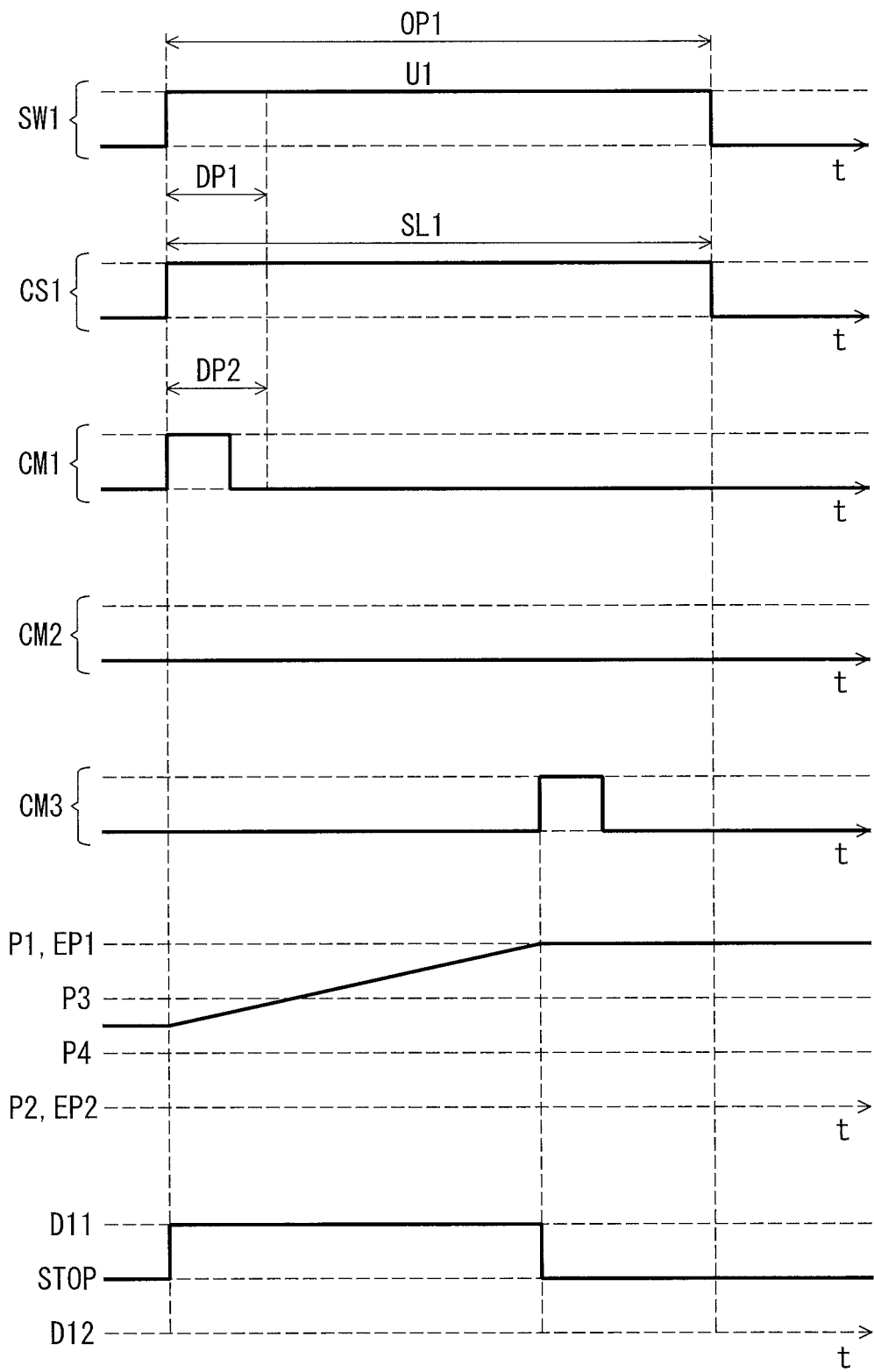

As seen in FIGS. 11 and 12, the signal controller 52 is configured to generate the first control signal CS1 having the signal length SL1 which is proportional to the length of the first operation period OP1 of the first user input U1 in a case where the first operation period OP1 of the first user input U1 is equal to or longer than the determination period DP1.

As seen in FIGS. 9, 10, 13, and 14, the signal controller 52 is configured to generate the second control signal CS2 in response to the activation of the second electrical switch SW2 (i.e., in response to the second user input U2). The signal controller 52 is configured to measure a length of a second operation period OP2 of the second user input U2. The signal controller 52 is configured to compare the second operation period OP2 with the determination period DP1.

Figure 9:
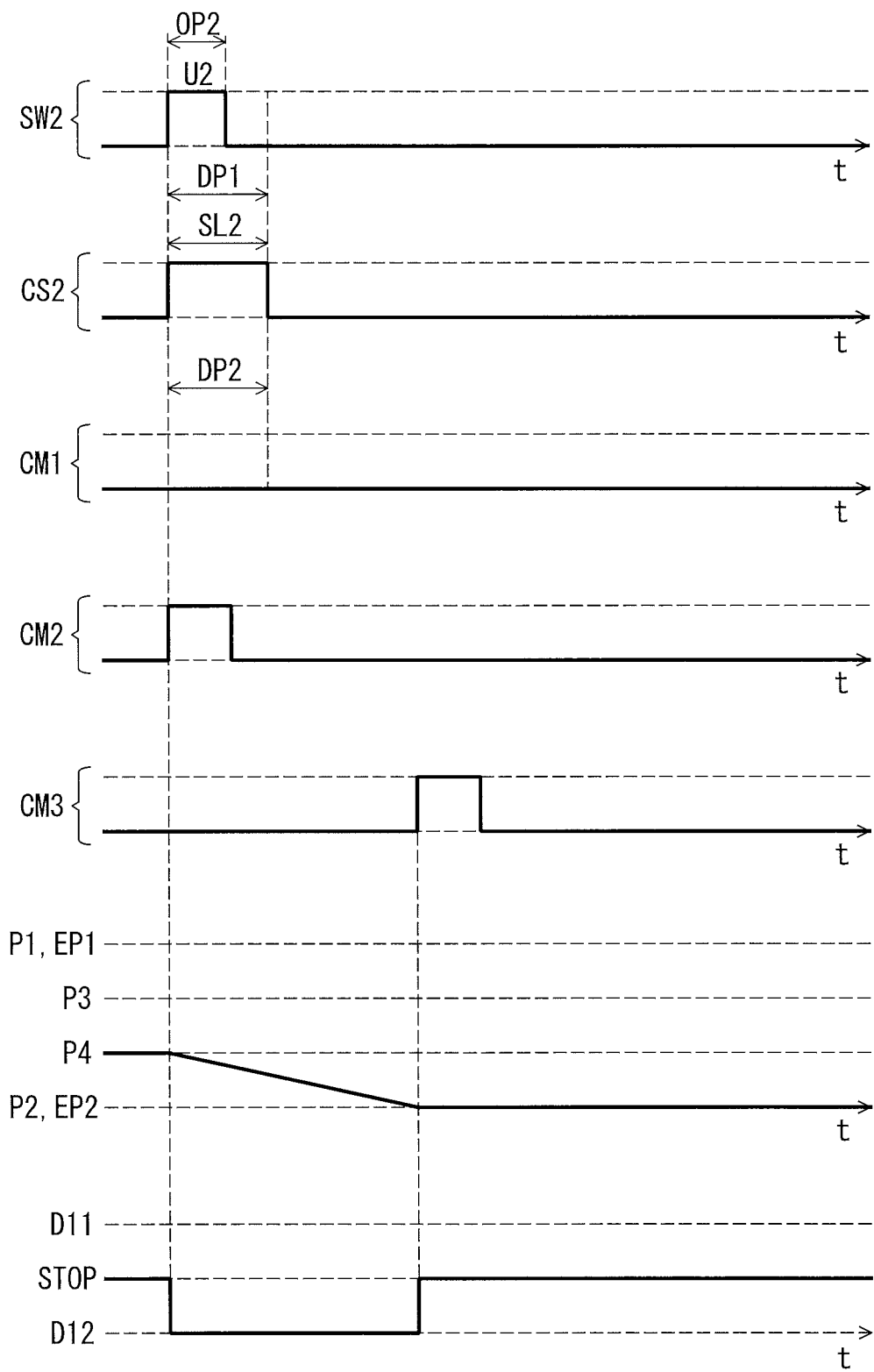
Figure 10:
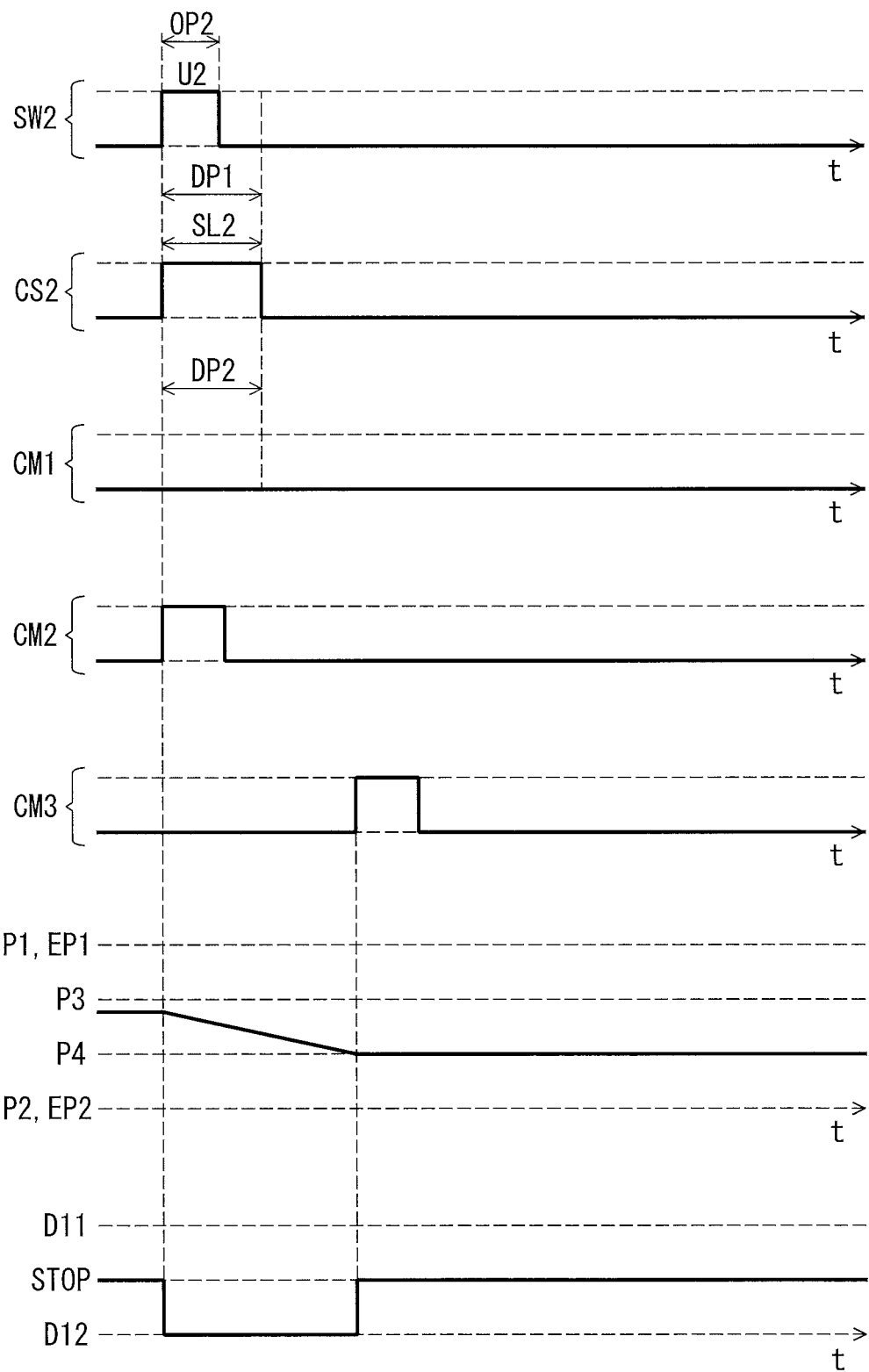

As seen in FIGS. 9 and 10, the signal controller 52 is configured to generate the second control signal CS2 having a signal length SL2 which is constant regardless of a length of a second operation period OP2 of the second user input U2 in a case where the second operation period OP2 of the second user input U2 is shorter than the determination period DP1.

Figure 13:
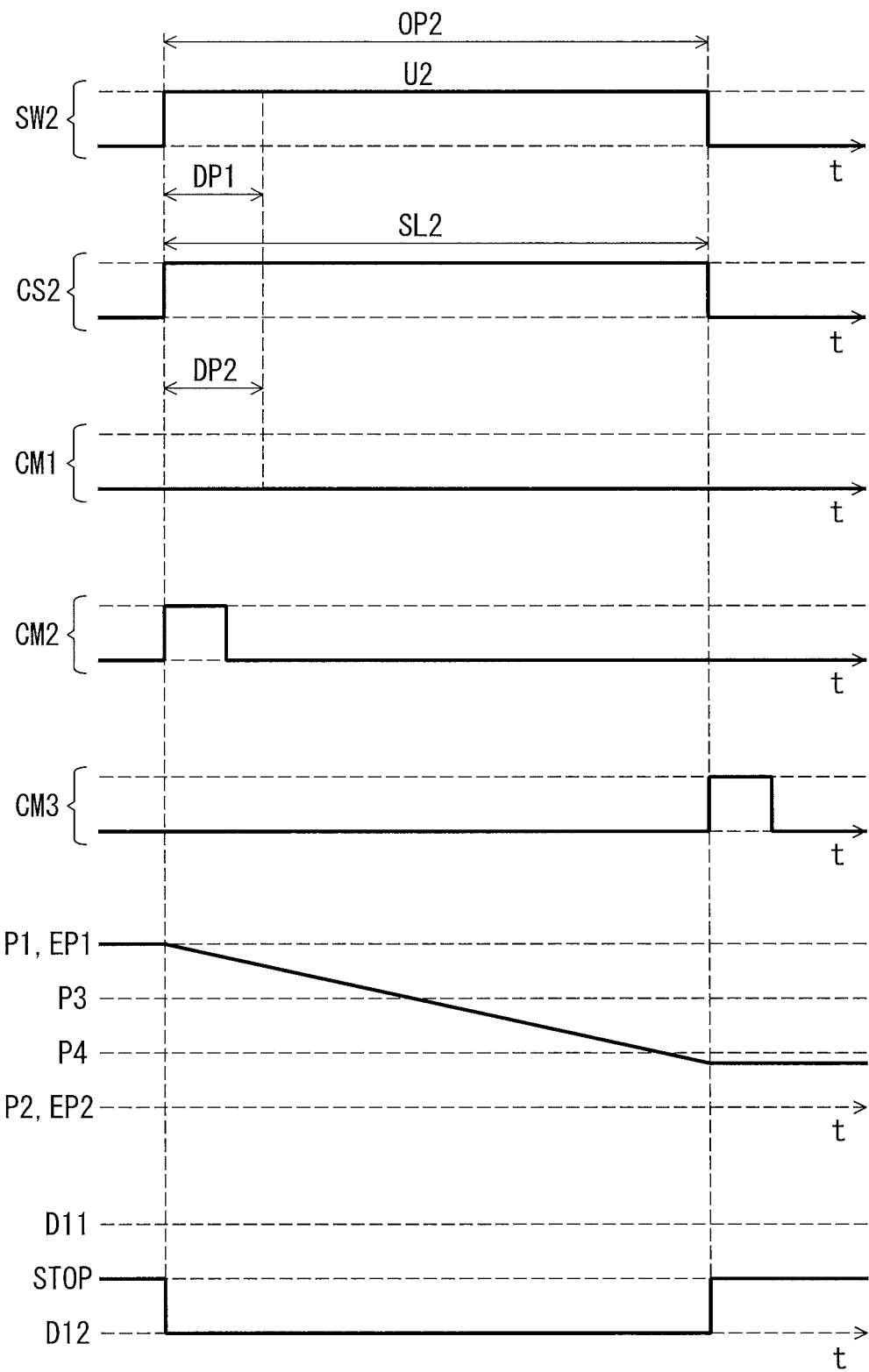
Figure 14:
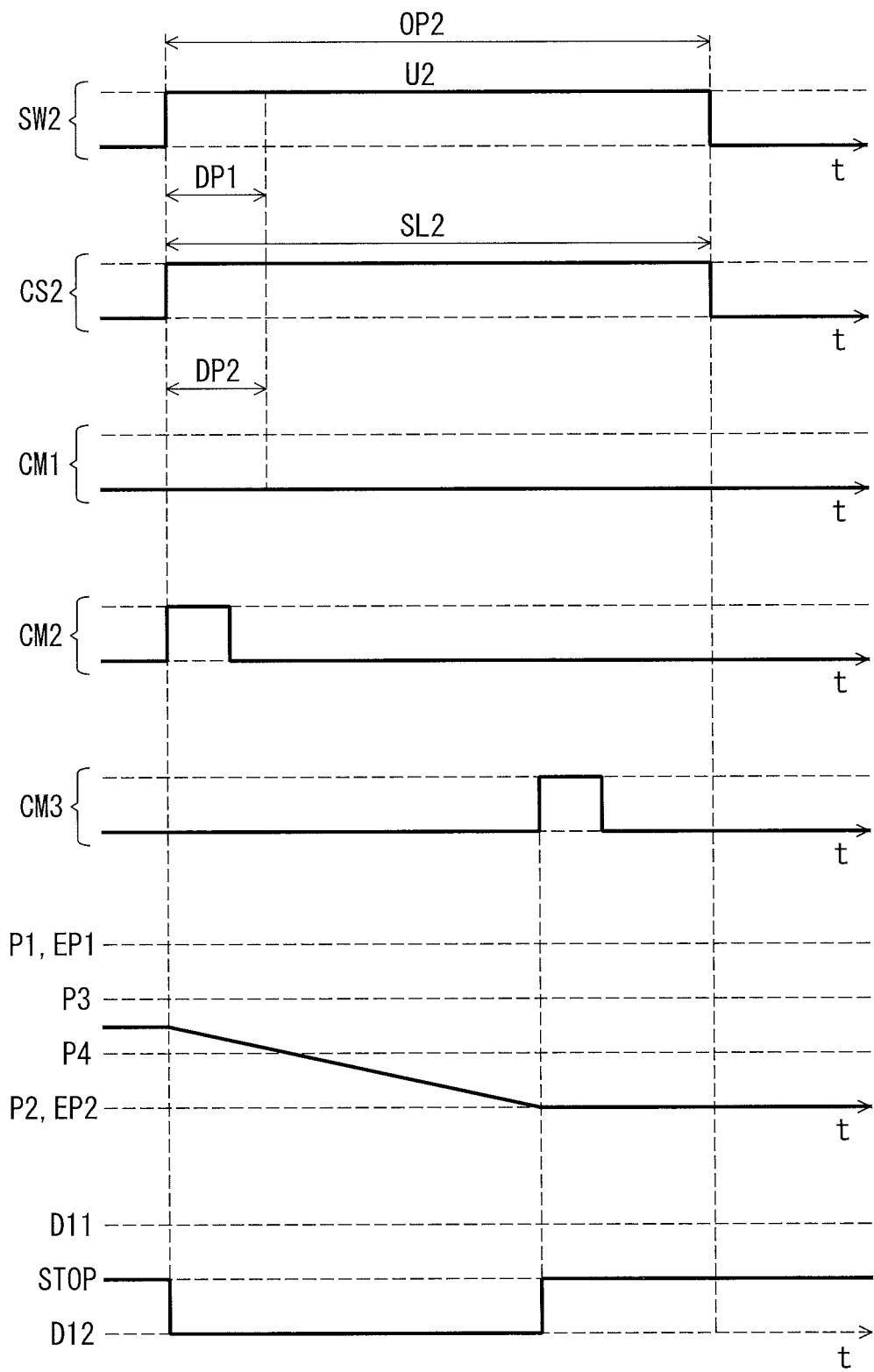

As seen in FIGS. 13 and 14, the signal controller 52 is configured to generate the second control signal CS2 having the signal length SL2 which is proportional to the length of the second operation period OP2 of the second user input U2 in a case where the second operation period OP2 of the second user input U2 is equal to or longer than the determination period DP1.

As seen in FIGS. 7 to 12, the controller 38 is configured to control the telescopic apparatus 12 in one of a plurality of operating modes. The plurality of operating modes includes a first operating mode in which the reference portion 18A of the telescopic apparatus 12 is selectively arranged to one of a first predetermined position P1 and a second predetermined position P2. The plurality of operating modes includes a second operating mode in which the reference portion 18A of the telescopic apparatus 12 is arbitrarily arranged between a first end position EP1 and a second end position EP2. FIGS. 7 to 10 show timing charts of the first operating mode. FIGS. 11 to 14 show timing charts of the second operating mode. The first to third predetermined positions P1, P2, P3 and P4 can also be referred to as predetermined positions P1, P2, P3 and P4. In this embodiment, the normal press of the first electrical switch SW1 or the second electrical switch SW2 indicates the first operating mode. The long press of the first electrical switch SW1 or the second electrical switch SW2 indicates the second operating mode. As seen in FIG. 6, the memory 40 is configured to store the first predetermined position P1, the second predetermined position P2, the third predetermined position P3, the third predetermined position P4, the first end position EP1, and the second end position EP2. At least one of the first to third predetermined positions P1 to P4 and the first and second end positions EP1 and EP2 can be changed using an external device.

As seen in FIG. 3, the first predetermined position P1 is offset from the first mechanical limit ML1 toward the second mechanical limit ML2. The second predetermined position P2 is offset from the second mechanical limit ML2 toward the first mechanical limit ML1. The first predetermined position P1 and the second predetermined position P2 are provided between the first mechanical limit ML1 and the second mechanical limit ML2. The first predetermined position P1 and the second predetermined position P2 define a movable range MR2. The movable range MR2 is smaller than the mechanical movable range MR1. However, the first predetermined position P1 can coincide with the first mechanical limit ML1 of the mechanical movable range MR1. The second predetermined position P2 can coincide with the second mechanical limit ML2 of the mechanical movable range MR1.

The first end position EP1 is offset from the first mechanical limit ML1 toward the second mechanical limit ML2. The second end position EP2 is offset from the second mechanical limit ML2 toward the first mechanical limit ML1. The first end position EP1 and the second end position EP2 are provided between the first mechanical limit ML1 and the second mechanical limit ML2. The first end position EP1 and the second end position EP2 define a movable range MR3. The movable range MR3 is smaller than the mechanical movable range MR1 and is equal to the movable range MR2. However, the first end position EP1 can coincide with the first mechanical limit ML1 of the mechanical movable range MR1. The second end position EP2 can coincide with the second mechanical limit ML2 of the mechanical movable range MR1.

In this embodiment, the first predetermined position P1 is the same as the first end position EP1. The second predetermined position P2 is the same as the second end position EP2. However, the first predetermined position P1 can be different from the first end position EP1. The second predetermined position P2 can be different from the second end position EP2.

As seen in FIGS. 7 to 10, the controller 38 is configured to selectively arrange the reference portion 18A of the telescopic apparatus 12 to one of the first predetermined position P1, the second predetermined position P2, and a third predetermined position P3 or P4 in the first operating mode. The third predetermined position P3 or P4 is provided between the first predetermined position P1 and the second predetermined position P2 and different from the first predetermined position P1 and the second predetermined position P2. The controller 38 is configured to selectively arrange the reference portion 18A of the telescopic apparatus 12 to one of the first predetermined position P1, the second predetermined position P2, and a plurality of third predetermined positions P3 and P4 in the first operating mode. Each of the third predetermined positions P3 and P4 is provide between the first predetermined position P1 and the second predetermined position P2 and is different from the first predetermined position P1 and the second predetermined position P2. A total number of the plurality of third predetermined positions is not limited to this embodiment. At least one of the plurality of third predetermined positions P3 and P4 can be omitted from the telescopic apparatus 12.

As seen in FIGS. 7, 8, 11, and 12, the controller 38 is configured to generate a first start command CM1 when the controller 38 detects the first control signal CS1. The actuator driver 48 is configured to control the electric motor 30 to rotate the screw rod 32 in the first rotational direction in response to the first start command CM1. Thus, for example, the second tube 18 is moved relative to the first tube 16 in the first telescopic direction D11.

After generating the first start command CM1, the controller 38 starts to measure a length of time and compares the measured length of time with a determination time DP2 stored in the memory 40 (FIG. 6). The controller 38 concludes that the operating mode of the controller 38 is the first operating mode if the controller 38 does not detect the first control signal CS1 when the measured length of time reaches the determination time DP2. The controller 38 concludes that the operating mode of the controller 38 is the second operating mode if the controller 38 still detects the first control signal CS1 when the measured length of time reaches the determination time DP2.

As seen in FIGS. 7 and 8, the controller 38 is configured to selectively arrange the reference portion 18A of the telescopic apparatus 12 according to comparison between the current position of the reference portion 18A and at least one of the first predetermined position P1 and the second predetermined position P2 in the first operating mode. In this embodiment, after concluding that the operating mode of the controller 38 is the first operating mode, the controller 38 is configured to compare the current position sensed by the position sensor 46 with the first predetermined position P1 and the second predetermined position P2. More specifically, the controller 38 is configured to compare the current position sensed by the position sensor 46 with the first predetermined position P1, the second predetermined position P2, the third predetermined position P3, and the third predetermined position P4.

The controller 38 is configured to generate a stop command CM3 when the controller 38 concludes that the reference portion 18A reaches one of the first predetermined position P1, the second predetermined position P2, the third predetermined position P3, and the third predetermined position P4. The actuator driver 48 is configured to stop the electric motor 30 in response to the stop command CM3. The second tube 18 is stopped at one of the first predetermined position P1, the second predetermined position P2, the third predetermined position P3, and the third predetermined position P4 which is adjacent to the starting position.

In an example illustrated in FIG. 7, the second tube 18 is stopped at the first predetermined position P1 which is adjacent to the third predetermined position P3 in the first telescopic direction D11 if the starting position is the third predetermined position P3. In an example illustrated in FIG. 8, the second tube 18 is stopped at the third predetermined position P3 which is adjacent to the starting position in the first telescopic direction D11 even when the starting position is offset from the first predetermined position P1, the second predetermined position P2, the third predetermined position P3, and the third predetermined position P4. Thus, it is possible to selectively arrange the reference portion 18A of the telescopic apparatus 12 to one of the first predetermined position P1, the second predetermined position P2, the third predetermined position P3, and the third predetermined position P4 which is adjacent to the starting position in the first telescopic direction D11 based on the normal press of the first electrical switch SW1.

As seen in FIGS. 11 and 12, the controller 38 is configured to selectively arrange the reference portion 18A of the telescopic apparatus 12 according to comparison between the current position of the reference portion 18A and at least one of the first end position EP1 and the second end position EP2 in the second operating mode. In this embodiment, after concluding that the operating mode of the controller 38 is the second operating mode, the controller 38 is configured to compare the current position sensed by the position sensor 46 with the first end position EP1 and the second end position EP2.

As seen in FIG. 11, the controller 38 is configured to generate the stop command CM3 when the controller 38 detects the termination of the first control signal CS1 before the reference portion 18A reaches one of the first end position EP1 and the second end position EP2. The actuator driver 48 is configured to stop the electric motor 30 in response to the stop command CM3. The second tube 18 is stopped when the first control signal CS1 is terminated. Thus, it is possible to arbitrarily arrange the reference portion 18A of the telescopic apparatus 12 between the starting position and the first end position EP1.

As seen in FIG. 12, the controller 38 is configured to generate the stop command CM3 when the reference portion 18A reaches one of the first end position EP1 and the second end position EP2 before the controller 38 detects the termination of the first control signal CS1. The actuator driver 48 is configured to stop the electric motor 30 in response to the stop command CM3. Thus, the second tube 18 is stopped at one of the first end position EP1 and the second end position EP2.

As seen in FIGS. 9, 10, 13, and 14, the controller 38 is configured to generate a second start command CM2 when the controller 38 detects the second control signal CS2. The actuator driver 48 is configured to control the electric motor 30 to rotate the screw rod 32 in the second rotational direction in response to the second start command CM2. Thus, for example, the second tube 18 is moved relative to the first tube 16 in the second telescopic direction D12.

After generating the second start command CM2, the controller 38 starts to measure a length of time and compares the measured length of time with the determination time DP2 stored in the memory 40 (FIG. 6). The controller 38 concludes that the operating mode of the controller 38 is the first operating mode if the controller 38 does not detect the second control signal CS2 when the measured length of time reaches the determination time DP2. The controller 38 concludes that the operating mode of the controller 38 is the second operating mode if the controller 38 still detects the second control signal CS2 when the measured length of time reaches the determination time DP2.

As seen in FIGS. 9 and 10, the controller 38 is configured to selectively arrange the reference portion 18A of the telescopic apparatus 12 according to comparison between the current position of the reference portion 18A and at least one of the first predetermined position P1 and the second predetermined position P2 in the first operating mode. In this embodiment, after concluding that the operating mode of the controller 38 is the first operating mode, the controller 38 is configured to compare the current position sensed by the position sensor 46 with the first predetermined position P1 and the second predetermined position P2. More specifically, the controller 38 is configured to compare the current position sensed by the position sensor 46 with the first predetermined position P1, the second predetermined position P2, the third predetermined position P3, and the third predetermined position P4.

The controller 38 is configured to generate the stop command CM3 when the controller 38 concludes that the reference portion 18A reaches one of the first predetermined position P1, the second predetermined position P2, the third predetermined position P3, and the third predetermined position P4. The actuator driver 48 is configured to stop the electric motor 30 in response to the stop command CM3. The second tube 18 is stopped at one of the first predetermined position P1, the second predetermined position P2, the third predetermined position P3, and the third predetermined position P4 which is adjacent to the starting position.

In an example illustrated in FIG. 9, the second tube 18 is stopped at the second predetermined position P2 which is adjacent to the third predetermined position P4 in the second telescopic direction D12 if the starting position is the third predetermined position P4. In an example illustrated in FIG. 10, the second tube 18 is stopped at the third predetermined position P4 which is adjacent to the starting position in the second telescopic direction D12 even when the starting position is offset from the first predetermined position P1, the second predetermined position P2, the third predetermined position P3, and the third predetermined position P4. Thus, it is possible to selectively arrange the reference portion 18A of the telescopic apparatus 12 to one of the first predetermined position P1, the second predetermined position P2, the third predetermined position P3, and the third predetermined position P4 which is adjacent to the starting position in the second telescopic direction D12 based on the normal press of the first electrical switch SW1.

As seen in FIGS. 13 and 14, the controller 38 is configured to selectively arrange the reference portion 18A of the telescopic apparatus 12 according to comparison between the current position of the reference portion 18A and at least one of the first end position EP1 and the second end position EP2 in the second operating mode. In this embodiment, after concluding that the operating mode of the controller 38 is the second operating mode, the controller 38 is configured to compare the current position sensed by the position sensor 46 with the first end position EP1 and the second end position EP2.

As seen in FIG. 13, the controller 38 is configured to generate the stop command CM3 when the controller 38 detects the termination of the second control signal CS2 before the reference portion 18A reaches one of the first end position EP1 and the second end position EP2. The actuator driver 48 is configured to stop the electric motor 30 in response to the stop command CM3. The second tube 18 is stopped when the second control signal CS2 is terminated. Thus, it is possible to arbitrarily arrange the reference portion 18A of the telescopic apparatus 12 between the starting position and the first end position EP1.

As seen in FIG. 14, the controller 38 is configured to generate the stop command CM3 when the reference portion 18A reaches one of the first end position EP1 and the second end position EP2 before the controller 38 detects the termination of the second control signal CS2. The actuator driver 48 is configured to stop the electric motor 30 in response to the stop command CM3. Thus, the second tube 18 is stopped at one of the first end position EP1 and the second end position EP2.

The memory 40 is configured to store setting information relating to at least one of an operation of the telescopic apparatus 12 and a movement of the telescopic apparatus 12. The operation of the telescopic apparatus 12 includes a mode-changing operation of the telescopic apparatus 12. The movement of the telescopic apparatus 12 includes a speed of a telescopic motion of the telescopic apparatus 12, a distance of the telescopic motion of the telescopic apparatus 12, and a stop position of the telescopic motion of the telescopic apparatus 12. In this embodiment, the memory 40 is configured to store the setting information relating to distances of the telescopic motion of the telescopic apparatus 12.

As seen in FIGS. 2 and 6, for example, the memory 40 is configured to store a distance DS1 defined between the first predetermined position P1 and the second predetermined position P2. The memory 40 is configured to store a distance DS2 defined between the first predetermined position P1 and the third predetermined position P3. The memory 40 is configured to store a distance DS3 defined between the second predetermined position P2 and the third predetermined position P4. The memory 40 is configured to store a distance DS4 defined between the first end position EP1 and the second end position EP2.

The controller 38 is configured to adjust the setting information in response to an input from the external device ED. Examples of the external device ED include a cycle computer, a smartphone, a tablet computer, and a desktop or laptop computer. The external device ED includes a processor ED1, an input device ED2, a display ED3, and a wireless communicator WC2. The processor ED1 includes a CPU, a memory controller, and a memory. A program is stored in the memory of the processor ED1. The at least one program is read into the CPU of the processor ED1, and thereby the configuration and/or algorithm of the external device ED is performed. The input device ED2 is configured to receive a user input. The display ED3 is configured to display settings of the bicycle seatpost system 1211. For example, the display ED3 is configured to display the first operating mode MD1 and the second operating mode MD2 to allow the user to select one of the first operating mode MD1 and the second operating mode MD2. The wireless communicator WC2 has substantially the same structure and/or configuration as those of the wireless communicators WC0 and WC1. Thus, it will not be described in detail here for the sake of brevity.

The external computer 50B is configured to receive the input to change the setting information. For example, the external computer 50B is configured to receive the input to change at least one of the first predetermined position P1, the second predetermined position P2, the third predetermined position P3, and the third predetermined position P4. Furthermore, the external computer 50B is configured to receive the input to change at least one of the distances DS1 to DS4. The user can change the distances DS1 to DS4 using the external computer 50B. The distance DS1 can be changed based on the change in the second predetermined position P2. The distance DS2 can be changed based on the change in the first predetermined position P1. The distance DS3 can be changed based on the change in the second predetermined position P2. The distance DS4 can be changed based on the change in the second predetermined position P2. For example, the distances DS1 and DS4 can be changed in a range of 2 mm to 300 mm. The distances DS2 and DS3 can be changed in a range of 2 mm to 100 mm.

Second Embodiment

A telescopic apparatus operating system 210 in accordance with a second embodiment will be described below referring to FIGS. 15 to 22. The telescopic apparatus operating system 210 has the same structure and/or configuration as that of the telescopic apparatus operating system 10 except for the telescopic apparatus controller 14. Thus, elements having substantially the same function as those in the first embodiment will be numbered the same here, and will not be described and/or illustrated again in detail here for the sake of brevity.

Figure 15:
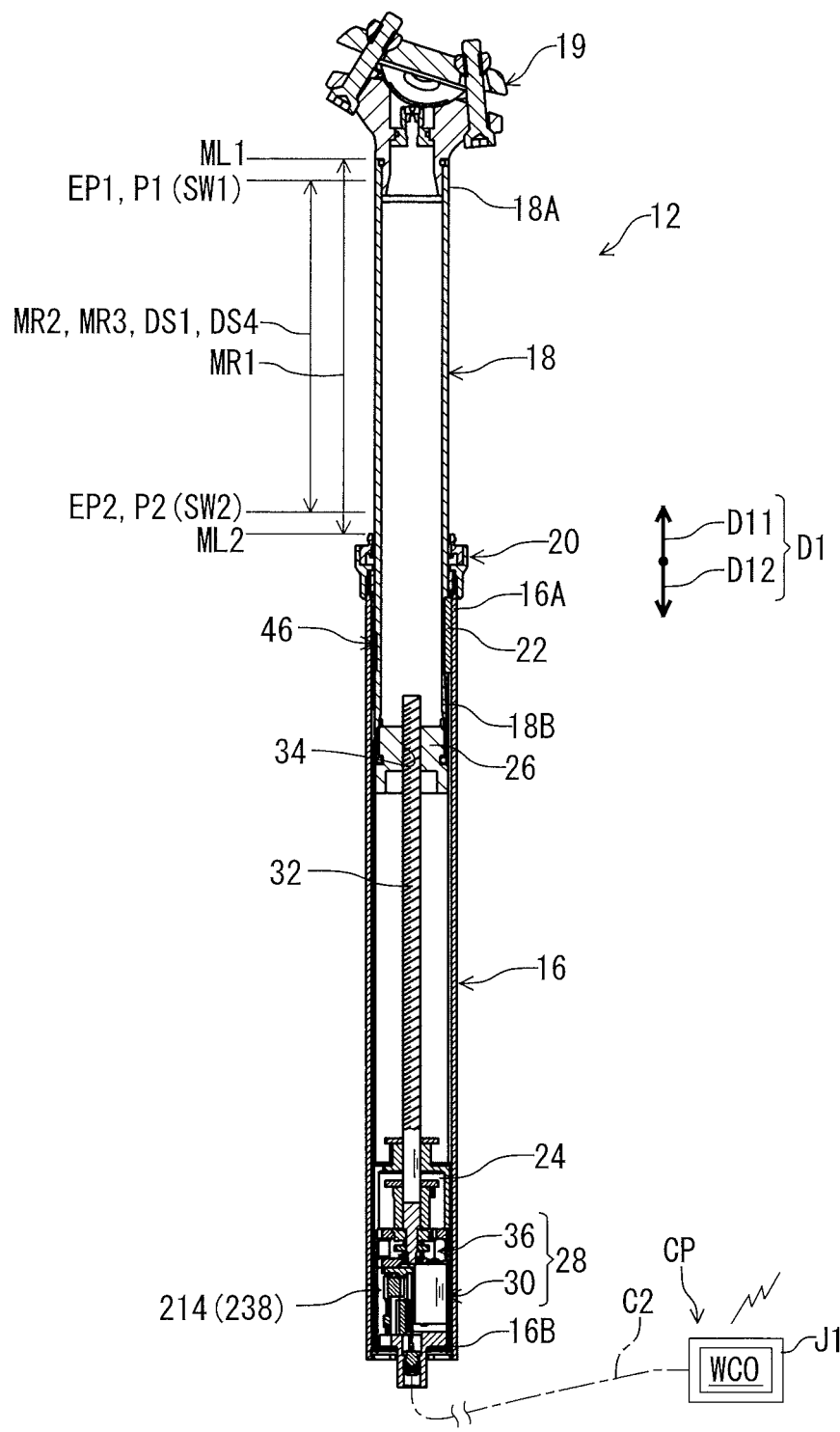
FIG. 15 is a cross-sectional view of a telescopic apparatus of a telescopic apparatus operating system in accordance with a second embodiment.
Figure 16:
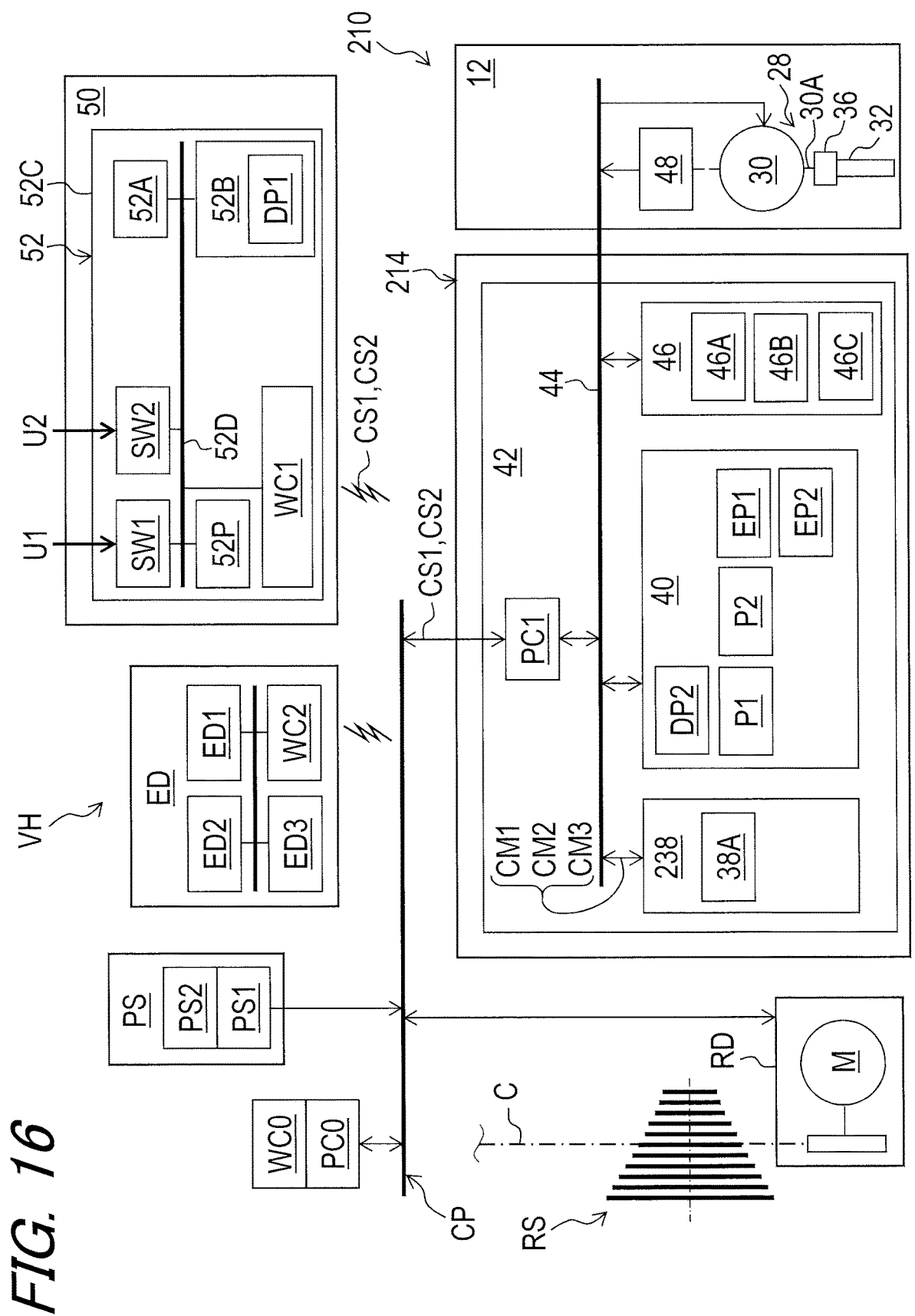
FIG. 16 is a block diagram of the telescopic apparatus operating system illustrated in FIG. 15.

As seen in FIGS. 15 and 16, the telescopic apparatus operating system 210 for the human-powered vehicle VH comprises a telescopic apparatus controller 214 and the telescopic apparatus 12. The telescopic apparatus controller 214 is configured to control the telescopic apparatus 12. The telescopic apparatus controller 214 for the human-powered vehicle VH comprises a controller 238. The controller 238 has substantially the same structure as the structure of the controller 38 of the first embodiment. The controller 238 is configured to control the telescopic apparatus 12 in one of the plurality of operating modes. The plurality of operating modes includes the first operating mode and the second operating mode. The plurality of operating modes includes the first operating mode in which the reference portion 18A of the telescopic apparatus 12 is selectively arranged to one of the first predetermined position P1 and the second predetermined position P2. The plurality of operating modes includes the second operating mode in which the reference portion 18A of the telescopic apparatus 12 is arbitrarily arranged between the first end position EP1 and the second end position EP2.

As seen in FIG. 15, the first electrical switch SW1 is assigned to the first predetermined position P1 in the first operating mode. The second electrical switch SW2 is assigned to the second predetermined position P2 in the first operating mode.

Figure 17:
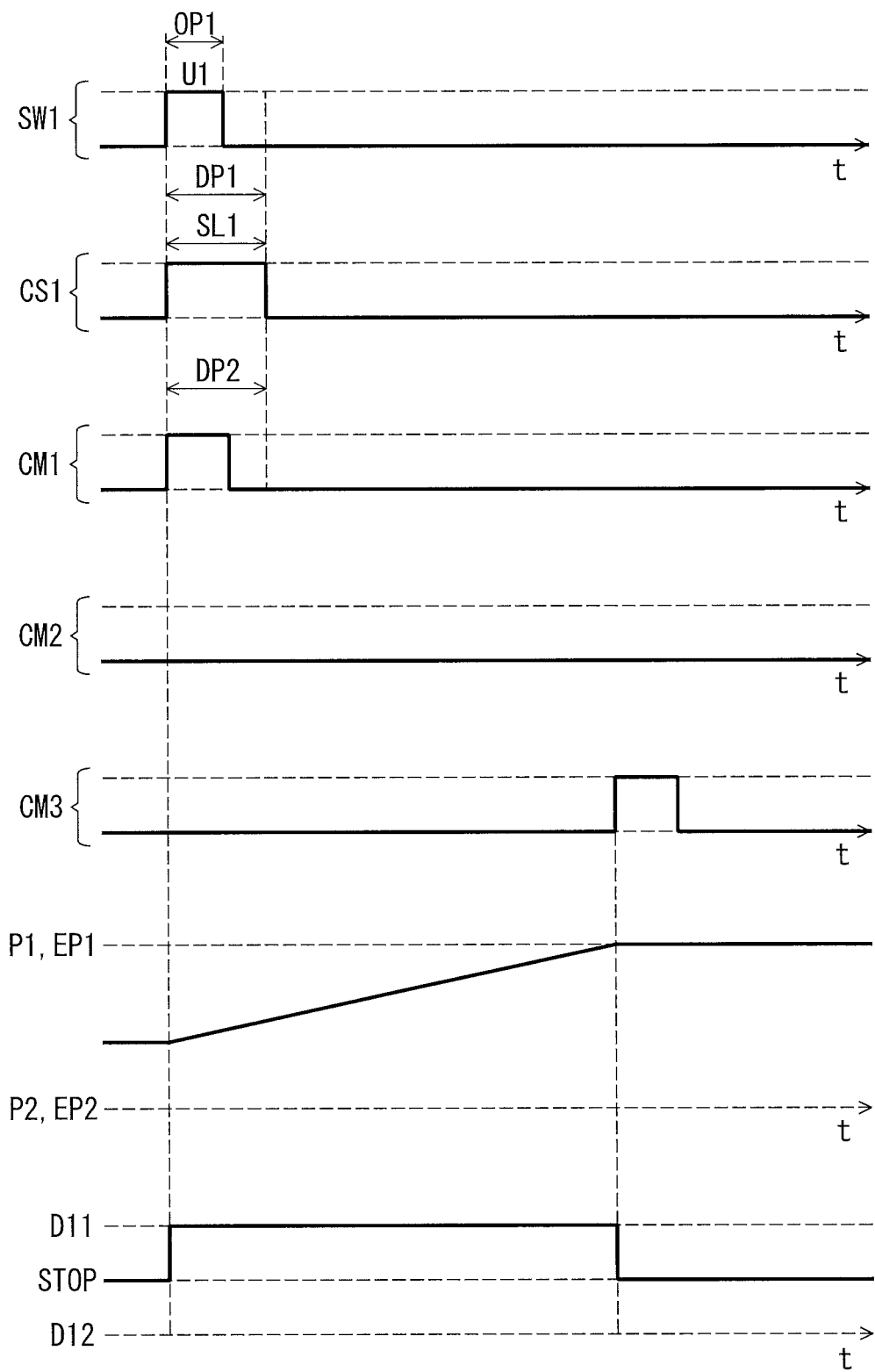
FIGS. 17 and 18 are timing charts of the telescopic apparatus operating system illustrated in FIG. 16 (first operating mode).
Figure 18:
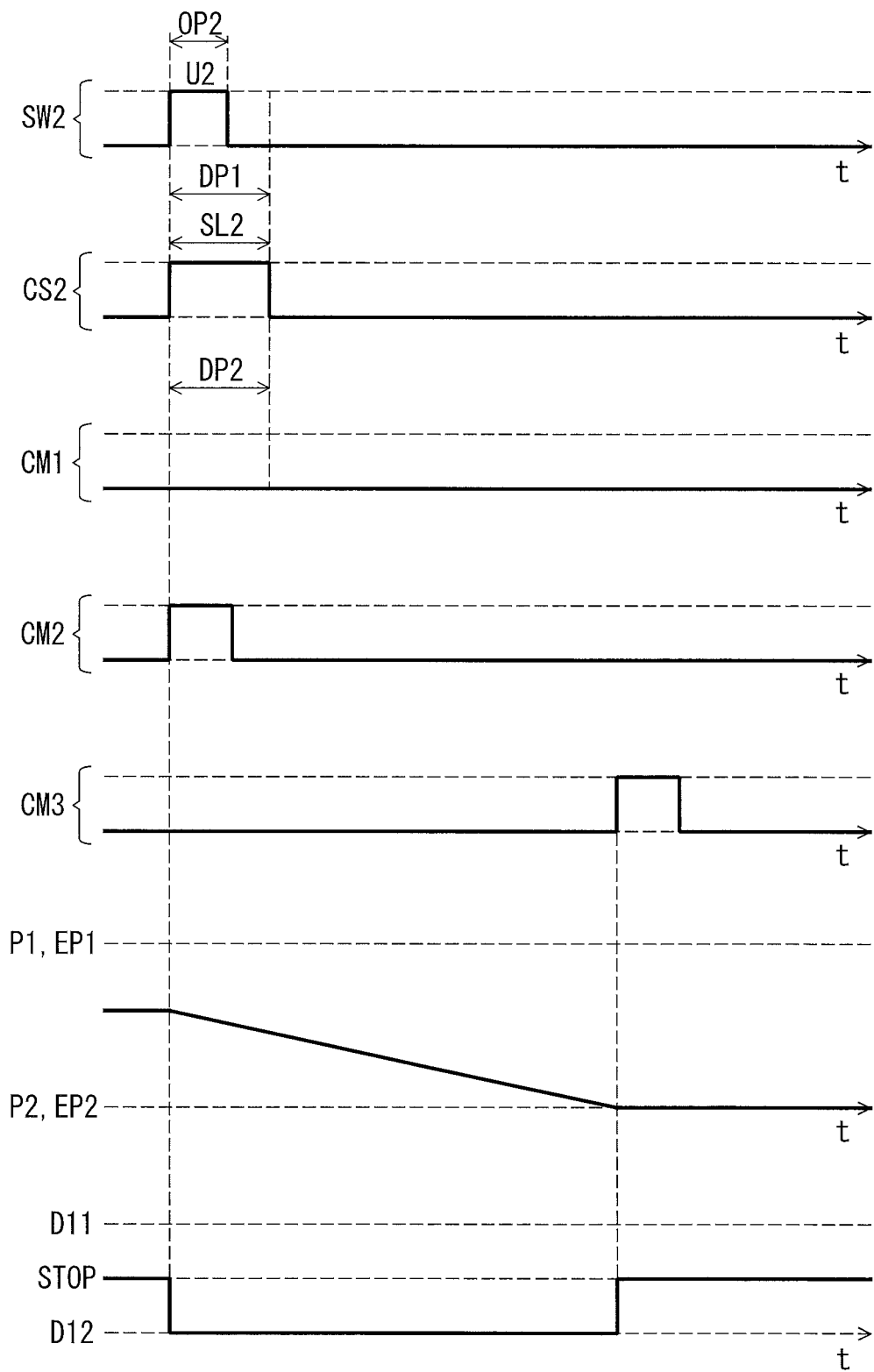

As seen in FIGS. 17 and 18, the controller 238 is configured to selectively arrange the reference portion 18A of the telescopic apparatus 12 to one of the first predetermined position P1, the second predetermined position P2, and a third predetermined position in the first operating mode. In this embodiment, the controller 238 is configured to selectively arrange the reference portion 18A of the telescopic apparatus 12 to one of the first predetermined position P1 and the second predetermined position P2. The third predetermined positions P3 and P4 are omitted from the first operating mode of the controller 238.

Figure 19:
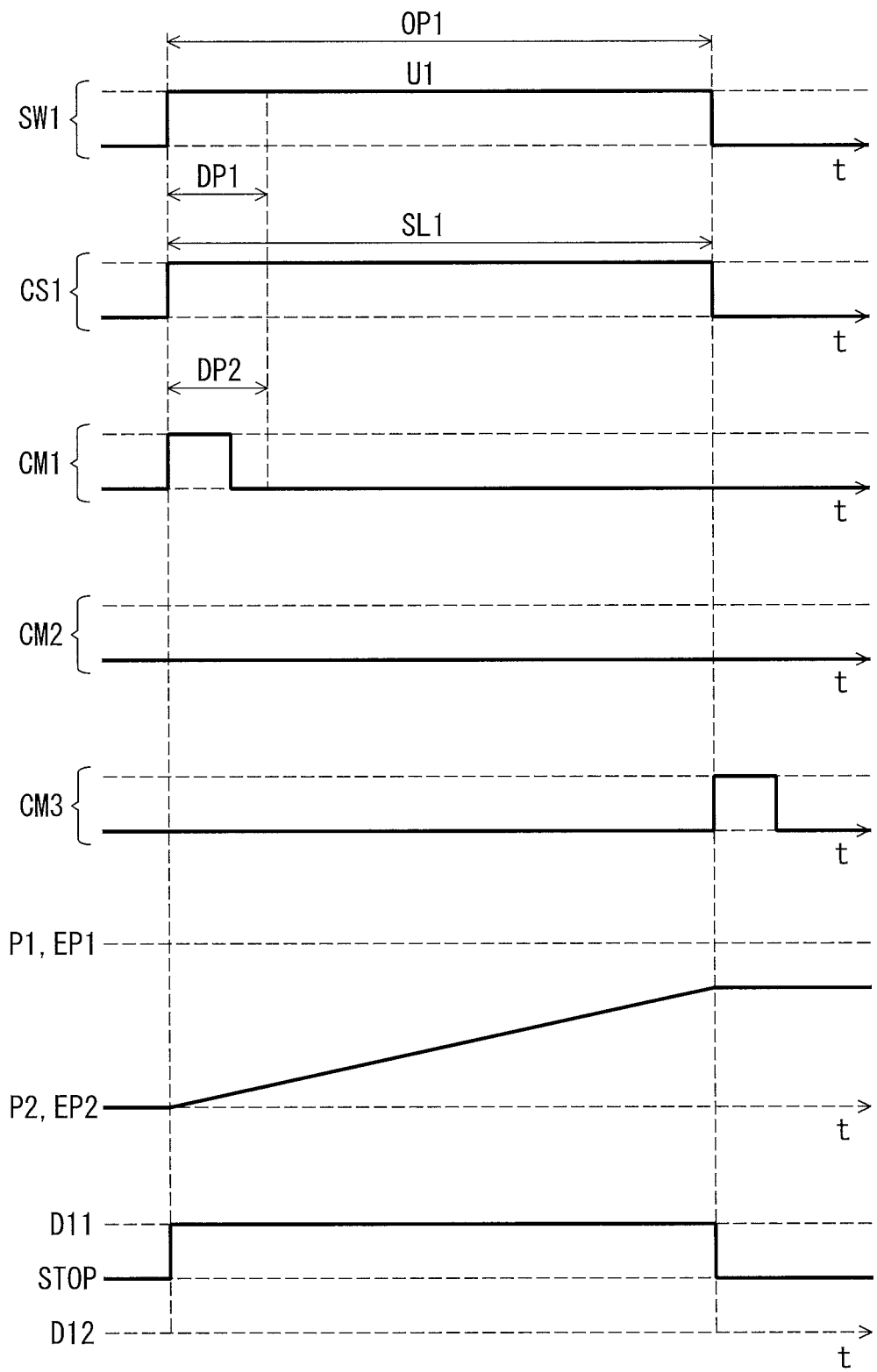
FIGS. 19 and 22 are timing charts of the telescopic apparatus operating system illustrated in FIG. 16 (second operating mode).
Figure 20:
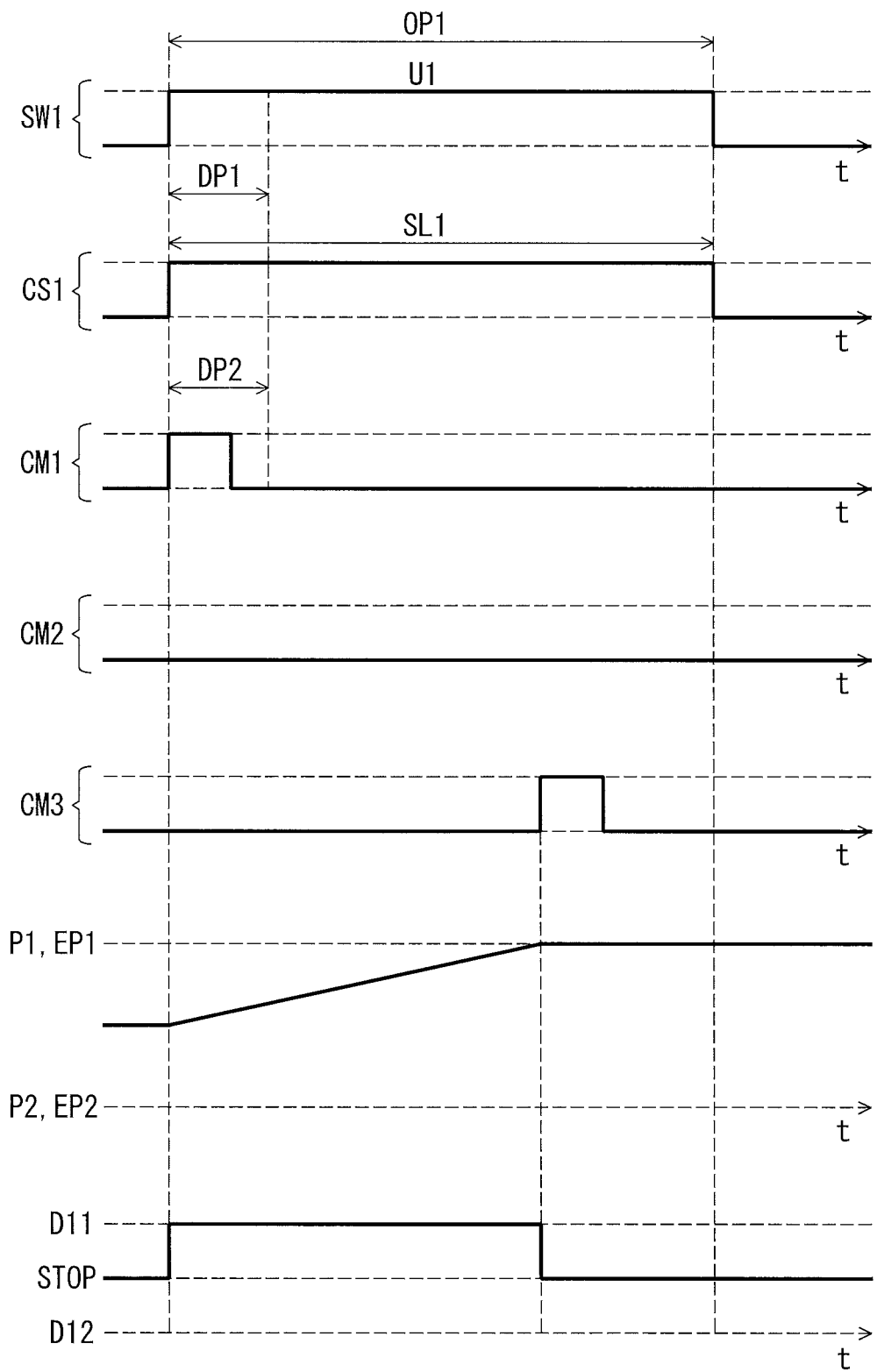

As seen in FIGS. 17, 19, and 20, the controller 238 is configured to generate the first start command CM1 when the controller 238 detects the first control signal CS1. The actuator driver 48 is configured to control the electric motor 30 to rotate the screw rod 32 in the first rotational direction in response to the first start command CM1. Thus, for example, the second tube 18 is moved relative to the first tube 16 in the first telescopic direction D11.

As seen in FIG. 17, the controller 238 is configured to selectively arrange the reference portion 18A of the telescopic apparatus 12 according to comparison between the current position of the reference portion 18A and at least one of the first predetermined position P1 and the second predetermined position P2 in the first operating mode. In this embodiment, after concluding that the operating mode of the controller 238 is the first operating mode, the controller 238 is configured to compare the current position sensed by the position sensor 46 with the first predetermined position P1 in the first operating mode.

The controller 238 is configured to generate the stop command CM3 when the controller 238 concludes that the reference portion 18A reaches the first predetermined position P1. The actuator driver 48 is configured to stop the electric motor 30 in response to the stop command CM3. The second tube 18 is stopped at the first predetermined position P1 corresponding to the first electrical switch SW1.

As seen in FIGS. 19 and 20, the controller 238 is configured to selectively arrange the reference portion 18A of the telescopic apparatus 12 according to comparison between the current position of the reference portion 18A and at least one of the first end position EP1 and the second end position EP2 in the second operating mode. The operations of the second operating mode illustrated in FIGS. 19 and 20 are substantially the same as the operations of the second operating mode illustrated in FIGS. 9 and 10. Thus, they will not be described in detail here for the sake of brevity.

Figure 21:
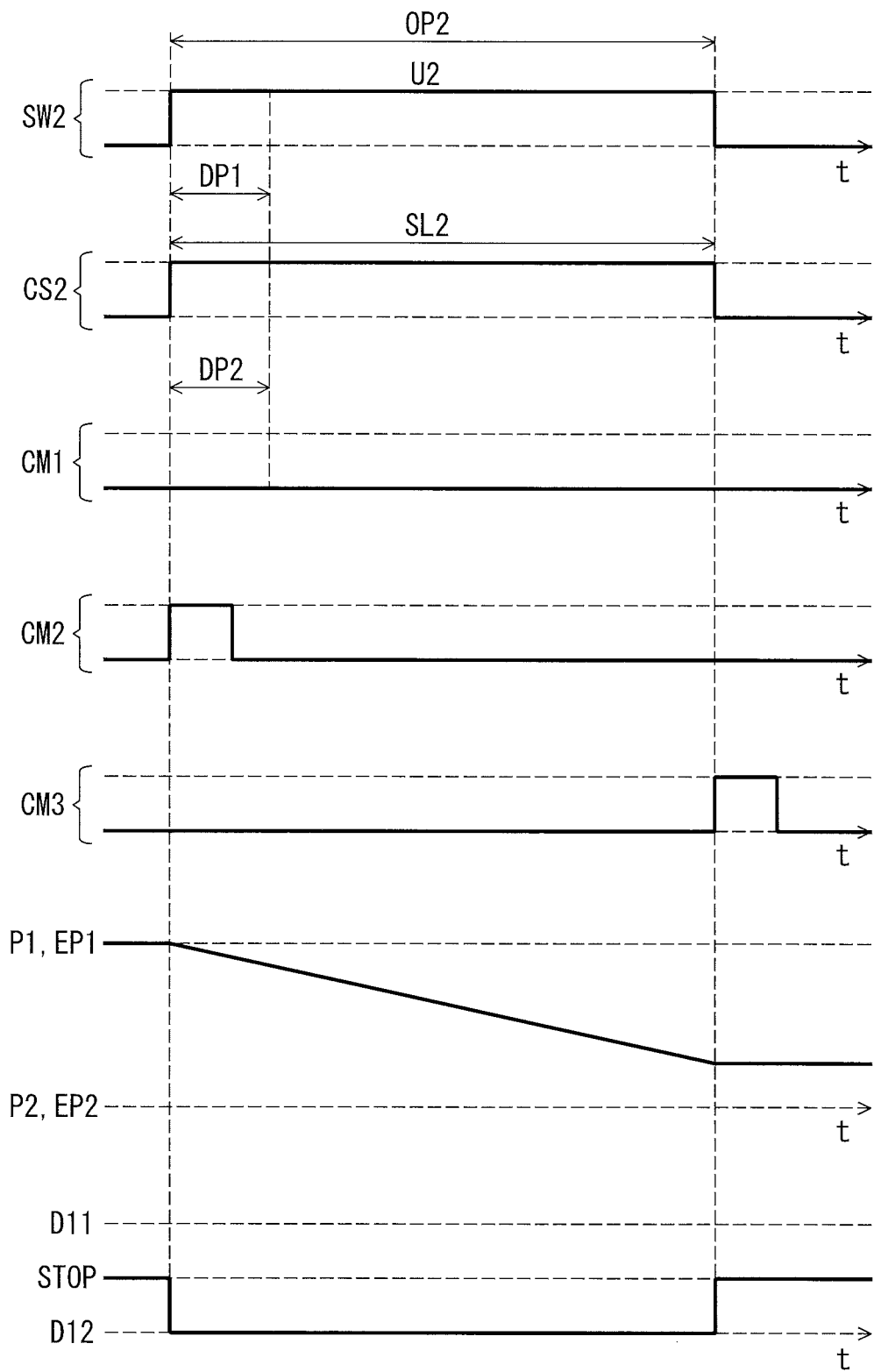
Figure 22:
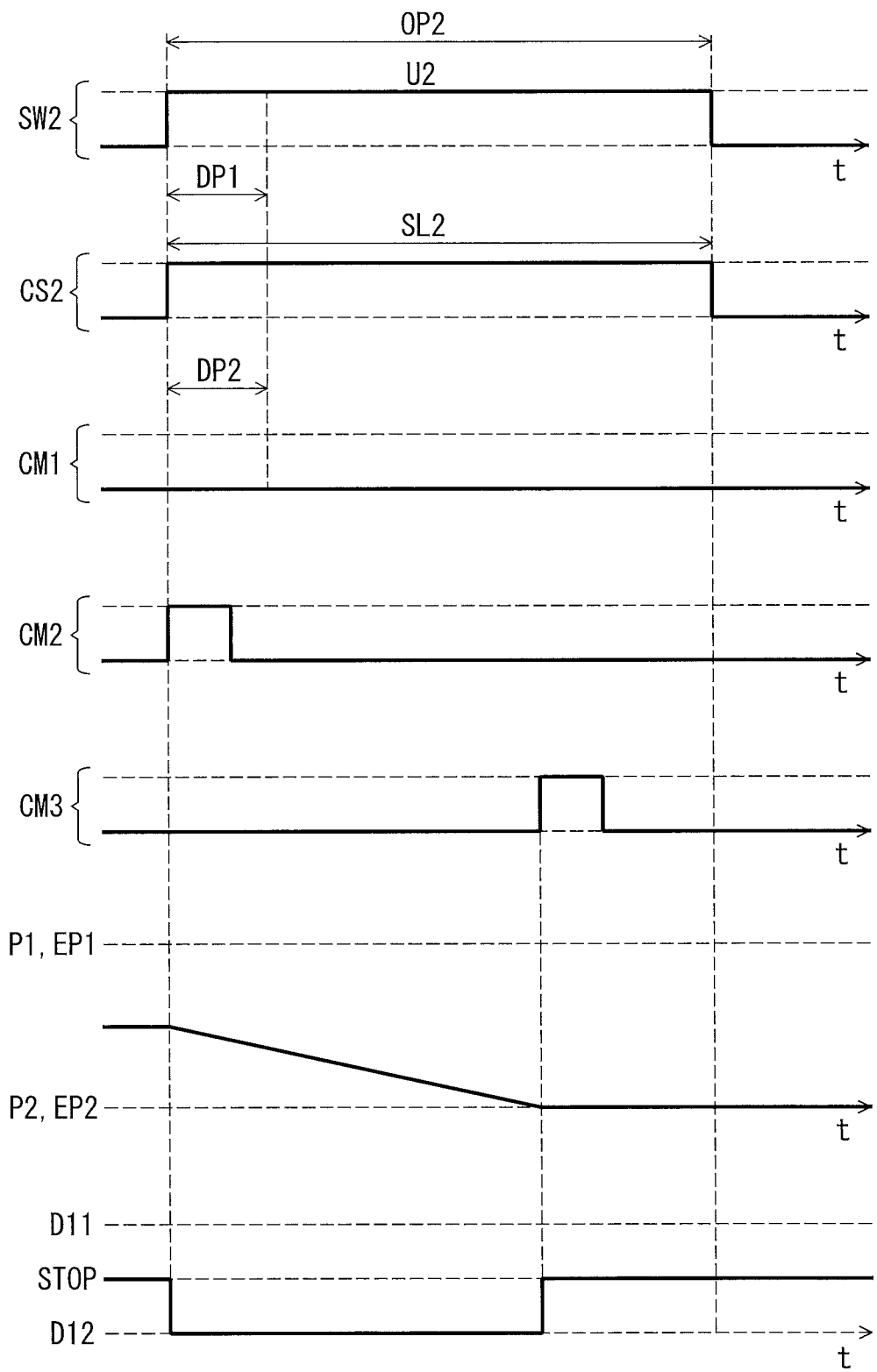

As seen in FIGS. 18, 21, and 22, the controller 238 is configured to generate the second start command CM2 when the controller 238 detects the second control signal CS2. The actuator driver 48 is configured to control the electric motor 30 to rotate the screw rod 32 in the second rotational direction in response to the second start command CM2. Thus, for example, the second tube 18 is moved relative to the first tube 16 in the second telescopic direction D12.

As seen in FIG. 18, the controller 238 is configured to selectively arrange the reference portion 18A of the telescopic apparatus 12 according to comparison between the current position of the reference portion 18A and at least one of the first predetermined position P1 and the second predetermined position P2 in the first operating mode. In this embodiment, after concluding that the operating mode of the controller 238 is the first operating mode, the controller 238 is configured to compare the current position sensed by the position sensor 46 with the second predetermined position P2 in the first operating mode.

The controller 238 is configured to generate the stop command CM3 when the controller 238 concludes that the reference portion 18A reaches the second predetermined position P2. The actuator driver 48 is configured to stop the electric motor 30 in response to the stop command CM3. The second tube 18 is stopped at the second predetermined position P2 corresponding to the second electrical switch SW2.

As seen in FIGS. 21 and 22, the controller 238 is configured to selectively arrange the reference portion 18A of the telescopic apparatus 12 according to comparison between the current position of the reference portion 18A and at least one of the first end position EP1 and the second end position EP2 in the second operating mode. The operations of the second operating mode illustrated in FIGS. 21 and 22 are substantially the same as the operations of the second operating mode illustrated in FIGS. 13 and 14. Thus, they will not be described in detail here for the sake of brevity.

Third Embodiment

A telescopic apparatus operating system 310 in accordance with a third embodiment will be described below referring to FIGS. 23 to 28. The telescopic apparatus operating system 310 has the same structure and/or configuration as that of the telescopic apparatus operating system 10 except for the telescopic apparatus controller 14. Thus, elements having substantially the same function as those in the above embodiments will be numbered the same here, and will not be described and/or illustrated again in detail here for the sake of brevity.

Figure 23:
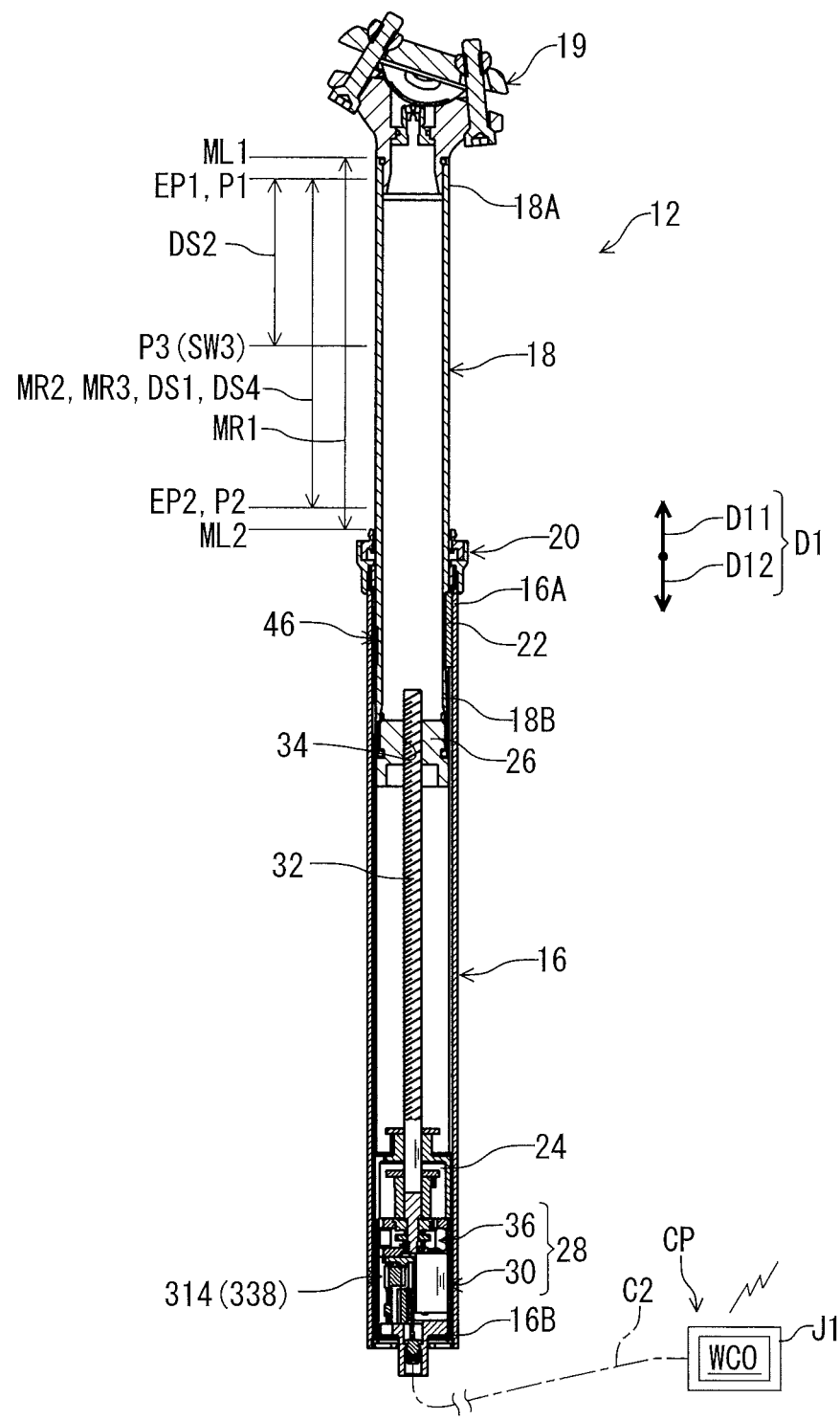
FIG. 23 is a cross-sectional view of a telescopic apparatus of a telescopic apparatus operating system in accordance with a third embodiment.
Figure 24:
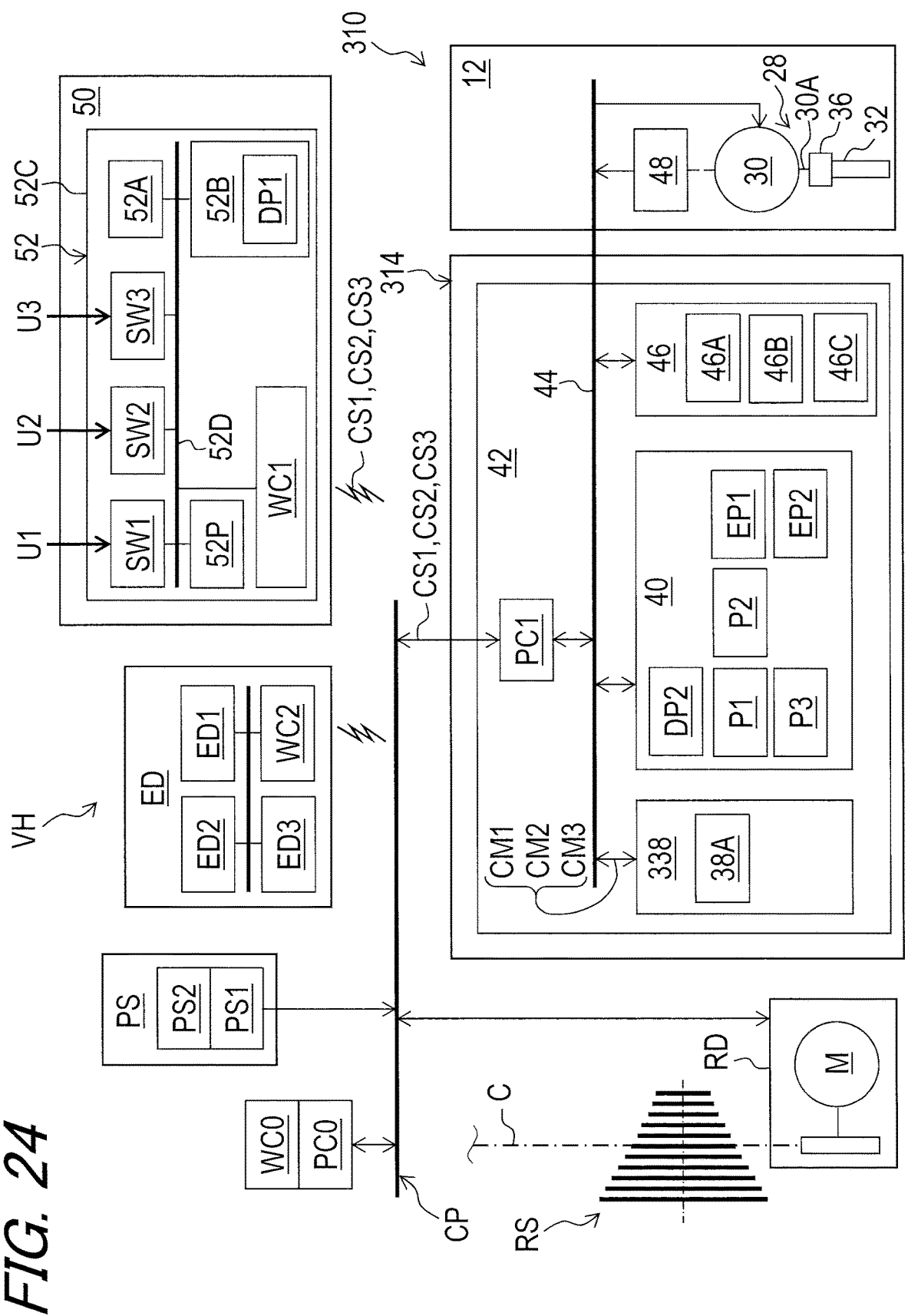
FIG. 24 is a block diagram of the telescopic apparatus operating system illustrated in FIG. 23.

As seen in FIGS. 23 and 24, the telescopic apparatus operating system 310 for the human-powered vehicle VH comprises a telescopic apparatus controller 314 and the telescopic apparatus 12. The telescopic apparatus controller 314 is configured to control the telescopic apparatus 12. The telescopic apparatus controller 314 for the human-powered vehicle VH comprises a controller 338. The controller 338 has substantially the same structure as the structure of the controller 38 of the first embodiment. The controller 338 is configured to control the telescopic apparatus 12 in one of the plurality of operating modes. The plurality of operating modes includes the first operating mode and the second operating mode. The plurality of operating modes includes the first operating mode in which the reference portion 18A of the telescopic apparatus 12 is selectively arranged to one of the first predetermined position P1 and the second predetermined position P2. The plurality of operating modes includes the second operating mode in which the reference portion 18A of the telescopic apparatus 12 is arbitrarily arranged between the first end position EP1 and the second end position EP2.

As seen in FIGS. 25 to 28, the controller 338 is configured to selectively arrange the reference portion 18A of the telescopic apparatus 12 to one of the first predetermined position P1, the second predetermined position P2, and a third predetermined position in the first operating mode. In this embodiment, the controller 338 is configured to selectively arrange the reference portion 18A of the telescopic apparatus 12 to one of the first predetermined position P1, the second predetermined position P2, and the third predetermined position P3. The third predetermined position P4 is omitted from the first operating mode of the controller 338.

Figure 25:
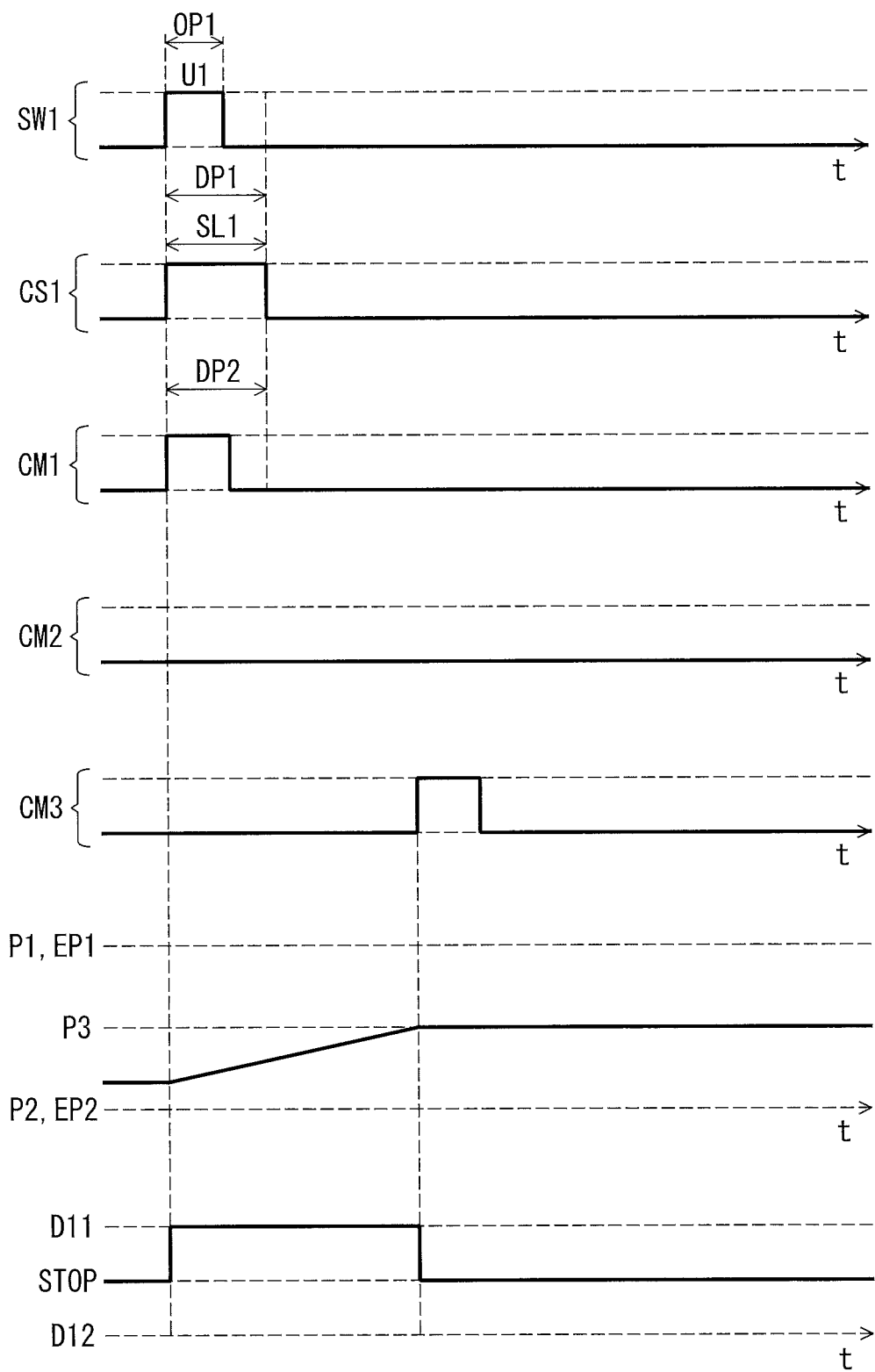
FIGS. 25 to 28 are timing charts of the telescopic apparatus operating system illustrated in FIG. 24 (first operating mode).

As seen in FIG. 25, the controller 338 is configured to generate the first start command CM1 when the controller 338 detects the first control signal CS1. The actuator driver 48 is configured to control the electric motor 30 to rotate the screw rod 32 in the first rotational direction in response to the first start command CM1. Thus, for example, the second tube 18 is moved relative to the first tube 16 in the first telescopic direction D11.

The controller 338 is configured to selectively arrange the reference portion 18A of the telescopic apparatus 12 according to comparison between the current position of the reference portion 18A and at least one of the first predetermined position P1 and the second predetermined position P2 in the first operating mode. In this embodiment, after concluding that the operating mode of the controller 338 is the first operating mode, the controller 338 is configured to compare the current position sensed by the position sensor 46 with the first predetermined position P1, the second predetermined position P2, and the third predetermined position P3 in the first operating mode.

The controller 338 is configured to generate the stop command CM3 when the controller 338 concludes that the reference portion 18A reaches one of the first predetermined position P1, the second predetermined position P2, and the third predetermined position P3. The actuator driver 48 is configured to stop the electric motor 30 in response to the stop command CM3. The second tube 18 is stopped at one of the first predetermined position P1, the second predetermined position P2, and the third predetermined position P3 which is adjacent to the starting position.

Figure 26:
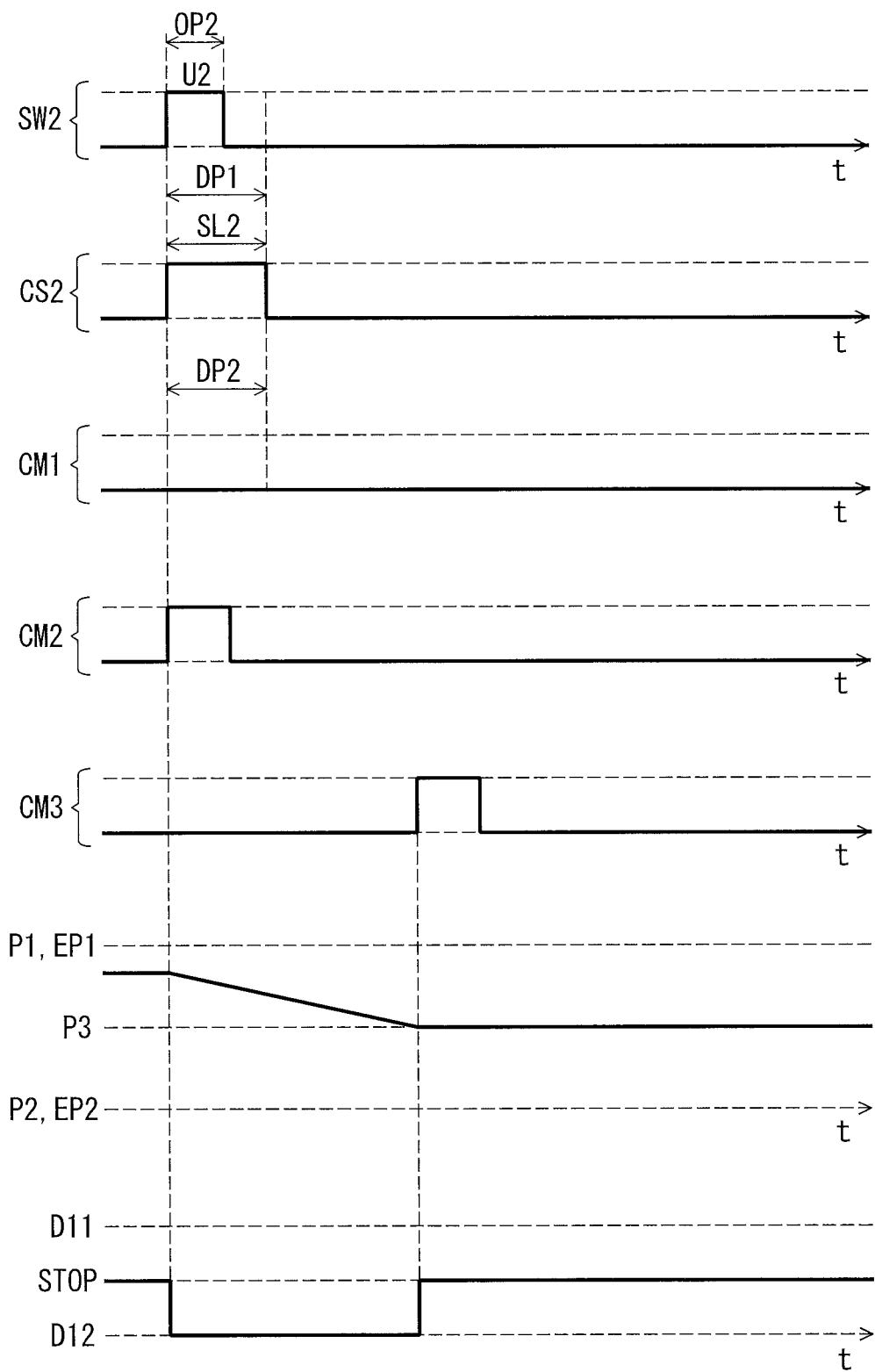

As seen in FIG. 26, the controller 338 is configured to generate the second start command CM2 when the controller 338 detects the second control signal CS2. The actuator driver 48 is configured to control the electric motor 30 to rotate the screw rod 32 in the second rotational direction in response to the second start command CM2. Thus, for example, the second tube 18 is moved relative to the first tube 16 in the second telescopic direction D12.

The controller 338 is configured to selectively arrange the reference portion 18A of the telescopic apparatus 12 according to comparison between the current position of the reference portion 18A and at least one of the first predetermined position P1 and the second predetermined position P2 in the first operating mode. In this embodiment, after concluding that the operating mode of the controller 338 is the first operating mode, the controller 338 is configured to compare the current position sensed by the position sensor 46 with the first predetermined position P1, the second predetermined position P2, and the third predetermined position P3 in the first operating mode.

The controller 338 is configured to generate the stop command CM3 when the controller 338 concludes that the reference portion 18A reaches one of the first predetermined position P1, the second predetermined position P2, and the third predetermined position P3. The actuator driver 48 is configured to stop the electric motor 30 in response to the stop command CM3. The second tube 18 is stopped at one of the first predetermined position P1, the second predetermined position P2, and the third predetermined position P3 which is adjacent to the starting position.

As seen in FIG. 24, the operating device 50 includes a third electrical switch SW3. As seen in FIG. 23, the third electrical switch SW3 is assigned to the third predetermined position P3 in the first operating mode. As seen in FIG. 24, the third electrical switch SW3 is configured to be activated in response to a third user input U3. For example, the third electrical switch SW3 includes a push-button switch. The third user input U3 includes a normal press of the third electrical switch SW3 and a long press of the third electrical switch SW3. However, the controller 338 does not determine if the third user input U3 is the normal press or the long press of the third electrical switch SW3.

Figure 27:
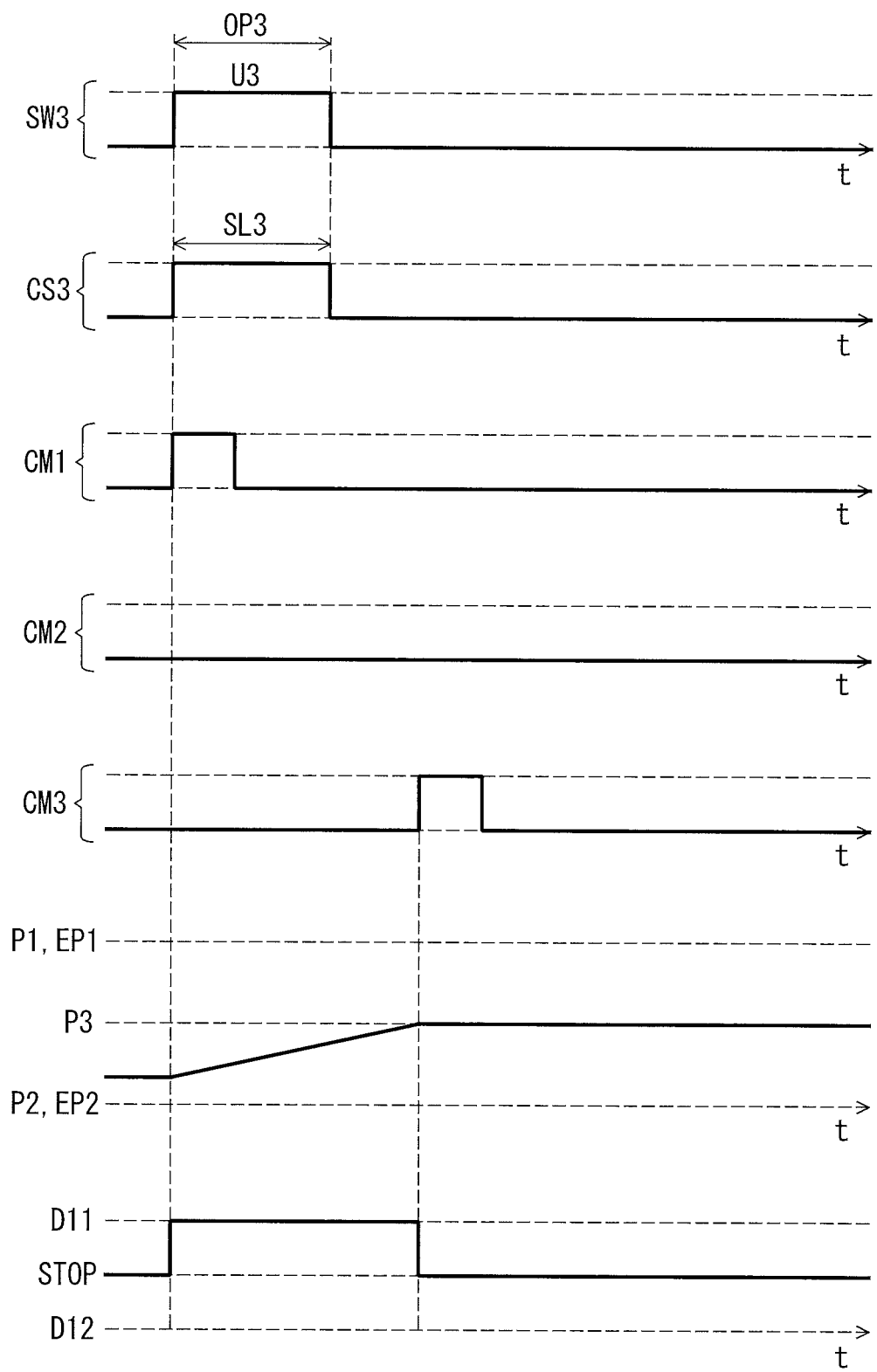
Figure 28:
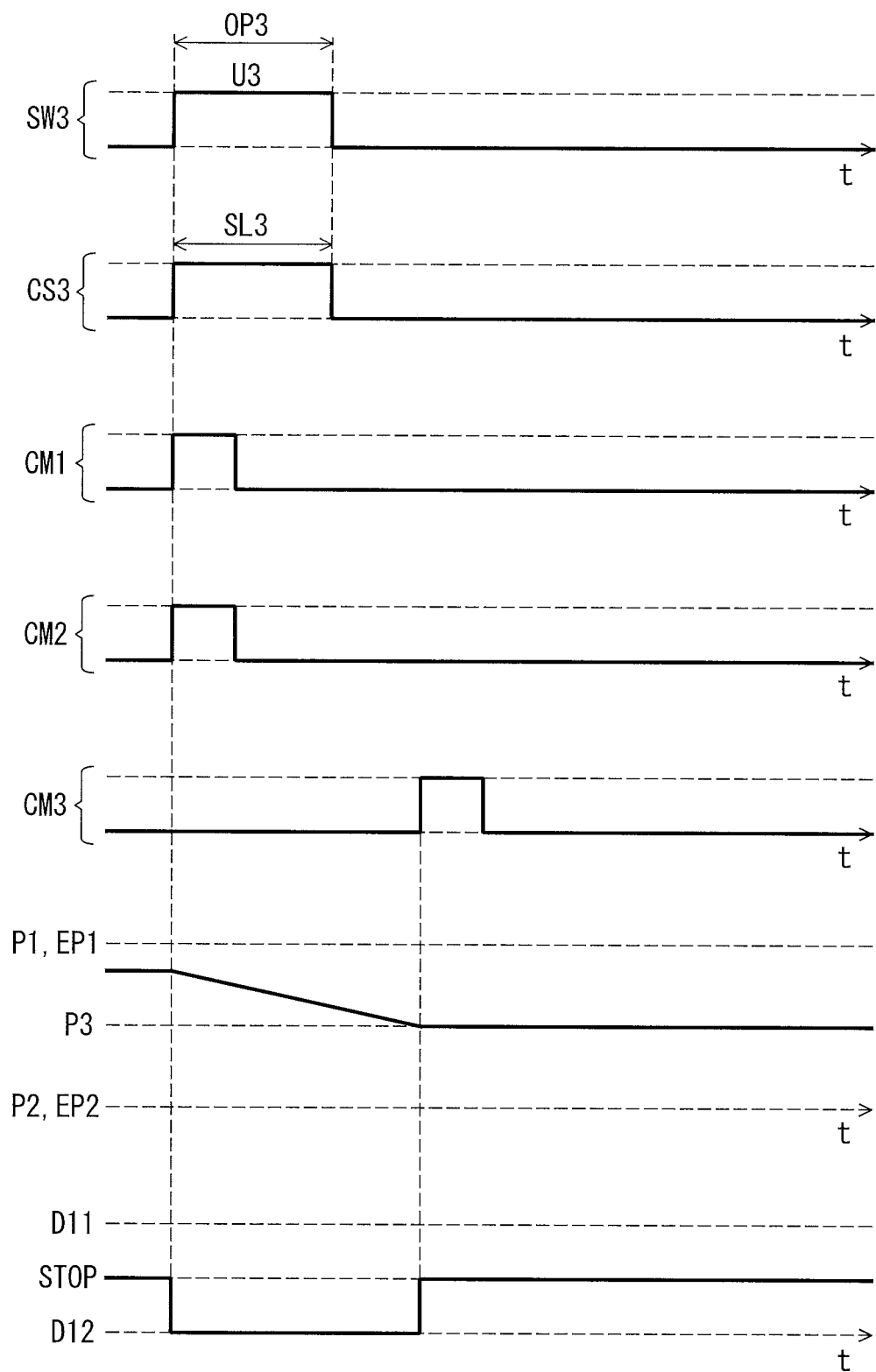

As seen in FIGS. 27 and 28, the signal controller 52 is configured to generate a third control signal CS3 having a signal length L3 in response to the third user input U3. The signal controller 52 is configured to generate the third control signal CS3 having the signal length SL3 which is constant regardless of a length of a third operation period OP3 of the third user input U3.

The controller 338 is configured to arrange the reference portion 18A of the telescopic apparatus 12 to the third predetermined position P3 in response to the third predetermined position P3. In this embodiment, the controller 338 is configured to determine the direction in which the reference portion 18A should be moved. The controller 338 is configured to compare the current position sensed by the position sensor 46 with the first predetermined position P1, the second predetermined position P2, and the third predetermined position P3 in the first operating mode.

As seen in FIG. 27, the controller 338 is configured to generate the first start command CM1 in response to the third control signal CS3 if the controller 338 concludes that the current position is closer to the second predetermined position P2 than the third predetermined position P3. As seen in FIG. 28, the controller 338 is configured to generate the second start command CM2 in response to the third control signal CS3 if the controller 338 concludes that the current position is closer to the first predetermined position P1 than the third predetermined position P3. The controller 338 is configured to generate neither the first start command CM1 nor the second start command CM2 if the controller 338 concludes that the current position is the third predetermined position P3.

As seen in FIGS. 27 and 28, the controller 338 is configured to generate the stop command CM3 when the controller 338 concludes that the reference portion 18A reaches the third predetermined position P3. The actuator driver 48 is configured to stop the electric motor 30 in response to the stop command CM3. The second tube 18 is stopped at the third predetermined position P3.

The controller 338 is configured to selectively arrange the reference portion 18A of the telescopic apparatus 12 according to comparison between the current position of the reference portion 18A and at least one of the first end position EP1 and the second end position EP2 in the second operating mode. The operations of the second operating mode is substantially the same as the operation of the second operating mode illustrated in FIGS. 11 to 14. Thus, they will not be described in detail here for the sake of brevity.

Fourth Embodiment

A telescopic apparatus operating system 410 in accordance with a fourth embodiment will be described below referring to FIGS. 29 to 34. The telescopic apparatus operating system 410 has the same structure and/or configuration as that of the telescopic apparatus operating system 10 except for the telescopic apparatus controller 14. Thus, elements having substantially the same function as those in the above embodiments will be numbered the same here, and will not be described and/or illustrated again in detail here for the sake of brevity.

Figure 29:
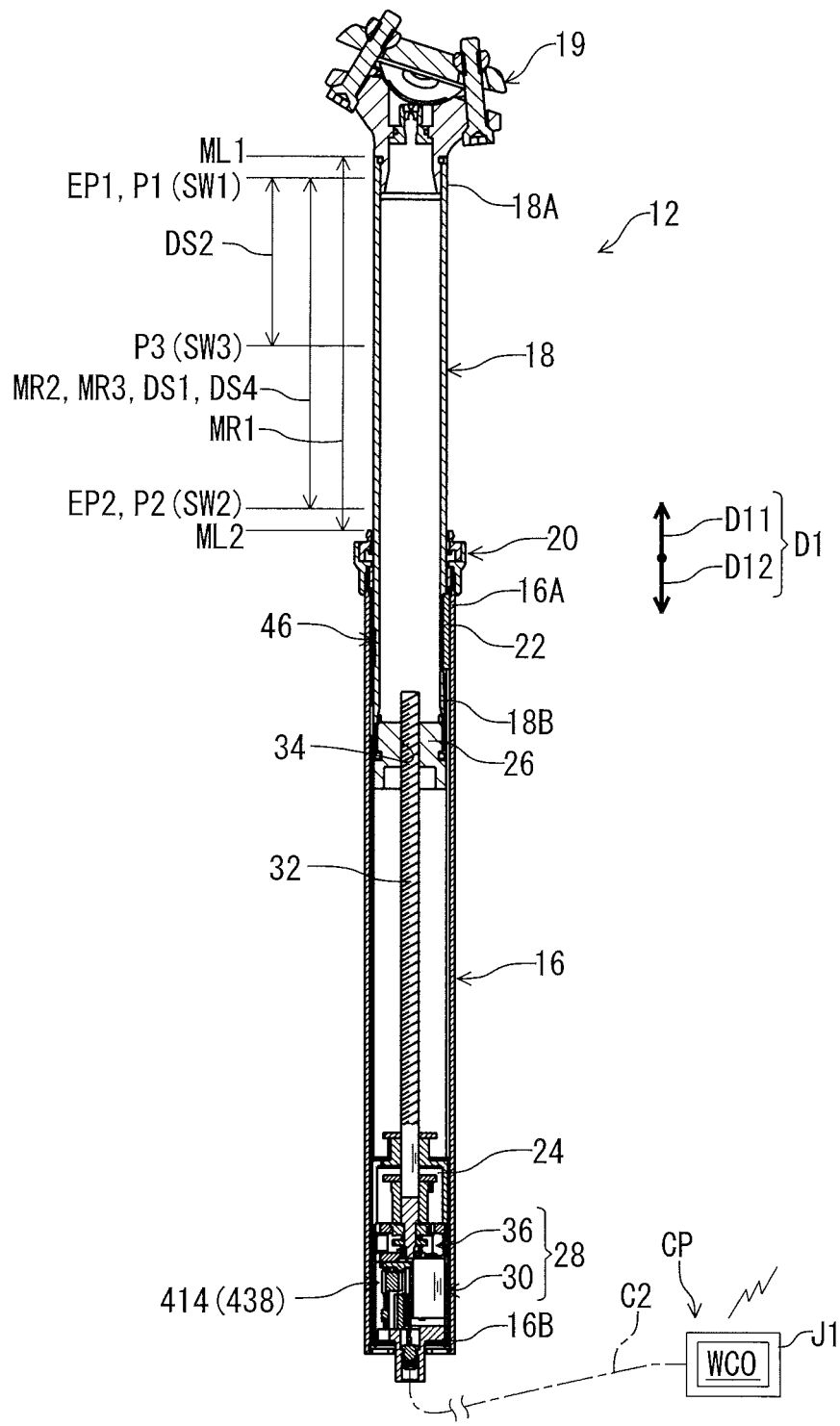
FIG. 29 is a cross-sectional view of a telescopic apparatus of a telescopic apparatus operating system in accordance with a fourth embodiment.
Figure 30:
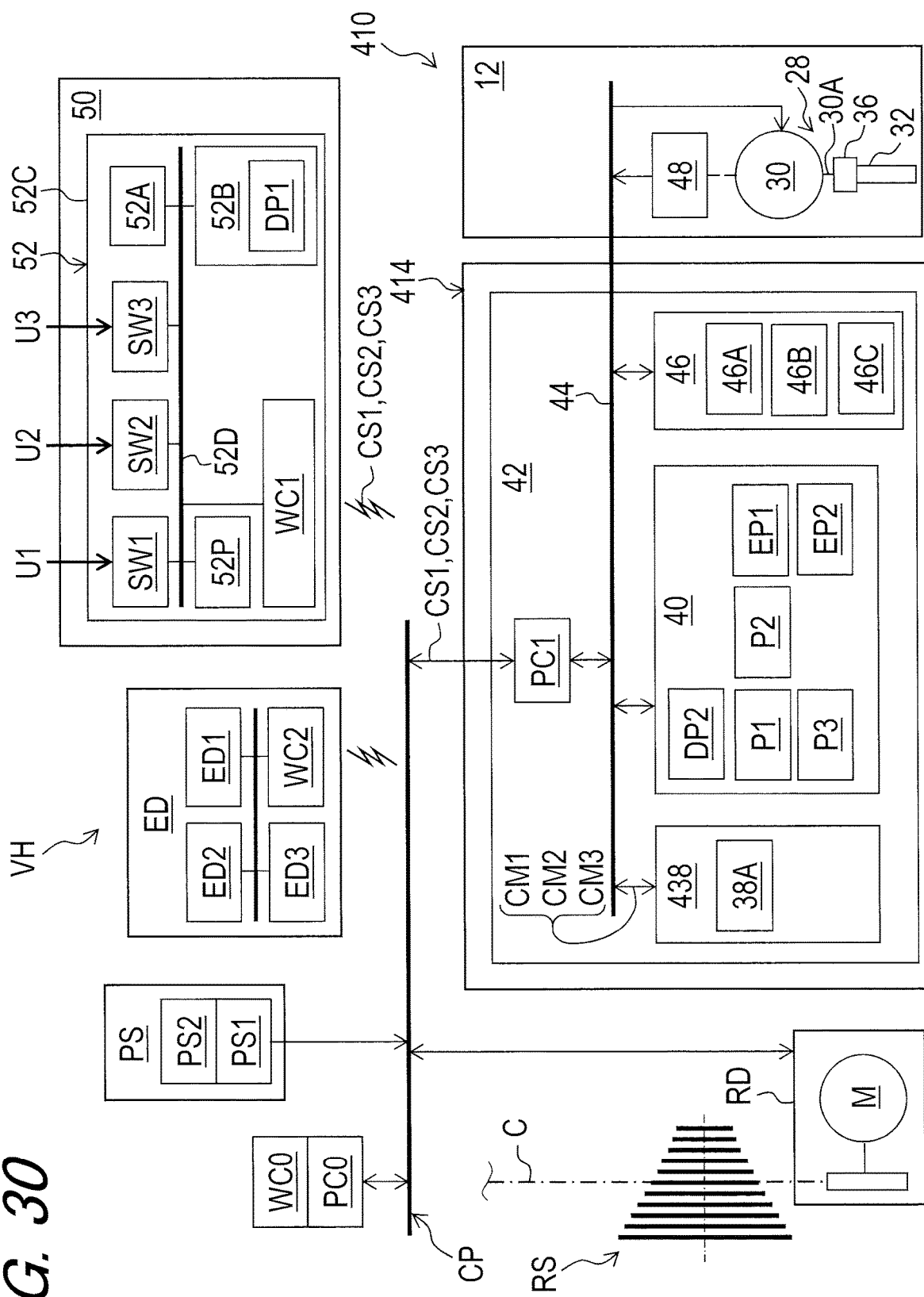
FIG. 30 is a block diagram of the telescopic apparatus operating system illustrated in FIG. 29.

As seen in FIGS. 29 and 30, the telescopic apparatus operating system 410 for the human-powered vehicle VII comprises a telescopic apparatus controller 414 and the telescopic apparatus 12. The telescopic apparatus controller 414 is configured to control the telescopic apparatus 12. The telescopic apparatus controller 414 for the human-powered vehicle VH comprises a controller 438. The controller 438 has substantially the same structure as the structure of the controller 38 of the first embodiment. The controller 438 is configured to control the telescopic apparatus 12 in one of the plurality of operating modes. The plurality of operating modes includes the first operating mode and the second operating mode. The plurality of operating modes includes the first operating mode in which the reference portion 18A of the telescopic apparatus 12 is selectively arranged to one of the first predetermined position P1 and the second predetermined position P2. The plurality of operating modes includes the second operating mode in which the reference portion 18A of the telescopic apparatus 12 is arbitrarily arranged between the first end position EP1 and the second end position EP2.

Figure 31:
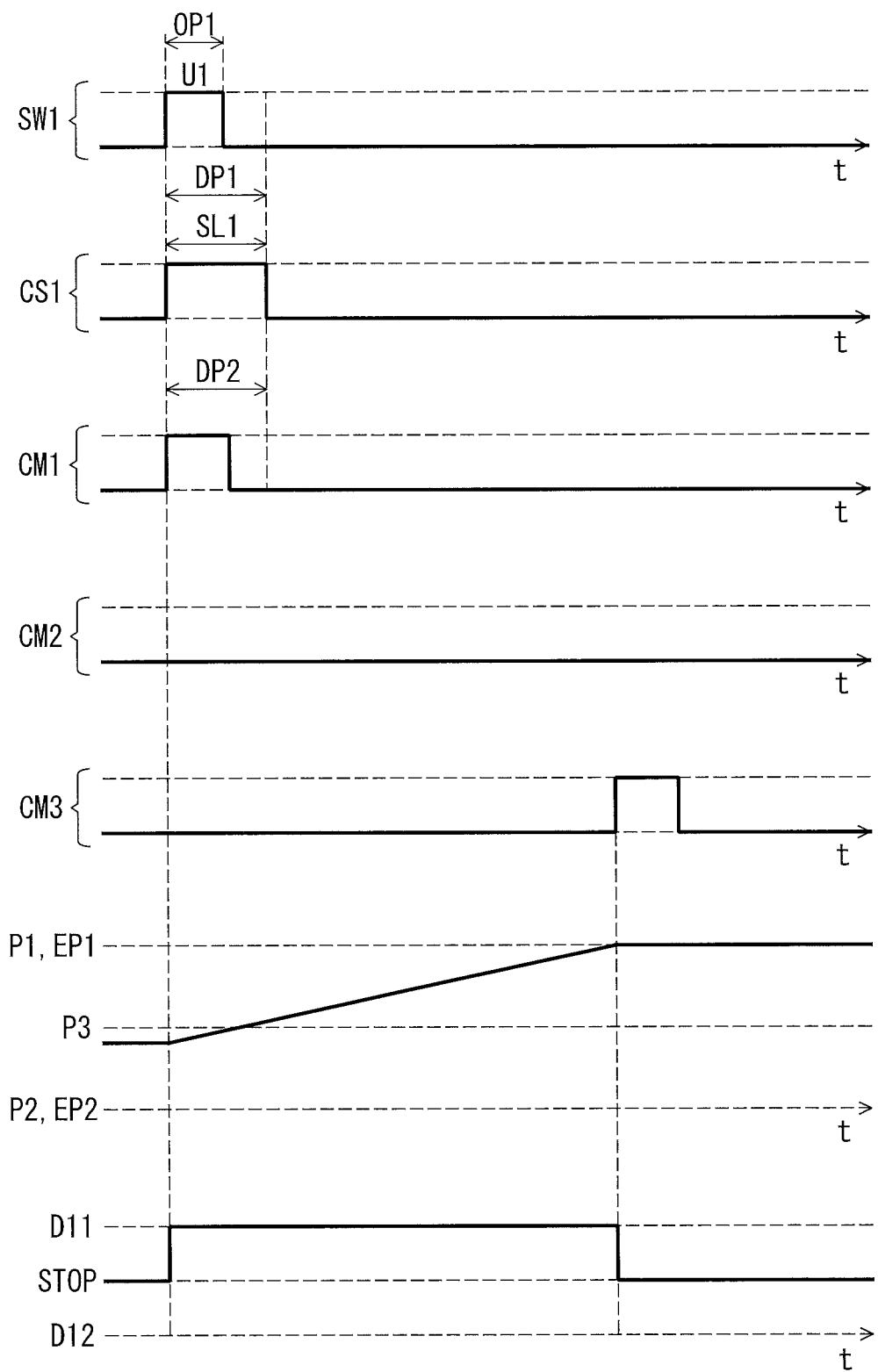
FIGS. 31 to 34 are timing charts of the telescopic apparatus operating system illustrated in FIG. 30 (first operating mode).
Figure 32:
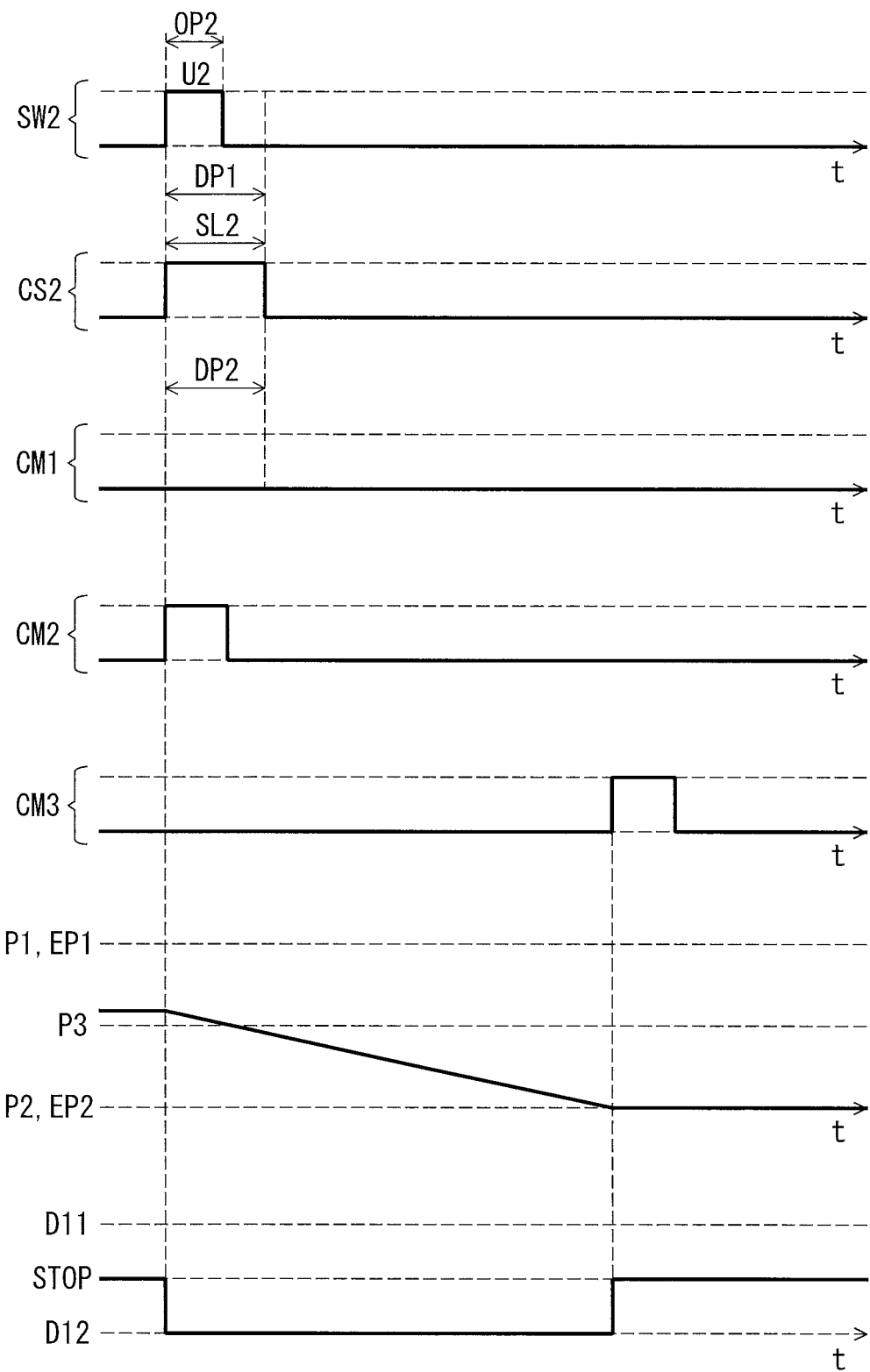
Figure 33:
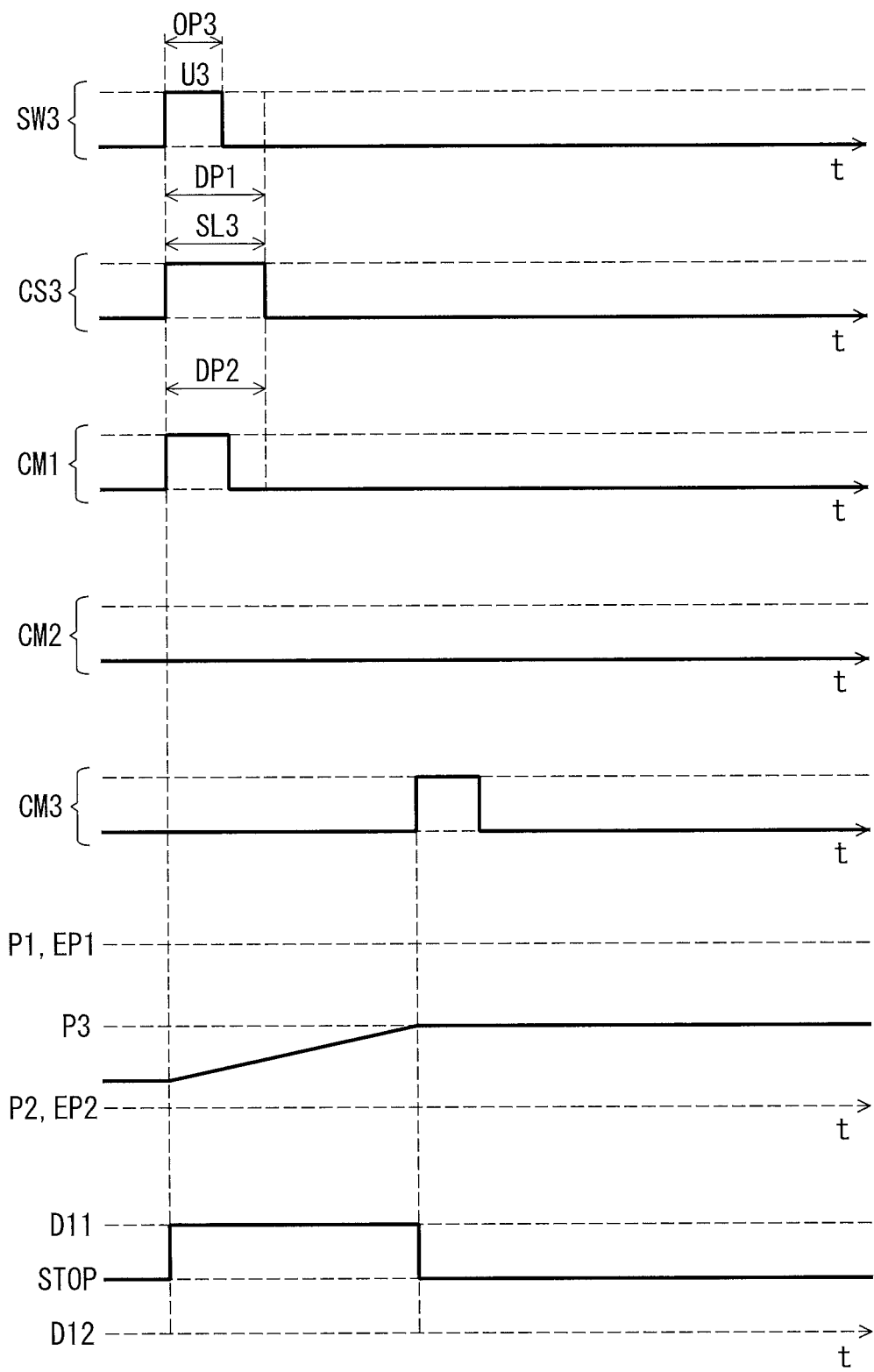
Figure 34:
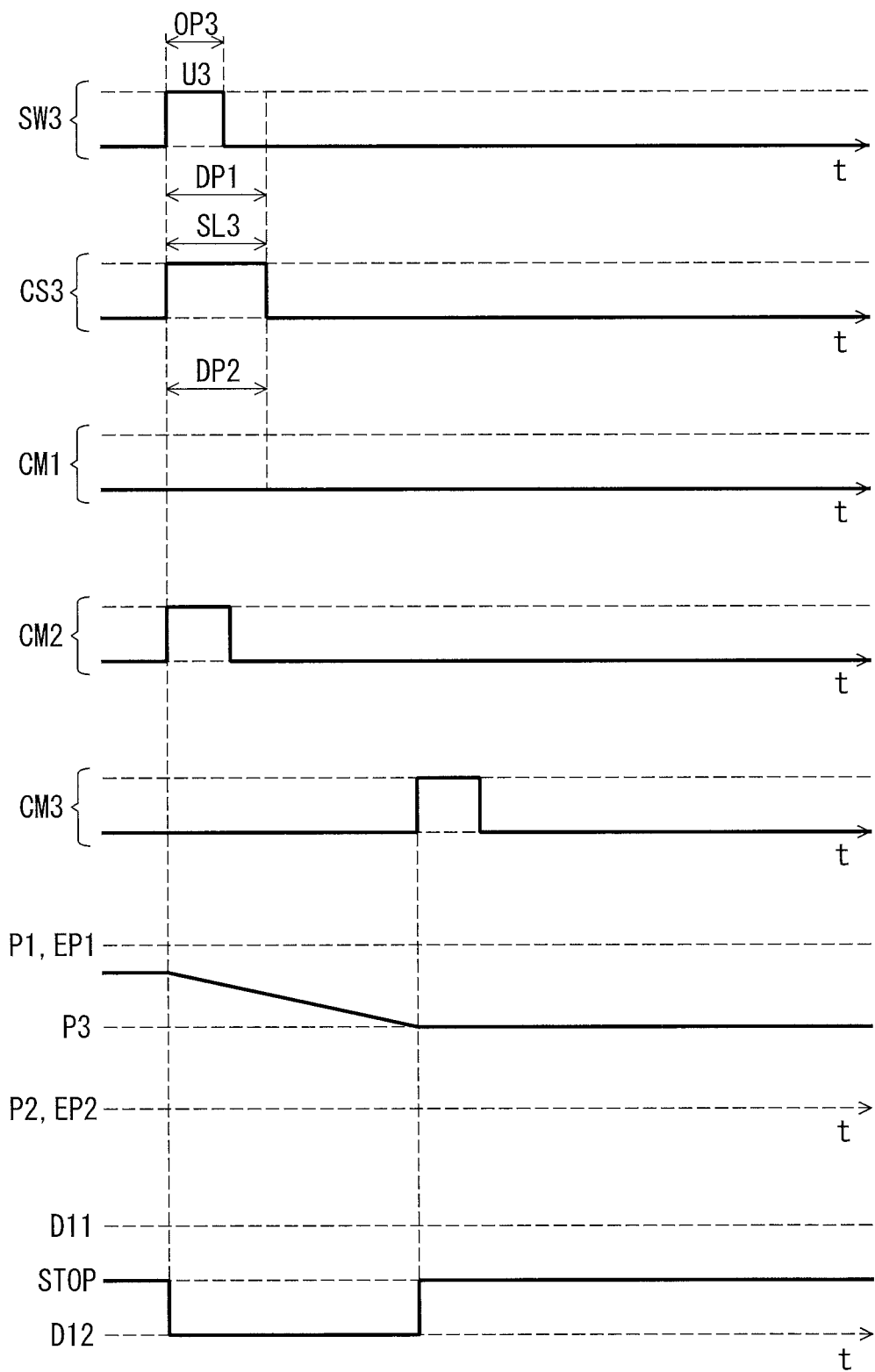

As seen in FIG. 31, as with the second embodiment, the first electrical switch SW1 is assigned to the first predetermined position P1 in the first operating mode. As seen in FIG. 32, the second electrical switch SW2 is assigned to the second predetermined position P2 in the first operating mode. As seen in FIGS. 33 and 34, as with the third embodiment, the third electrical switch SW3 is assigned to the third predetermined position P3 in the first operating mode. The operations of the first operating mode illustrated in FIGS. 31 to 34 are substantially the same as the operations of the first operating mode illustrated in FIGS. 17, 18, 27, and 28. Thus, they will not be described in detail here for the sake of brevity.

Fifth Embodiment

A telescopic apparatus operating system 510 in accordance with a fifth embodiment will be described below referring to FIGS. 35 to 38. The telescopic apparatus operating system 510 has the same structure and/or configuration as that of the telescopic apparatus operating system 10 except for the telescopic apparatus controller 14. Thus, elements having substantially the same function as those in the above embodiments will be numbered the same here, and will not be described and/or illustrated again in detail here for the sake of brevity.

Figure 35:
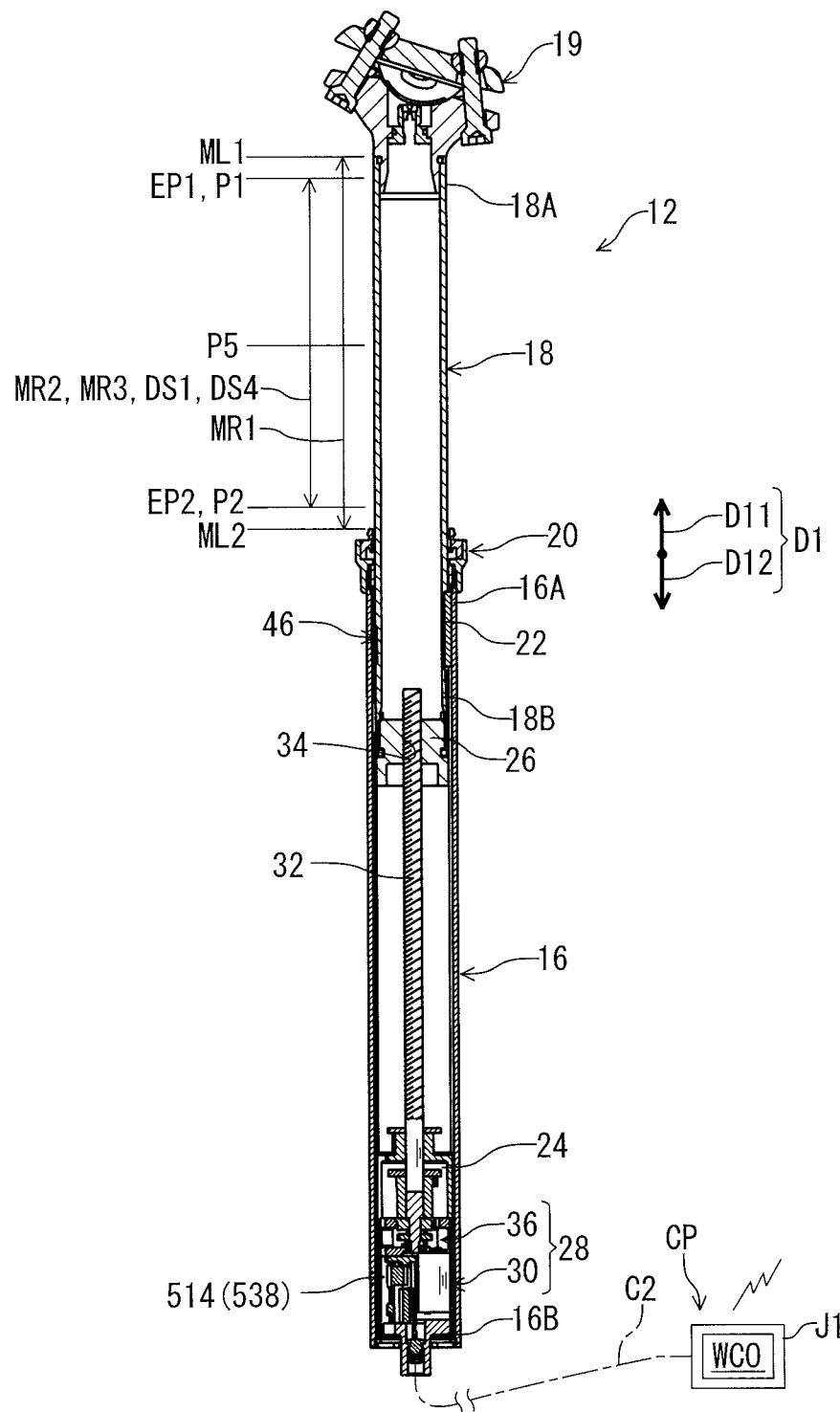
FIG. 35 is a cross-sectional view of a telescopic apparatus of a telescopic apparatus operating system in accordance with a fifth embodiment.
Figure 36:
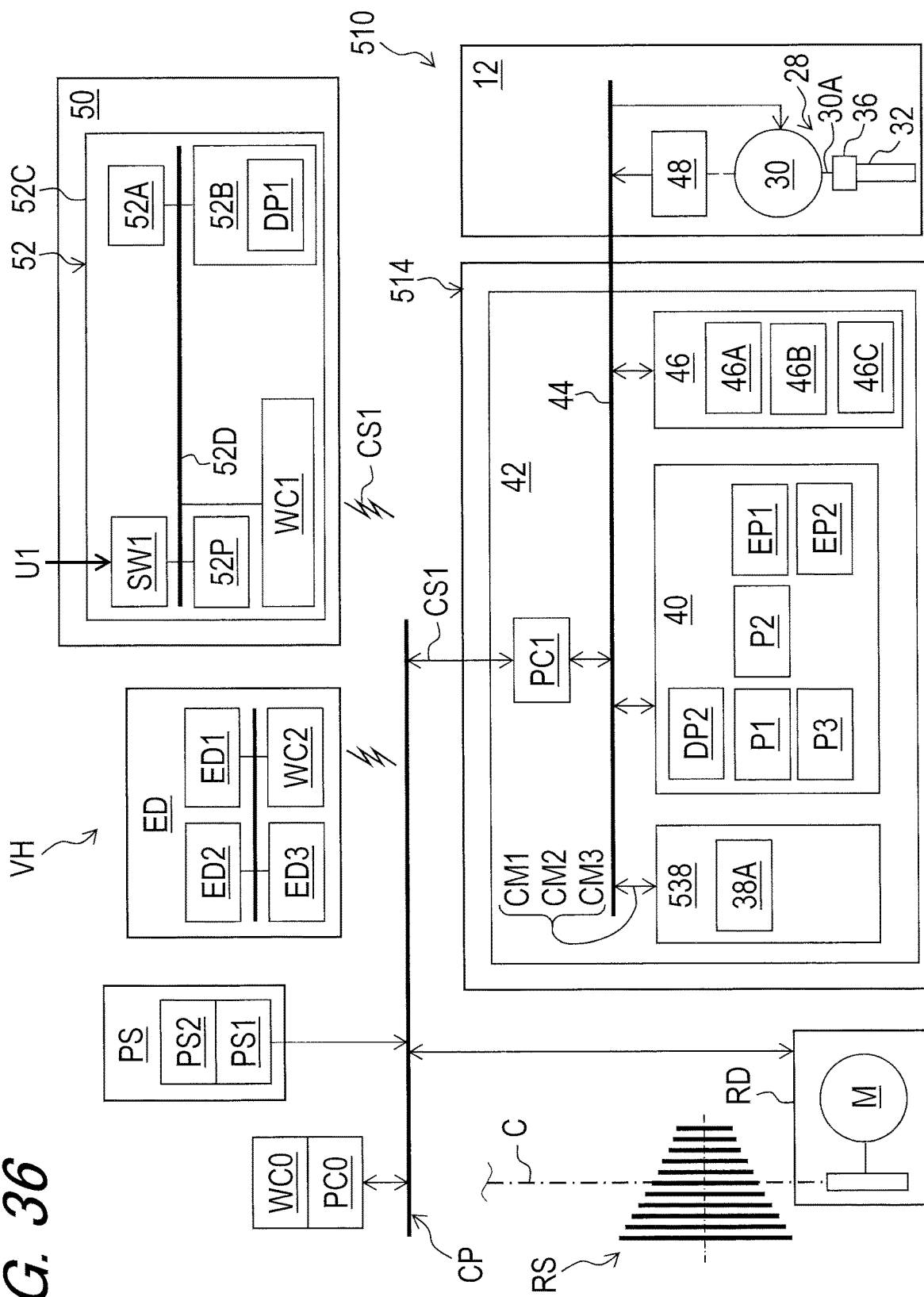
FIG. 36 is a block diagram of the telescopic apparatus operating system illustrated in FIG. 35.

As seen in FIGS. 35 and 36, the telescopic apparatus operating system 510 for the human-powered vehicle VH comprises a telescopic apparatus controller 514 and the telescopic apparatus 12. The telescopic apparatus controller 514 is configured to control the telescopic apparatus 12. The telescopic apparatus controller 514 for the human-powered vehicle VH comprises a controller 538. The controller 538 has substantially the same structure as the structure of the controller 38 of the first embodiment. The controller 538 is configured to control the telescopic apparatus 12 in one of the plurality of operating modes. The plurality of operating modes includes the first operating mode and the second operating mode. The plurality of operating modes includes the first operating mode in which the reference portion 18A of the telescopic apparatus 12 is selectively arranged to one of the first predetermined position P1 and the second predetermined position P2. The plurality of operating modes includes the second operating mode in which the reference portion 18A of the telescopic apparatus 12 is arbitrarily arranged between the first end position EP1 and the second end position EP2.

In this embodiment, the second electrical switch SW2 is omitted from the operating device 50. In this embodiment, the controller 538 is configured to determine the direction in which the reference portion 18A should be moved. The controller 538 is configured to compare the current position sensed by the position sensor 46 with the first predetermined position P1, the second predetermined position P2, and an intermediate position P5 in the first operating mode. As seen in FIG. 35, the intermediate position P5 is provided at the center between the first predetermined position P1 and the second predetermined position P2 in the telescopic direction D1.

Figure 37:
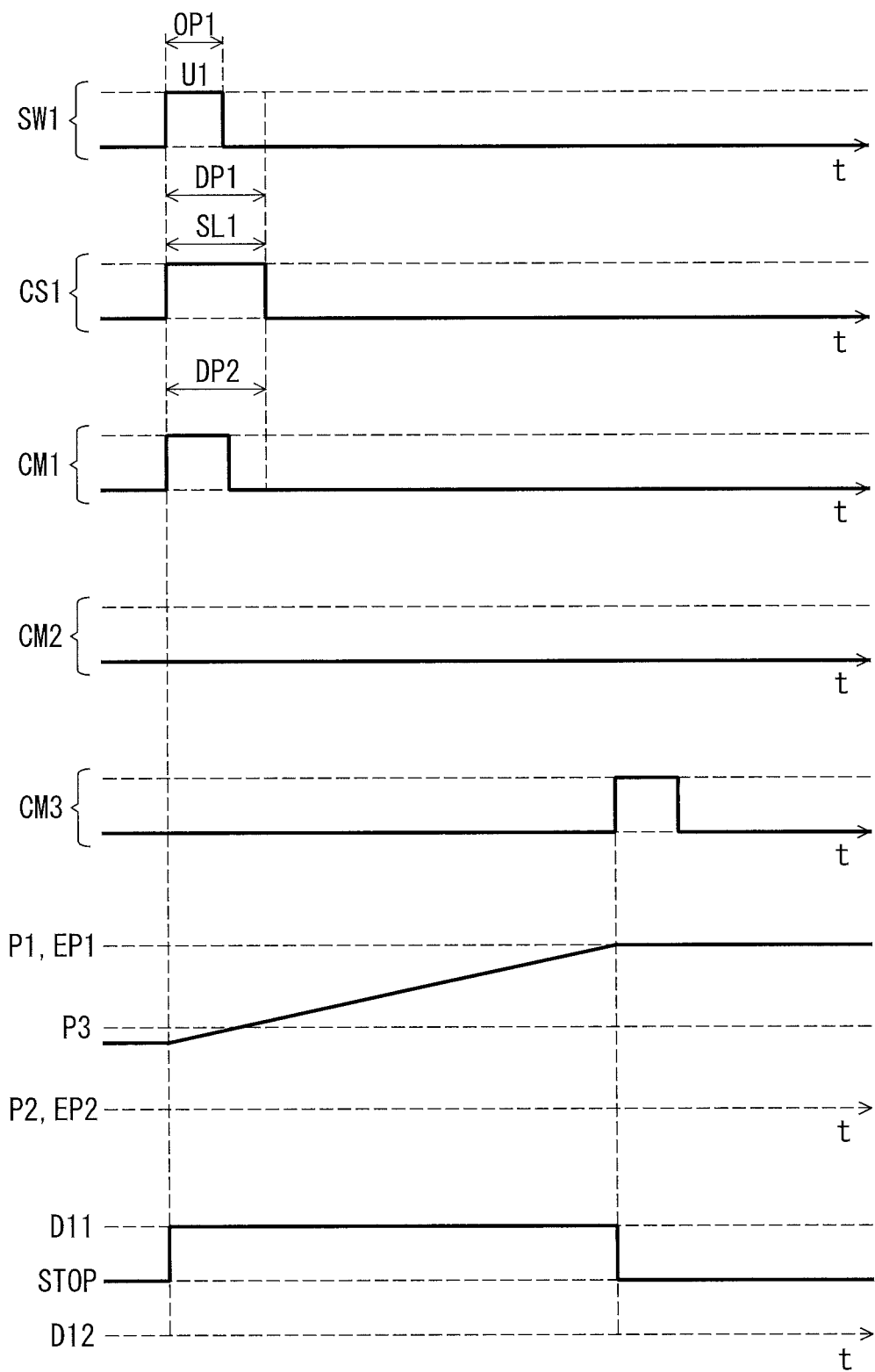
FIGS. 37 and 38 are timing charts of the telescopic apparatus operating system illustrated in FIG. 36 (first operating mode).
Figure 38:
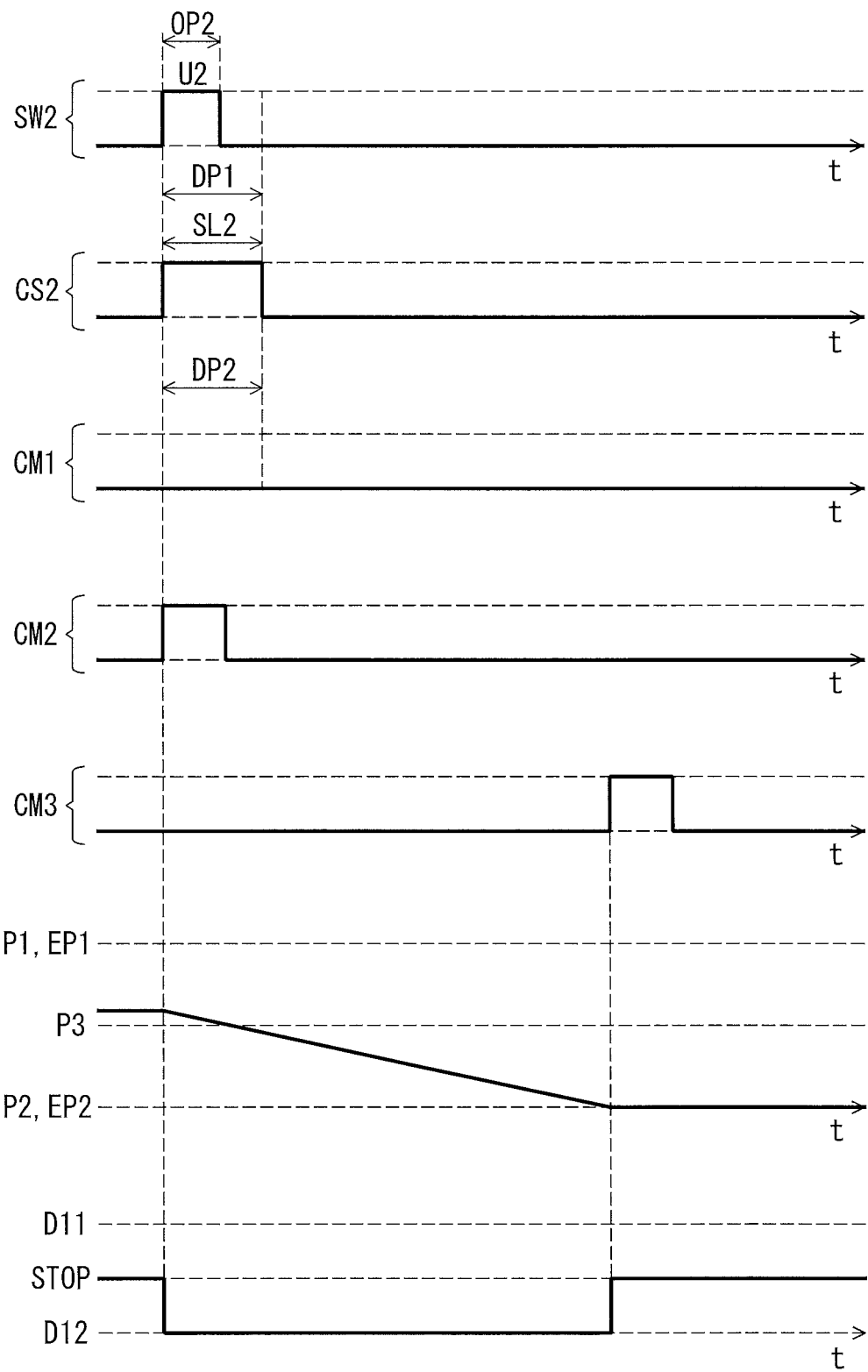

As seen in FIG. 37, the controller 538 is configured to generate the first start command CM1 in response to the first control signal CS1 if the controller 538 concludes that the current position is closer to the second predetermined position P2 than the intermediate position P5. As seen in FIG. 38, the controller 538 is configured to generate the second start command CM2 in response to the first control signal CS1 if the controller 538 concludes that the current position is closer to the first predetermined position P1 than the intermediate position P5. The controller 538 is configured to generate the second start command CM2 in response to the first control signal CS1 if the controller 538 concludes that the current position is the intermediate position P5. However, the controller 538 can be configured to generate the first start command CM1 in response to the first control signal CS1 if the controller 538 concludes that the current position is the intermediate position P5.

As seen in FIGS. 37 and 38, the controller 538 is configured to generate the stop command CM3 when the controller 538 concludes that the reference portion 18A reaches one of the first predetermined position P1 and the second predetermined position P2. The actuator driver 48 is configured to stop the electric motor 30 in response to the stop command CM3. The second tube 18 is stopped at one of the first predetermined position P1 and the second predetermined position P2.

Sixth Embodiment

A telescopic apparatus operating system 610 in accordance with a sixth embodiment will be described below referring to FIGS. 39 to 47. The telescopic apparatus operating system 610 has the same structure and/or configuration as that of the telescopic apparatus operating system 10 except for the telescopic apparatus controller 14. Thus, elements having substantially the same function as those in the above embodiments will be numbered the same here, and will not be described and/or illustrated again in detail here for the sake of brevity.

Figure 39:
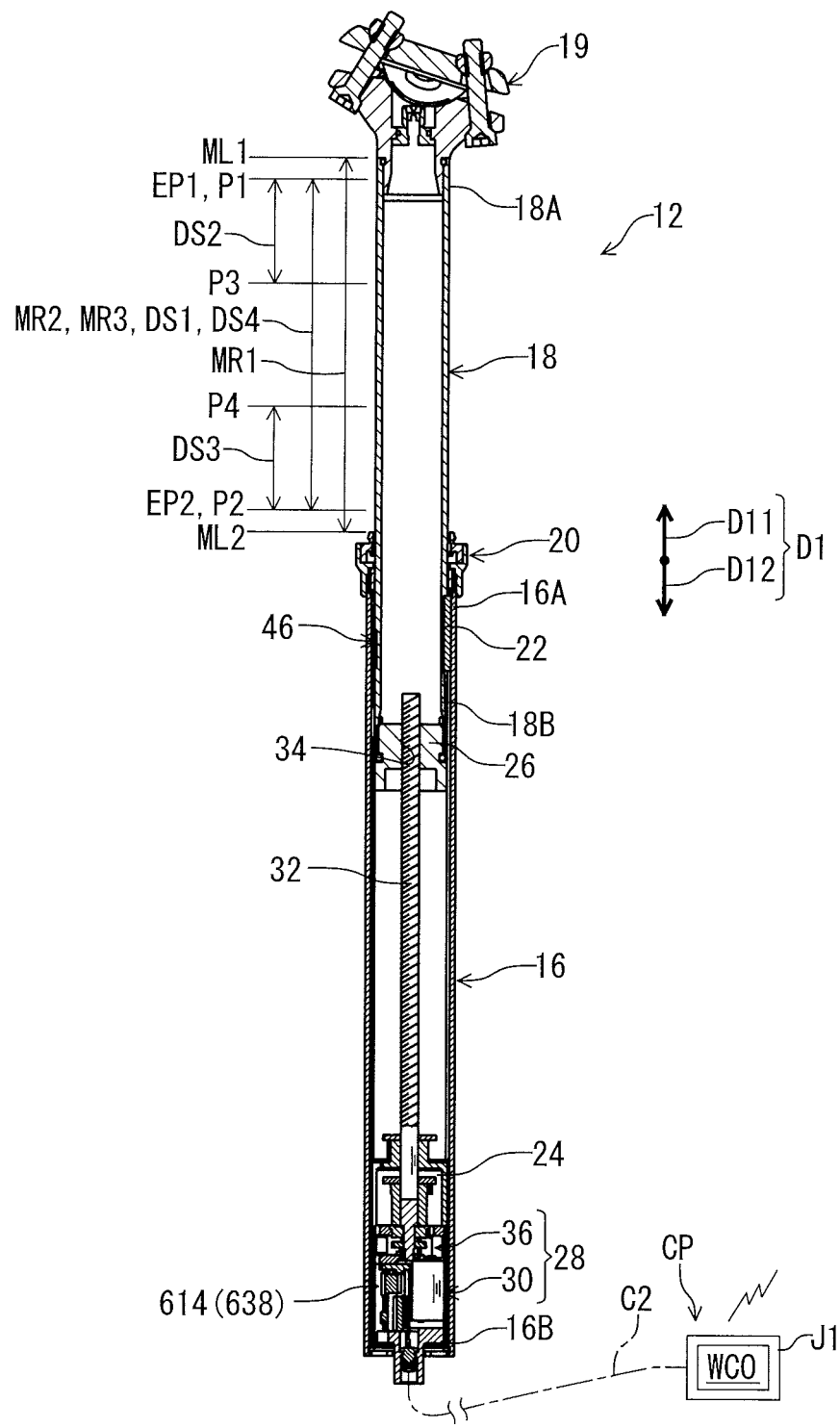
FIG. 39 is a cross-sectional view of a telescopic apparatus of a telescopic apparatus operating system in accordance with a sixth embodiment.
Figure 40:
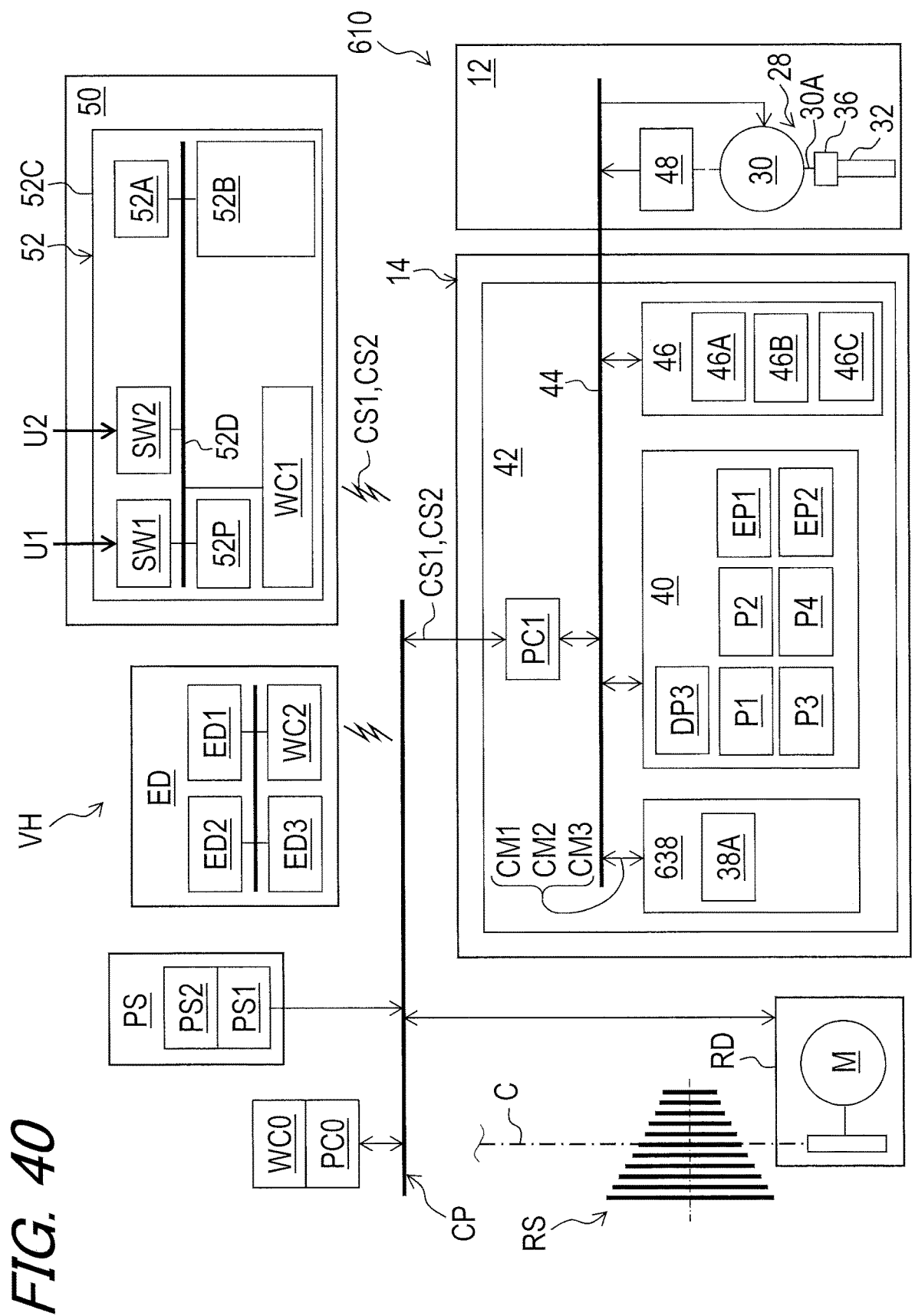
FIG. 40 is a block diagram of the telescopic apparatus operating system illustrated in FIG. 39.

As seen in FIGS. 39 and 40, the telescopic apparatus operating system 610 for the human-powered vehicle VH comprises a telescopic apparatus controller 614 and the telescopic apparatus 12. The telescopic apparatus controller 614 is configured to control the telescopic apparatus 12. The telescopic apparatus controller 614 for the human-powered vehicle VH comprises a controller 638. The controller 638 has substantially the same structure as the structure of the controller 38 of the first embodiment. The controller 638 is configured to control the telescopic apparatus 12 in one of the plurality of operating modes. The plurality of operating modes includes the first operating mode and the second operating mode. The plurality of operating modes includes the first operating mode in which the reference portion 18A of the telescopic apparatus 12 is selectively arranged to one of the first predetermined position P1 and the second predetermined position P2. The plurality of operating modes includes the second operating mode in which the reference portion 18A of the telescopic apparatus 12 is arbitrarily arranged between the first end position EP1 and the second end position EP2.

Figure 41:
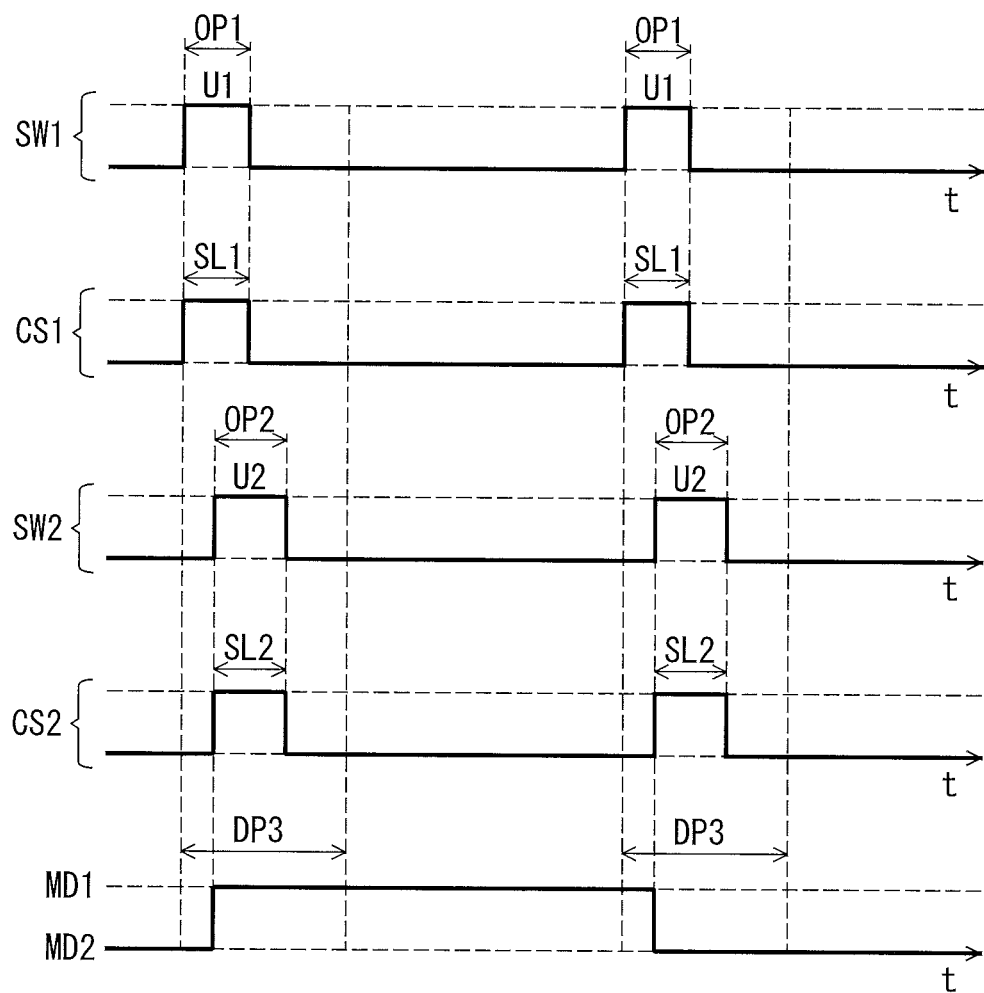
FIG. 41 is a timing chart of the telescopic apparatus operating system illustrated in FIG. 40 (mode-change).

As seen in FIG. 41, the controller 638 is configured to change an operating mode from one of the first operating mode MD1 and the second operating mode MD2 to the other of the first operating mode MD1 and the second operating mode MD2 in response to a mode-change input. In this embodiment, the mode-change input includes that the first control signal CS1 and the second control signal CS2 are concurrently input to the controller 638 within a concurrent-input determination time DP3 stored in the memory 40 (see e.g., FIG. 40).

The signal controller 52 of the operating device 50 is configured to generate the first control signal CS1 having the signal length SL1 which is proportional to the length of the first operation period OP1 of the first user input U1 in both the first operating mode MD1 and the second operating mode MD2.

After the controller 638 detects one of the first control signal CS1 and the second control signal CS2, the controller 638 is configured to determine if the controller 638 detects the other of the first control signal CS1 and the second control signal CS2 within the concurrent-input determination time DP3. The controller 638 concludes that the controller 638 receives the mode-change input including the concurrent input of the first control signal CS1 and the second control signal CS2. Thus, the controller 638 changes the operating mode from one of the first operating mode MD1 and the second operating mode MD2 to the other of the first operating mode MD1 and the second operating mode MD2 in response to the mode-change input.

Figure 42:
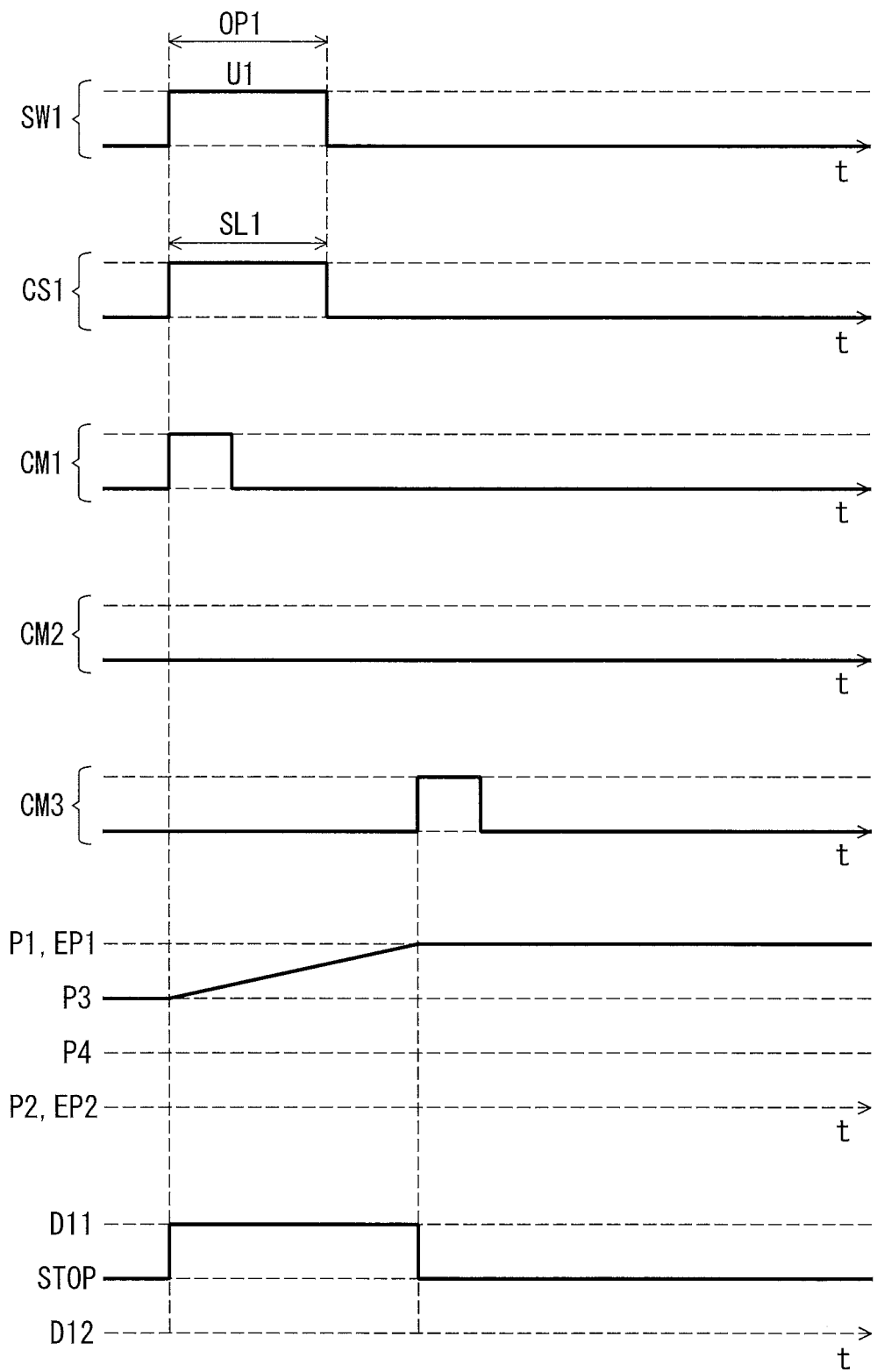
FIGS. 42 and 43 are timing charts of the telescopic apparatus operating system illustrated in FIG. 40 (first operating mode).
Figure 43:
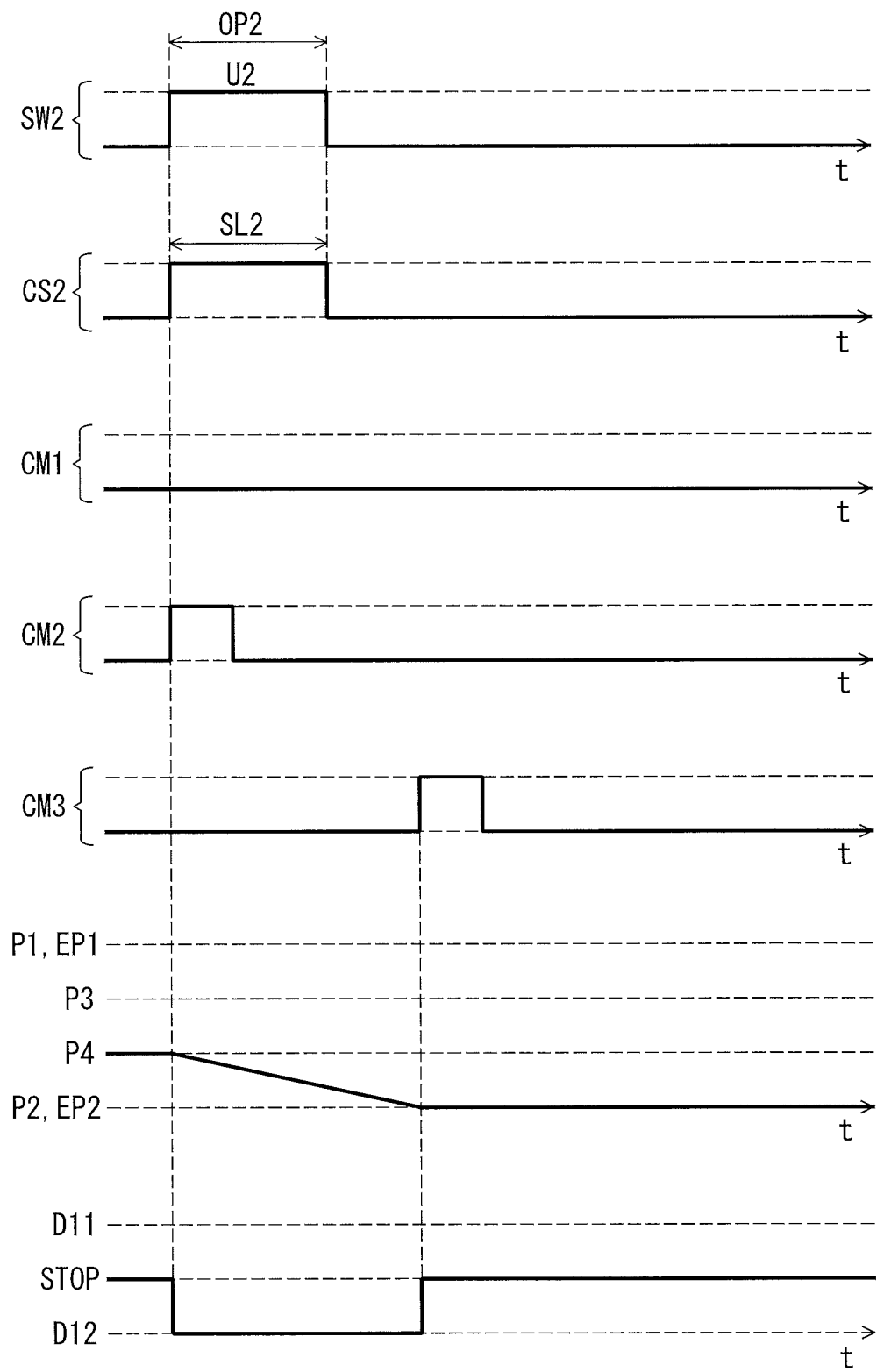
Figure 44:
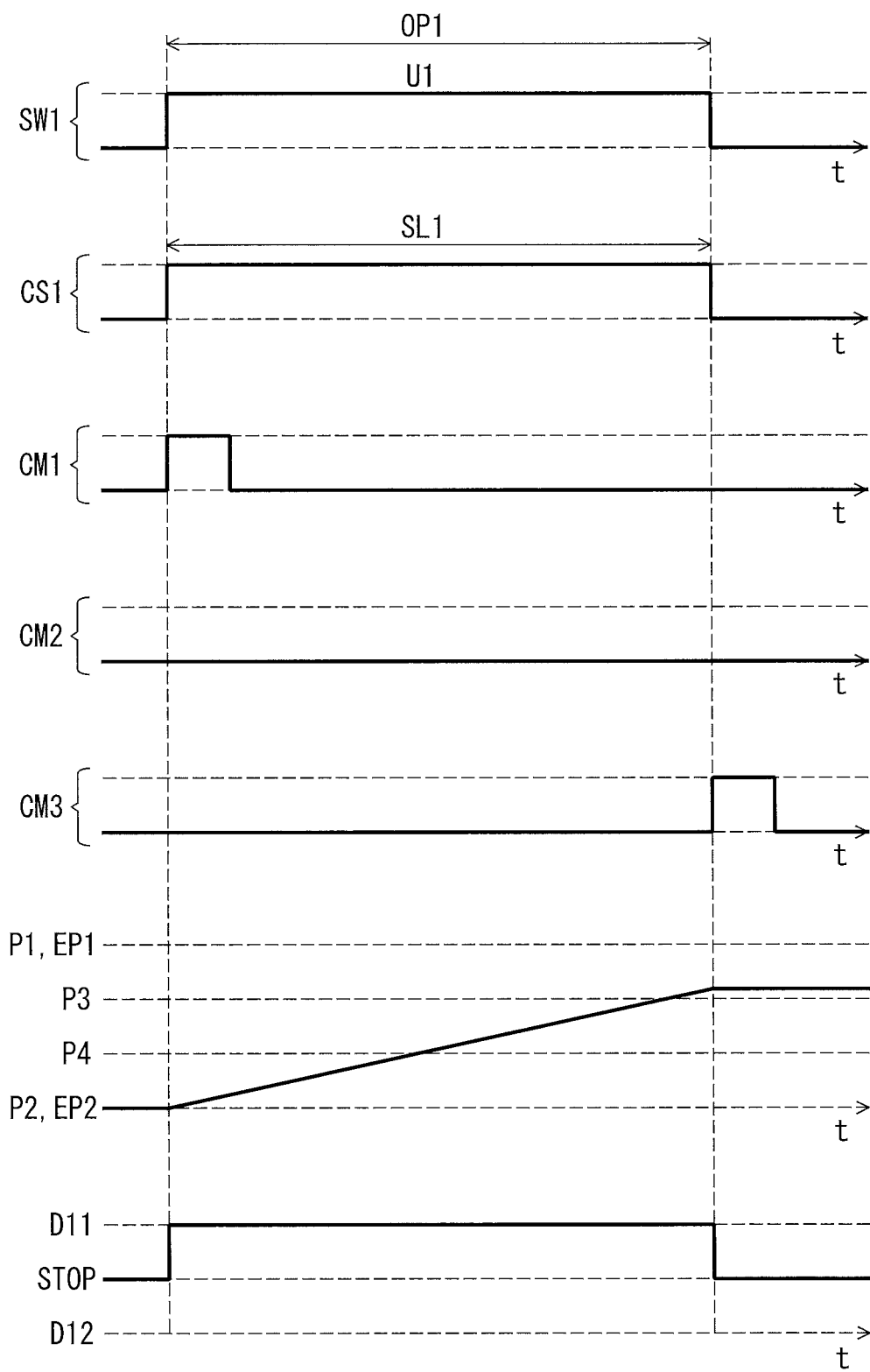
FIGS. 44 to 47 are timing charts of the telescopic apparatus operating system illustrated in FIG. 40 (second operating mode).
Figure 45:
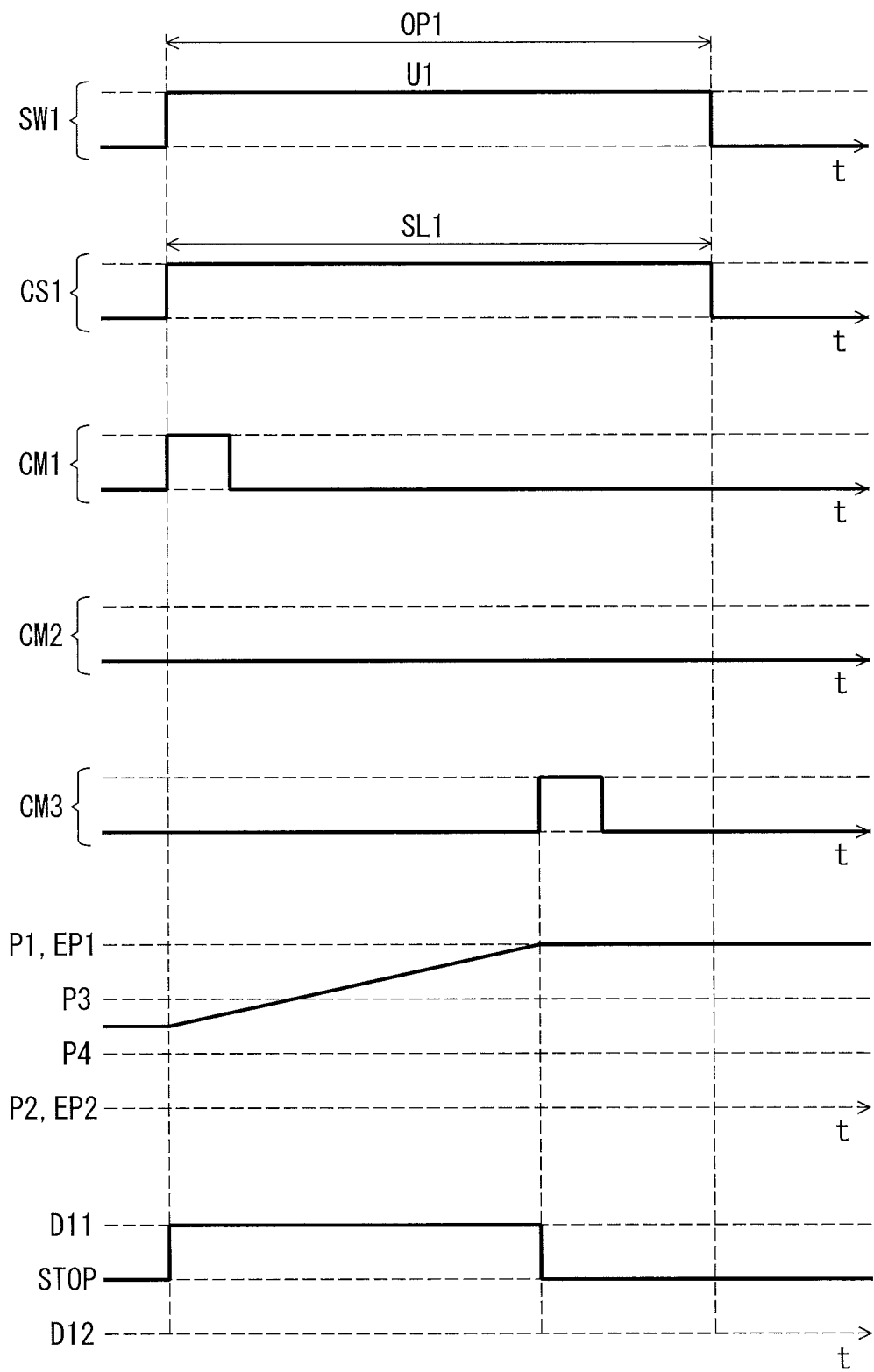
Figure 46:
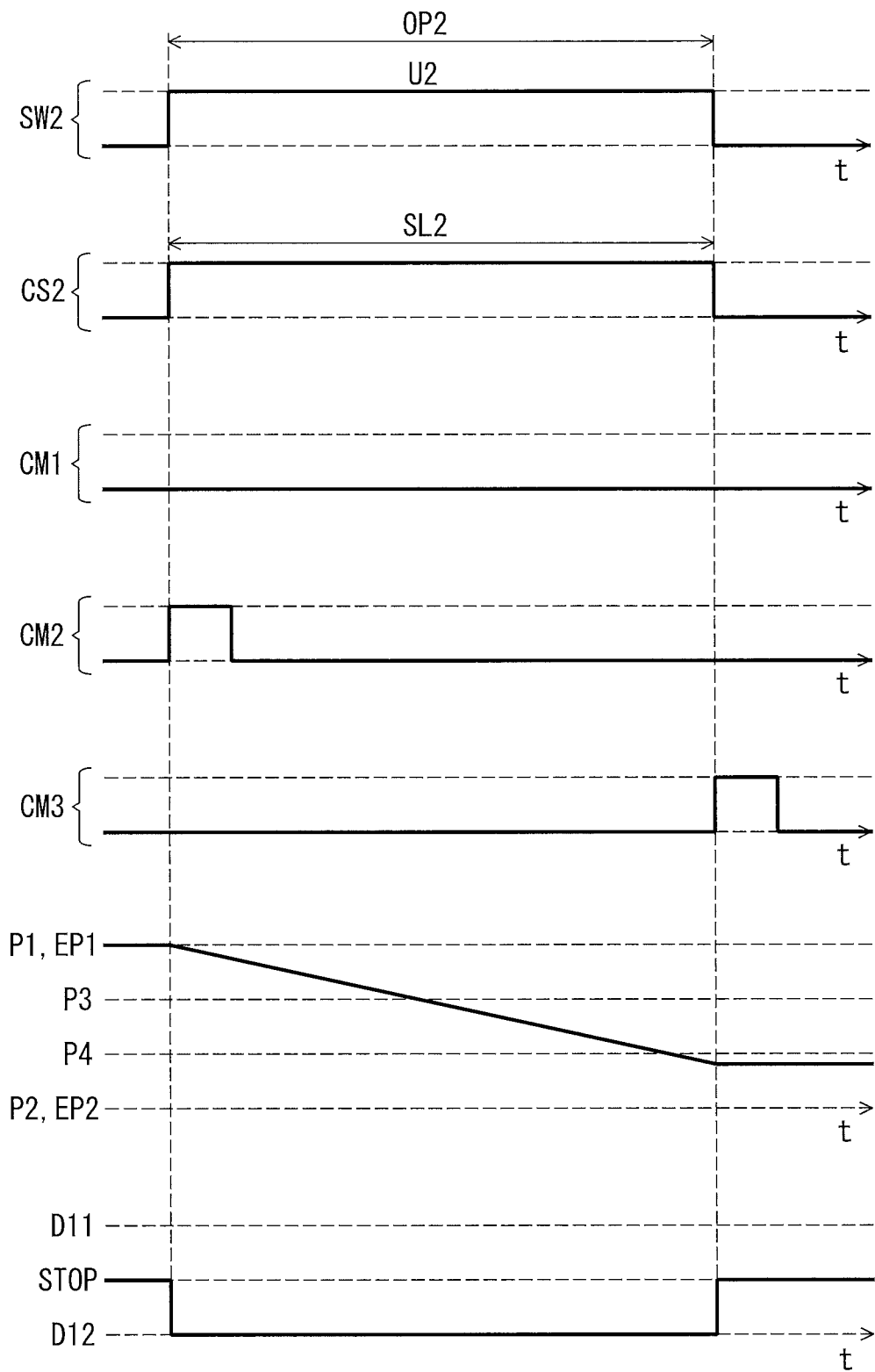
Figure 47:
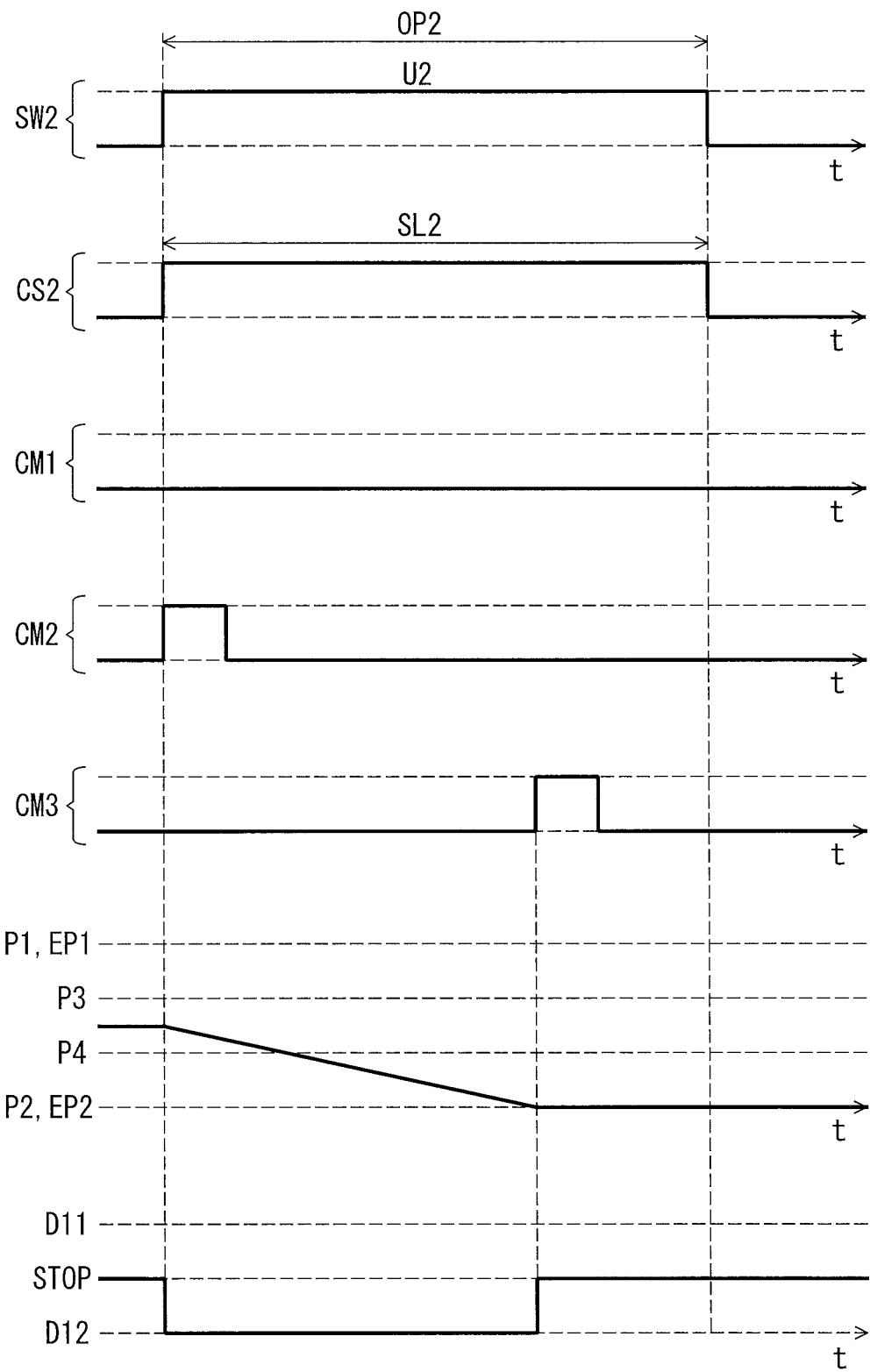

As seen in FIGS. 42 and 43, as with the controller 38 of the first embodiment, the controller 638 is configured to selectively arrange the reference portion 18A of the telescopic apparatus 12 to one of the first predetermined position P1, the second predetermined position P2, and the plurality of third predetermined positions P3 and P4 in the first operating mode MD1.

As seen in FIG. 42, after changing the operating mode from the second operating mode MD2 to the first operating mode MD1, the controller 638 is configured to generate the first start command CM1 when the controller 638 detects the first control signal CS1 in the first operating mode MD1. Thus, the second tube 18 is moved relative to the first tube 16 from the starting position in the first telescopic direction D11. After generating the first start command CM1, the controller 638 is configured to compare the current position sensed by the position sensor 46 with the first predetermined position P1, the second predetermined position P2, the third predetermined position P3, and the third predetermined position P4.

The controller 638 is configured to generate the stop command CM3 when the controller 638 concludes that the reference portion 18A reaches one of the first predetermined position P1, the second predetermined position P2, the third predetermined position P3, and the third predetermined position P4. The actuator driver 48 is configured to stop the electric motor 30 in response to the stop command CM3. The second tube 18 is stopped at one of the first predetermined position P1, the second predetermined position P2, the third predetermined position P3, and the third predetermined position P4 which is adjacent to the starting position.

As seen in FIG. 43, after changing the operating mode from the second operating mode MD2 to the first operating mode MD1, the controller 638 is configured to generate the second start command CM2 when the controller 638 detects the second control signal CS2 in the second operating mode MD2. Thus, the second tube 18 is moved relative to the first tube 16 from the starting position in the second telescopic direction D12. After generating the second start command CM2, the controller 638 is configured to compare the current position sensed by the position sensor 46 with the first predetermined position P1, the second predetermined position P2, the third predetermined position P3, and the third predetermined position P4.

The controller 638 is configured to generate the stop command CM3 when the controller 638 concludes that the reference portion 18A reaches one of the first predetermined position P1, the second predetermined position P2, the third predetermined position P3, and the third predetermined position P4. The actuator driver 48 is configured to stop the electric motor 30 in response to the stop command CM3. The second tube 18 is stopped at one of the first predetermined position P1, the second predetermined position P2, the third predetermined position P3, and the third predetermined position P4 which is adjacent to the starting position.

As seen in FIGS. 44 to 47, as with the controller 38 of the first embodiment, the controller 638 is configured to selectively arrange the reference portion 18A of the telescopic apparatus 12 according to comparison between the current position of the reference portion 18A and at least one of the first end position EP1 and the second end position EP2 in the second operating mode MD2. The operations of the second operating mode MD2 illustrated in FIGS. 44 to 47 are substantially the same as the operations of the second operating mode MD2 illustrated in FIGS. 11 to 14 except for the determination based on the determination time DP2. Thus, they will not be described in detail here for the sake of brevity.

The configuration of the controller 638 can apply to each of the controllers 238, 338, and 438 of the second to fourth embodiments. Furthermore, the operating device 50 can include a mode-change switch to generate the mode-change input instead of the use of the concurrent input of the first control signal CS1 and the second control signal CS2. For example, such mode-change switch can apply to the fifth embodiment.

Seventh Embodiment

A telescopic apparatus operating system 710 in accordance with a seventh embodiment will be described below referring to FIGS. 48 to 55. The telescopic apparatus operating system 710 has the same structure and/or configuration as that of the telescopic apparatus operating system 10 except for the telescopic apparatus 12 and the telescopic apparatus controller 14. Thus, elements having substantially the same function as those in the above embodiments will be numbered the same here, and will not be described and/or illustrated again in detail here for the sake of brevity.

Figure 48:
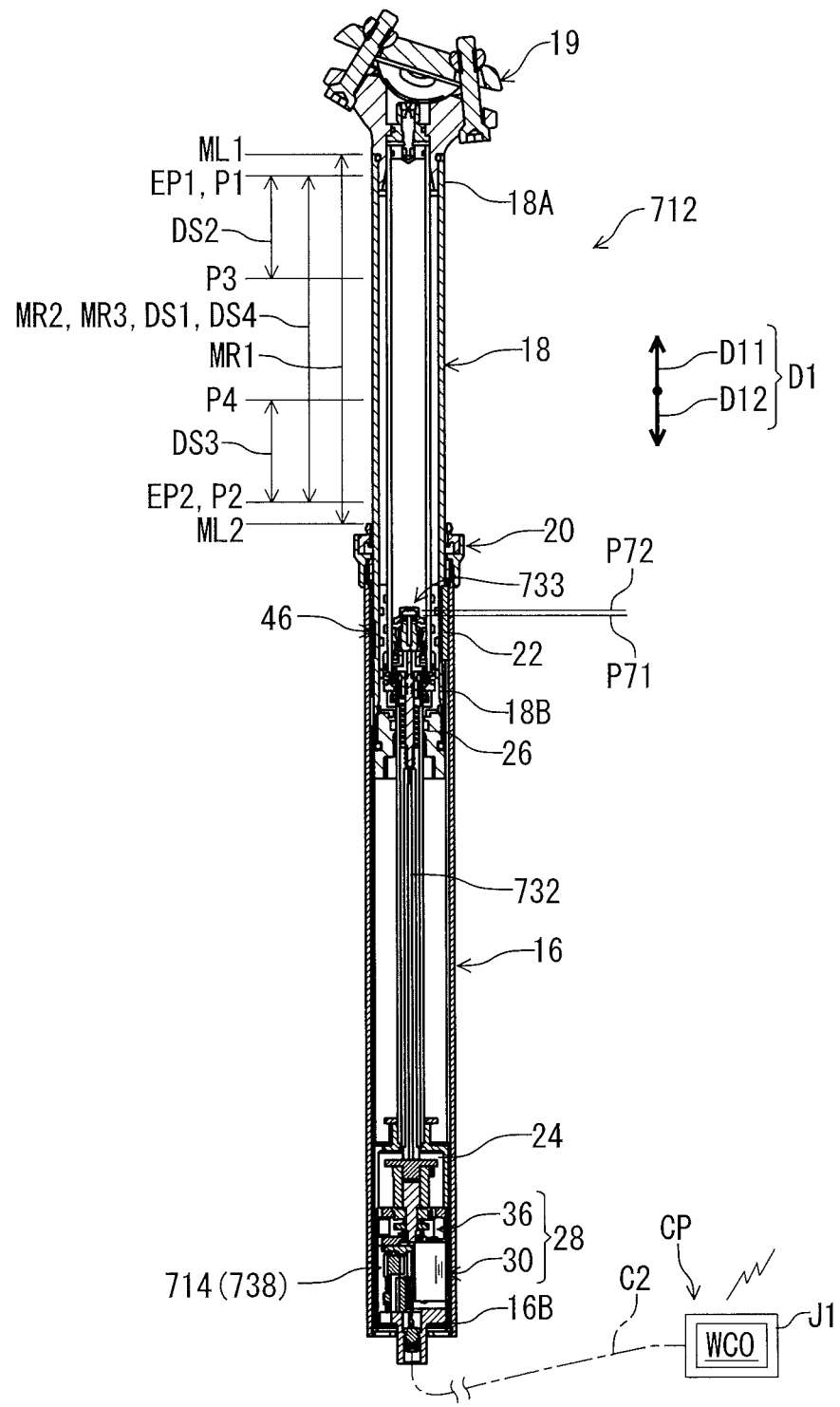
FIG. 48 is a cross-sectional view of a telescopic apparatus of a telescopic apparatus operating system in accordance with a seventh embodiment.

As seen in FIG. 48, the telescopic apparatus operating system 710 for the human-powered vehicle VH comprises a telescopic apparatus controller 714 and a telescopic apparatus 712. The telescopic apparatus 712 has substantially the same structure as the structure of the telescopic apparatus 12 of the first embodiment. The telescopic apparatus 712 includes a hydraulic structure instead of the screw rod 32. In this embodiment, the telescopic apparatus 712 includes a control rod 732 and a valve structure 733. The control rod 732 is movable relative to the first tube 16 between a closed position P71 and an open position P72 in the telescopic direction D1. A passageway of the valve structure 733 is closed in a closed state where the control rod 732 is in the closed position P71. The passageway of the valve structure 733 is open in an open state where the control rod 732 is in the open position P72. The second tube 18 is moved relative to the first tube 16 in the first telescopic direction D11 by compressed fluid (e.g., compressed air) when the rider's weight is released from the saddle VH2 in the open state. The second tube 18 is moved relative to the first tube 16 in the second telescopic direction D12 against the compressed fluid when the rider's weight applies to the saddle VH2 in the open state. Namely, the direction in which the second tube 18 is moved relative to the first tube 16 depends on releasing or applying of the rider's weight in the telescopic apparatus 712. The second tube 18 is fixedly positioned relative to the first tube 16 in the telescopic direction D1 in the closed state of the control rod 732. The second tube 18 is movable relative to the first tube 16 in the telescopic direction D1 in the open state of the control rod 732. The hydraulic structure of the telescopic apparatus 712 includes structures which have been known in the hydraulic field. Thus, they will not be described in detail here for the sake of brevity.

Figure 49:
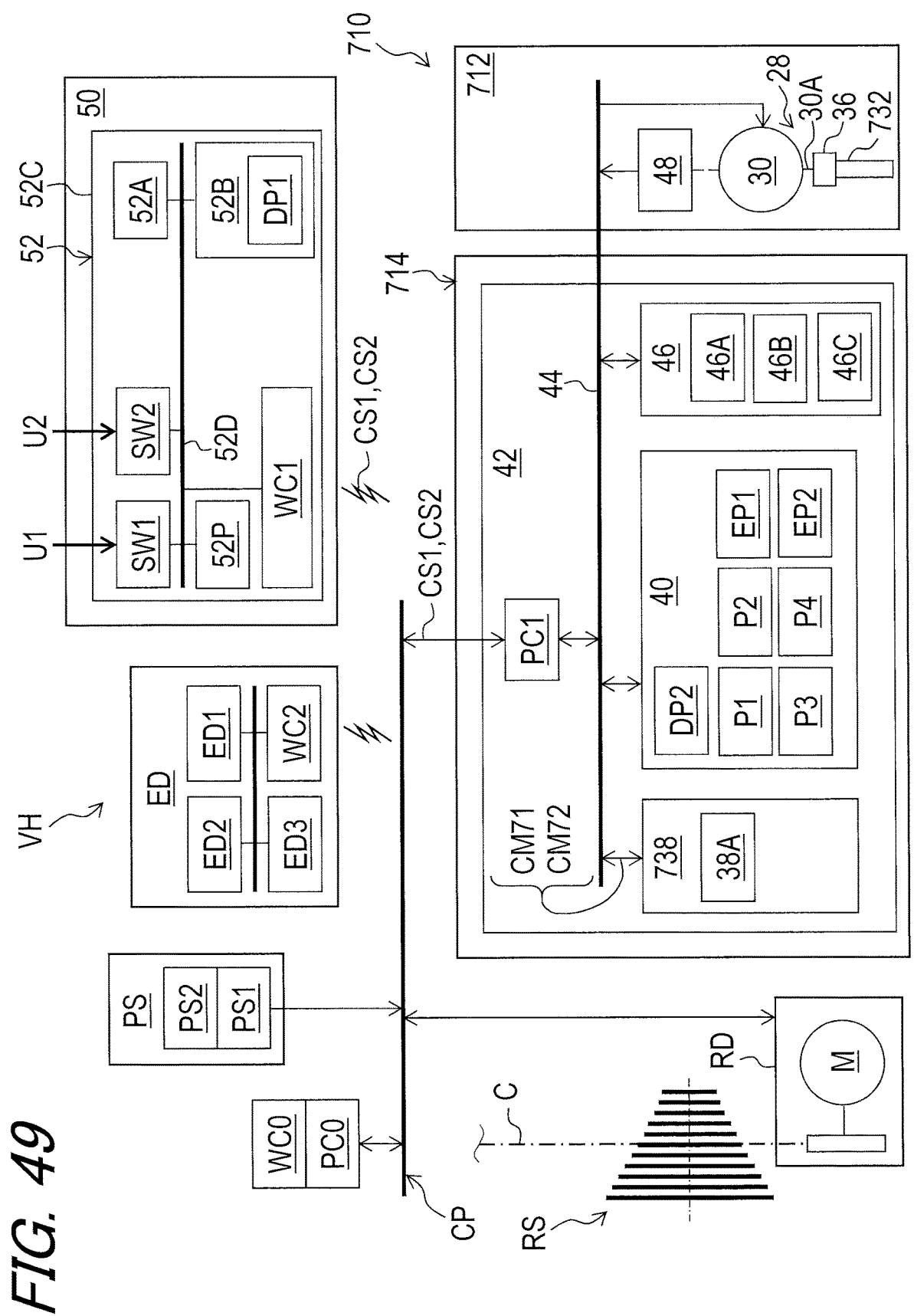
FIG. 49 is a block diagram of the telescopic apparatus operating system illustrated in FIG. 48.

As seen in FIG. 49, the telescopic apparatus controller 714 is configured to control the telescopic apparatus 12. The telescopic apparatus controller 714 for the human-powered vehicle VH comprises a controller 738. The controller 738 has substantially the same structure as the structure of the controller 38 of the first embodiment.

As seen in FIGS. 50 to 55, the controller 738 is configured to control the telescopic apparatus 12 in one of the plurality of operating modes. The plurality of operating modes includes the first operating mode and the second operating mode. The plurality of operating modes includes the first operating mode in which the reference portion 18A of the telescopic apparatus 12 is selectively arranged to one of the first predetermined position P1 and the second predetermined position P2. The plurality of operating modes includes the second operating mode in which the reference portion 18A of the telescopic apparatus 12 is arbitrarily arranged between the first end position EP1 and the second end position EP2.

The controller 738 is configured to selectively arrange the reference portion 18A of the telescopic apparatus 12 to one of the first predetermined position P1, the second predetermined position P2, and the plurality of third predetermined positions P3 and P4 in the first operating mode. Each of the plurality of third predetermined positions P3 and P4 is provided between the first predetermined position P1 and the second predetermined position P2 and different from the first predetermined position P1 and the second predetermined position P2.

Figure 50:
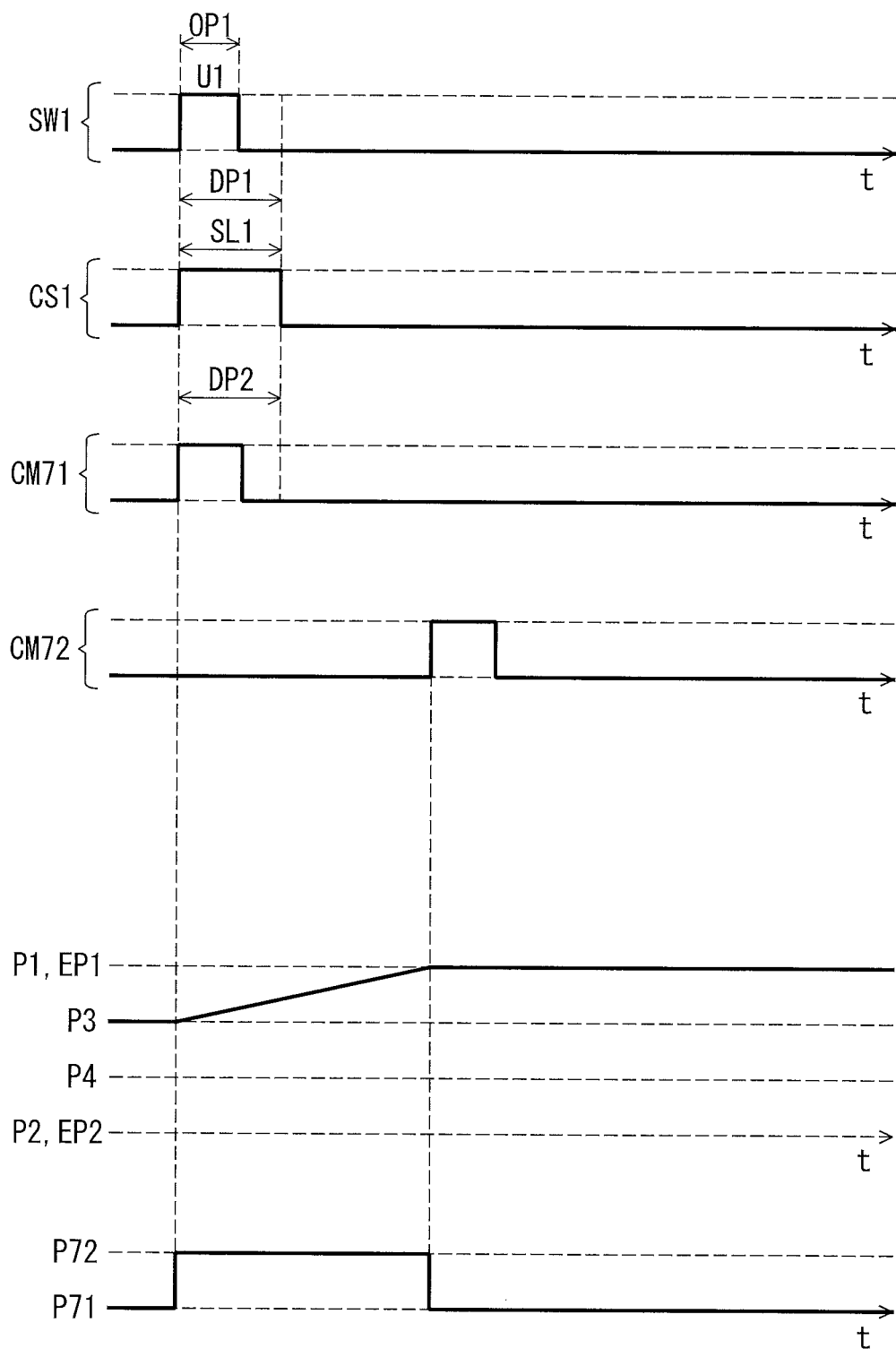
FIGS. 50 and 51 are timing charts of the telescopic apparatus operating system illustrated in FIG. 48 (first operating mode).
Figure 52:
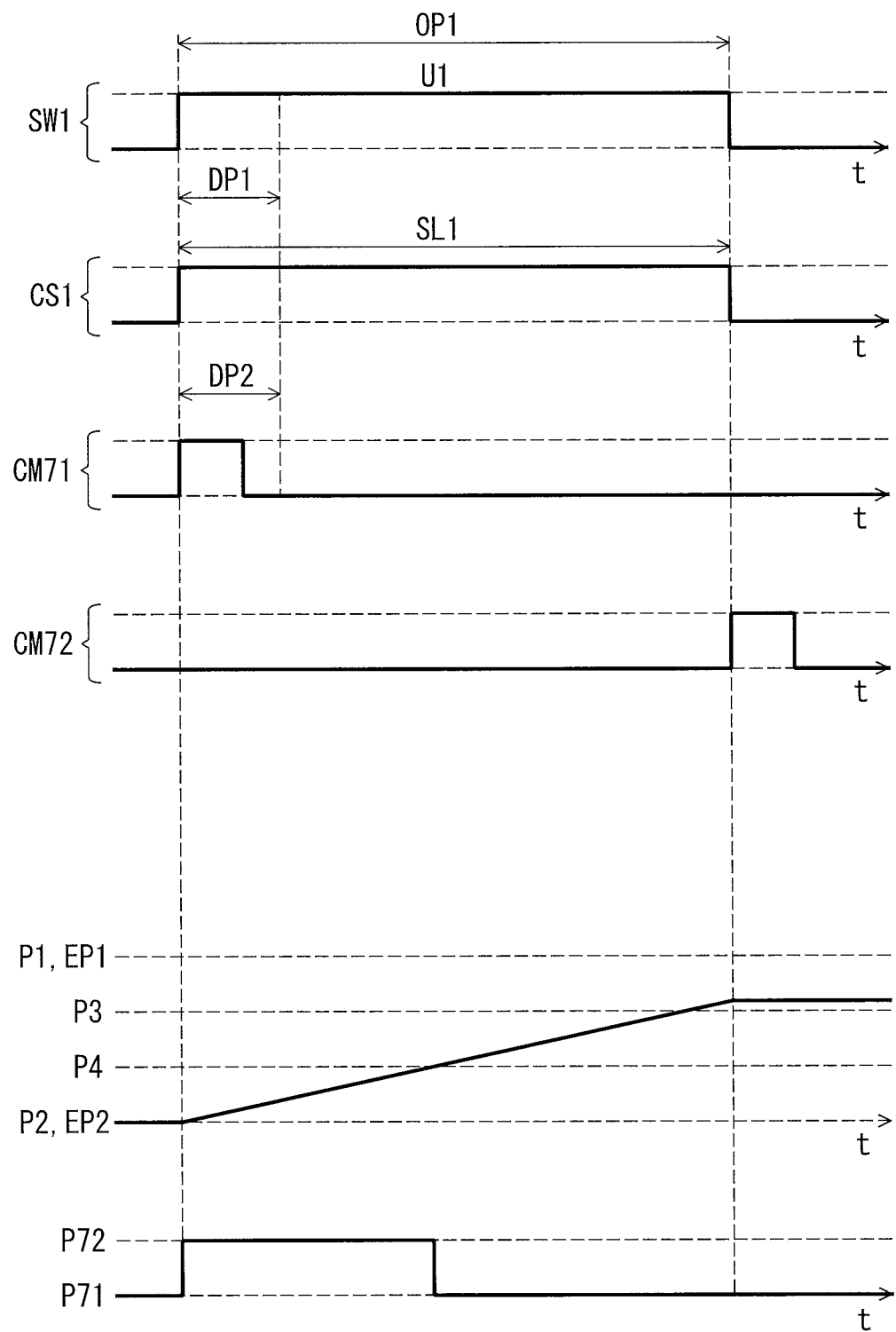
FIGS. 52 to 55 are timing charts of the telescopic apparatus operating system illustrated in FIG. 48 (second operating mode).
Figure 53:
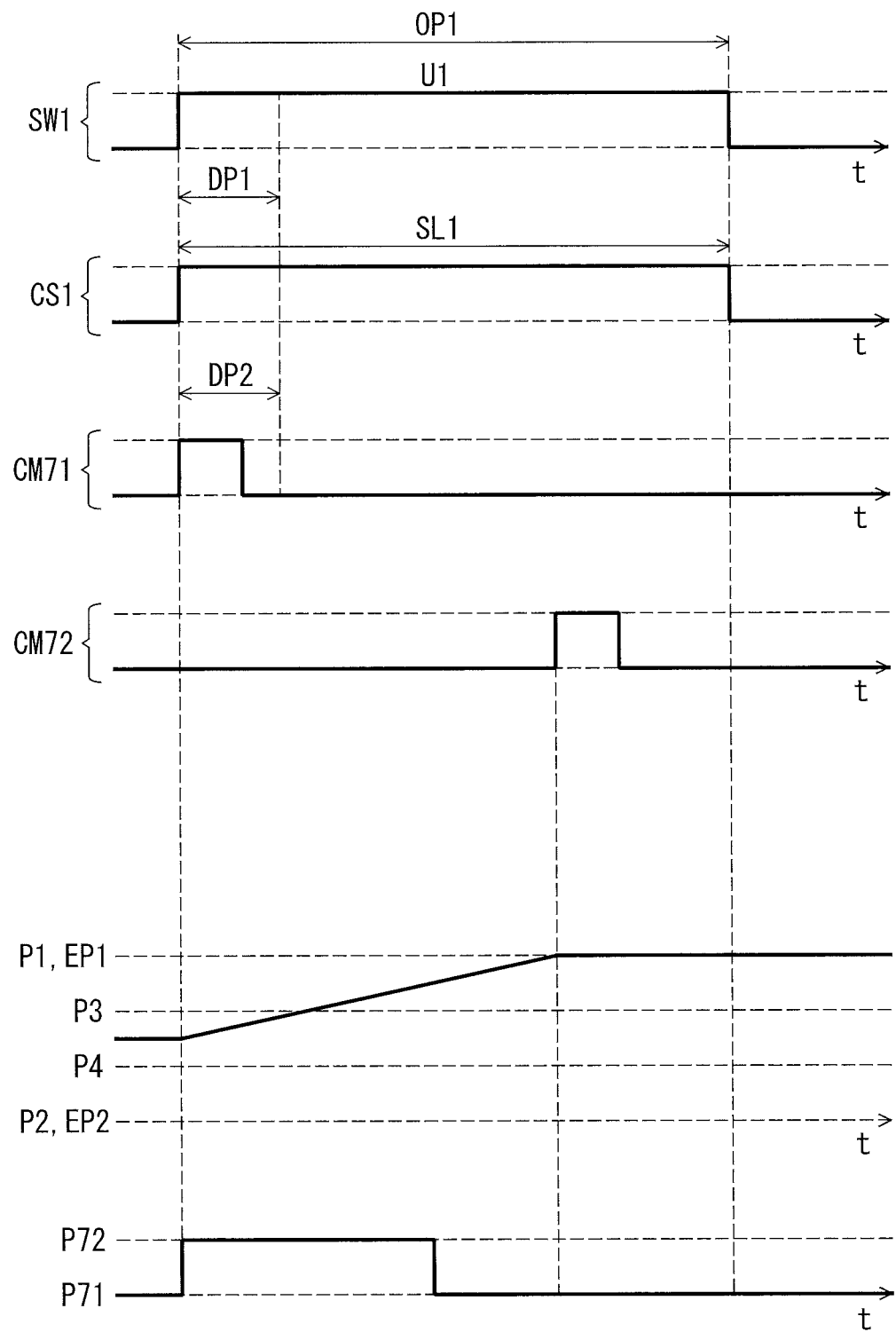

As seen in FIGS. 50, 52, and 53, the controller 738 is configured to generate an open command CM71 when the controller 738 detects the first control signal CS1. The actuator driver 48 is configured to control the electric motor 30 to move the control rod 732 from the closed position P71 to the open position P72 in response to the open command CM71. In the open state where the control rod 732 is in the open position P72, the second tube 18 is moved relative to the first tube 16 in the first telescopic direction D11 or the second telescopic direction D12 by applying or releasing the rider's weight to or from the saddle VH2.

After generating the open command CM71, the controller 738 starts to measure a length of time and compares the measured length of time with the determination time DP2 stored in the memory 40 (FIG. 49). The controller 738 concludes that the operating mode of the controller 738 is the first operating mode if the controller 738 does not detect the first control signal CS1 when the measured length of time reaches the determination time DP2. The controller 738 concludes that the operating mode of the controller 738 is the second operating mode if the controller 738 still detects the first control signal CS1 when the measured length of time reaches the determination time DP2.

As seen in FIG. 50, the controller 738 is configured to selectively arrange the reference portion 18A of the telescopic apparatus 12 according to comparison between the current position of the reference portion 18A and at least one of the first predetermined position P1 and the second predetermined position P2 in the first operating mode. In this embodiment, after concluding that the operating mode of the controller 738 is the first operating mode, the controller 738 is configured to compare the current position sensed by the position sensor 46 with the predetermined position which is adjacent to the current position in the first telescopic direction D11 among the first to third predetermined positions P1 to P4.

The controller 738 is configured to generate a close command CM72 when the controller 738 concludes that the reference portion 18A reaches, by releasing the rider's weight, the predetermined position which is adjacent to the starting position in the first telescopic direction D11. The actuator driver 48 is configured to control the electric motor 30 to move the control rod 732 from the open position P72 to the closed position P71 in response to the close command CM72. Thus, the second tube 18 is stopped at one of the first predetermined position P1, the second predetermined position P2, the third predetermined position P3, and the third predetermined position P4 which is adjacent to the starting position in the first telescopic direction D11.

As seen in FIGS. 52 and 53, the controller 738 is configured to selectively arrange the reference portion 18A of the telescopic apparatus 12 according to comparison between the current position of the reference portion 18A and at least one of the first end position EP1 and the second end position EP2 in the second operating mode.

As seen in FIG. 52, after concluding that the operating mode of the controller 738 is the second operating mode, the controller 738 is configured to generate the close command CM72 when the controller 738 detects the termination of the first control signal CS1 before the reference portion 18A reaches one of the first end position EP1 and the second end position EP2. The actuator driver 48 is configured to control the electric motor 30 to move the control rod 732 from the open position P72 to the closed position P71 in response to the close command CM72. The second tube 18 is stopped when the first control signal CS1 is terminated. Thus, it is possible to arbitrarily arrange the reference portion 18A of the telescopic apparatus 12 before the reference portion 18A reaches one of the first end position EP1 and the second end position EP2.

As seen in FIG. 53, the controller 738 is configured to generate the close command CM72 when the reference portion 18A reaches one of the first end position EP1 and the second end position EP2 before the controller 738 detects the termination of the first control signal CS1. The actuator driver 48 is configured to control the electric motor 30 to move the control rod 732 from the open position P72 to the closed position P71 in response to the close command CM72. Thus, the second tube 18 is stopped at one of the first end position EP1 and the second end position EP2 before the controller 738 detects the termination of the first control signal CS1.

Figure 51:
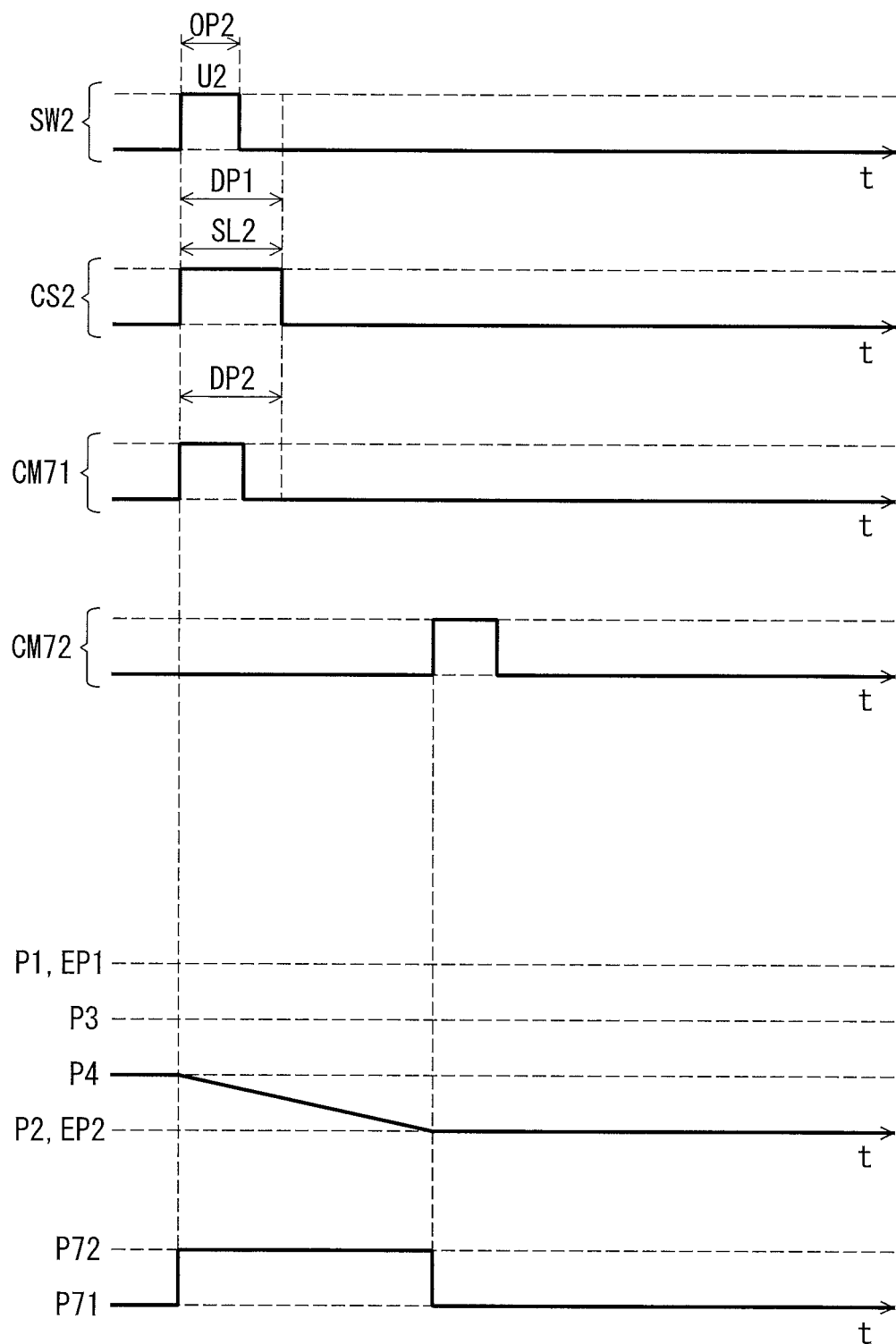
Figure 54:
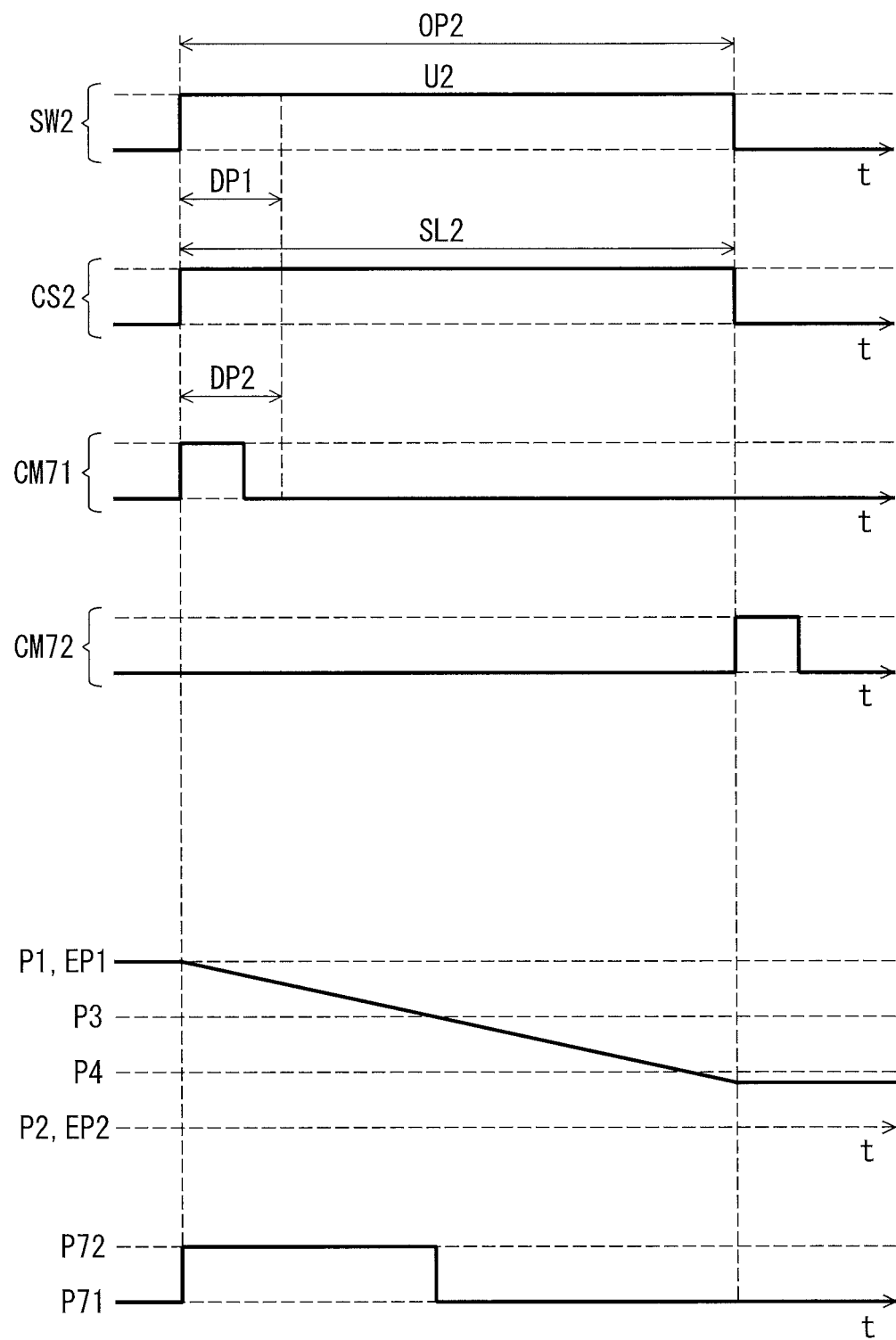
Figure 55:
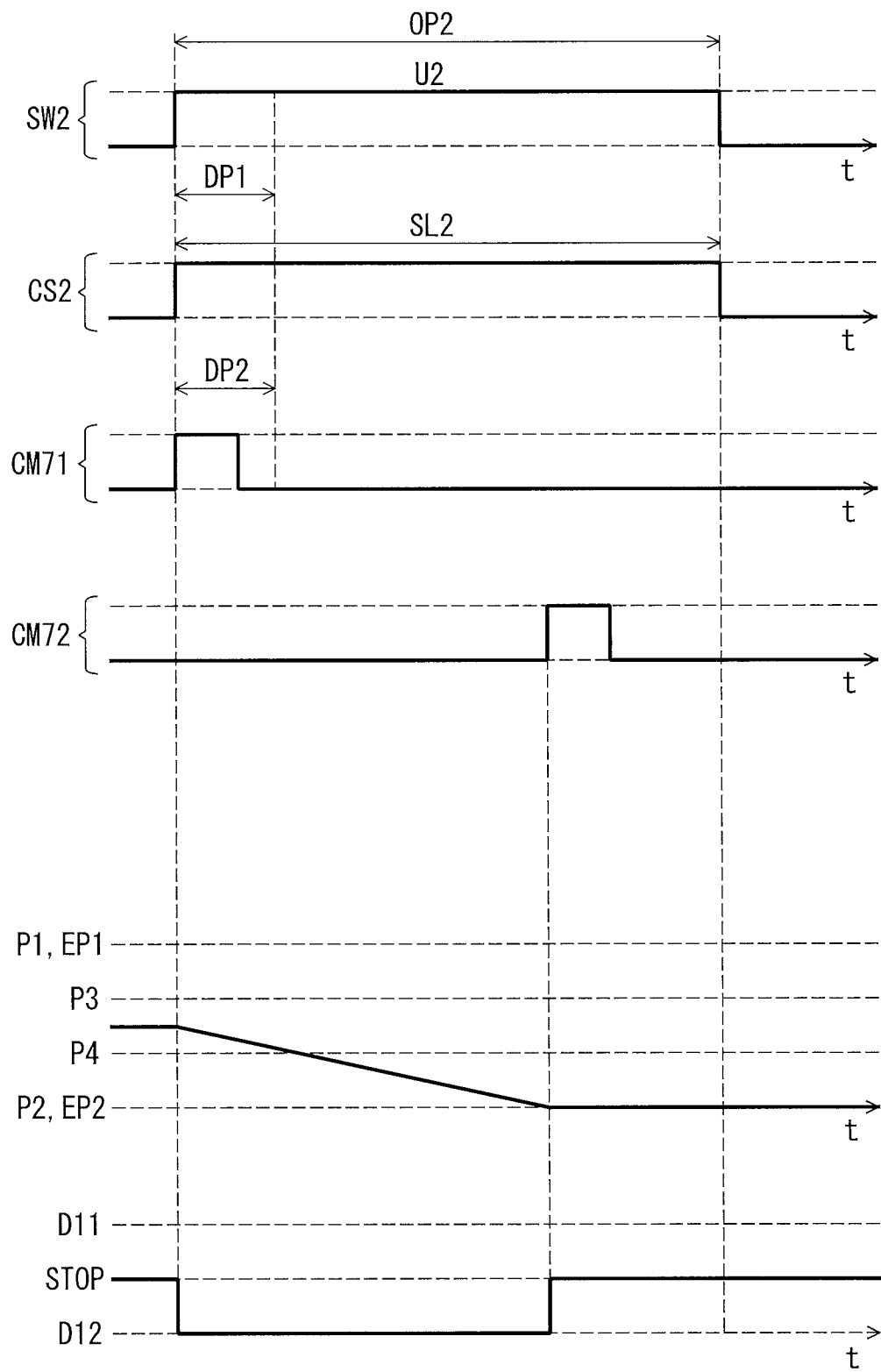

As seen in FIGS. 51, 54, and 55, the controller 738 is configured to generate the open command CM71 when the controller 738 detects the second control signal CS2. The actuator driver 48 is configured to control the electric motor 30 to move the control rod 732 from the closed position P71 to the open position P72 in response to the open command CM71. In the open state where the control rod 732 is in the open position P72, the second tube 18 is moved relative to the first tube 16 in the first telescopic direction D11 or the second telescopic direction D12 by applying or releasing the rider's weight to or from the saddle VH2.

After generating the open command CM71, the controller 738 starts to measure a length of time and compares the measured length of time with the determination time DP2 stored in the memory 40 (FIG. 49). The controller 738 concludes that the operating mode of the controller 738 is the first operating mode if the controller 738 does not detect the second control signal CS2 when the measured length of time reaches the determination time DP2. The controller 738 concludes that the operating mode of the controller 738 is the second operating mode if the controller 738 still detects the second control signal CS2 when the measured length of time reaches the determination time DP2.

As seen in FIG. 51, the controller 738 is configured to selectively arrange the reference portion 18A of the telescopic apparatus 12 according to comparison between the current position of the reference portion 18A and at least one of the first predetermined position P1 and the second predetermined position P2 in the first operating mode. In this embodiment, after concluding that the operating mode of the controller 738 is the first operating mode, the controller 738 is configured to compare the current position sensed by the position sensor 46 with the predetermined position which is adjacent to the current position in the first telescopic direction D11 among the first to third predetermined positions P1 to P4.

The controller 738 is configured to generate the close command CM72 when the controller 738 concludes that the reference portion 18A reaches, by releasing the rider's weight, the predetermined position which is adjacent to the starting position in the second telescopic direction D12. The actuator driver 48 is configured to control the electric motor 30 to move the control rod 732 from the open position P72 to the closed position P71 in response to the close command CM72. Thus, the second tube 18 is stopped at one of the first predetermined position P1, the second predetermined position P2, the third predetermined position P3, and the third predetermined position P4 which is adjacent to the starting position in the second telescopic direction D12.

As seen in FIGS. 54 and 55, the controller 738 is configured to selectively arrange the reference portion 18A of the telescopic apparatus 12 according to comparison between the current position of the reference portion 18A and at least one of the first end position EP1 and the second end position EP2 in the second operating mode. The operations of the second operating mode illustrated in FIGS. 54 and 55 are substantially the same as the operations of the second operating mode illustrated in FIGS. 52 and 53. Thus, they will not be described in detail here for the sake of brevity.

The configuration of the controller 238 of the second embodiment can be combined with the configuration of the controller 738 of the seventh embodiment. For example, the first electrical switch SW1 can be assigned to one of the first to third predetermined positions P1 to P4 in the first operating mode as with the second embodiment. The second electrical switch SW2 can be assigned to another of the first to third predetermined positions P1 to P4 in the first operating mode as with the second embodiment. If the first electrical switch SW1 is assigned to the first predetermined position P1 in the first operating mode, the controller 738 is configured to control the actuator 28 to keep the control rod 732 at the open position P72 after the first electrical switch SW1 is activated until the reference portion 18A reaches the first predetermined position P1 corresponding to the first electrical switch SW1 in the first operating mode. If the second electrical switch SW2 is assigned to the second predetermined position P2 in the first operating mode, the controller 738 is configured to control the actuator 28 to keep the control rod 732 at the open position P72 after the second electrical switch SW2 is activated until the reference portion 18A reaches the second predetermined position P2 corresponding to the first electrical switch SW1 in the first operating mode. Furthermore, the first electrical switch SW1 can be assigned to the third predetermined position P3, and the second electrical switch SW2 can be assigned to the third predetermined position P4. In such embodiment, in the first operating mode, the controller 738 is configured to control the actuator 28 to keep the control rod 732 at the open position P72 until the reference portion 18A reaches the third predetermined position P3 corresponding to the first electrical switch SW1. In the first operating mode, the controller 738 is configured to control the actuator 28 to keep the control rod 732 at the open position P72 until the reference portion 18A reaches the third predetermined position P4 corresponding to the second electrical switch SW2. For example, the user can change the assignment of the first electrical switch SW1 and the second electrical switch SW2 using the external device ED.

The configuration of the controller 338 and the third electrical switch SW3 of the third embodiment can be combined with the configuration of the controller 738 of the seventh embodiment. For example, in the seventh embodiment, the operating device 50 can include the third electrical switch SW3 assigned to the third predetermined position P3.

In such embodiment, the controller 738 is configured to control the actuator 28 to keep the control rod 732 at the open position P72 until the reference portion 18A reaches the third predetermined position P3 corresponding to the third electrical switch SW3 in the first operating mode.

Eighth Embodiment

A telescopic apparatus operating system 810 in accordance with an eighth embodiment will be described below referring to FIGS. 56 to 64. The telescopic apparatus operating system 810 has the same structure and/or configuration as that of the telescopic apparatus operating system 710 except for the telescopic apparatus controller 714. Thus, elements having substantially the same function as those in the above embodiments will be numbered the same here, and will not be described and/or illustrated again in detail here for the sake of brevity.

Figure 56:
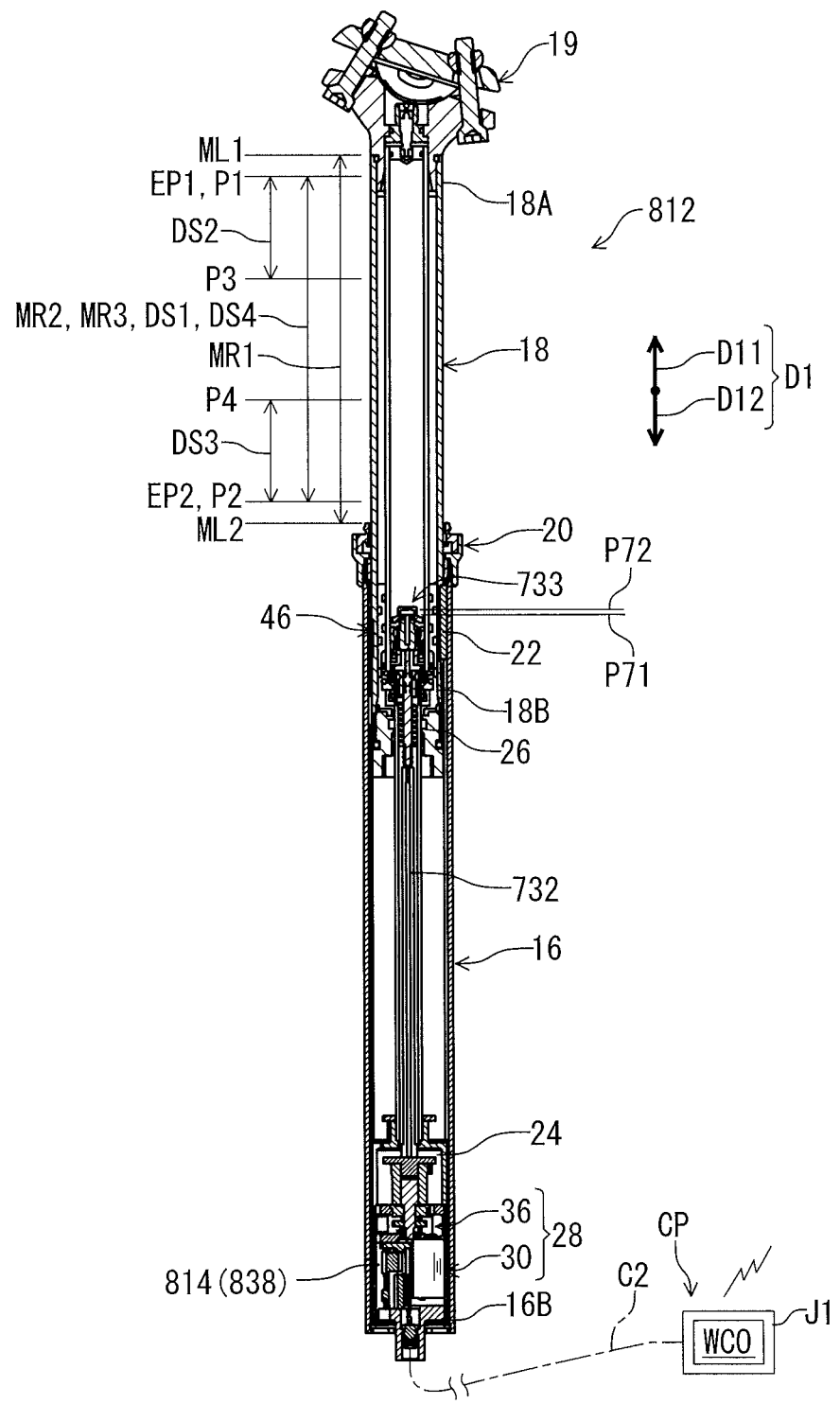
FIG. 56 is a cross-sectional view of a telescopic apparatus of a telescopic apparatus operating system in accordance with an eighth embodiment.
Figure 57:
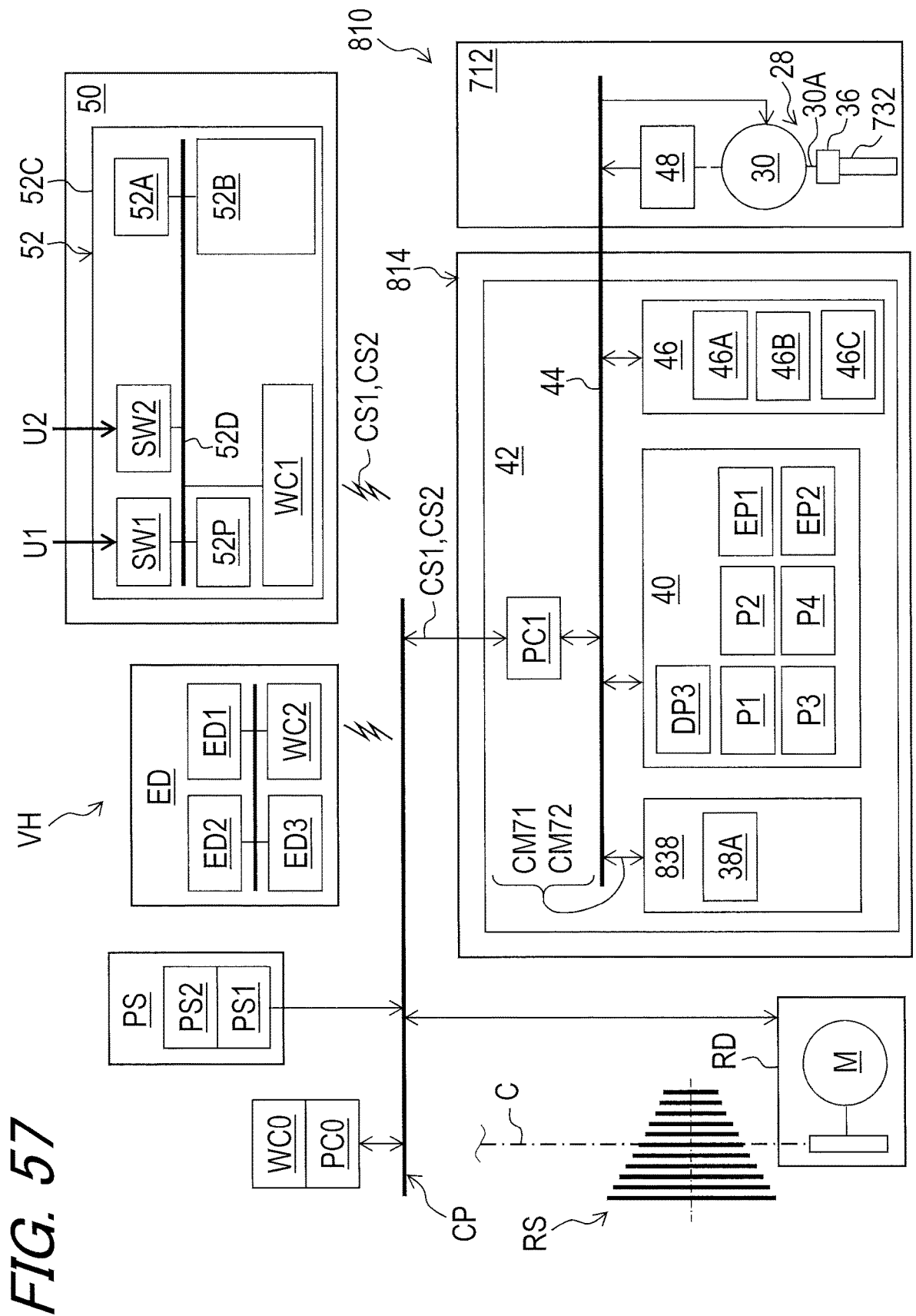
FIG. 57 is a block diagram of the telescopic apparatus operating system illustrated in FIG. 56.

As seen in FIGS. 56 and 57, the telescopic apparatus operating system 810 for the human-powered vehicle VH comprises a telescopic apparatus controller 814 and the telescopic apparatus 712. The telescopic apparatus controller 814 is configured to control the telescopic apparatus 12. The telescopic apparatus controller 814 for the human-powered vehicle VH comprises a controller 838. The controller 838 has substantially the same structure as the structure of the controller 38 of the first embodiment. The controller 838 is configured to control the telescopic apparatus 12 in one of the plurality of operating modes. The plurality of operating modes includes the first operating mode MD1 and the second operating mode MD2. The plurality of operating modes includes the first operating mode MD1 in which the reference portion 18A of the telescopic apparatus 12 is selectively arranged to one of the first predetermined position P1 and the second predetermined position P2. The plurality of operating modes includes the second operating mode MD2 in which the reference portion 18A of the telescopic apparatus 12 is arbitrarily arranged between the first end position EP1 and the second end position EP2.

Figure 58:
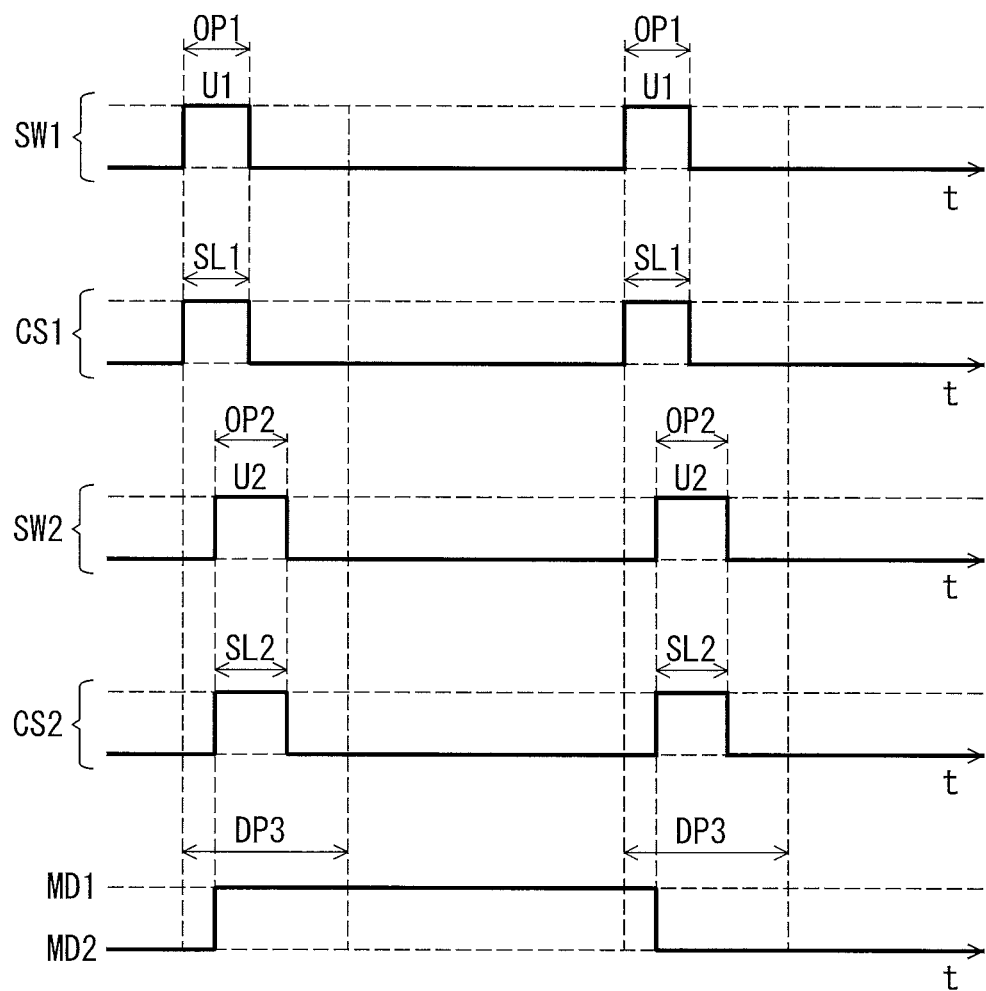
FIG. 58 is a timing chart of the telescopic apparatus operating system illustrated in FIG. 57 (mode-change).

The telescopic apparatus operating system 810 corresponds to the combination of the sixth embodiment and the seventh embodiment. As seen in FIG. 58, the controller 838 is configured to change an operating mode from one of the first operating mode MD1 and the second operating mode MD2 to the other of the first operating mode MD1 and the second operating mode MD2 in response to a mode-change input. In this embodiment, the mode-change input includes that the first control signal CS1 and the second control signal CS2 are concurrently input to the controller 838 within a concurrent-input determination time DP3 stored in the memory 40 (see e.g., FIG. 57).

The signal controller 52 of the operating device 50 is configured to generate the first control signal CS1 having the signal length SL1 which is proportional to the length of the first operation period OP1 of the first user input U1 in both the first operating mode MD1 and the second operating mode MD2.

After the controller 838 detects one of the first control signal CS1 and the second control signal CS2, the controller 838 is configured to determine if the controller 838 detects the other of the first control signal CS1 and the second control signal CS2 within the concurrent-input determination time DP3. The controller 838 concludes that the controller 838 receives the mode-change input including the concurrent input of the first control signal CS1 and the second control signal CS2. Thus, the controller 838 changes the operating mode from one of the first operating mode MD1 and the second operating mode MD2 to the other of the first operating mode MD1 and the second operating mode MD2 in response to the mode-change input.

Figure 59:
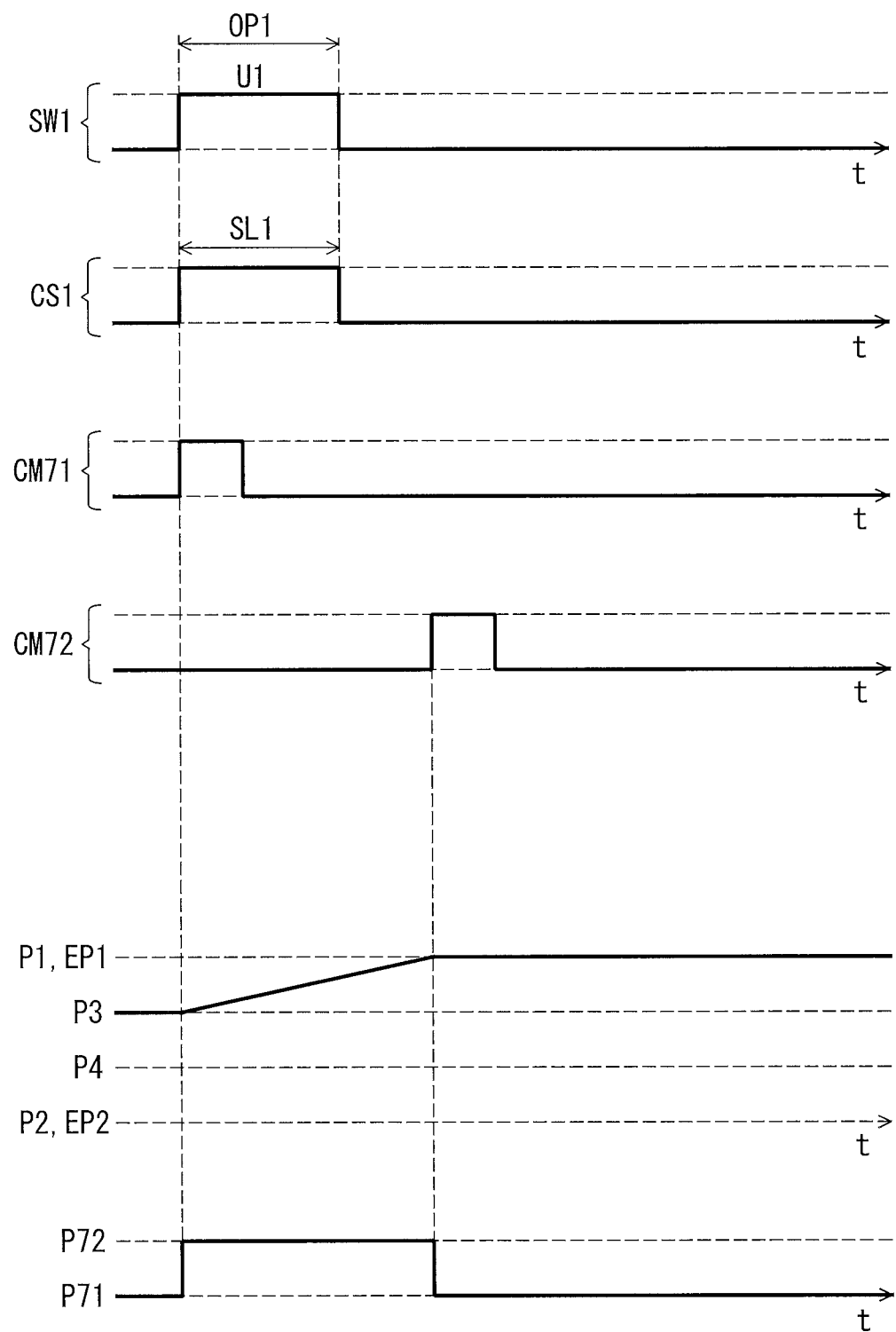
FIGS. 59 and 60 are timing charts of the telescopic apparatus operating system illustrated in FIG. 57 (first operating mode).
Figure 60:
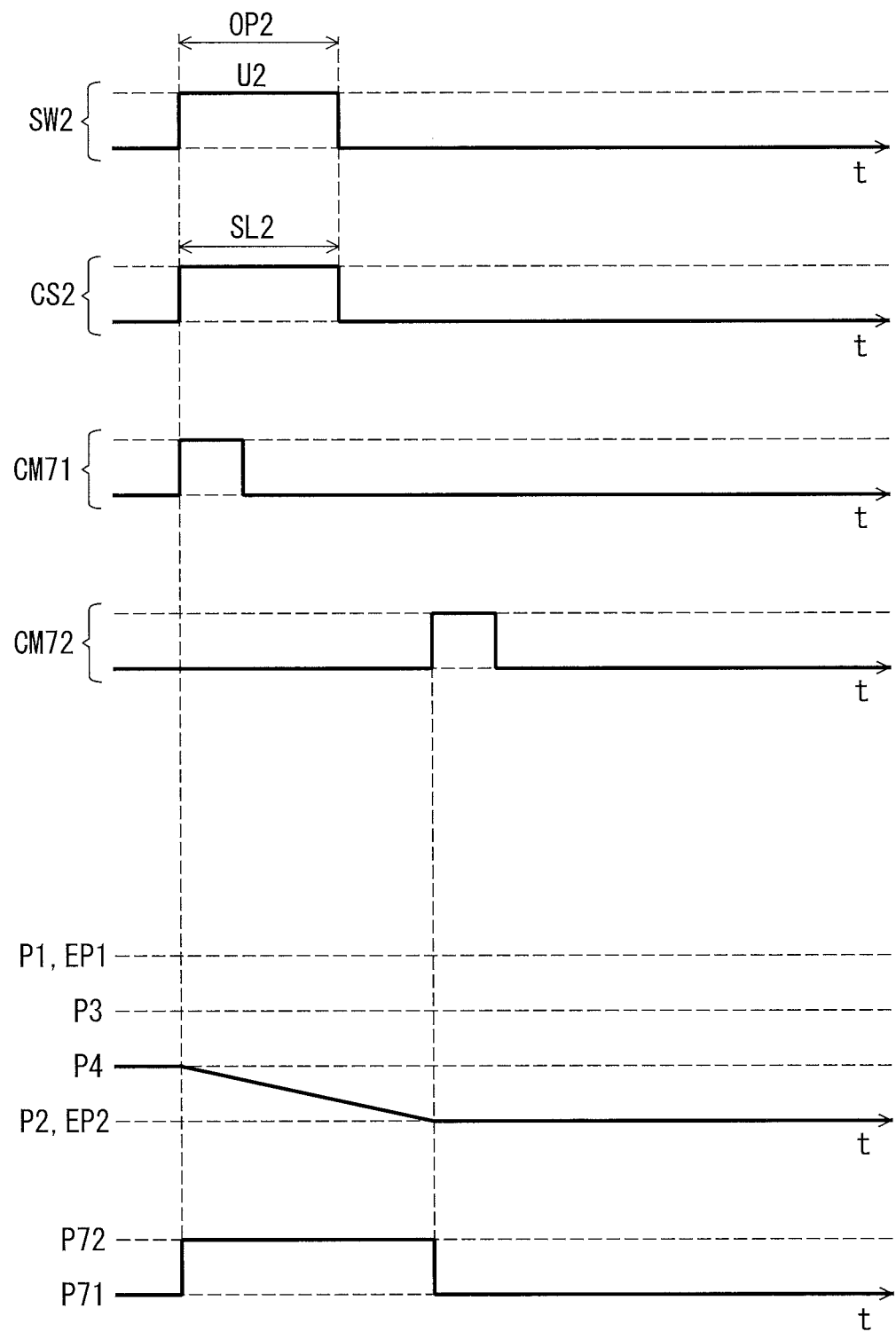
Figure 61:
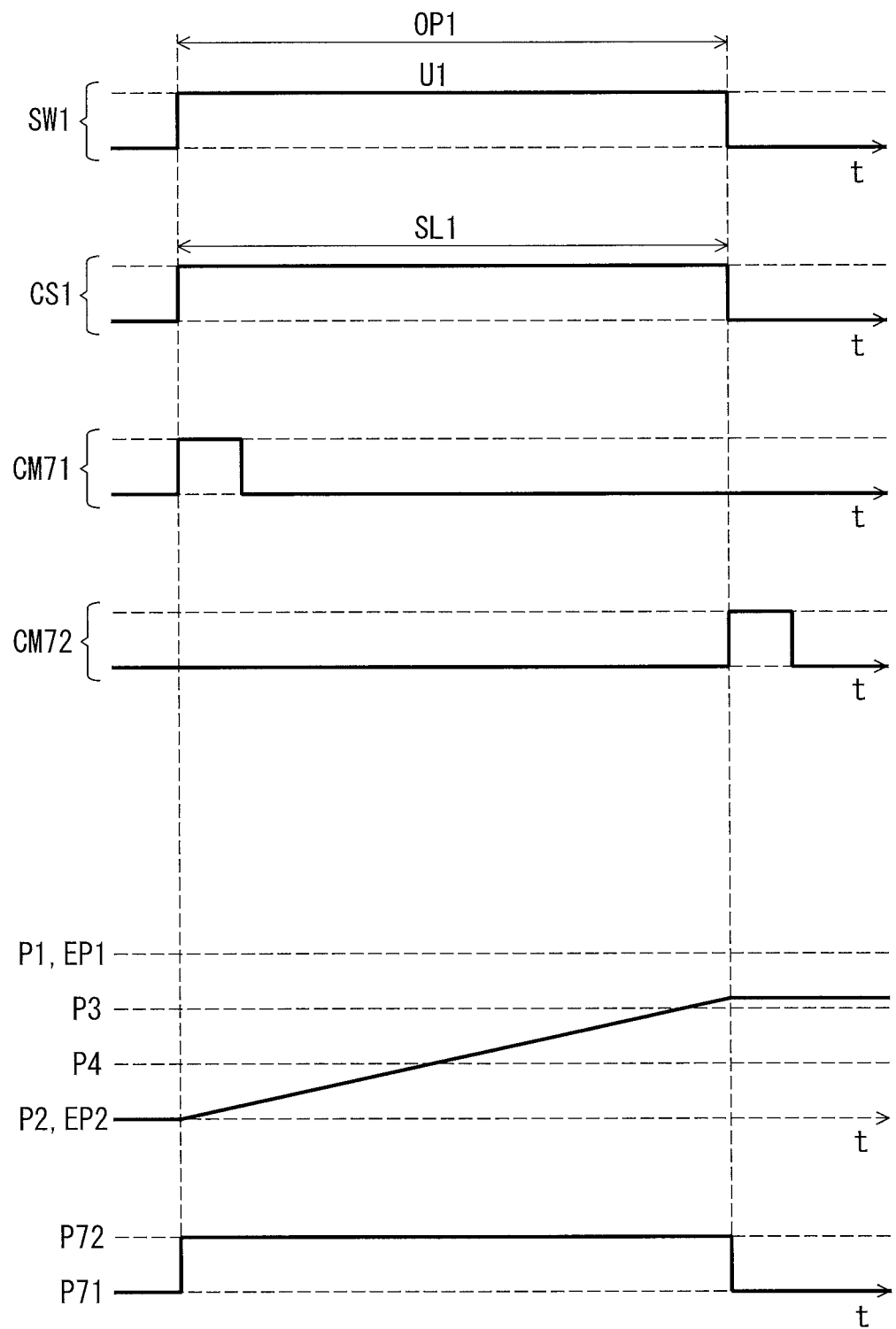
FIGS. 61 to 64 are timing charts of the telescopic apparatus operating system illustrated in FIG. 57 (second operating mode).
Figure 62:
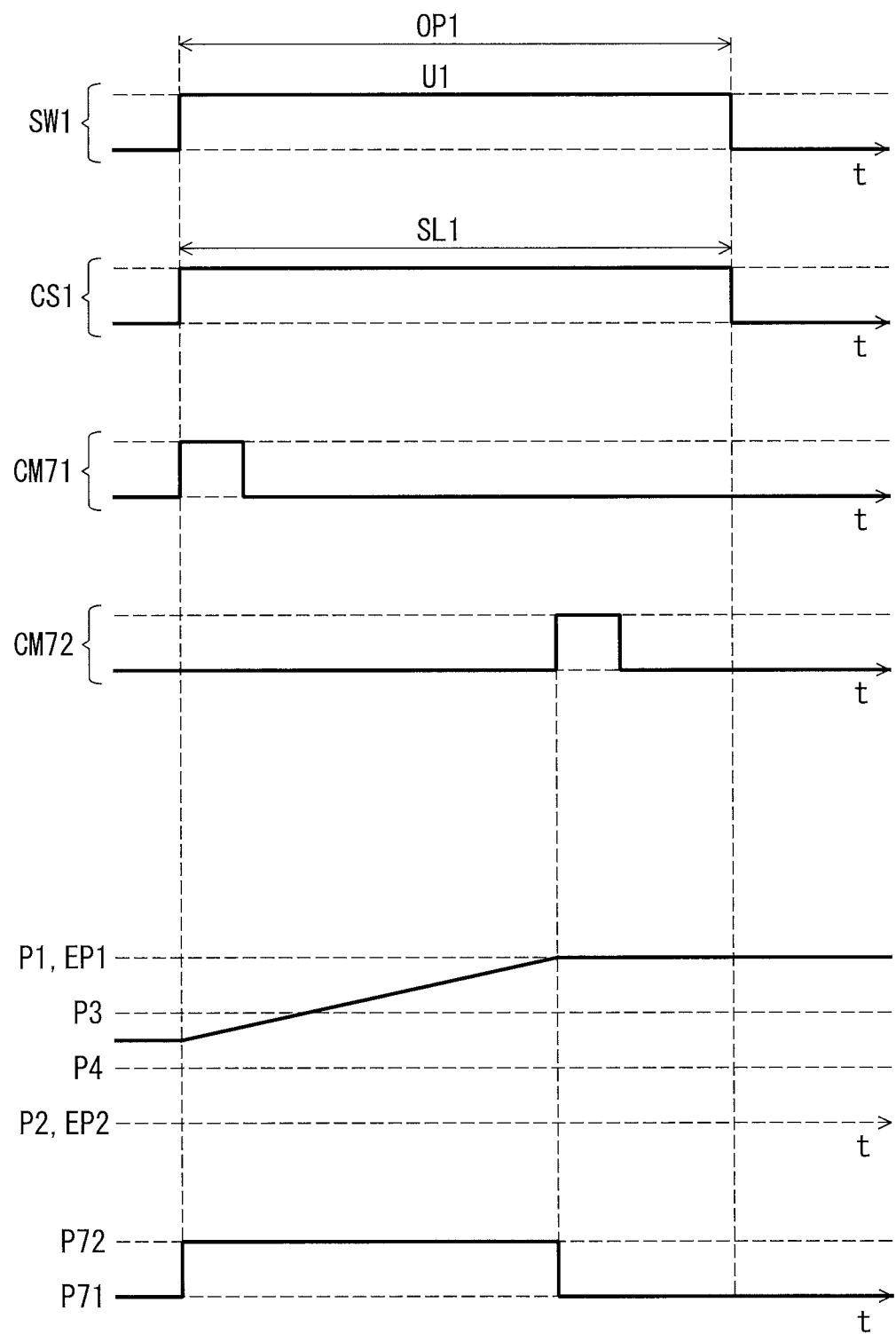
Figure 63:
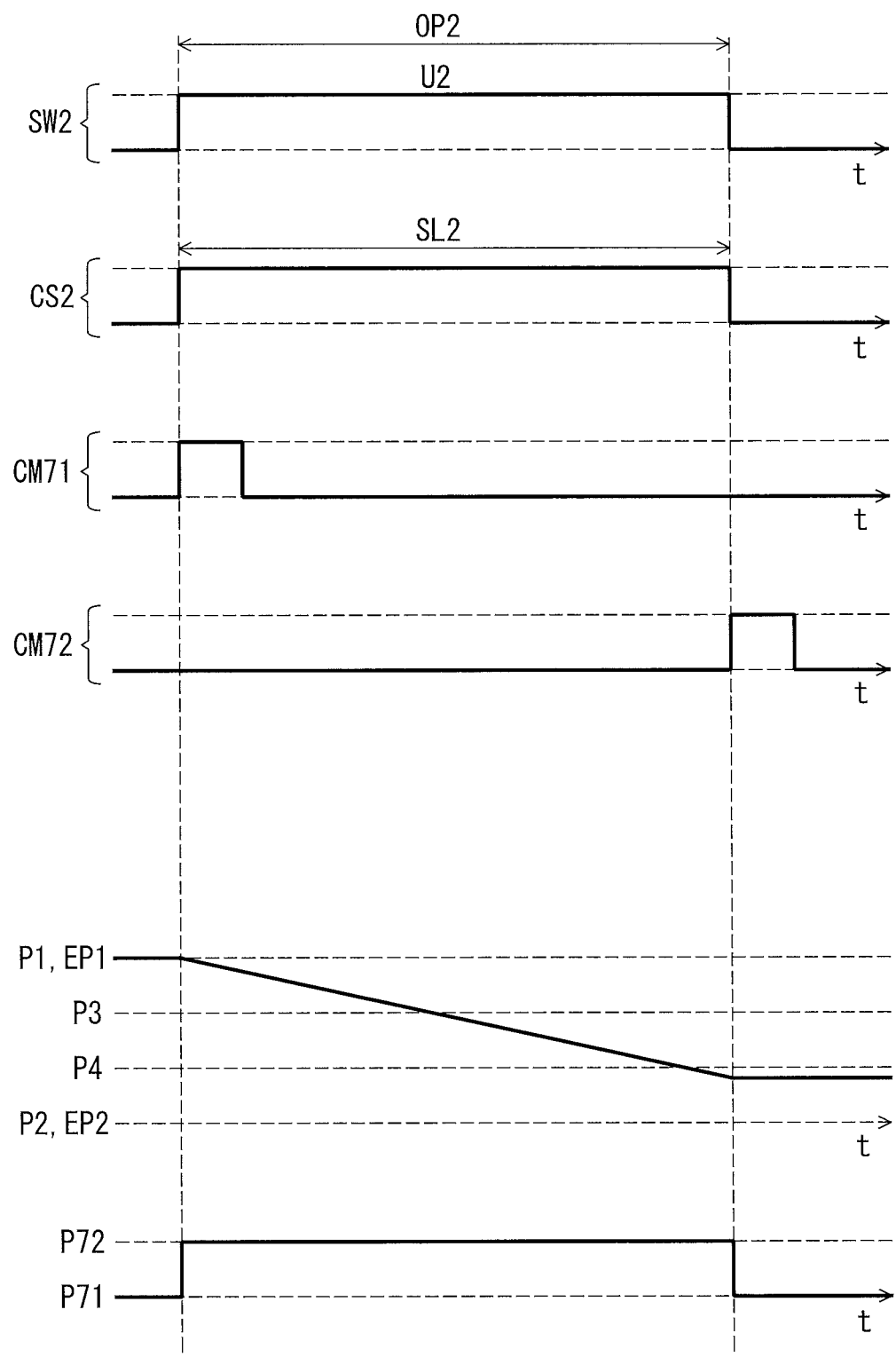
Figure 64:
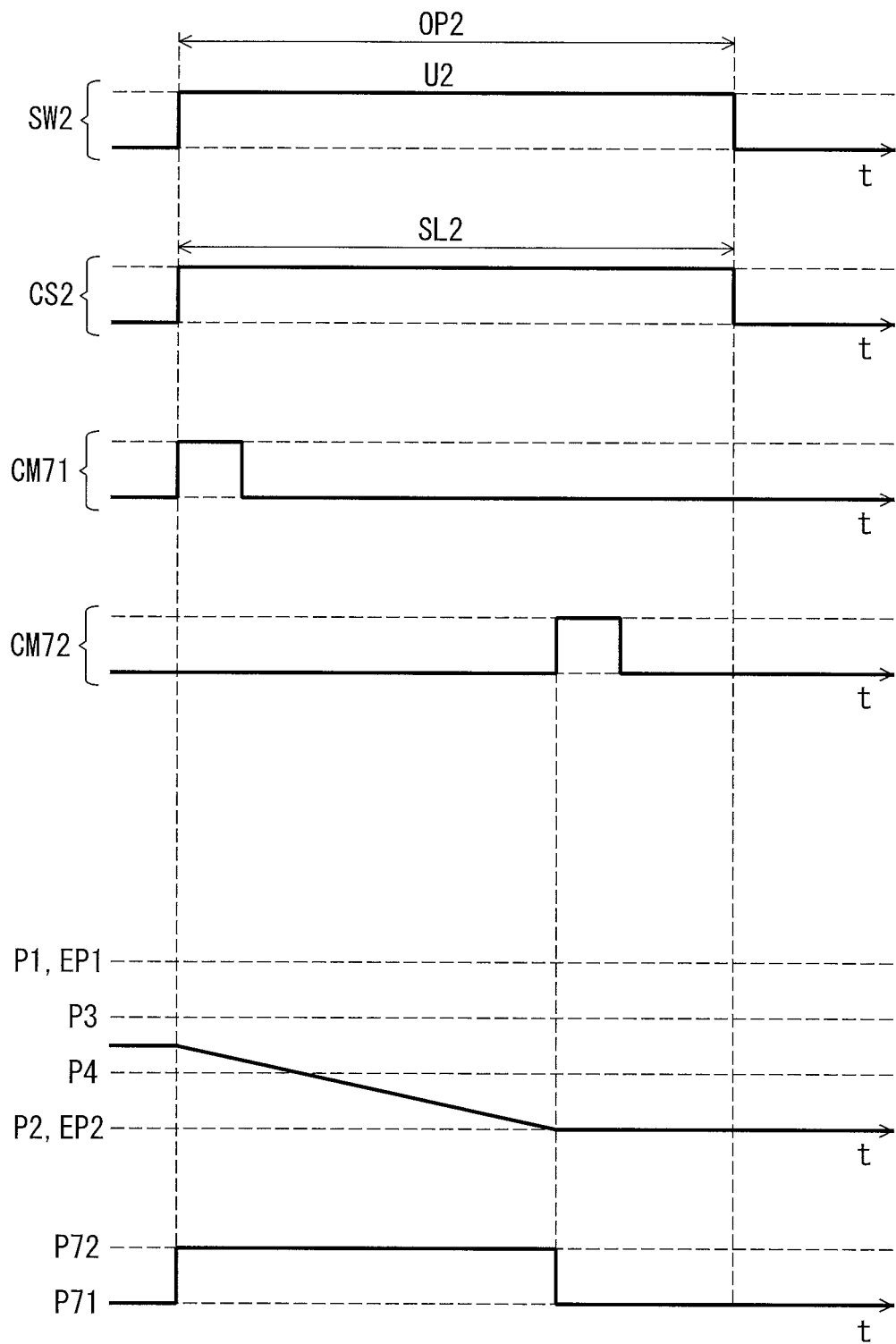

As seen in FIGS. 59 and 60, as with the controller 738 of the seventh embodiment, the controller 838 is configured to selectively arrange the reference portion 18A of the telescopic apparatus 12 to one of the first predetermined position P1, the second predetermined position P2, and the plurality of third predetermined positions P3 and P4 in the first operating mode MD1. The operations of the first operating mode MD1 illustrated in FIGS. 59 and 60 are substantially the same as the operations of the first operating mode MD1 illustrated in FIGS. 50 and 51 except for the determination based on the determination time DP2.

As seen in FIG. 59, after changing the operating mode from the second operating mode MD2 to the first operating mode MD1, the controller 838 is configured to generate the open command CM71 when the controller 838 detects the first control signal CS1 in the first operating mode MD1. The actuator driver 48 is configured to control the electric motor 30 to move the control rod 732 from the closed position P71 to the open position P72 in response to the open command CM71. In the open state where the control rod 732 is in the open position P72, the second tube 18 is moved relative to the first tube 16 in the first telescopic direction D11 or the second telescopic direction D12 by applying or releasing the rider's weight to or from the saddle VH2.

After generating the open command CM71, the controller 838 is configured to compare the current position sensed by the position sensor 46 with the predetermined position which is adjacent to the current position in the first telescopic direction D11 among the first to third predetermined positions P1 to P4.

The controller 838 is configured to generate the close command CM72 when the controller 838 concludes that the reference portion 18A reaches, by releasing the rider's weight, the predetermined position which is adjacent to the starting position in the first telescopic direction D11. The actuator driver 48 is configured to control the electric motor 30 to move the control rod 732 from the open position P72 to the closed position P71 in response to the close command CM72. Thus, the second tube 18 is stopped at one of the first predetermined position P1, the second predetermined position P2, the third predetermined position P3, and the third predetermined position P4 which is adjacent to the starting position in the first telescopic direction D11.

As seen in FIG. 60, after changing the operating mode from the second operating mode MD2 to the first operating mode MD1, the controller 838 is configured to generate the open command CM71 when the controller 838 detects the second control signal CS2 in the first operating mode MD1. The actuator driver 48 is configured to control the electric motor 30 to move the control rod 732 from the closed position P71 to the open position P72 in response to the open command CM71. In the open state where the control rod 732 is in the open position P72, the second tube 18 is moved relative to the first tube 16 in the first telescopic direction D11 or the second telescopic direction D12 by applying or releasing the rider's weight to or from the saddle VH2.

After generating the open command CM71, the controller 838 is configured to compare the current position sensed by the position sensor 46 with the predetermined position which is adjacent to the current position in the second telescopic direction D12 among the first to third predetermined positions P1 to P4.

The controller 838 is configured to generate the close command CM72 when the controller 838 concludes that the reference portion 18A reaches, by releasing the rider's weight, the predetermined position which is adjacent to the starting position in the second telescopic direction D12. The actuator driver 48 is configured to control the electric motor 30 to move the control rod 732 from the open position P72 to the closed position P71 in response to the close command CM72. Thus, the second tube 18 is stopped at one of the first predetermined position P1, the second predetermined position P2, the third predetermined position P3, and the third predetermined position P4 which is adjacent to the starting position in the second telescopic direction D12.

As seen in FIGS. 61 to 64, as with the controller 738 of the seventh embodiment, the controller 838 is configured to selectively arrange the reference portion 18A of the telescopic apparatus 12 according to comparison between the current position of the reference portion 18A and at least one of the first end position EP1 and the second end position EP2 in the second operating mode MD2. The operations of the second operating mode MD2 illustrated in FIGS. 61 to 64 are substantially the same as the operations of the second operating mode MD2 illustrated in FIGS. 52 to 55 except for the determination based on the determination time DP2. Thus, they will not be described in detail here for the sake of brevity.

Ninth Embodiment

A telescopic apparatus operating system 910 in accordance with an ninth embodiment will be described below referring to FIGS. 65 to 70. The telescopic apparatus operating system 910 has the same structure and/or configuration as that of the telescopic apparatus operating system 710 except for the telescopic apparatus controller 714. Thus, elements having substantially the same function as those in the above embodiments will be numbered the same here, and will not be described and/or illustrated again in detail here for the sake of brevity.

In the ninth embodiment, the configuration of the controller 338 and the third electrical switch SW3 of the third embodiment can be combined with the configuration of the controller 738 of the seventh embodiment.

Figure 65:
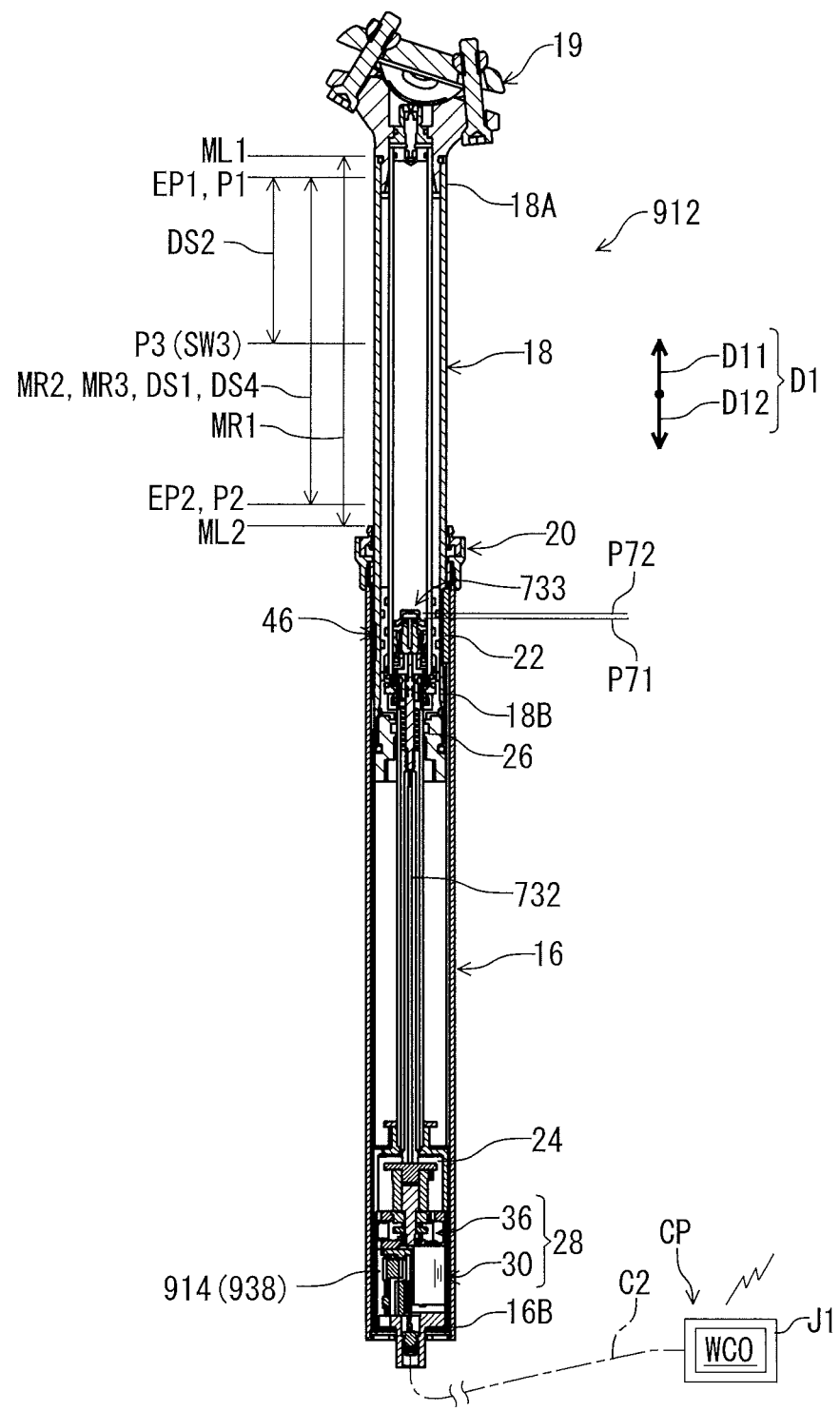
FIG. 65 is a cross-sectional view of a telescopic apparatus of a telescopic apparatus operating system in accordance with a ninth embodiment.
Figure 66:
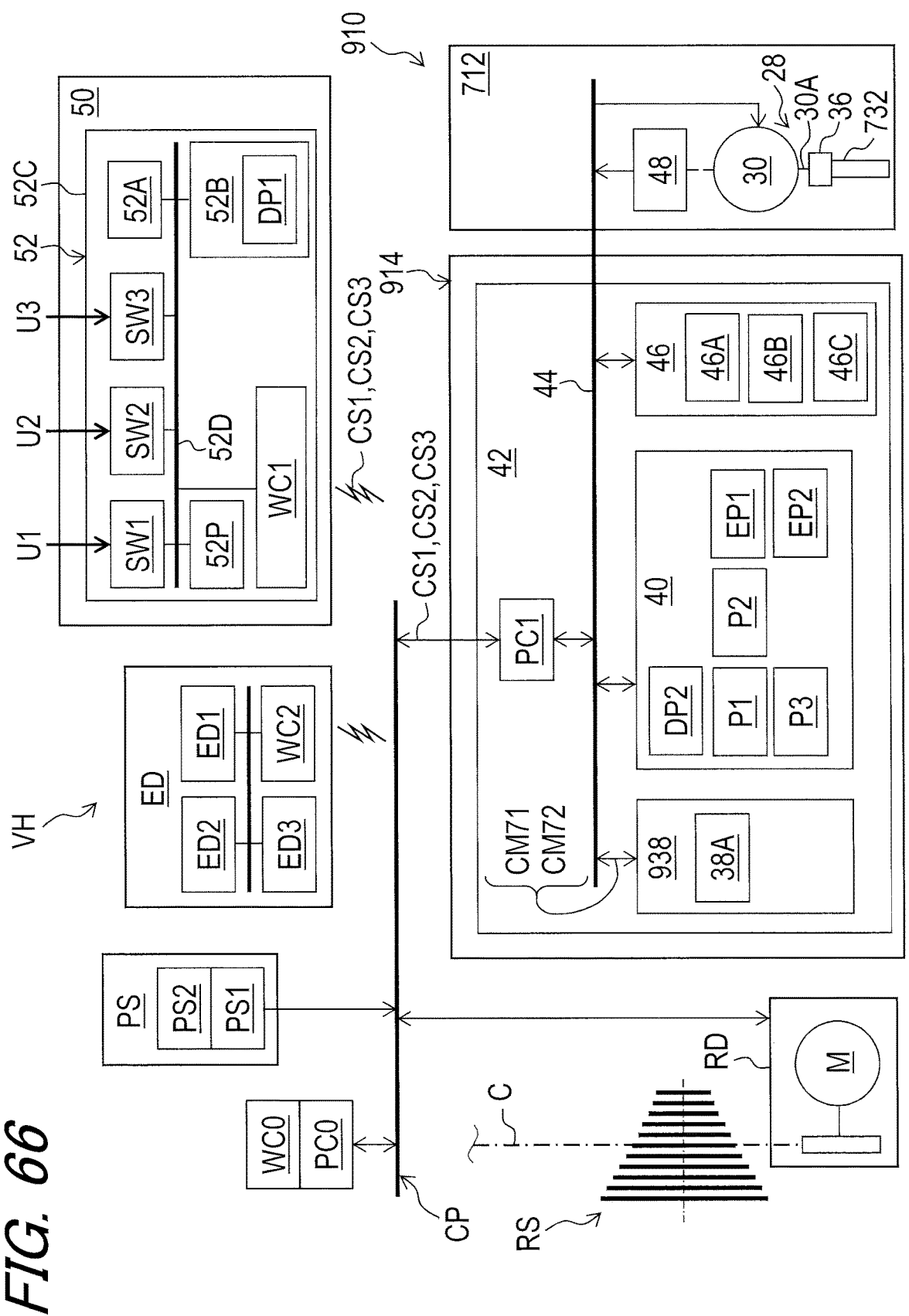
FIG. 66 is a block diagram of the telescopic apparatus operating system illustrated in FIG. 65.

As seen in FIGS. 65 and 66, the telescopic apparatus operating system 910 for the human-powered vehicle VH comprises a telescopic apparatus controller 914 and the telescopic apparatus 12. The telescopic apparatus controller 914 is configured to control the telescopic apparatus 12. The telescopic apparatus controller 914 for the human-powered vehicle VH comprises a controller 938. The controller 938 has substantially the same structure as the structure of the controller 38 of the first embodiment. The controller 938 is configured to control the telescopic apparatus 12 in one of the plurality of operating modes. The plurality of operating modes includes the first operating mode and the second operating mode. The plurality of operating modes includes the first operating mode in which the reference portion 18A of the telescopic apparatus 12 is selectively arranged to one of the first predetermined position P1 and the second predetermined position P2. The plurality of operating modes includes the second operating mode in which the reference portion 18A of the telescopic apparatus 12 is arbitrarily arranged between the first end position EP1 and the second end position EP2.

As seen in FIGS. 67 to 70, the controller 938 is configured to selectively arrange the reference portion 18A of the telescopic apparatus 12 to one of the first predetermined position P1, the second predetermined position P2, and a third predetermined position in the first operating mode. In this embodiment, the controller 938 is configured to selectively arrange the reference portion 18A of the telescopic apparatus 12 to one of the first predetermined position P1, the second predetermined position P2, and the third predetermined position P3. The third predetermined position P4 is omitted from the first operating mode of the controller 938.

Figure 67:
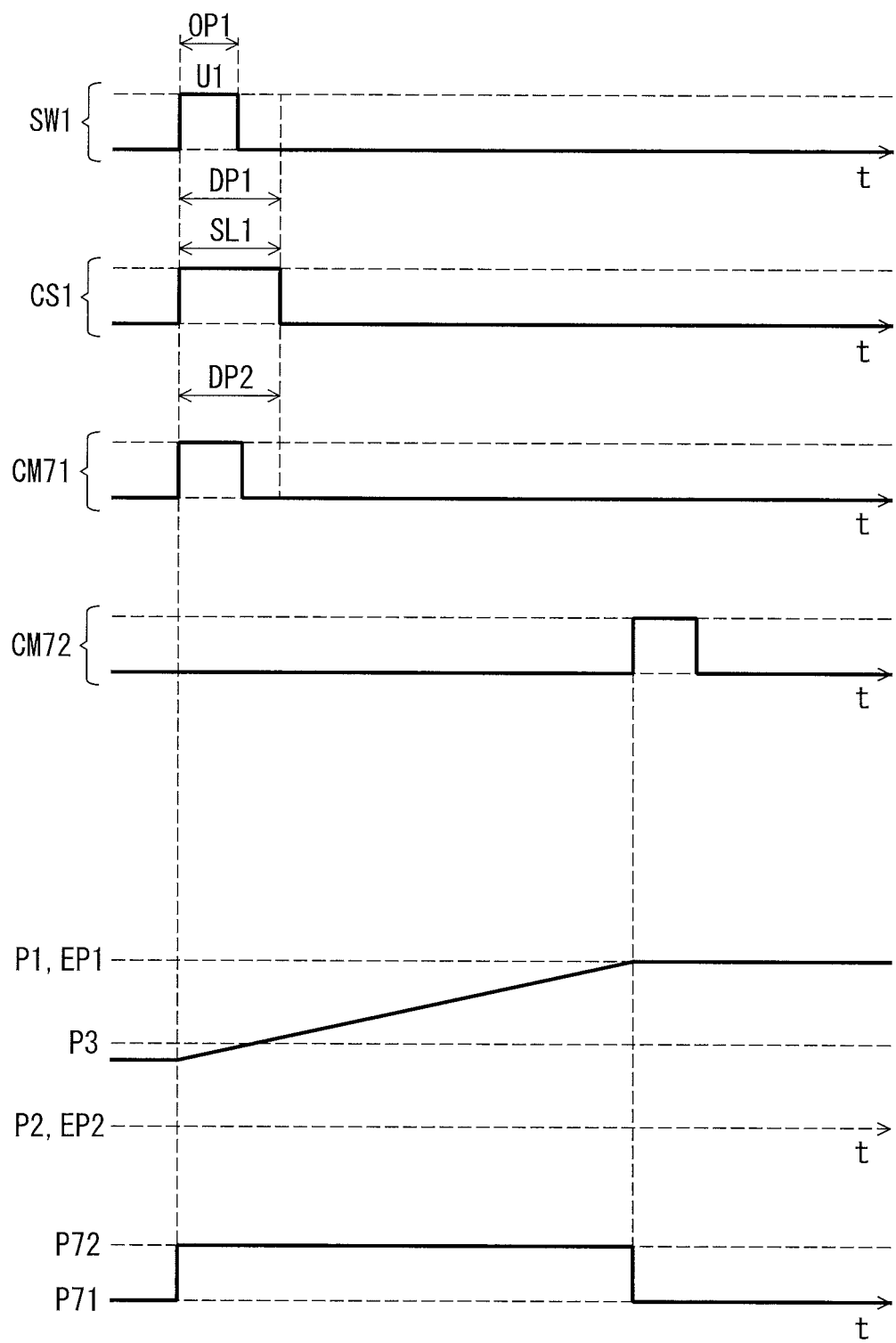
FIGS. 67 to 70 are timing charts of the telescopic apparatus operating system illustrated in FIG. 66 (first operating mode).

As seen in FIG. 67, the controller 938 is configured to generate the open command CM71 when the controller 938 detects the first control signal CS1. The actuator driver 48 is configured to control the electric motor 30 to move the control rod 732 from the closed position P71 to the open position P72 in response to the open command CM71. In the open state where the control rod 732 is in the open position P72, the second tube 18 is moved relative to the first tube 16 in the first telescopic direction D11 or the second telescopic direction D12 by applying or releasing the rider's weight to or from the saddle VH2.

The controller 938 is configured to selectively arrange the reference portion 18A of the telescopic apparatus 12 according to comparison between the current position of the reference portion 18A and at least one of the first predetermined position P1 and the second predetermined position P2 in the first operating mode. In this embodiment, after concluding that the operating mode of the controller 938 is the first operating mode, the controller 938 is configured to compare the current position sensed by the position sensor 46 with the first predetermined position P1 in response to the first control signal CS1 without comparing the current position with the second predetermined position P2 and the third predetermined position P3 in the first operating mode.

The controller 938 is configured to generate a close command CM72 when the controller 938 concludes that the reference portion 18A reaches the first predetermined position P1 by releasing the rider's weight from the second tube 18. The actuator driver 48 is configured to control the electric motor 30 to move the control rod 732 from the open position P72 to the closed position P71 in response to the close command CM72. Thus, the second tube 18 is stopped at the first predetermined position P1.

Figure 68:
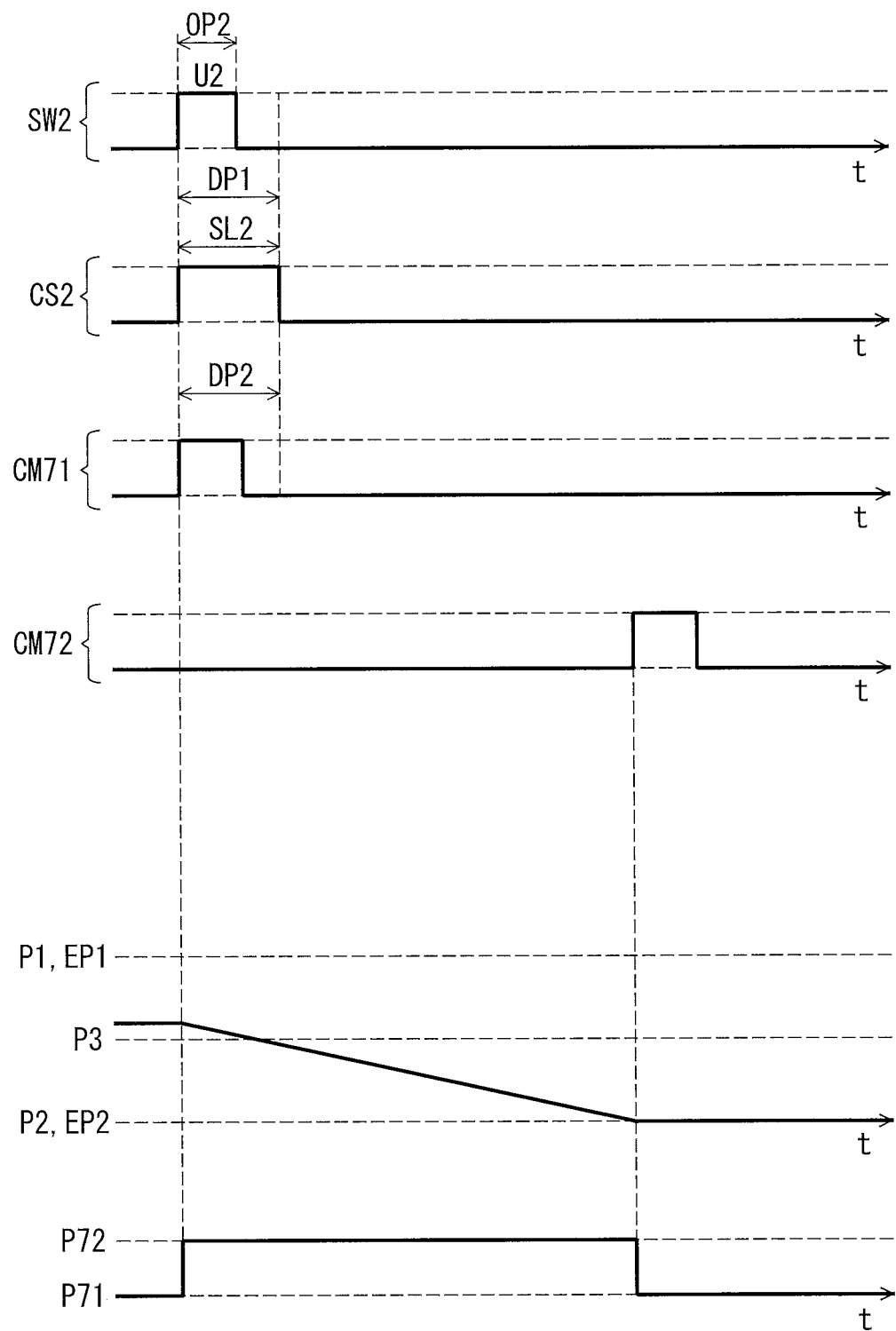

As seen in FIG. 68, the controller 938 is configured to generate the open command CM71 when the controller 938 detects the second control signal CS2. The actuator driver 48 is configured to control the electric motor 30 to move the control rod 732 from the closed position P71 to the open position P72 in response to the open command CM71. In the open state where the control rod 732 is in the open position P72, the second tube 18 is moved relative to the first tube 16 in the first telescopic direction D11 or the second telescopic direction D12 by applying or releasing the rider's weight to or from the saddle VH2.

The controller 938 is configured to selectively arrange the reference portion 18A of the telescopic apparatus 12 according to comparison between the current position of the reference portion 18A and at least one of the first predetermined position P1 and the second predetermined position P2 in the first operating mode. In this embodiment, after concluding that the operating mode of the controller 938 is the first operating mode, the controller 938 is configured to compare the current position sensed by the position sensor 46 with the second predetermined position P2 in response to the second control signal CS2 without comparing the current position with the first predetermined position P1 and the third predetermined position P3 in the first operating mode.

The controller 938 is configured to generate a close command CM72 when the controller 938 concludes that the reference portion 18A reaches the second predetermined position P2 by applying the rider's weight to the second tube 18. The actuator driver 48 is configured to control the electric motor 30 to move the control rod 732 from the open position P72 to the closed position P71 in response to the close command CM72. Thus, the second tube 18 is stopped at the second predetermined position P2.

As seen in FIG. 66, the operating device 50 includes the third electrical switch SW3 of the third embodiment. As seen in FIG. 65, the third electrical switch SW3 is assigned to the third predetermined position P3 in the first operating mode. As seen in FIG. 66, the third electrical switch SW3 is configured to be activated in response to the third user input U3. The third user input U3 includes the normal press of the third electrical switch SW3 and the long press of the third electrical switch SW3. However, the controller 938 does not determine if the third user input U3 is the normal press or the long press of the third electrical switch SW3.

Figure 69:
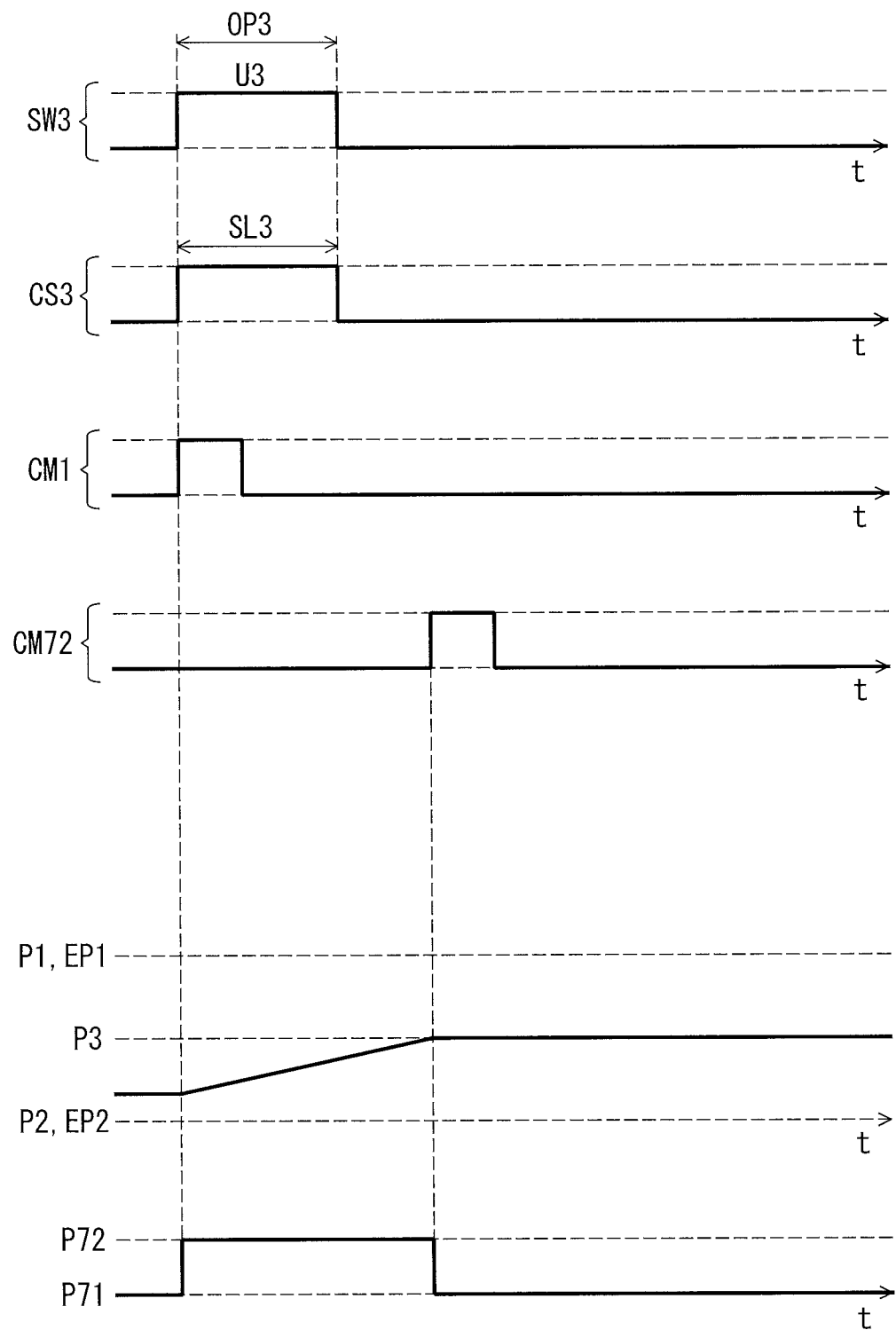
Figure 70:
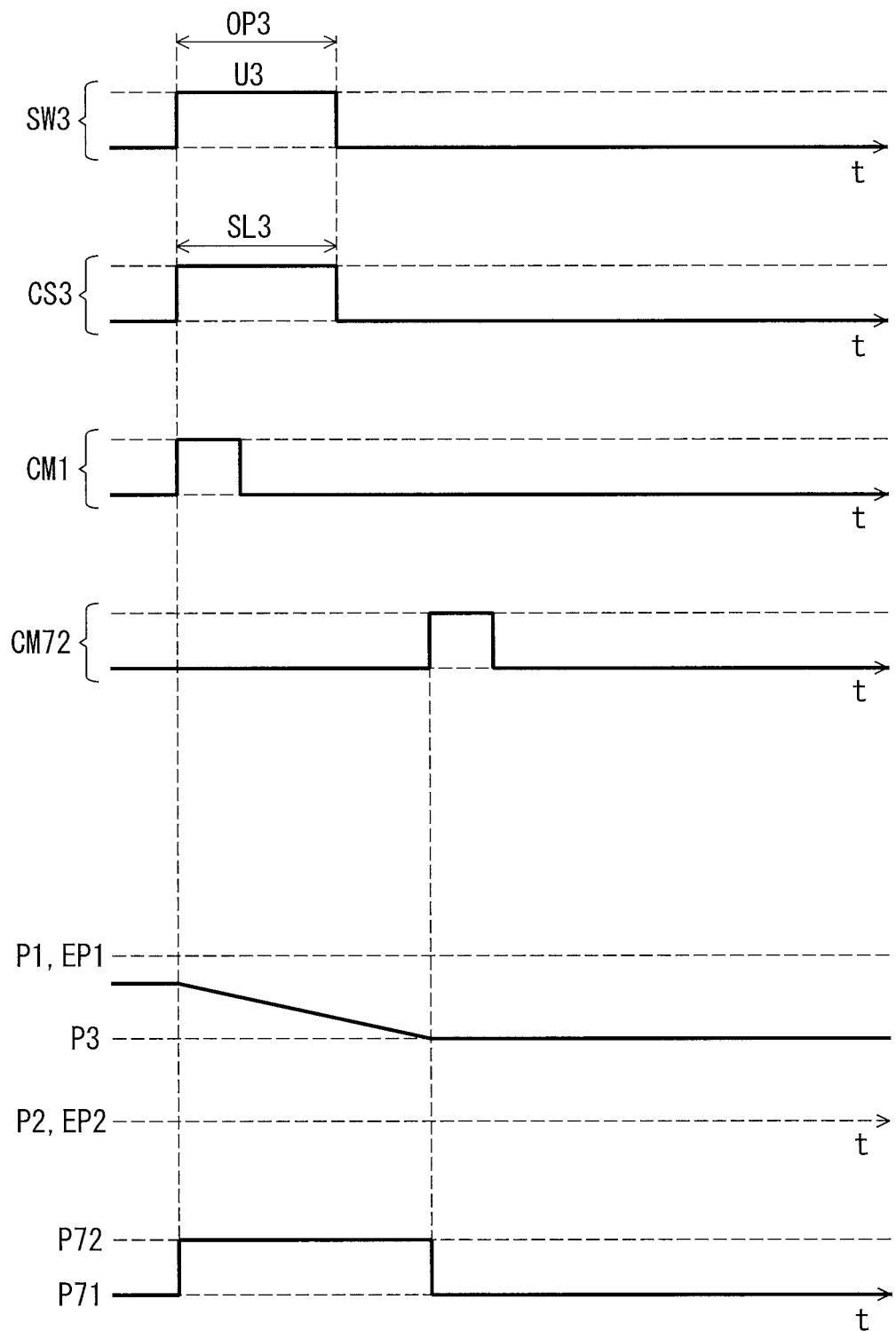

As seen in FIGS. 69 and 70, the signal controller 52 is configured to generate the third control signal CS3 having the signal length L3 in response to the third user input U3. The signal controller 52 is configured to generate the third control signal CS3 having the signal length SL3 which is constant regardless of the length of the third operation period OP3 of the third user input U3.

The controller 938 is configured to arrange the reference portion 18A of the telescopic apparatus 12 to the third predetermined position P3 in response to the third predetermined position P3. In this embodiment, the controller 938 is configured to compare the current position sensed by the position sensor 46 with the third predetermined position P3 in response to the third control signal CS3 without comparing the current position with the first predetermined position P1 and the second predetermined position P2 in the first operating mode.

The controller 938 is configured to generate the open command CM71 in response to the third control signal CS3 if the controller 938 concludes that the current position is not the third predetermined position P3. The controller 938 is configured not to generate the open command CM71 in response to the third control signal CS3 if the controller 938 concludes that the current position is the third predetermined position P3.

The controller 938 is configured to generate the close command CM72 when the controller 938 concludes that the reference portion 18A reaches the third predetermined position P3. The actuator driver 48 is configured to control the electric motor 30 to move the control rod 732 from the open position P72 to the closed position P71 in response to the close command CM72. Thus, the second tube 18 is stopped at the third predetermined position P3.

The controller 938 is configured to selectively arrange the reference portion 18A of the telescopic apparatus 12 according to comparison between the current position of the reference portion 18A and at least one of the first end position EP1 and the second end position EP2 in the second operating mode. The operations of the second operating mode is substantially the same as the operation of the second operating mode illustrated in FIGS. 52 to 55. Thus, they will not be described in detail here for the sake of brevity.

The controller 938 is configured not to respond the third control signal CS3 in the second operating mode. However, the controller 938 can be configured to utilize the third control signal CS3 in the second operating mode.

Tenth Embodiment

A telescopic apparatus operating system 1010 in accordance with a tenth embodiment will be described below referring to FIGS. 71 to 78. The telescopic apparatus operating system 1010 has the same structure and/or configuration as that of the telescopic apparatus operating system 710 except for the telescopic apparatus controller 714. Thus, elements having substantially the same function as those in the above embodiments will be numbered the same here, and will not be described and/or illustrated again in detail here for the sake of brevity.

Figure 71:
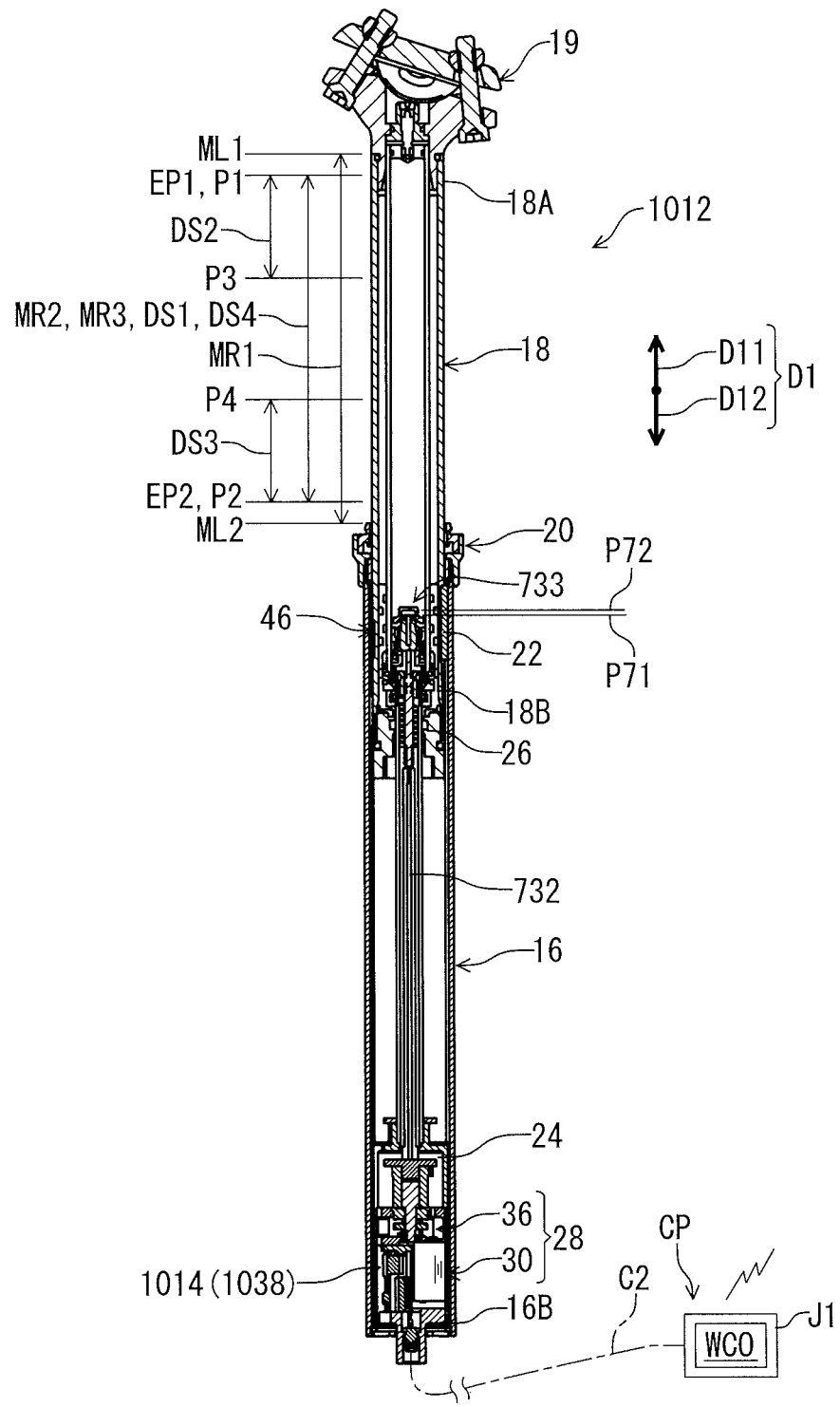
FIG. 71 is a cross-sectional view of a telescopic apparatus of a telescopic apparatus operating system in accordance with a tenth embodiment.
Figure 72:
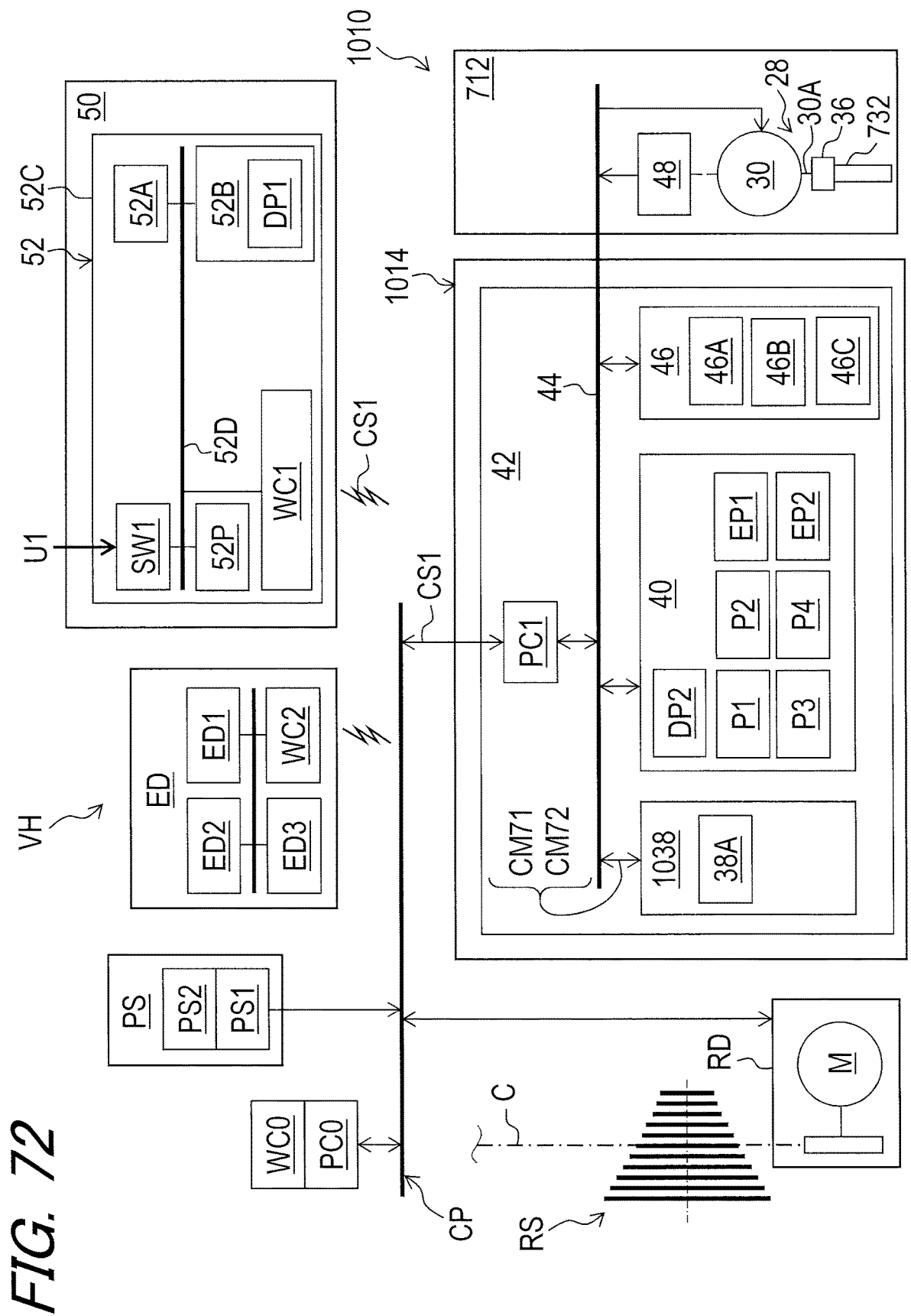
FIG. 72 is a block diagram of the telescopic apparatus operating system illustrated in FIG. 71.

As seen in FIGS. 71 and 72, the telescopic apparatus operating system 1010 for the human-powered vehicle VH comprises a telescopic apparatus controller 1014 and the telescopic apparatus 12. The telescopic apparatus controller 1014 is configured to control the telescopic apparatus 12. The telescopic apparatus controller 1014 for the human-powered vehicle VH comprises a controller 1038. The controller 1038 has substantially the same structure as the structure of the controller 738 of the seventh embodiment. The controller 1038 is configured to control the telescopic apparatus 12 in one of the plurality of operating modes. The plurality of operating modes includes the first operating mode and the second operating mode. The plurality of operating modes includes the first operating mode in which the reference portion 18A of the telescopic apparatus 12 is selectively arranged to one of the first predetermined position P1 and the second predetermined position P2. The plurality of operating modes includes the second operating mode in which the reference portion 18A of the telescopic apparatus 12 is arbitrarily arranged between the first end position EP1 and the second end position EP2. In this embodiment, the second electrical switch SW2 is omitted from the operating device 50.

Figure 73:
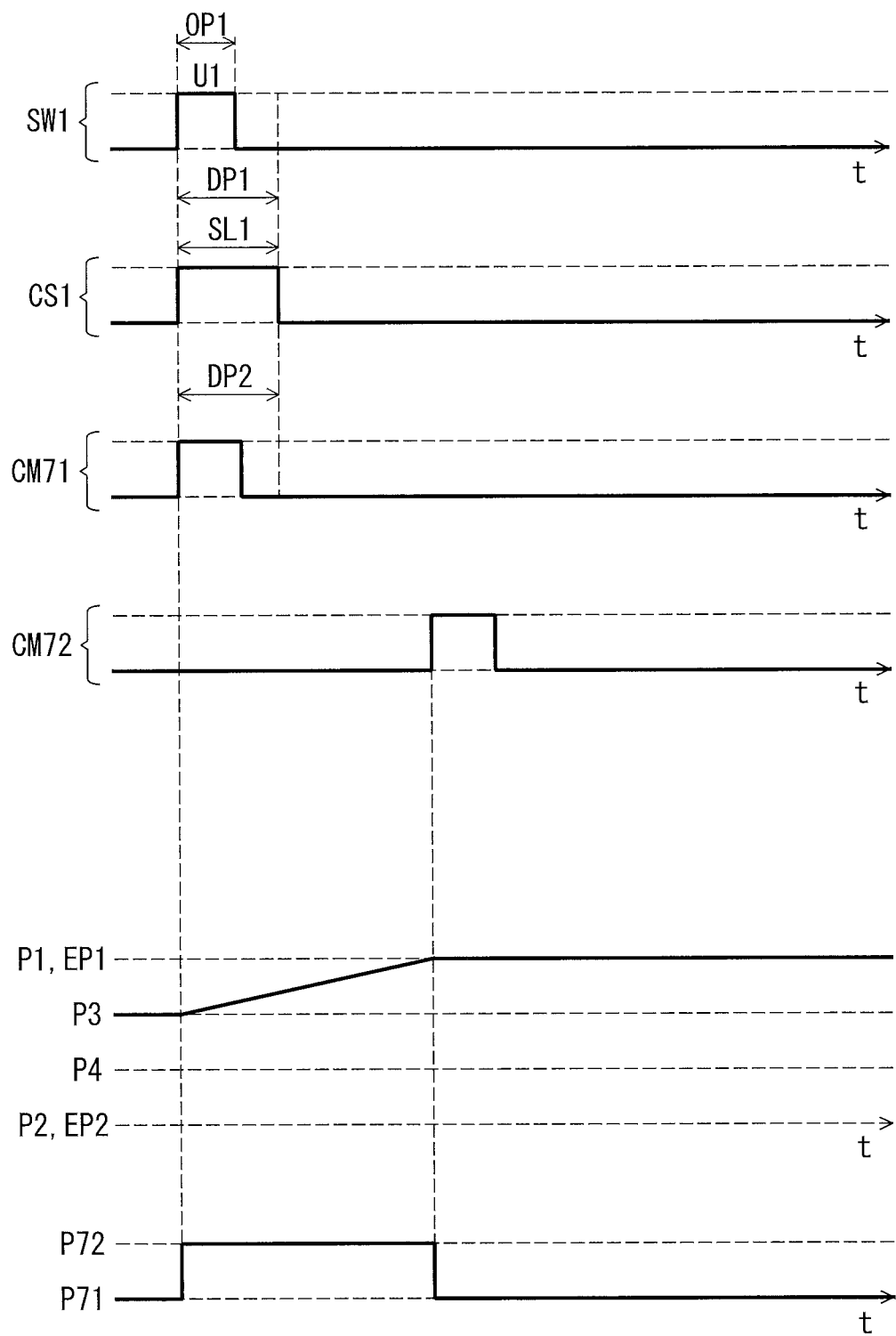
FIGS. 73 and 74 are timing charts of the telescopic apparatus operating system illustrated in FIG. 72 (first operating mode).
Figure 74:
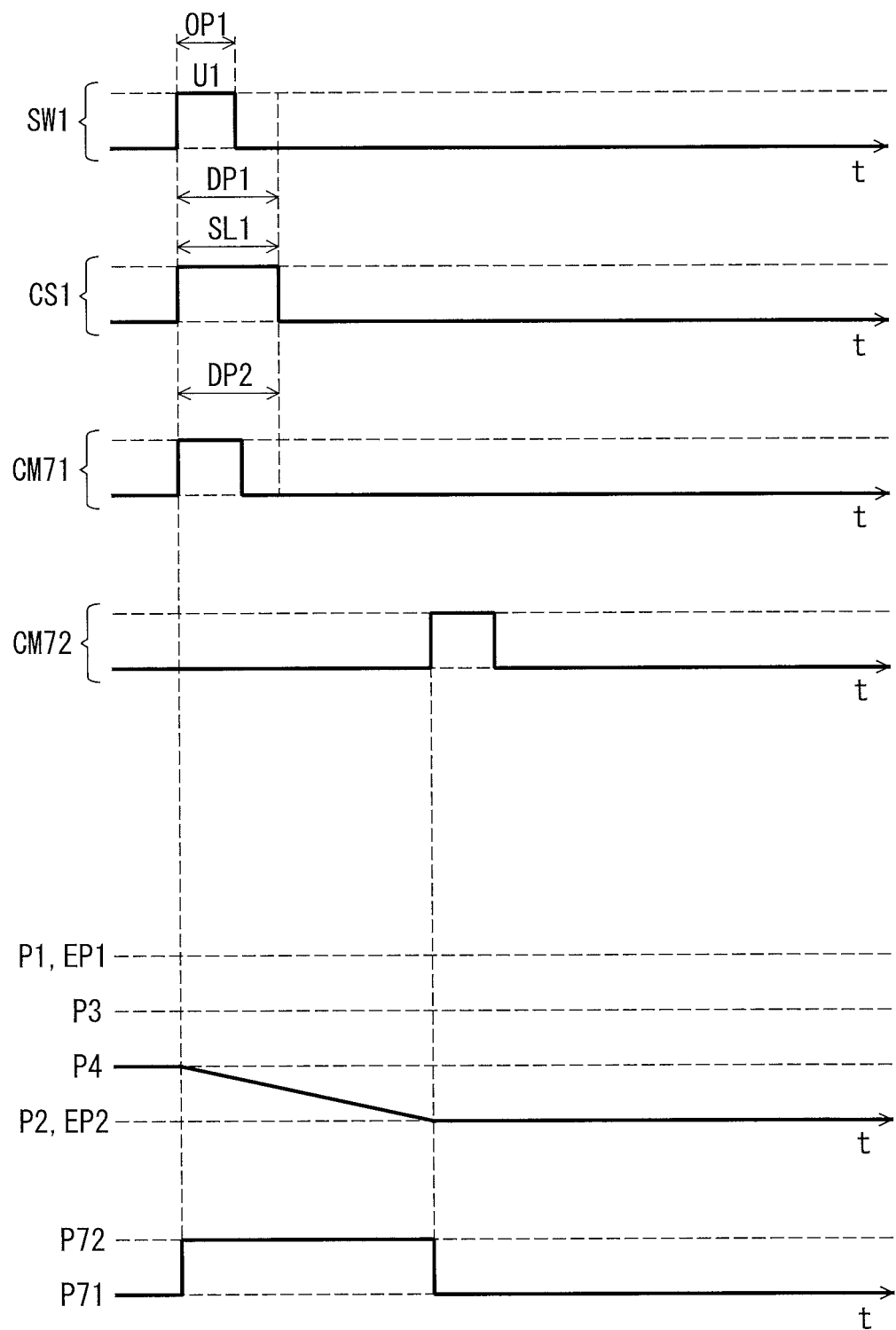
Figure 75:
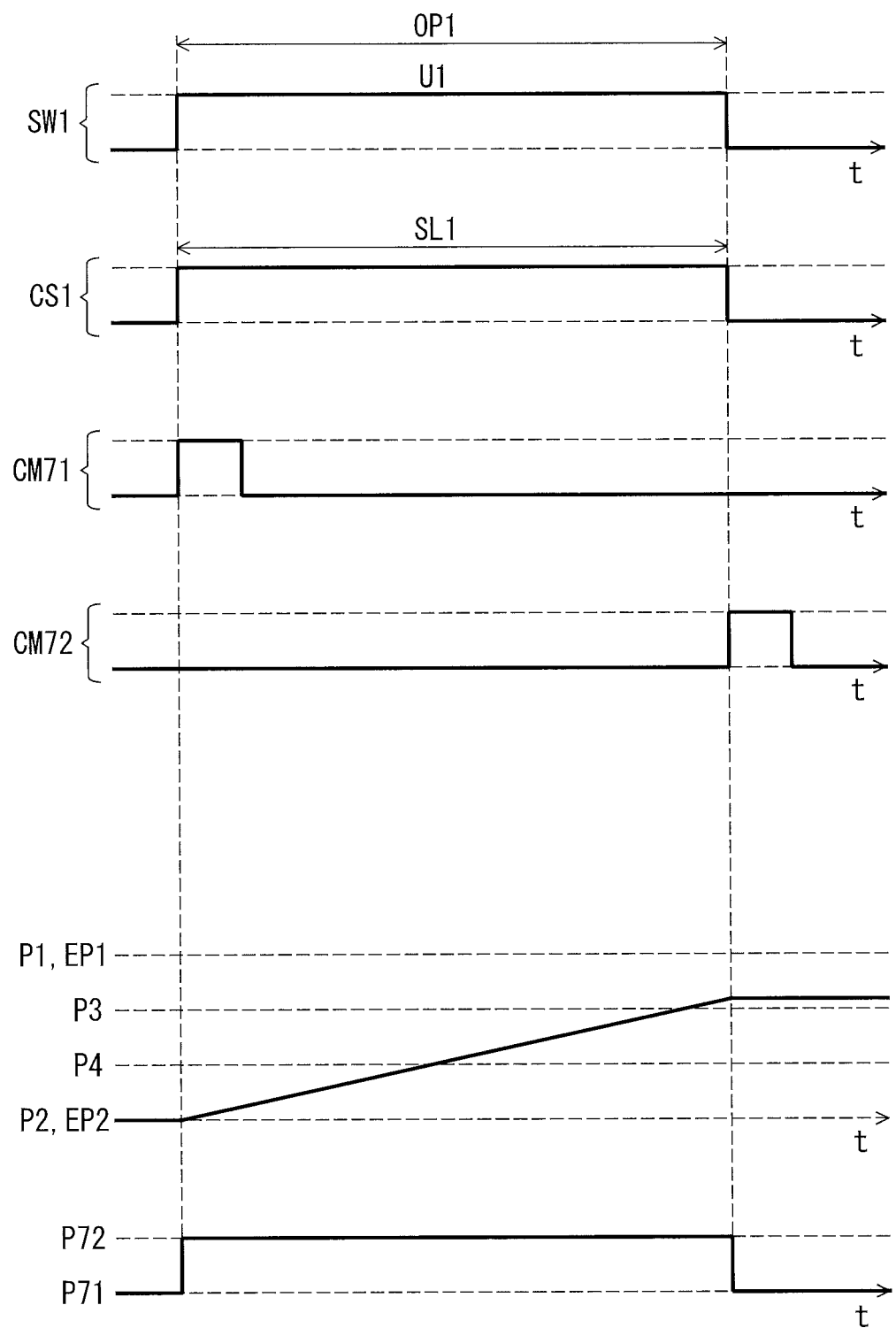
FIGS. 75 to 78 are timing charts of the telescopic apparatus operating system illustrated in FIG. 72 (second operating mode).
Figure 76:
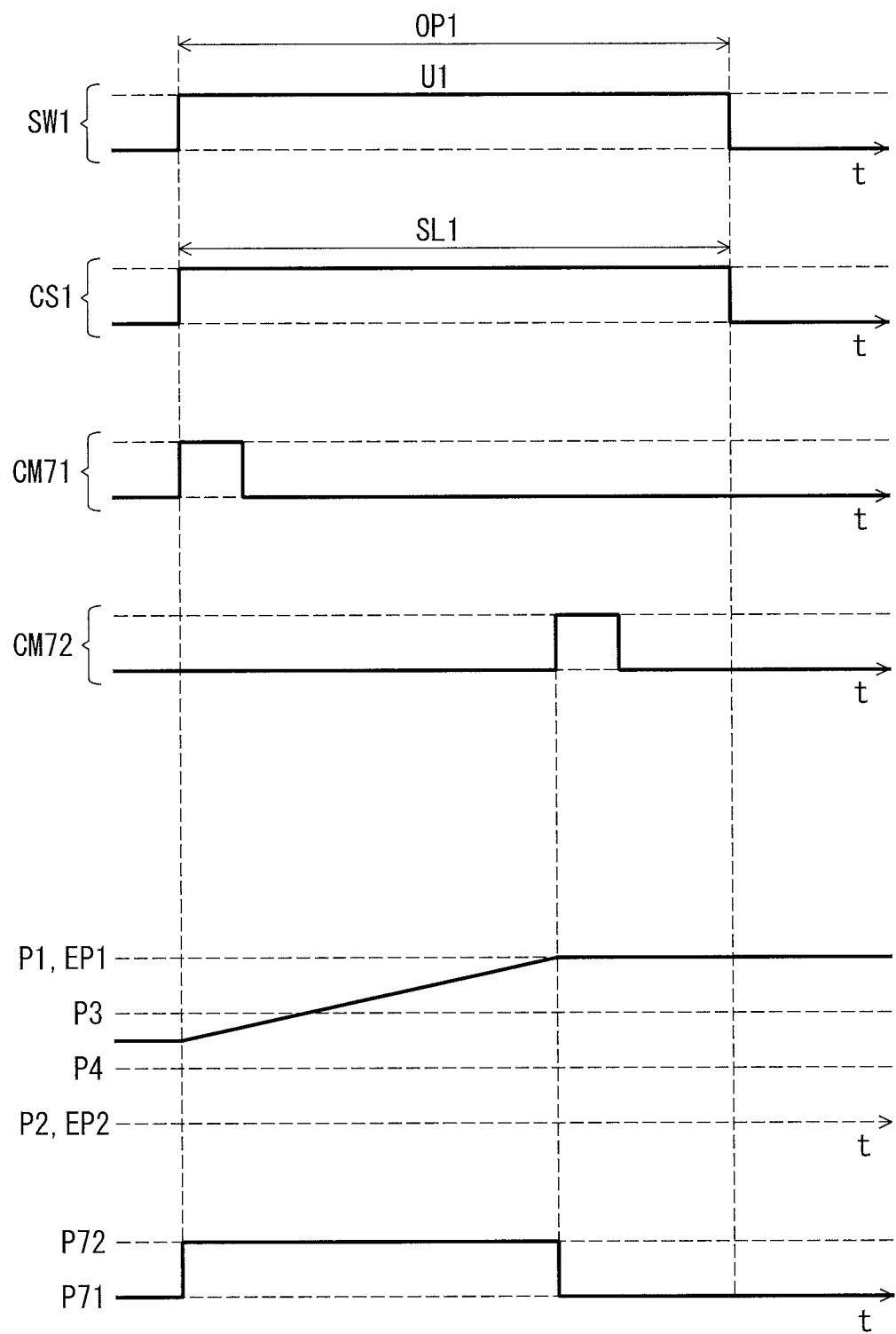
Figure 77:
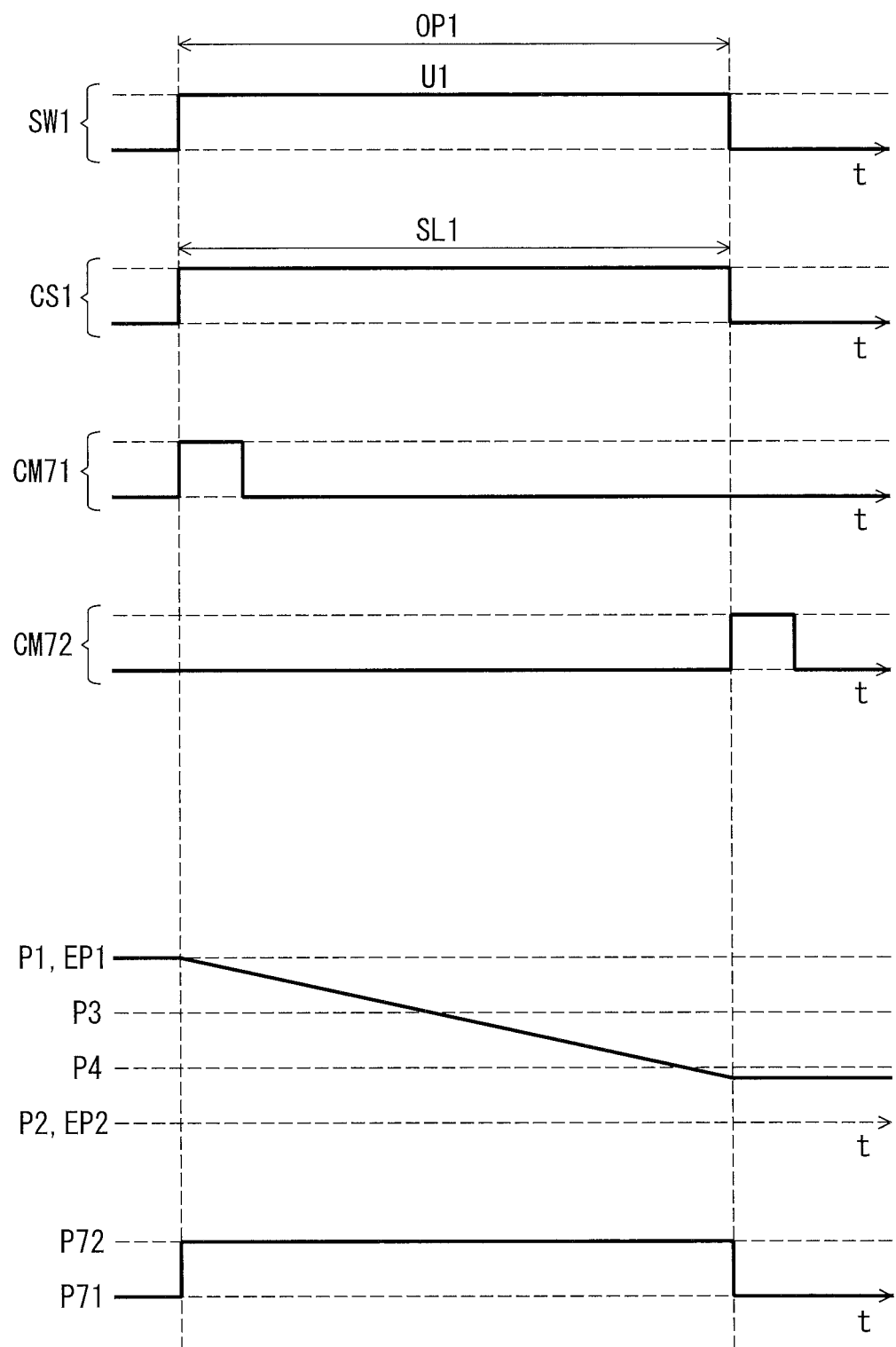
Figure 78:
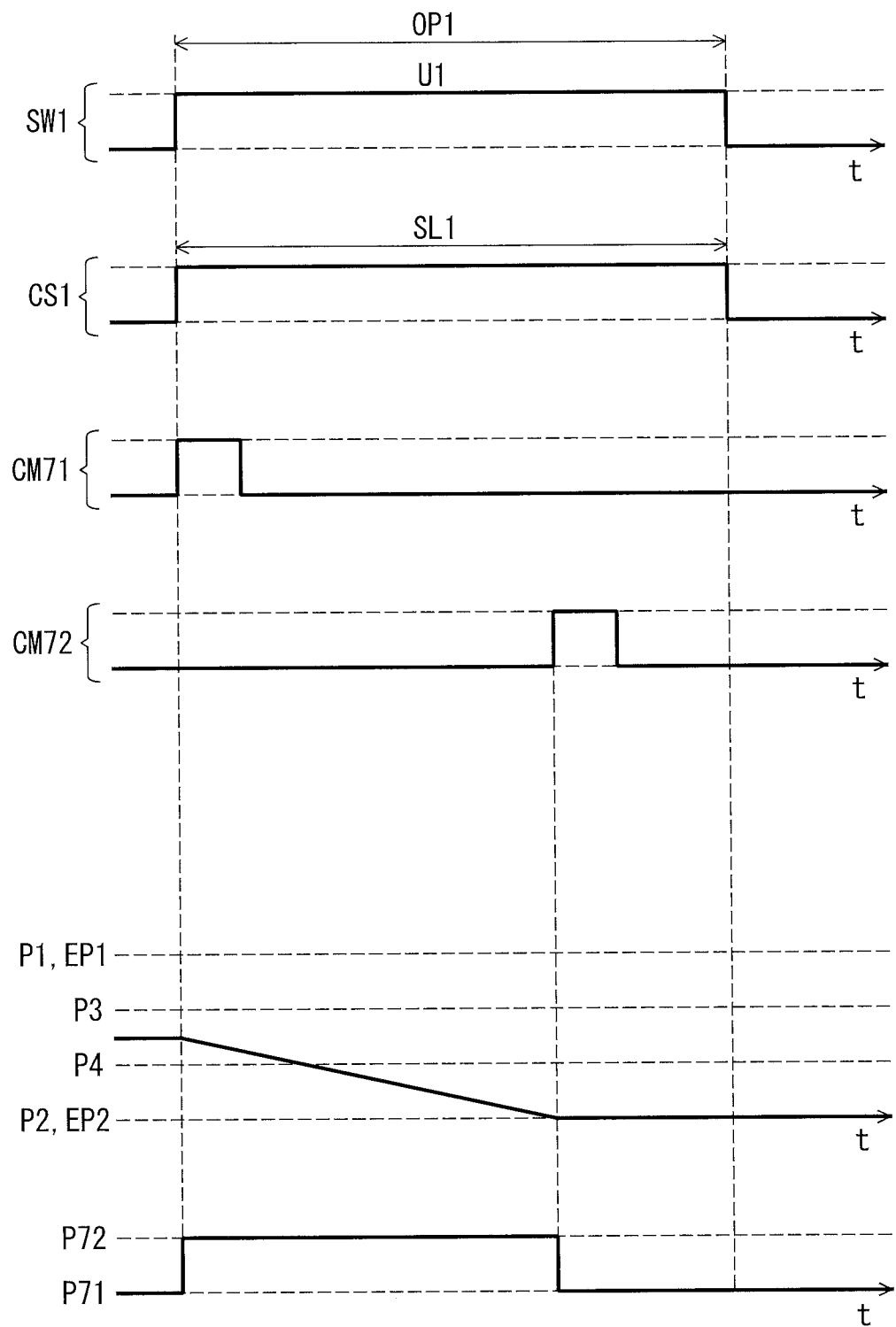

As seen in FIGS. 73 and 74, the controller 1038 is configured to generate the open command CM71 when the controller 1038 detects the first control signal CS1 in the first operating mode. The actuator driver 48 is configured to control the electric motor 30 to move the control rod 732 from the closed position P71 to the open position P72 in response to the open command CM71. In the open state where the control rod 732 is in the open position P72, the second tube 18 is moved relative to the first tube 16 in the first telescopic direction D11 or the second telescopic direction D12 by applying or releasing the rider's weight to or from the saddle VH2.

After generating the open command CM71, the controller 1038 is configured to determine the operating mode based on the signal length SL1 of the first control signal CS1 as with the controller 38 of the first embodiment and the controller 738 of the seventh embodiment.

In this embodiment, after concluding that the operating mode of the controller 1038 is the first operating mode, the controller 1038 is configured to compare the current position sensed by the position sensor 46 with the first predetermined position P1, the second predetermined position P2, the third predetermined position P3, and the third predetermined position P4.

The controller 1038 is configured to generate the close command CM72 when the controller 1038 concludes that the reference portion 18A reaches, by releasing the rider's weight, one of the first predetermined position P1, the second predetermined position P2, the third predetermined position P3, and the third predetermined position P4. The actuator driver 48 is configured to control the electric motor 30 to move the control rod 732 from the open position P72 to the closed position P71 in response to the close command CM72. Thus, the second tube 18 is stopped at one of the first predetermined position P1, the second predetermined position P2, the third predetermined position P3, and the third predetermined position P4 which is adjacent to the starting position in the first telescopic direction D11 or the second telescopic direction D12.

As seen in FIGS. 75 to 78, as with the controller 738 of the seventh embodiment, the controller 1038 is configured to selectively arrange the reference portion 18A of the telescopic apparatus 12 according to comparison between the current position of the reference portion 18A and at least one of the first end position EP1 and the second end position EP2 in the second operating mode. The operations of the second operating mode illustrated in FIGS. 75 to 78 are substantially the same as the operations of the second operating mode illustrated in FIGS. 61 to 64 except that only the first control signal CS1 is used. Thus, they will not be described in detail here for the sake of brevity.

Eleventh Embodiment

A telescopic apparatus operating system 1110 in accordance with an eleventh embodiment will be described below referring to FIGS. 79 to 83. The telescopic apparatus operating system 1110 has the same structure and/or configuration as that of the telescopic apparatus operating system 10 except for the telescopic apparatus controller 14. Thus, elements having substantially the same function as those in the above embodiments will be numbered the same here, and will not be described and/or illustrated again in detail here for the sake of brevity.

Figure 79:
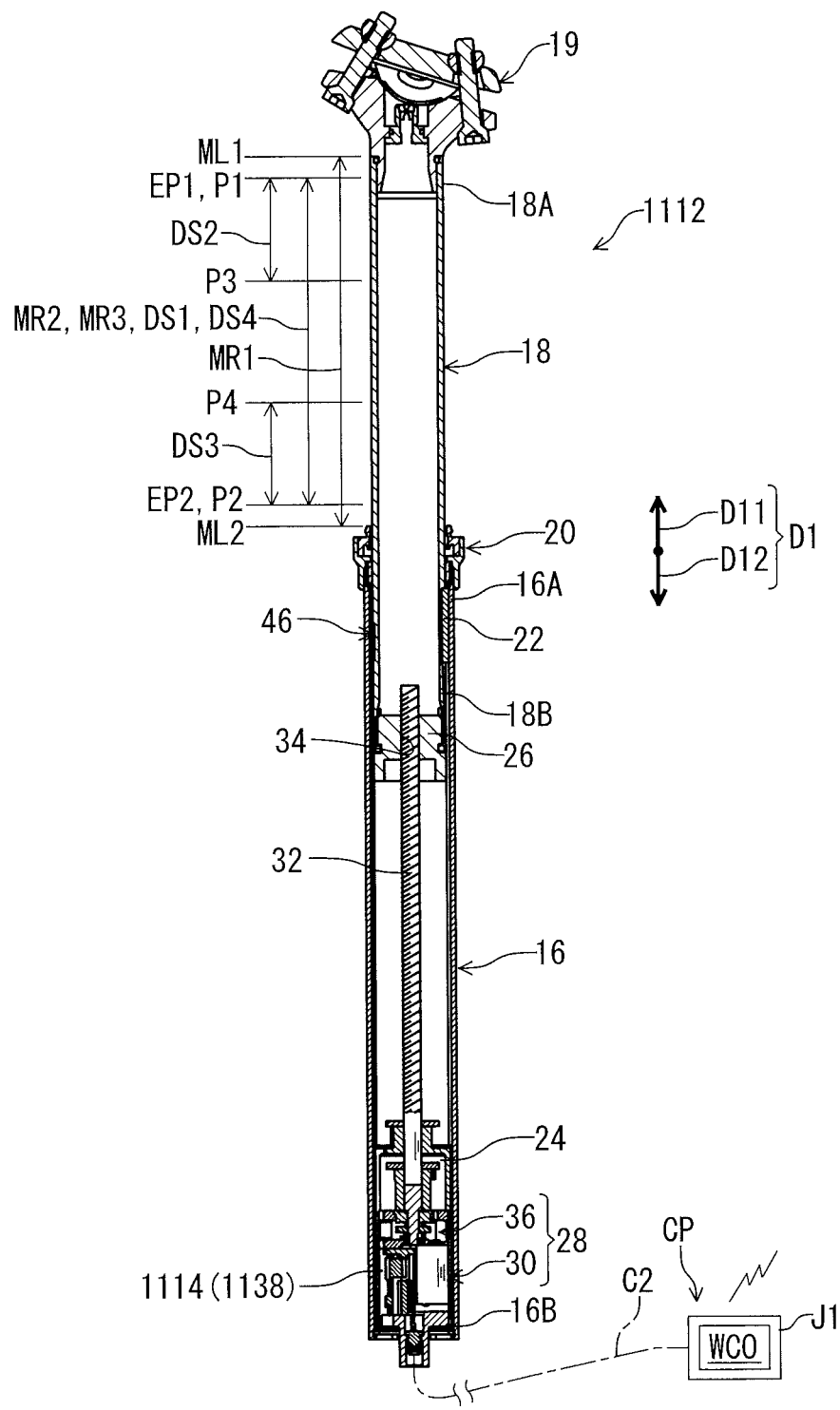
FIG. 79 is a cross-sectional view of a telescopic apparatus of a telescopic apparatus operating system in accordance with an eleventh embodiment.
Figure 80:
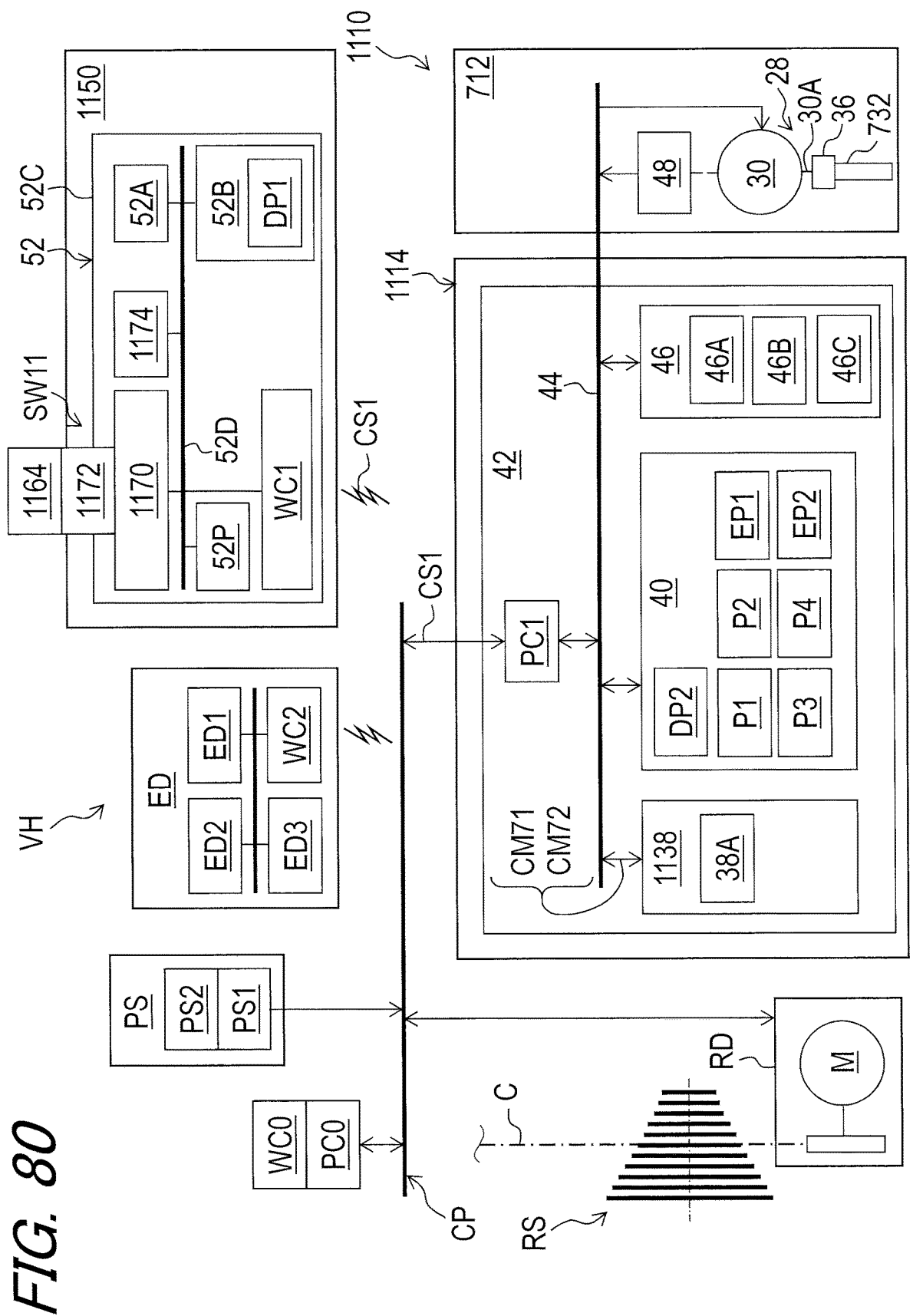
FIG. 80 is a block diagram of the telescopic apparatus operating system illustrated in FIG. 79.

As seen in FIGS. 79 and 80, the telescopic apparatus operating system 1110 for the human-powered vehicle VH comprises a telescopic apparatus controller 1114 and the telescopic apparatus 12. The telescopic apparatus controller 1114 is configured to control the telescopic apparatus 12. The telescopic apparatus controller 1114 for the human-powered vehicle VH comprises a controller 1138. The controller 1138 has substantially the same structure as the structure of the controller 38 of the first embodiment. The controller 1138 is configured to control the telescopic apparatus 12 in one of the plurality of operating modes. The plurality of operating modes includes the first operating mode and the second operating mode. The plurality of operating modes includes the first operating mode in which the reference portion 18A of the telescopic apparatus 12 is selectively arranged to one of the first predetermined position P1 and the second predetermined position P2. The plurality of operating modes includes the second operating mode in which the reference portion 18A of the telescopic apparatus 12 is arbitrarily arranged between the first end position EP1 and the second end position EP2.

As seen in FIG. 80, the telescopic apparatus operating system 1110 comprises an operating device 1150. The operating device 1150 includes a slide operating device SW11, the signal controller 52, and the wireless communicator WC1. The slide operating device SW11 is electrically connected to the signal controller 52.

Figure 81:
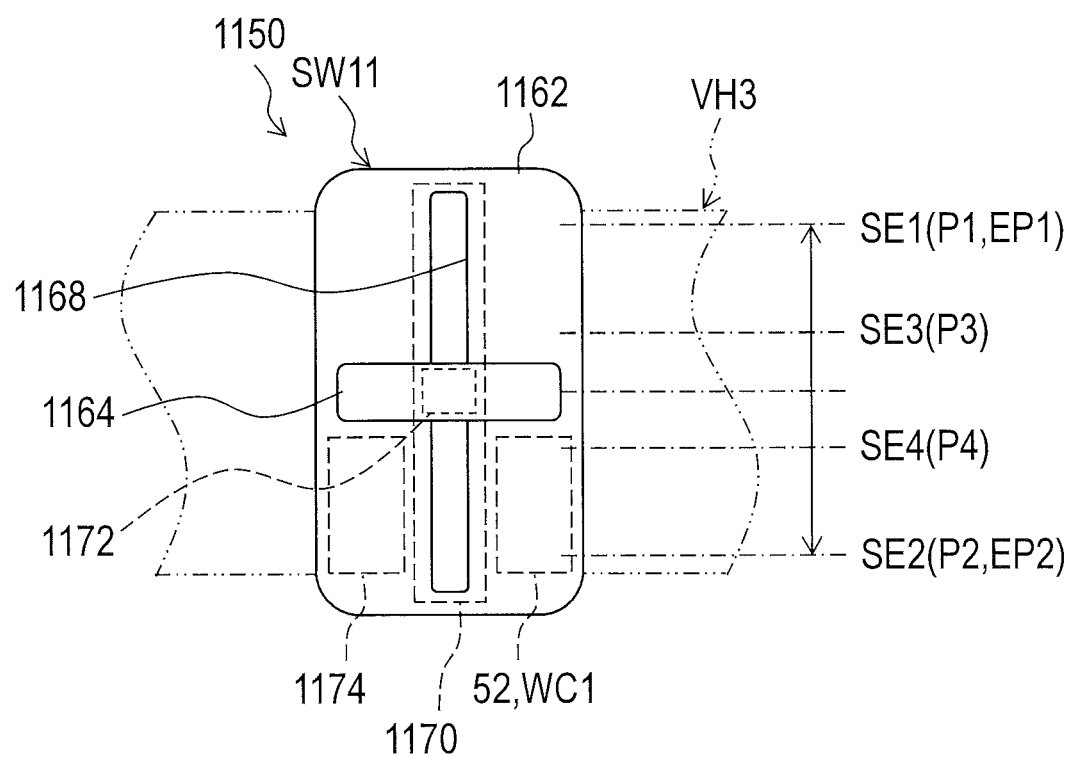
FIG. 81 is a plan view of a slide operating device of the telescopic apparatus operating system illustrated in FIG. 80.

As seen in FIG. 81, the slide operating device SW11 includes a base member 1162 and a slide member 1164. The base member 1162 includes a groove 1168. The slide member 1164 is movably provided on the base member 1162 along the groove 1168. The slide member 1164 is movable relative to the base member 1162 along the groove 1168 between a first slide end SE1 and a second slide end SE2. The first slide end SE1 corresponds to the first predetermined position P1 in the first operating mode. The second slide end SE2 corresponds to the second predetermined position P2 in the first operating mode. The first slide end SE1 corresponds to the first end position EP1 in the second operating mode. The second slide end SE2 corresponds to the second end position EP2 in the second operating mode. Intermediate slide positions SE3 and SE4 corresponding to the third predetermined positions P3 and P4 are defined between the first slide end SE1 and the second slide end SE2 in the slide operating device SW11.

The slide operating device SW11 includes a resistivity substrate 1170 and a brush 1172. The brush 1172 is attached to the slide member 1164. The brush 1172 is in slidable contact with the resistivity substrate 1170. The position of the slide member 1164 is kept when the user does not move the slide member 1164.

As seen in FIG. 80, the slide operating device SW11 includes a resistance sensor 1174. The resistance sensor 1174 is electrically connected to the resistivity substrate 1170. The resistance sensor 1174 is electrically mounted on the circuit board 52C. The resistance sensor 1174 is electrically connected to the signal controller 52 through the circuit board 52C. The resistance sensor 1174 is configured to sense a resistance value of the resistivity substrate 1170. The resistance value sensed by the resistance sensor 1174 linearly indicates a current position of the slide member 1164 relative to the base member 1162. The signal controller 52 is configured to periodically generate a control signal CS11 indicating the current position of the slide member 1164. The wireless communicator WC1 is configured to wirelessly transmit the control signal CS11 to the telescopic apparatus controller 1114 through the wireless communicator WC0. The controller 1138 is configured to recognize the current position of the slide member 1164.

Figure 82:
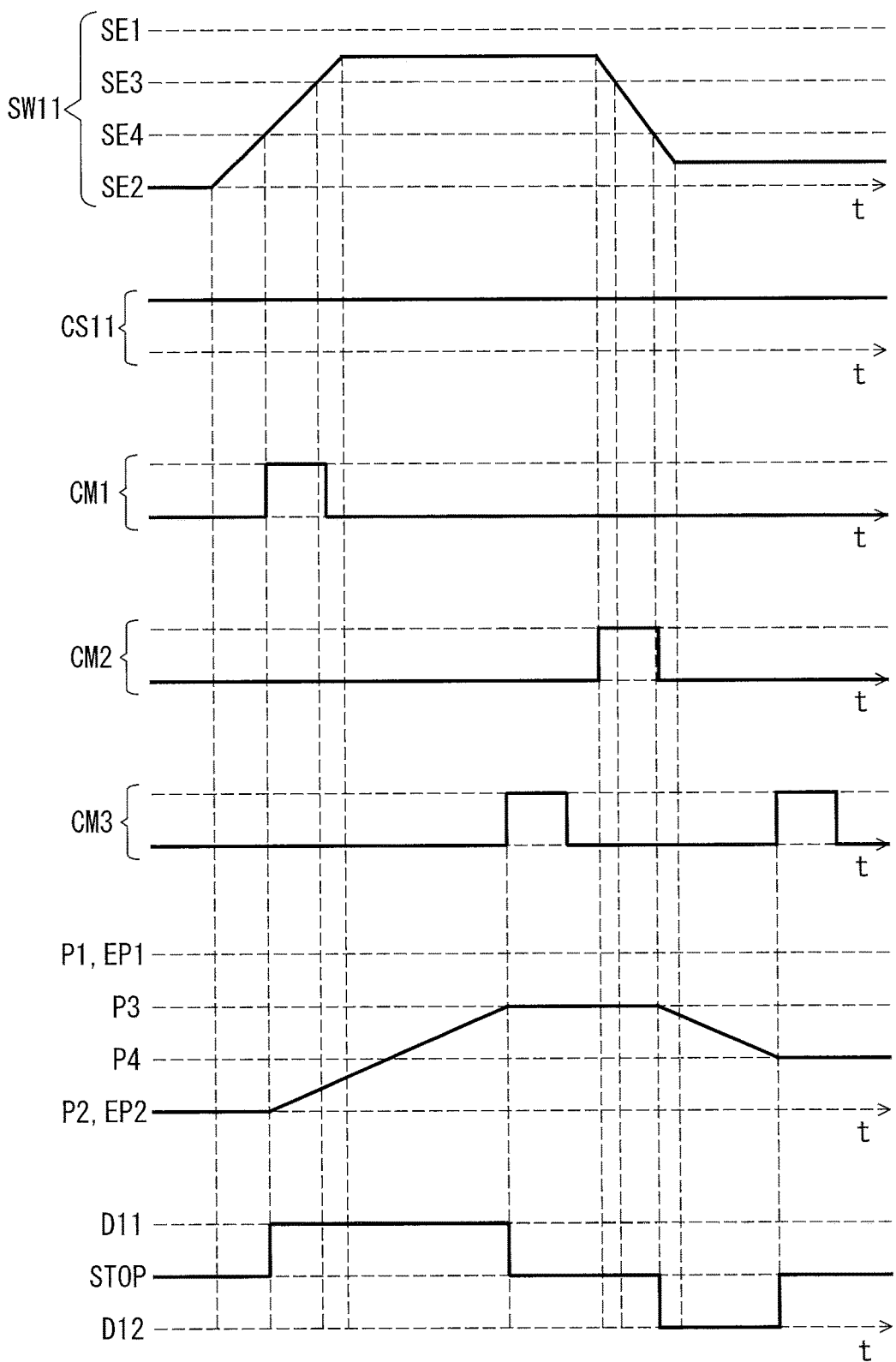
FIG. 82 is a timing chart of the telescopic apparatus operating system illustrated in FIG. 80 (first operating mode).

As seen in FIG. 82, the controller 1138 is configured to selectively arrange the reference portion 18A of the telescopic apparatus 12 to one of the first predetermined position P1, the second predetermined position P2, and a third predetermined position in the first operating mode. In this embodiment, the controller 1138 is configured to selectively arrange the reference portion 18A of the telescopic apparatus 12 to one of the first predetermined position P1, the second predetermined position P2, the third predetermined position P3, and the third predetermined position P4.

In the first operating mode, the controller 1138 is configured to periodically compare the current position of the slide member 1164 with the current position of the reference portion 18A sensed by the position sensor 46. The controller 1138 is configured to generate the first start command CM1 when the controller 1138 concludes that the slide member 1164 passes through a position corresponding to the predetermined position (e.g., the third predetermined position P4) located in the first telescopic direction D11 relative to the current position of the reference portion 18A. The actuator driver 48 is configured to control the electric motor 30 to move the second tube 18 relative to the first tube 16 in the first telescopic direction D11.

The controller 1138 is configured to periodically compare the current position of the slide member 1164 with the current position of the reference portion 18A sensed by the position sensor 46 after generating the first start command CM1. The controller 1138 is configured not to generate the stop command CM3 if the controller 1138 concludes that the slide member 1164 passes through a position (e.g., the intermediate slide position SE3) corresponding to the predetermined position (e.g., the third predetermined position P3) located in the first telescopic direction D11 relative to the current position of the reference portion 18A. If the controller 1138 concludes that the slide member 1164 is stopped, the controller 1138 is configured to generate the stop command CM3 when the reference portion 18A reaches the predetermined position (e.g., the third predetermined position P3) corresponding to the latest position where through which the slide member 1164 passes. The actuator driver 48 is configured to control the electric motor 30 to stop the second tube 18 relative to the first tube 16 in response to the stop command CM3. Thus, the reference portion 18A is stopped at the predetermined position.

The controller 1138 is configured not to generate the second start command CM2 when the controller 1138 concludes that the slide member 1164 passes through the position (e.g., the intermediate slide position SE3) corresponding to the predetermined position (e.g., the third predetermined position P3) in which the reference portion 18A is located. The controller 1138 is configured to generate the first start command CM1 when the controller 1138 concludes that the slide member 1164 passes through the position (e.g., the intermediate slide position SE4) corresponding to the predetermined position (e.g., the third predetermined position P4) located in the second telescopic direction D12 relative to the current position of the reference portion 18A. The actuator driver 48 is configured to control the electric motor 30 to move the second tube 18 relative to the first tube 16 in the second telescopic direction D12.

The controller 1138 is configured to periodically compare the current position of the slide member 1164 with the current position of the reference portion 18A sensed by the position sensor 46 after generating the second start command CM2. The controller 1138 is configured not to generate the stop command CM3 if the controller 1138 concludes that the slide member 1164 passes through a position corresponding to the predetermined position provided in the second telescopic direction D12 relative to the current position of the reference portion 18A. If the controller 1138 concludes that the slide member 1164 is stopped, the controller 1138 is configured to generate the stop command CM3 when the reference portion 18A reaches the predetermined position (e.g., the third predetermined position P4) corresponding to the latest position where through which the slide member 1164 passes. The actuator driver 48 is configured to control the electric motor 30 to stop the second tube 18 relative to the first tube 16 in response to the stop command CM3. Thus, the reference portion 18A is stopped at the predetermined position.

Figure 83:
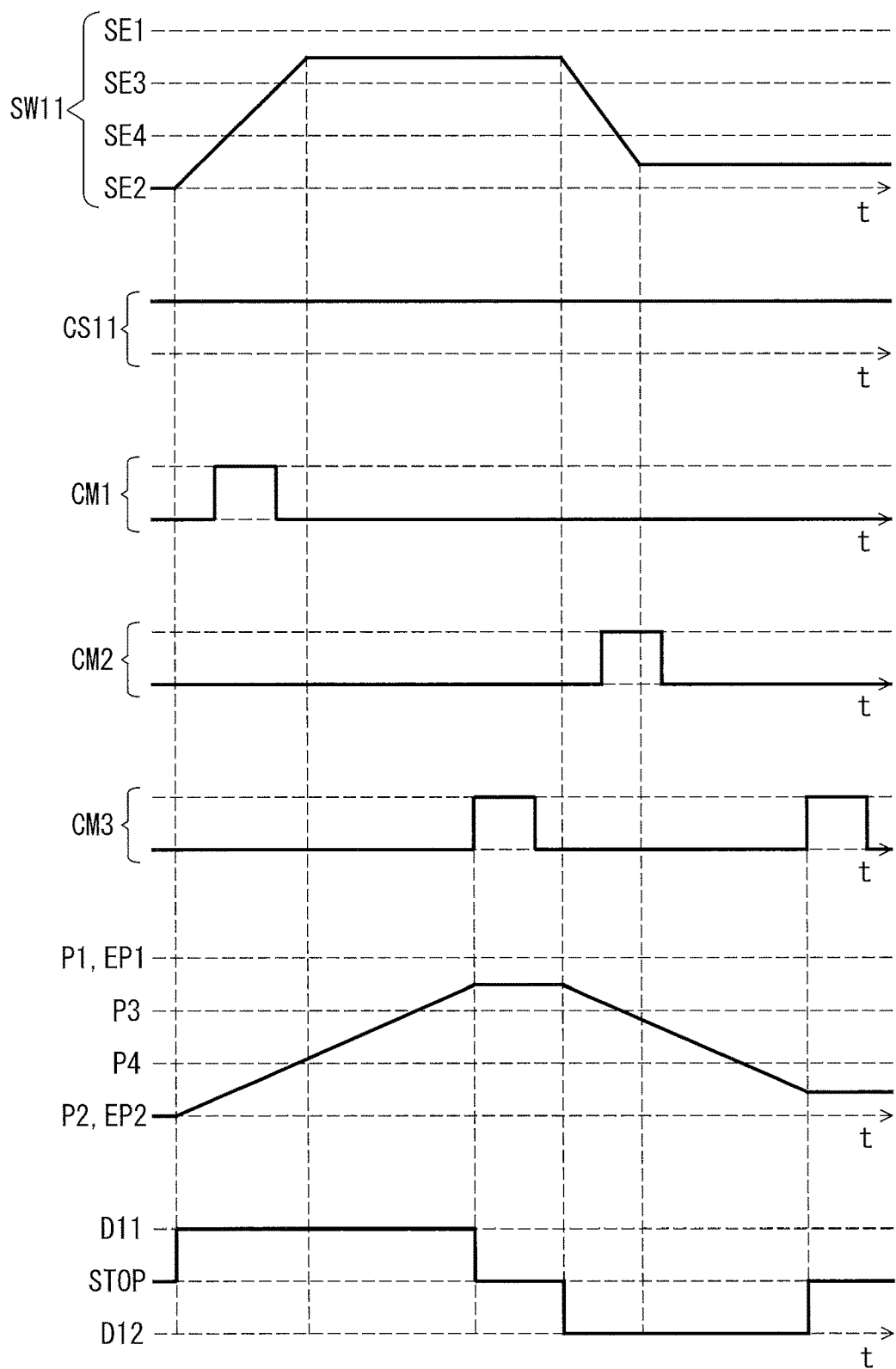
FIG. 83 is a timing chart of the telescopic apparatus operating system illustrated in FIG. 80 (second operating mode).

As seen in FIG. 83, the controller 1138 is configured to selectively arrange the reference portion 18A of the telescopic apparatus 12 according to comparison between the current position of the reference portion 18A and at least one of the first end position EP1 and the second end position EP2 in the second operating mode.

In the second operating mode, the controller 1138 is configured to periodically compare the current position of the slide member 1164 with the current position of the reference portion 18A sensed by the position sensor 46. The controller 1138 is configured to generate the first start command CM1 when the controller 1138 concludes that the slide member 1164 is moved toward the first slide end SE1. The actuator driver 48 is configured to control the electric motor 30 to move the second tube 18 relative to the first tube 16 in the first telescopic direction D11.

The controller 1138 is configured to periodically compare the current position of the slide member 1164 with the current position of the reference portion 18A sensed by the position sensor 46 after generating the first start command CM1. If the controller 1138 concludes that the slide member 1164 is stopped, the controller 1138 is configured to generate the stop command CM3 when the reference portion 18A reaches the position corresponding to the position in which the slide member 1164 is stopped. The actuator driver 48 is configured to control the electric motor 30 to stop the second tube 18 relative to the first tube 16 in response to the stop command CM3. Thus, the reference portion 18A is stopped at the position corresponding to the position in which the slide member 1164 is stopped.

In the second operating mode, the controller 1138 is configured to periodically compare the current position of the slide member 1164 with the current position of the reference portion 18A sensed by the position sensor 46. The controller 1138 is configured to generate the second start command CM2 when the controller 1138 concludes that the slide member 1164 is moved toward the second slide end SE2. The actuator driver 48 is configured to control the electric motor 30 to move the second tube 18 relative to the first tube 16 in the second telescopic direction D12.

The controller 1138 is configured to periodically compare the current position of the slide member 1164 with the current position of the reference portion 18A sensed by the position sensor 46 after generating the second start command CM2. If the controller 1138 concludes that the slide member 1164 is stopped, the controller 1138 is configured to generate the stop command CM3 when the reference portion 18A reaches the position corresponding to the position in which the slide member 1164 is stopped. The actuator driver 48 is configured to control the electric motor 30 to stop the second tube 18 relative to the first tube 16 in response to the stop command CM3. Thus, the reference portion 18A is stopped at the position corresponding to the position in which the slide member 1164 is stopped.

Modifications

At least one of the first to third electrical switches SW1 to SW3 can include an electricity generation element configured to generate electricity in response to a press of the at least one of the first to third electrical switches SW1 to SW3. Examples of the electricity generation element include a piezoelectric element. In the sixth or eighth embodiment, for example, if the first and second electrical switch SW1 and SW2 includes the electricity generation element and the third electrical switch SW3 is free of such electricity generation element, the concurrent operation of the first and second electrical switches SW1 and SW2 can be utilized instead of the long press of the first electrical switch SW1 even though the long press of the first electrical switch SW1 is not enough to generate electricity.

In the above embodiments, the telescopic apparatus controllers 14 to 914 are provided inside the first tube 16 and at a lower part of the first tube 16. However, at least one of the telescopic apparatus controllers 14 to 914 can be provided in other positions such that an upper part of the first tube 16, a lower part and/or an upper part of the second tube 18, outside of the first tube 16 and/or the second tube 18, the saddle VH2, the vehicle body VH1, the handlebar VH3, or other any part of the human-powered vehicle VH.

In the above embodiments, the operating device 50 includes the first to third electrical switches SW1 to SW3 such as a push-button switch. However, the operating device 50 can include other type of devices configured to receive a user input. For example, the operating device 50 can include a toggle switch, a rotary switch, and a slide switch.

In the above embodiments, the human-powered vehicle VH is a mountain bike. However, the telescopic apparatus operating systems 10 to 1110 can apply to any type of human-powered vehicles such as a road bike and a gravel bike. In the above embodiments, the operating device 50 is mounted to a flat handlebar. However, the operating device 50 can be mounted to a drop-down handlebar of a road bike or a gravel bike.

In the above embodiments, the telescopic apparatus operating systems 10, 210, 310, 410, 510, 610, and 1110 comprises the telescopic apparatus 12 including the screw rod 32 and the threaded hole 34, and the telescopic apparatus operating systems 710, 810, 910, and 1010 comprises the telescopic apparatus 712 including the control rod 732 and the valve structure 733. However, the structure of the telescopic apparatus is not limited to the above embodiment. The telescopic apparatus can include other structures configured to displace the second tube 18 relative to the first tube 16.

In the eleventh embodiment, the telescopic apparatus operating system 1110 comprises the telescopic apparatus controller 1114 and the telescopic apparatus 12. However, the configuration of the telescopic apparatus controller 1114 can apply to the telescopic apparatus 712 including a hydraulic structure and/or a pneumatic structure.

Figure 84:
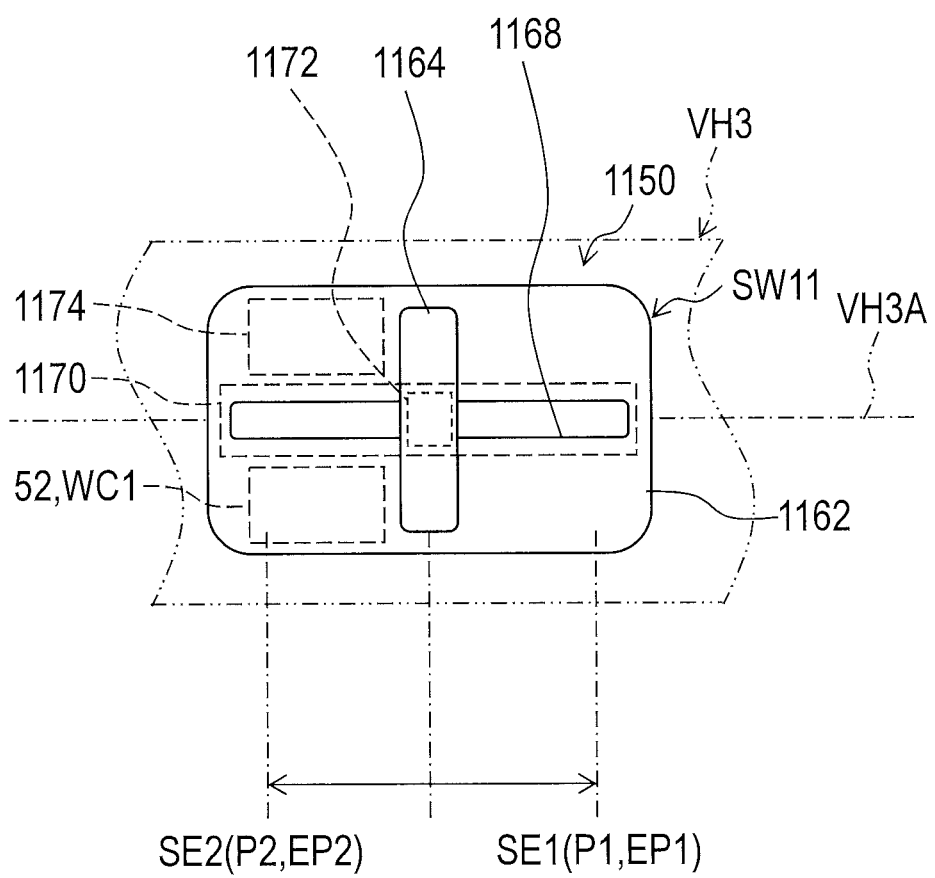
FIGS. 84 to 87 are plan views of slide operating devices in accordance with modifications.
Figure 85:
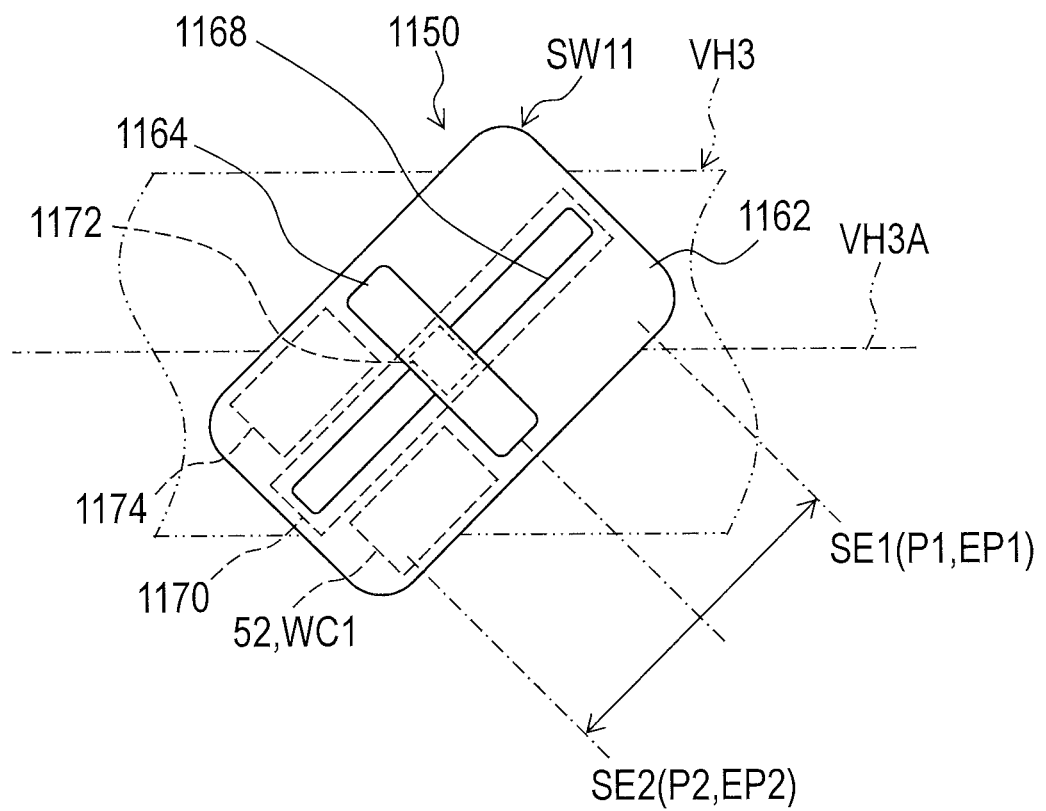
Figure 86:
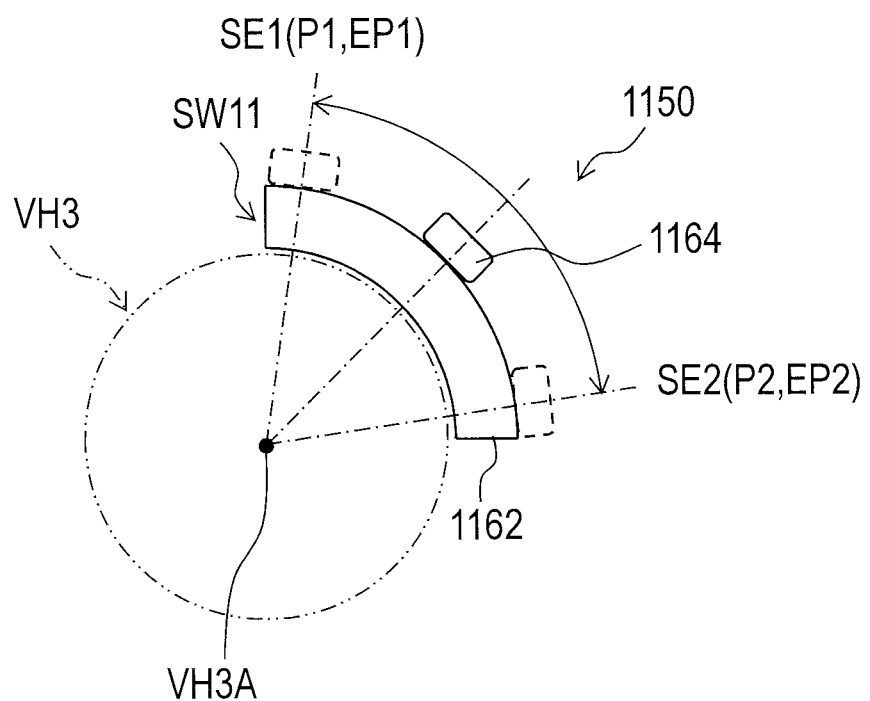
Figure 87:
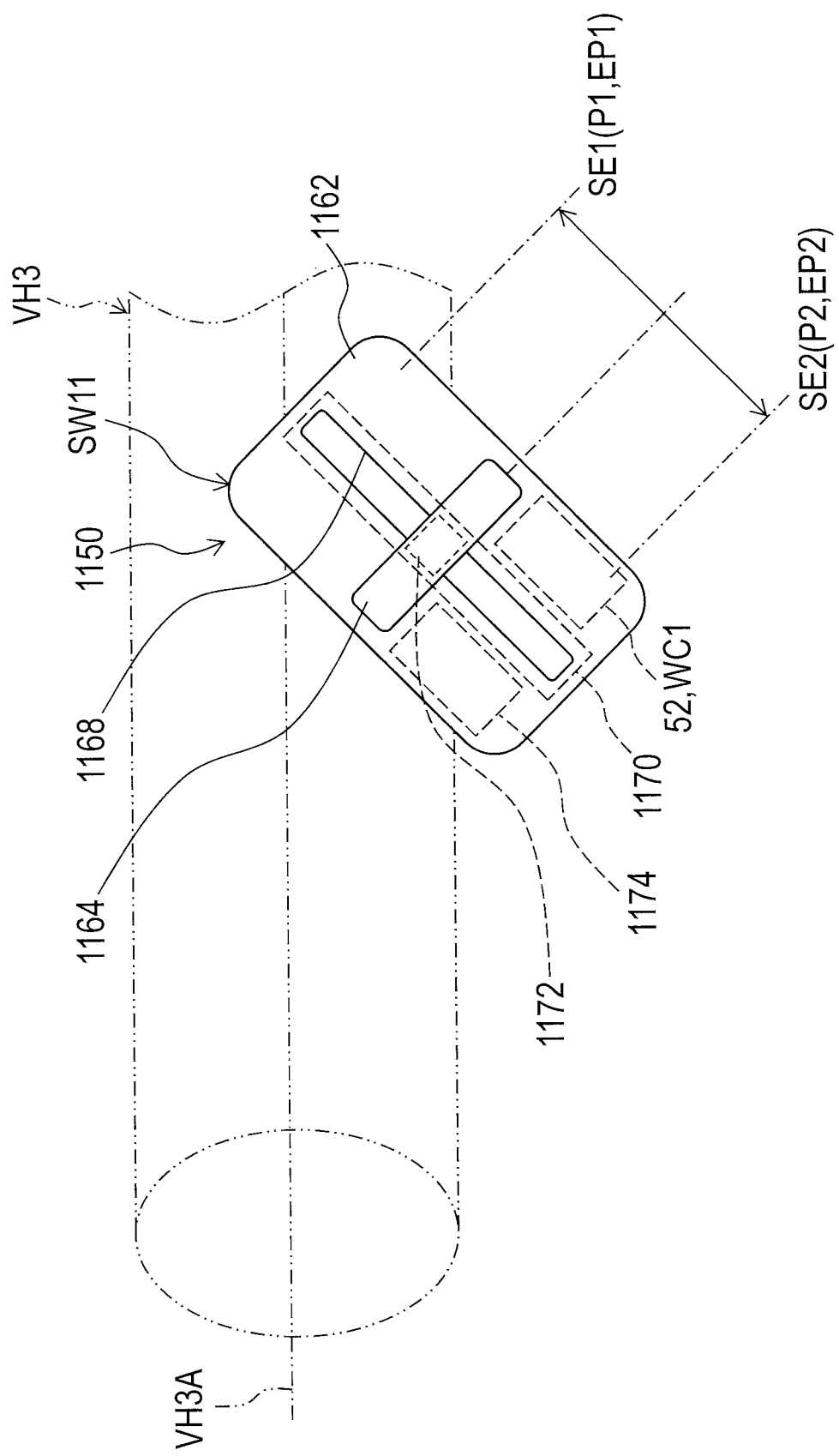

In the eleventh embodiment, the position, the orientation, and the structure of the slide operating device SW11 is not limited to this embodiment. As seen in FIG. 84, for example, the slide operating device SW11 can be mounted to the handlebar VH3 such that the direction in which the slide member 1164 is movable relative to the base member 1162 is provided along a center axis VH3A of the handlebar VH3. As seen in FIG. 85, the slide operating device SW11 can be mounted to the handlebar VH3 such that the direction in which the slide member 1164 is movable relative to the base member 1162 is inclined relative to the center axis VH3A of the handlebar VH3. As seen in FIG. 86, the slide operating device SW11 can be mounted to the handlebar VH3 such that the direction in which the slide member 1164 is movable relative to the base member 1162 is provided along an outer peripheral surface of the handlebar VH3 about the center axis VH3A. As seen in FIG. 87, the slide operating device SW11 can be mounted to the handlebar VH3 such that the direction in which the slide member 1164 is movable relative to the base member 1162 is inclined relative to the center axis VH3A of the handlebar VH3. The shape of the slide operating device SW11 illustrated in FIG. 86 can apply to each of the slide operating devices SW11 illustrated in FIGS. 81, 84, 85, and 87.

Figure 88:
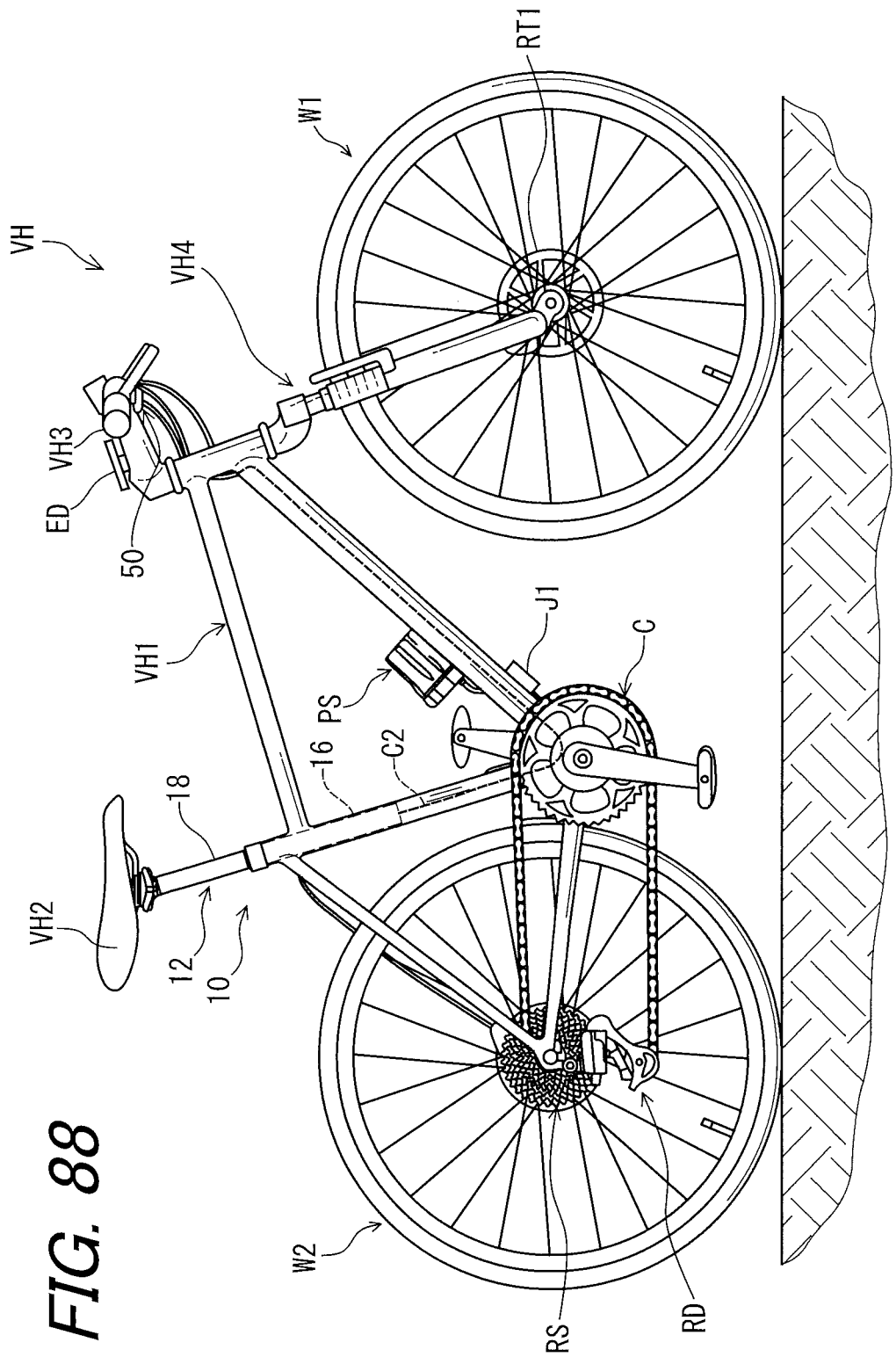
FIG. 88 is a side elevational view of a human-powered vehicle including a telescopic apparatus operating system in accordance with another modification.

In the above embodiments, the operating device 50 is wirelessly connected to the telescopic apparatus controller 14. However, the operating device 50 can be connected to the telescopic apparatus controller 14 with an electric cable. In FIG. 1, for example, the operating device 50 can be connected to the junction J1 with an electric cable. As seen in FIG. 88, the operating device 50 can be directly connected to the telescopic apparatus controller 14 with the electric cable C2 routed partially within the internal space of the vehicle body VH1 of the human-powered vehicle VH.

The above embodiments and modifications can apply to other telescopic apparatuses such as a suspension. Furthermore, the above embodiments can apply to a link structure configured to change a position of the saddle VH2.

The term "comprising" and its derivatives, as used herein, are intended to be open ended terms that specify the presence of the stated features, elements, components, groups, integers, and/or steps, but do not exclude the presence of other unstated features, elements, components, groups, integers, and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term, "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A telescopic apparatus controller for a human-powered vehicle, comprising:
   a controller configured to control a telescopic apparatus in one of a plurality of operating modes, the plurality of operating modes including
       a first operating mode in which a reference portion of the telescopic apparatus is selectively arranged to one of a plurality of predetermined positions that are spaced apart from one another, the plurality of predetermined positions including at least a first predetermined position and a second predetermined position, and
       a second operating mode in which the reference portion of the telescopic apparatus is arbitrarily arranged at any location between a first end position and a second end position that define a moveable range of the reference portion of the telescopic apparatus in the second operating mode,
   wherein the first operating mode is a preset position setting mode in which the reference portion of the telescopic apparatus is selectively arranged to one of the plurality of predetermined positions that are spaced apart from one another within the movable range of the reference portion, and the second operating mode is an arbitrary position setting mode in which the reference portion of the telescopic apparatus is arbitrarily arranged at any location between the first end position and the second end position that define the moveable range of the reference portion.

2. The telescopic apparatus controller according to claim 1, wherein
the first predetermined position is the same as the first end position.

3. The telescopic apparatus controller according to claim 1, wherein
the second predetermined position is the same as the second end position.

4. The telescopic apparatus controller according to claim 1, wherein
the controller is configured to selectively arrange the reference portion of the telescopic apparatus to one of the first predetermined position, the second predetermined position, and a third predetermined position in the first operating mode.

5. The telescopic apparatus controller according to claim 4, wherein
the third predetermined position is provided between the first predetermined position and the second predetermined position and different from the first predetermined position and the second predetermined position.

6. The telescopic apparatus controller according to claim 1, wherein
the controller is configured to selectively arrange the reference portion of the telescopic apparatus to one of the first predetermined position, the second predetermined position, and a plurality of third predetermined positions in the first operating mode.

7. The telescopic apparatus controller according to claim 1, wherein
the controller is configured to change an operating mode from one of the first operating mode and the second operating mode to the other of the first operating mode and the second operating mode in response to a mode-change input.

8. The telescopic apparatus controller according to claim 1, further comprising
a memory electrically connected to the controller, wherein
the memory is configured to store setting information relating to at least one of an operation of the telescopic apparatus and a movement of the telescopic apparatus.

9. The telescopic apparatus controller according to claim 8, wherein
the controller is configured to communicate with an external device, and
the controller is configured to adjust the setting information in response to an input from the external device.

10. The telescopic apparatus controller according to claim 1, wherein
the telescopic apparatus comprises
a first tube,
a second tube configured to be telescopically coupled to the first tube, and
an actuator configured to telescopically displace the first tube relative to the second tube, and
the controller is configured to control the actuator.

11. The telescopic apparatus controller according to claim 10, wherein
the actuator includes at least one of a hydraulic device, a pneumatic device, an electric motor, a solenoid, a shape memory alloy, and a piezoelectric element.

12. The telescopic apparatus controller according to claim 1, further comprising
a position sensor configured to detect a current position of the reference portion of the telescopic apparatus.

13. The telescopic apparatus controller according to claim 12, wherein
the controller is configured to selectively arrange the reference portion of the telescopic apparatus according to comparison between the current position of the reference portion and at least one of the first predetermined position and the second predetermined position in the first operating mode, and
the controller is configured to selectively arrange the reference portion of the telescopic apparatus according to comparison between the current position of the reference portion and at least one of the first end position and the second end position in the second operating mode.

14. The telescopic apparatus controller according to claim 1, further comprising
a wireless communicator electrically connected to the controller, wherein
the wireless communicator is configured to be wirelessly in communication with an external device.

15. A telescopic apparatus operating system for a human-powered vehicle, comprising:
the telescopic apparatus controller according to claim 1; and
the telescopic apparatus.

16. The telescopic apparatus operating system according to claim 15, wherein
the telescopic apparatus comprises
a first tube,
a second tube configured to be telescopically coupled to the first tube, and
an actuator configured to telescopically displace the first tube relative to the second tube.

17. The telescopic apparatus operating system according to claim 16, wherein
the actuator is provided to at least one of the first tube and the second tube.

18. The telescopic apparatus operating system according to claim 15, wherein
the telescopic apparatus includes a height adjustable seatpost.

19. A telescopic apparatus controller for a human-powered vehicle, comprising:
a controller configured to control a telescopic apparatus in one of a plurality of operating modes, the plurality of operating modes including
a first operating mode in which a reference portion of the telescopic apparatus is selectively arranged to one of a first predetermined position and a second predetermined position, and
a second operating mode in which the reference portion of the telescopic apparatus is arbitrarily arranged between a first end position and a second end position; and
a position sensor configured to detect a current position of the reference portion of the telescopic apparatus, wherein
the controller is configured to selectively arrange the reference portion of the telescopic apparatus according to comparison between the current position of the reference portion and at least one of the first end position and the second end position in the second operating mode.

\* \* \* \* \*